US005557113A

United States Patent [19]

Moorhouse et al.

[11] Patent Number: 5,557,113

[45] Date of Patent: Sep. 17, 1996

[54] METHOD AND STRUCTURE FOR GENERATING A SURFACE IMAGE OF A THREE DIMENSIONAL TARGET

[75] Inventors: Abigail A. Moorhouse; Christopher R. Fairley, both of San Jose; Phillip R. Rigg, Saratoga; Alan Helgesson, Mountain View, all of Calif.

[73] Assignee: Ultrapointe Corp., Santa Clara County, Calif.

[21] Appl. No.: 198,751

[22] Filed: Feb. 18, 1994

[51] Int. Cl.$^6$ .......................... G01N 21/00; G01B 11/24

[52] U.S. Cl. ...................................... 250/559.38; 356/376

[58] Field of Search .................................... 250/559, 560, 250/561, 562, 563, 208.1, 208.2, 571, 572, 559.22, 559.29, 559.38, 559.06; 356/376, 378, 379, 380, 381, 383; 348/128, 130, 294

[56] References Cited

U.S. PATENT DOCUMENTS

Re. 34,749 10/1994 Leong et al. ........................ 250/237 G
4,935,635 6/1990 O'Harra ................................. 250/560
5,187,506 2/1993 Carter ..................................... 351/221
5,289,261 2/1994 Yogo et al. ............................ 356/376

*Primary Examiner*—Edward P. Westin
*Assistant Examiner*—John R. Lee
*Attorney, Agent, or Firm*—Skjerven, Morrill, MacPherson, Frankling & Friel; Alan H. MacPherson; E. Eric Hoffman

[57] ABSTRACT

A method and apparatus for generating a surface image of a target. The laser beam of a confocal laser microscope is moved along a scanning pattern on an area of a target. During each scanning pattern, the resulting electronic focus signal of the microscope is sampled at defined positions along the scanning pattern to generate a frame of pixel intensity values. At the end of each scanning pattern, the height of the target is slightly increased. A new frame of pixel intensity values is generated for each height of the target. The pixel intensity values of the frames are compared. The maximum pixel intensity value for each defined position along the scanning pattern is stored to create a single frame representative of the surface image of the target. In an alternate embodiment, the height at which each maximum pixel intensity value was measured is stored in a separate memory.

7 Claims, 71 Drawing Sheets

KEY TO FIG. 7B

| FIG. 7B-1 | FIG. 7B-2 |
|---|---|

KEY TO FIG. 10A

| FIG. 10A-1 | |
|---|---|
| FIG. 10A-2 | FIG. 10A-3 |

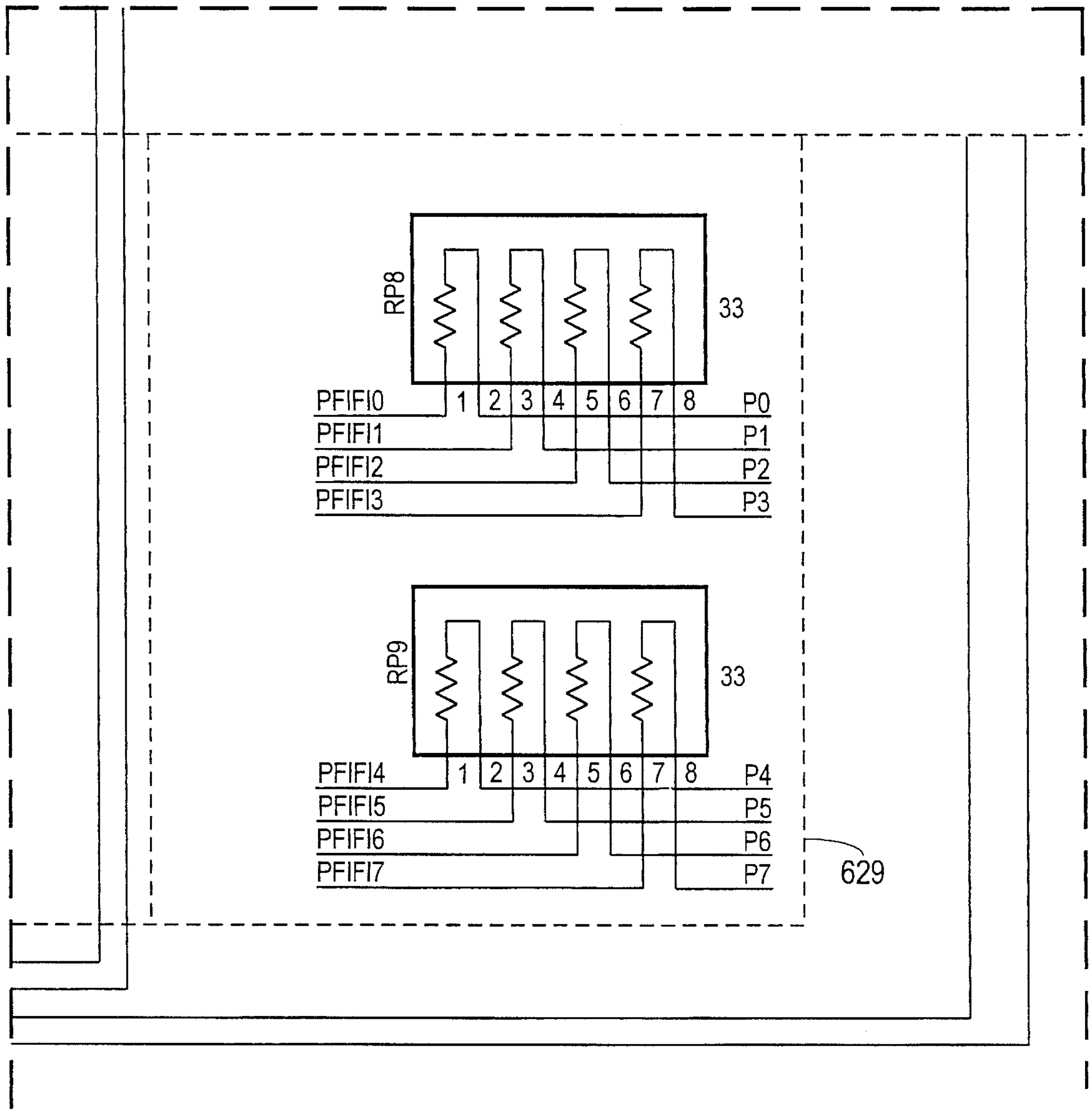
FIG. 10B-3
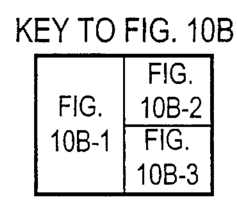

KEY TO FIG. 10C

| | |
|---|---|
| FIG. 10C-1 | FIG. 10C-3 |
| FIG. 10C-2 | |

KEY TO FIG. 10F

| FIG. 10F-1 | FIG. 10F-2 | FIG. 10F-3 |
|---|---|---|

KEY FIG. 10H

| FIG. 10H-1 | FIG. 10H-2 |
|---|---|

KEY TO FIG. 10I

| FIG. 10I-1 | FIG. 10I-2 |
| --- | --- |

| FIG. 10K-1 | FIG. 10K-2 |
|---|---|

KEY TO FIG. 10K

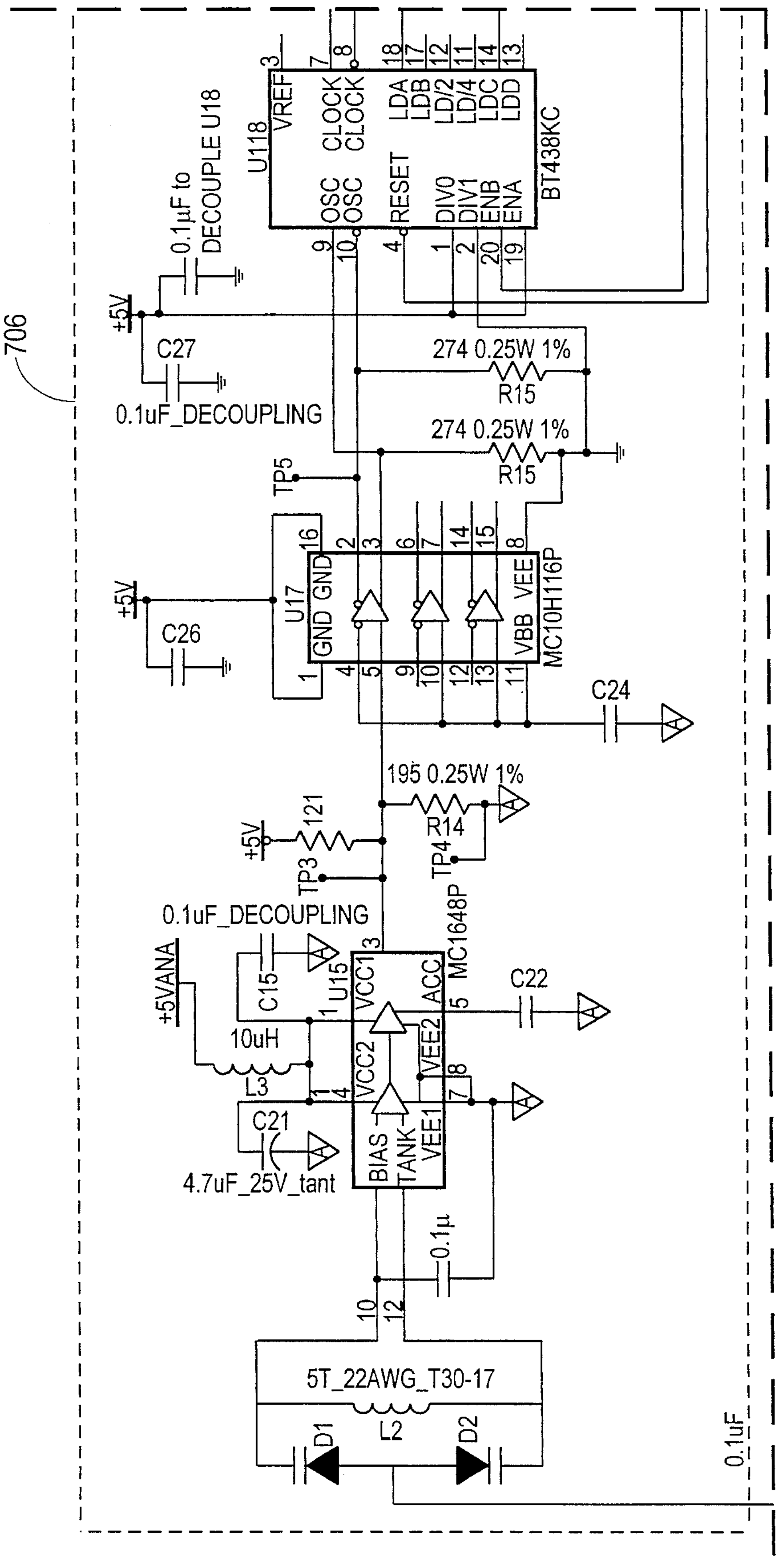
FIG. 12A-1
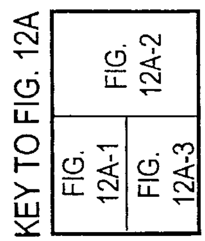

KEY TO FIG. 12B

| FIG. 12B-1 | FIG. 12B-2 |
|---|---|

KEY TO FIG. 12C

| FIG. 12C-1 | FIG. 12C-2 |
| --- | --- |

FIG. 17A
AGND
+5VANA
0.01uF
C72
0.01uF
C36
0.01uF
C75
22uF 20% TANT
C127
22uF 20% TANT
C126
0.1uF DECOUPLING
C180
0.1uF DECOUPLING
C16
0.1uF DECOUPLING
C28
0.1uf DECOUPLING
C74
0.1uF DECOUPLING
C19
0.1uF DECOUPLING
C35
0.1uF DECOULPLING
C73
+5A
-5V
AGND
22uF 20% TANT
C125
0.1uF DECOUPLING
C20
0.1uF DECOUPLING
C30
0.1uF DECOUPLING
-5.2
C124
GND
+5V
0.1uF DECOUPLING
C119
C120
C41
C122
C52
C118
C121
C76
C147
C157
C158
C159
1 2 SPARE2 2 4
1 2 SPARE8 2 4
1 2 SPARE3 2 4
1 2 SPARE4 2 4
1 2 SPARE5 2 4
1 2 SPARE1 2 4
1 2 SPARE7 2 4
1 2 SPARE9 2 4
1 2 SPARE10 2 4
1 2 SPARE6 2 4
C37
C91
C93
C94
C1
C95
C5
C6
C9
C96
C97
C98
C100
C99
C178
C104
C108
C43
C150
C172
C163
C184
C69
C92
C78
C79
C77
C102
C84
C87
C85
C86
C110
C130
C70
C40
C152
C173
C185
C38
C89
C7
C90
C39

FIG. 17B
GNDA
MX39-29-1088
J4
BEAD
L4
-5V
AGND
+5VANA
GND
+5V
GND
+5V
0.1uF_DECOUPLING
22uF_TANT
C59
C106
C129
C103
C126
C107
C176
C175
C167
C151
C174
C166
C138
C11
C10
C8
C4
C3
C2
C61
C64
C65
C68
C109
C131
C181
C148
C168
C139
C182
C46
C47
C146
C51
C123
C145
C58
C144
C153
C45
C44
C56
C112
C162
C170
C177
C149
C169
C140
C183
C132
C133
C48
C50
C134
C54
C161
C88
C111
C137
C55
C105
C57
C66
C67
C164
C82
C63
C62
C49
C101
C141
C143
C114
C53
C117
C115
C116
C113
C142
C160
C135
C165
C171
C60
C80
C83
C81
C42

KEY TO FIG. 19A

| FIG. 19A-1 | FIG. 19A-2 |
|---|---|

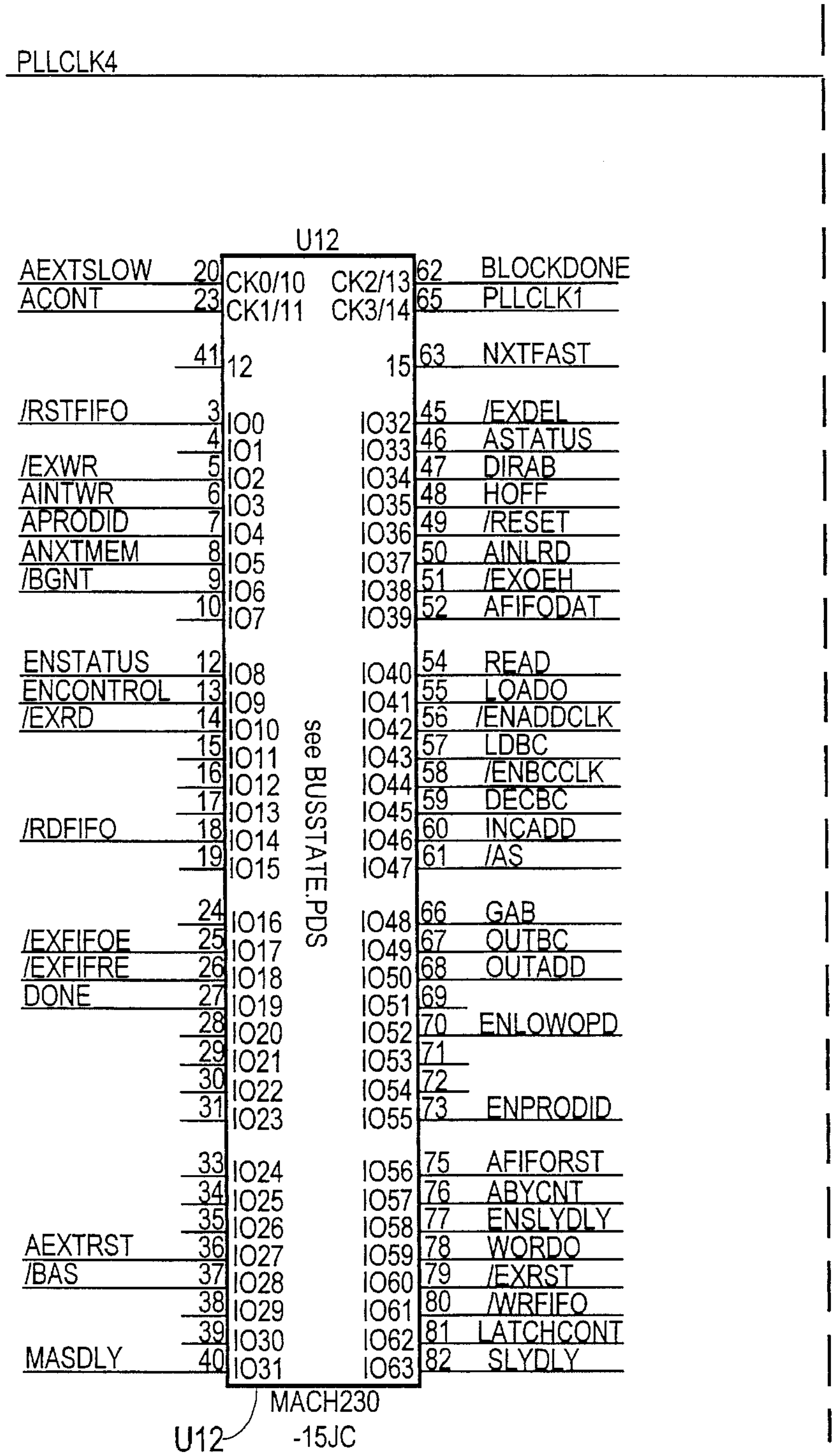
FIG. 19B-1
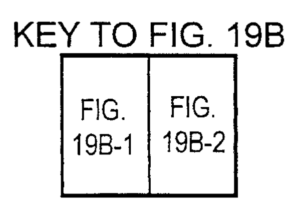

KEY TO FIG. 19C

| FIG. 19C-1 | FIG. 19C-2 |
|---|---|

KEY TO FIG. 19D

| | |
|---|---|
| FIG. 19D-1 | FIG. 19D-2 |

METHOD AND STRUCTURE FOR GENERATING A SURFACE IMAGE OF A THREE DIMENSIONAL TARGET

CROSS-REFERENCE TO RELATED APPLICATIONS

This application is related to and incorporates by reference commonly owned U.S. patent application Ser. No. 08/080,014, entitled "Laser Imaging System for Inspection and Analysis of Sub-Micron Particles", filed by Bruce W. Worster et al, on Jun. 17, 1993 now U.S. Pat. No. 5,479,252.

NOTICE OF COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention generally relates to an apparatus and method for processing an array of data values, and in particular to the processing of an array of data values obtained during the imaging operation of a scanning confocal microscope.

BACKGROUND OF THE INVENTION

Confocal laser microscopes perform imaging by scanning a focused laser beam over the surface of the target to be viewed. FIG. 1 is a block diagram of a confocal laser microscope. Laser 102 generates laser beam 118, which is transmitted to beam splitter 104, X-mirror 106, spatial filter 107, Y-mirror 108, and objective lens 110 to target 112. When the distance between objective lens 110 and target 112 is such that the microscope is in a focused condition, laser beam 118 is reflected from target 112, back through objective lens 110, Y-mirror 108, spatial filter 107, X-mirror 106, and beam splitter 104 to detector 114. When the microscope is not in a focused condition, only a small portion of laser beam 118 is reflected to detector 114. Detector 114 generates an imaging signal 116 which is representative of the intensity of laser beam 118 reflected to detector 114. Imaging signal 116 is transmitted to microprocessor 120. Microprocessor 120 processes imaging signal 116 to create a video image signal 121 which is transmitted to video display terminal 122. Video display terminal 122 displays the image of target 112. Microprocessor 120 also controls other functions within the microscope.

FIG. 2 is a top view of target 112 illustrating the imaging of an area 202 of target 112. To obtain an image of target area 202, X-mirror 106 and Y-mirror 108 are deflected to scan the laser beam 118 along a path 204 which follows a series of rows within target area 202. In this manner, detector 114 receives imaging information for target area 202. Target area 202 is parallel to the X-Y plane.

FIG. 3 is a side view of target 112, illustrating laser beam 118 at three positions 301–303 along path 204. Confocal microscopes typically have a narrow focal plane 307 along the Z-axis. Surfaces of target 112 positioned outside of focal plane 307 fail to reflect a significant portion laser beam 118 from target 112 to detector 114. Thus, a small imaging signal 116 is generated when laser beam 118 is at position 302 because surface 305 is outside of focal plane 307. Consequently, the resulting image of surface 305 appears dark, rather than blurry. This results in an imaging signal 116 which only represents surface 305 at a single plane (i.e., a single frame). Certain targets, such as semiconductor wafers, can have uneven surfaces such as surface 305. To accurately represent surface 305, imaging signal 116 is therefore generated at many focal planes to obtain the information necessary to image the surface 305 of target 112.

It is therefore desirable to have a confocal microscope capable of generating an imaging signal 116 which represents a plurality of focal plane images (i.e., frames) of a target having a varying surface terrain. It is also desirable to have a method and apparatus for processing these frames of information to create an image representative of the surface of the target 112.

In addition, when imaging signal 116 is being transmitted to microprocessor 120, the bandwidth of the input/output (I/O) bus of microprocessor 120 is almost entirely consumed by the transfer of image data and therefore cannot be used to receive or transmit other information to control the microscope. Also, because imaging signal 116 contains a large amount of information, it takes a significant amount of time for microprocessor 120 to process imaging signal 116. It is therefore desirable to avoid transmitting imaging signal 116 to microprocessor 120 when generating a video image on video display terminal 122.

SUMMARY OF THE INVENTION

The present invention provides a method and apparatus for providing an accurate surface image of a target having a varying surface terrain. The present invention also provides a video image signal to a video display terminal, without burdening the system host work station I/O bus.

A method in accordance with one embodiment of the invention generates in imaging signal representative of a three dimensional surface of a target. This method includes the following steps.

A fixed number of first intensity values are measured. Each of the first intensity values corresponds to a position on the surface of the target, and each of the first intensity values is measured while the target is positioned at a first height.

Each of the first intensity values is stored at an address within an intensity memory. Each of the addresses within the intensity memory corresponds to a position on the surface of the target.

A fixed number of second intensity values are measured. The second intensity values are measured at the same positions on the surface of the target as the first intensity values. The second intensity values are measured while the target is positioned at a second height.

The second intensity values are compared to the first intensity values, such that the second intensity values and the first intensity values which were measured at the same positions on the surface of the target are compared, The first intensity values are overwritten in the intensity memory with the second intensity values when the second intensity values are greater than the first intensity values. The intensity values stored in the intensity memory are representative of the surface of the target.

In addition, the first height of the target can be stored at each address of a Z-memory. Each address within the Z-memory corresponds to an address within the intensity memory. When a first intensity values in the intensity memory is overwritten with a second intensity value, the first target height is overwritten with the second target height at the corresponding address in the Z-memory.

A circuit for generating a surface image of a three-dimensional target in accordance with one embodiment of the invention includes a scanner circuit, a detector circuit, an actuator, a first memory, a second memory and a comparator. The scanner circuit repeatedly scans a light beam over the target in a predetermined two dimensional pattern. The detector circuit, which is coupled to the scanner circuit, measures intensity values of the light beam reflected from the target at a plurality of positions in the two dimensional pattern. The actuator, which is coupled to the target, moves the target to successive target heights along a direction perpendicular to the two dimensional pattern each time the scanner circuit completes a scan along the two dimensional pattern.

The first memory, which is coupled to the detector circuit, has a plurality of addresses which correspond to the positions in the two dimensional pattern at which the intensity values are measured. The first memory stores the intensity values measured at a first target height. The second memory has a plurality of addresses that correspond to the addresses of the first memory. Each of the addresses of the second memory initially stores the first target height.

The comparator circuit, which is coupled to the detector circuit, the first memory and the second memory, compares the intensity values measured at the first target height with intensity values measured at corresponding positions at a second target height. Where the intensity values measured at the second target height exceed the intensity values measured at the first target height, the comparator overwrites the first intensity values with the second intensity values at the corresponding address of the first memory. The comparator also overwrites the first target height with the second target height at the corresponding address of the second memory. In this manner, the circuit generates a surface image of the three dimensional target.

The present invention will be more fully understood in light of the following detailed description taken together with the drawings.

DETAILED DESCRIPTION

Figure 1:
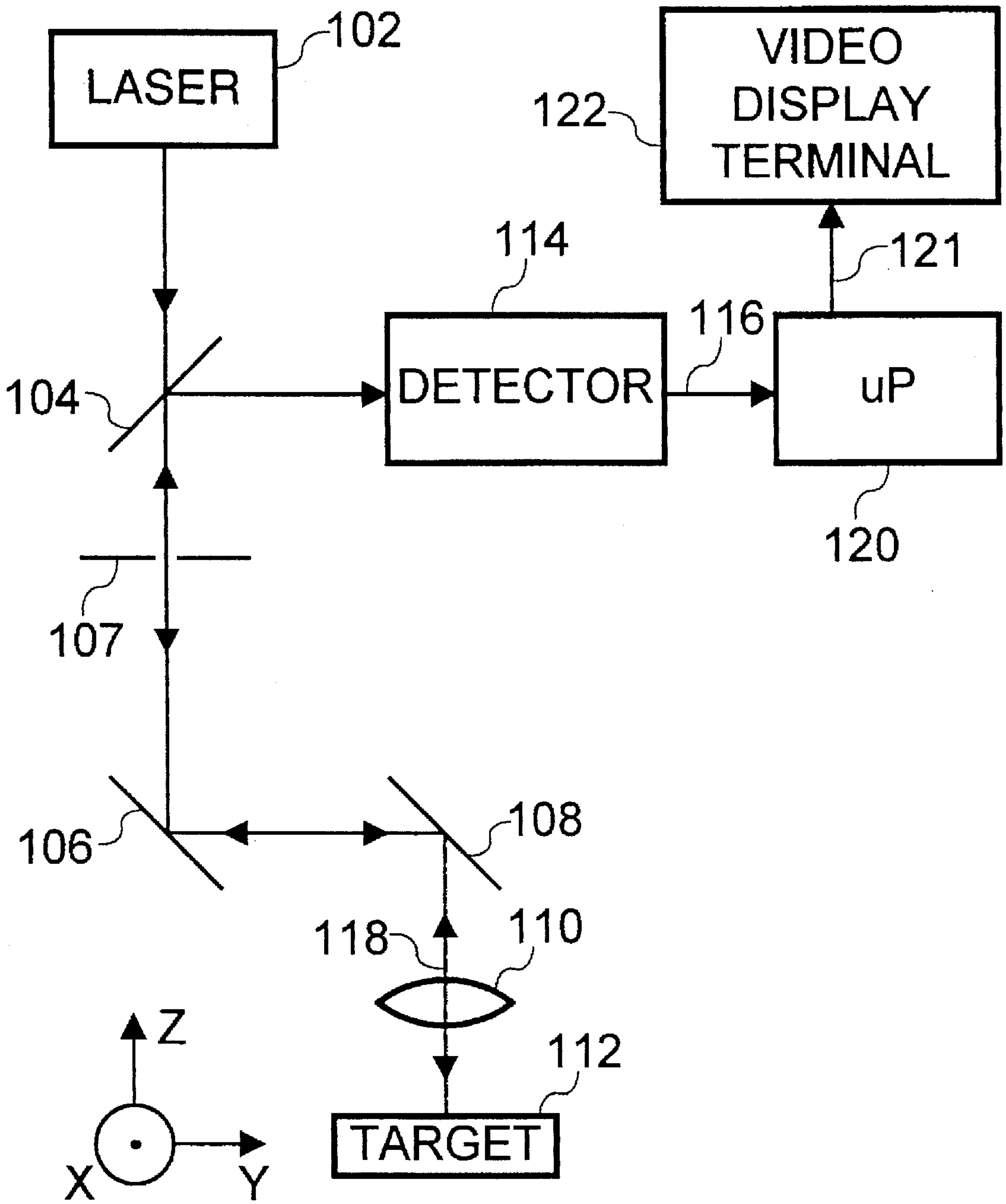
FIG. 1 is a block diagram of a confocal laser microscope.
Figure 2:
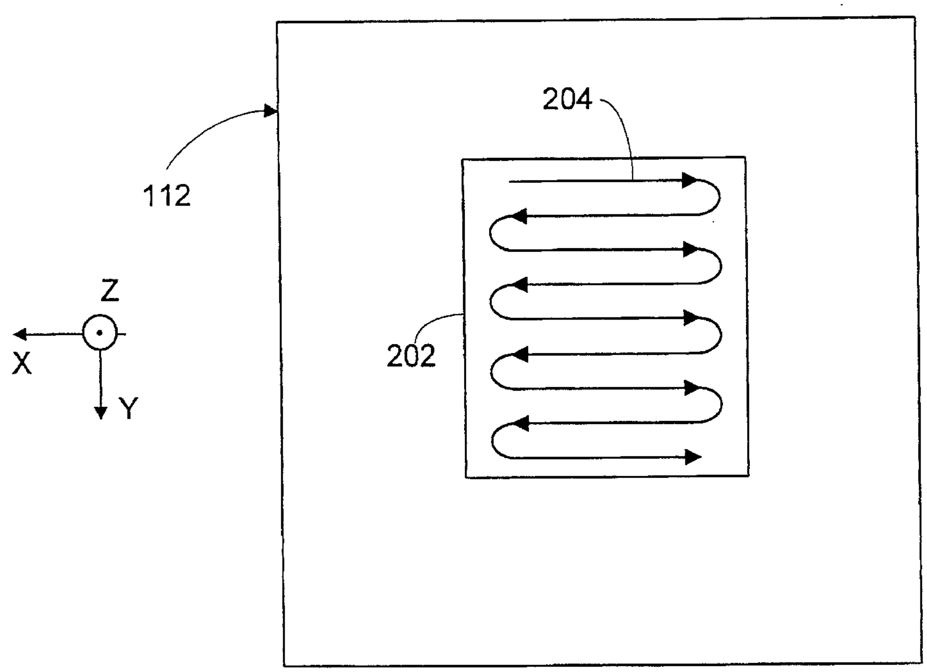
FIG. 2 is a top view of a target which illustrates the imaging of an area of the target.
Figure 3:
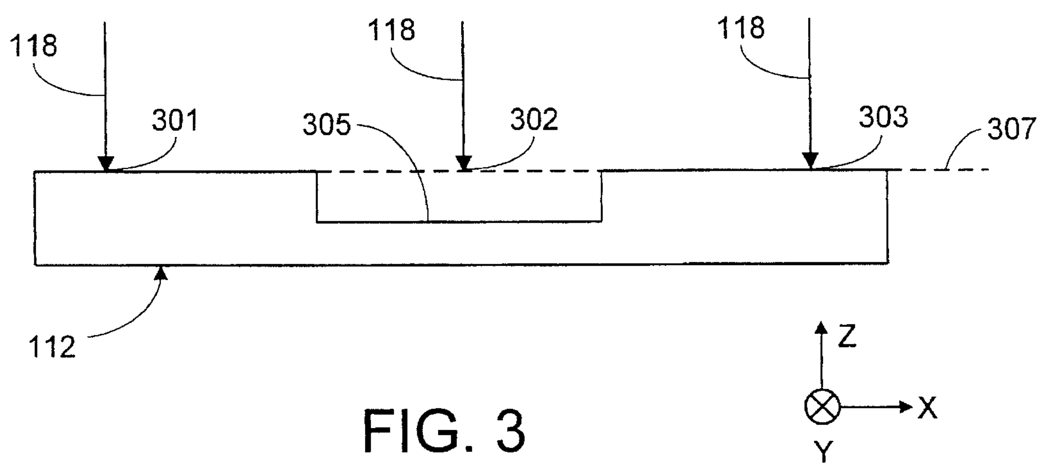
FIG. 3 is a side view of the target of FIG. 2 which illustrates a laser beam at three positions along a path.
Figure 4:
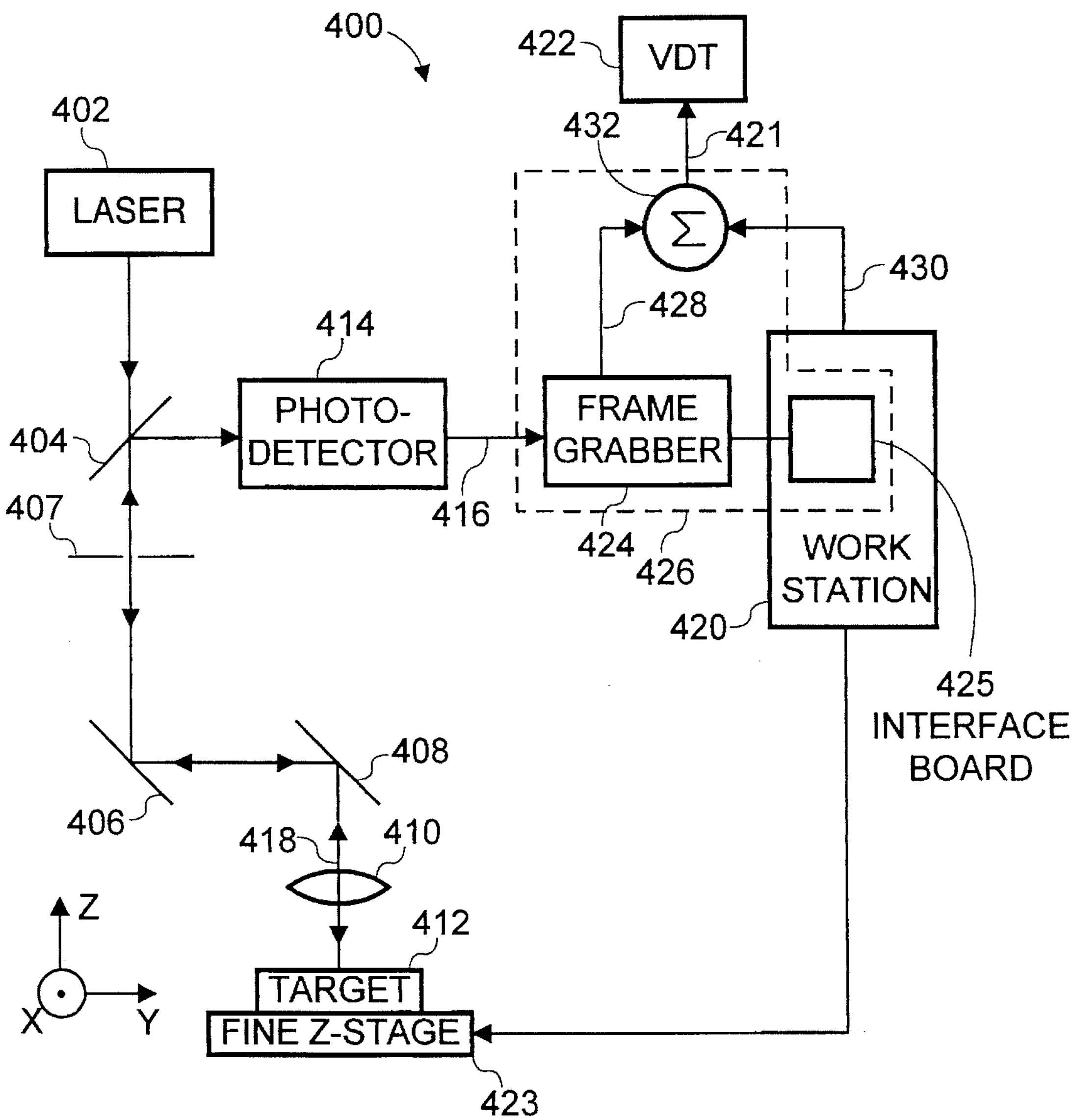
FIG. 4 is a block diagram of a confocal laser microscope system in accordance with the present invention.

FIG. 4 is a block diagram of a confocal laser microscope system 400 in accordance with the present invention. Laser 402 is typically an argon laser, however, it is understood that other types of lasers can be used. Laser 402 generates a laser beam 418 which is transmitted through beam splitter 404 to X-mirror 406, spatial filter 407, Y-mirror 408, objective lens 410 and target 412. Beam splitter 404, X-mirror 406, spatial filter 407, Y-mirror 408 and objective lens 410 are conventional elements known in the art. When the distance between objective lens 410 and target 412 is such that microscope system 400 is in a focused condition, laser beam 418 is reflected to photodetector 414. Photodetector 414 is a conventional device which converts the received laser beam into an electronic imaging signal 416.

Imaging signal 416 is transmitted to surface data processor (SDP) 426. SDP 426 includes frame grabber 424 and interface board 425. Frame grabber 424 includes a circuit board which contains most of the circuitry of SDP 426. Frame grabber 424 resides outside of work station 420. Interface board 425 is a smaller board located within host work station 420 which provides an interface between frame grabber 424 and the I/O bus of work station 420. In one embodiment, host work station 420 is a Silicon Graphics Unix Workstation. Frame grabber 424 provides a target image signal 428 to summing node 432 and work station 420 provides a background image signal 430 to summing node 432. Target image signal 428 and background image signal 430 are added at summing node 432 to create video imaging signal 421, which is transmitted to video monitor 422.

Figure 5A:
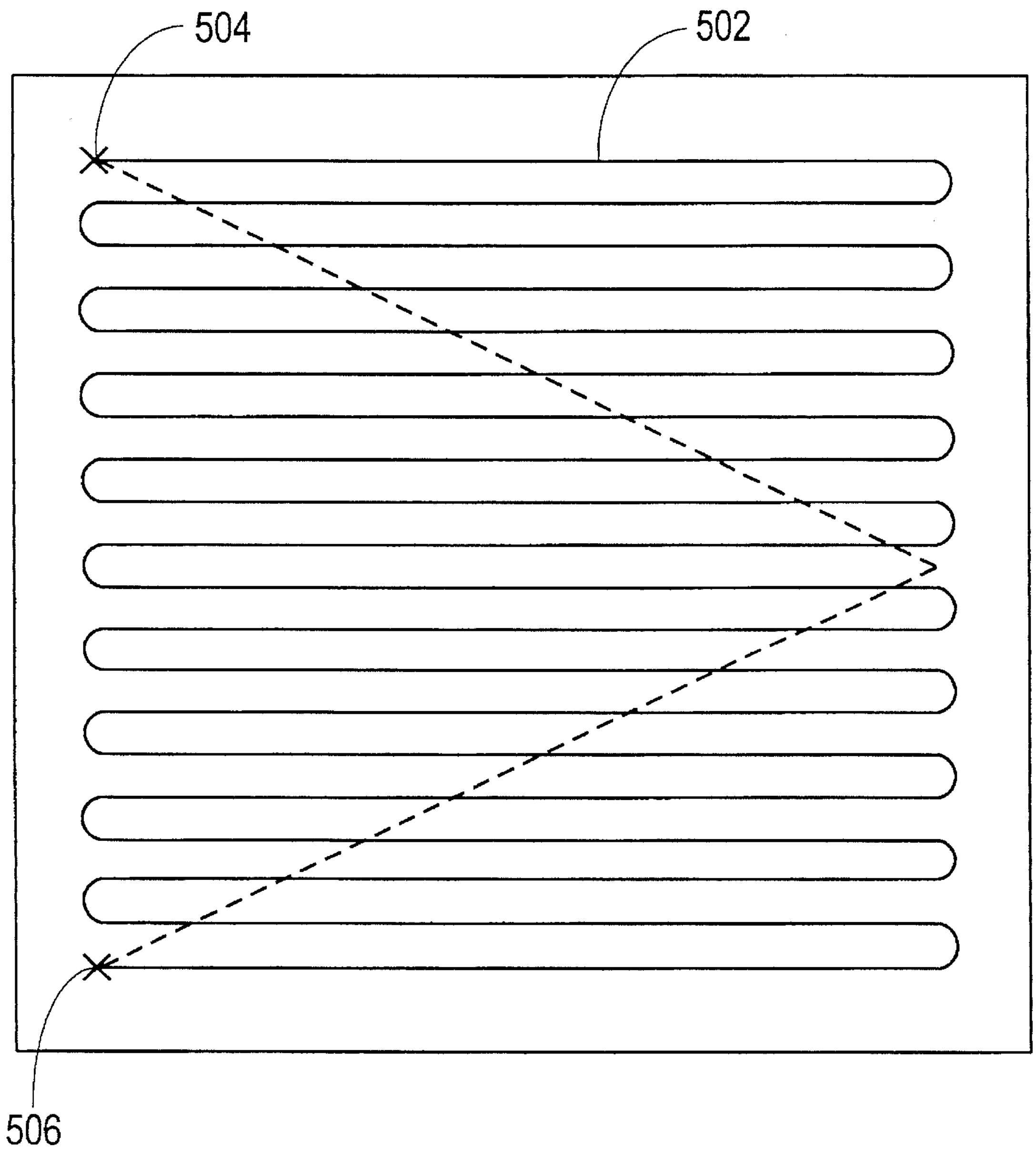
FIG. 5*a* is a schematic diagram of a scanning pattern of a laser beam on a target.

To create imaging signal 416, target 412 is first positioned within the depth of focus of microscope system 400. This focusing operation can be performed as described in commonly owned, U.S. patent application Ser. No. 08/183,536 entitled "A Method and Apparatus for Performing An Automatic Focus Operation", filed by Timothy V. Thompson, Christopher R. Fairley and Ken K. Lee on Jan. 18, 1994, now U.S. Pat. No. 5,483,055 herein incorporated by reference. Laser beam 418 is then scanned over an area of target 412 using a scanning subsystem. The motion of laser beam 418 along the X-axis of target 412 is created with a resonant line scanner in the scanning subsystem which operates at approximately 8 kHz. In one embodiment, X-mirror 406 is oscillated on the end of a torsion bar to move laser beam 418. Such a resonant line scanner is available from General Scanning, Inc. as part number CRS8000. The resonant oscillation of X-mirror 406 causes laser beam 418 to move along the X-axis of target 412 at a velocity which varies sinusoidally as a function of time. As laser beam 418 oscillates along the X-axis, Y-mirror 408 is rotated by the scanning subsystem about the X-axis to move laser beam 418 slowly along the Y-axis of target 418. FIG. 5*a* is a schematic diagram of a resulting idealized scanning pattern 502 of laser beam 418 on target 412. Scanning pattern 502 begins at starting position 504 and ends at ending position 506.

After laser beam 418 has traced scanning pattern 502, Y-axis mirror 408 is moved to its original position. This movement is timed such that laser beam 418 is positioned at starting position 504 when the X-axis mirror 406 is beginning an oscillation. As the Y-axis mirror 408 is being moved to its original position, the host work station 420 instructs the fine Z-stage 423 to move target 412 a small distance along the Z-axis. One embodiment of the present invention uses the fine Z-stage described in commonly owned, U.S. patent application Ser. No. 08/118,536 entitled "A Method and Apparatus for Performing an Automatic Focus Operation", filed by Timothy V. Thompson, Christopher R. Fairley and Ken K. Lee on Jan. 18, 1994, now U.S. Pat. No. 5,483,055, herein incorporated by reference. In one embodiment of the present invention, target 412 is moved downward as little as 12 nm along the Z axis upon the completion of scanning pattern 502. Thus, during the second time that laser 418 is moved along scanning pattern 502, target 412 is slightly lower on the Z-axis. In another embodiment, target 412 is moved upward along the Z axis. This process is repeated to obtain many frames (a volume) of imaging information. A frame is defined as the information obtained as laser beam 418 is moved through one scanning pattern 502 in one focal plane.

As laser beam 418 is moved along scanning pattern 502, laser beam 418 is reflected (or not reflected) from target 412 to photodetector 414 to create analog imaging signal 416.

Figure 6:
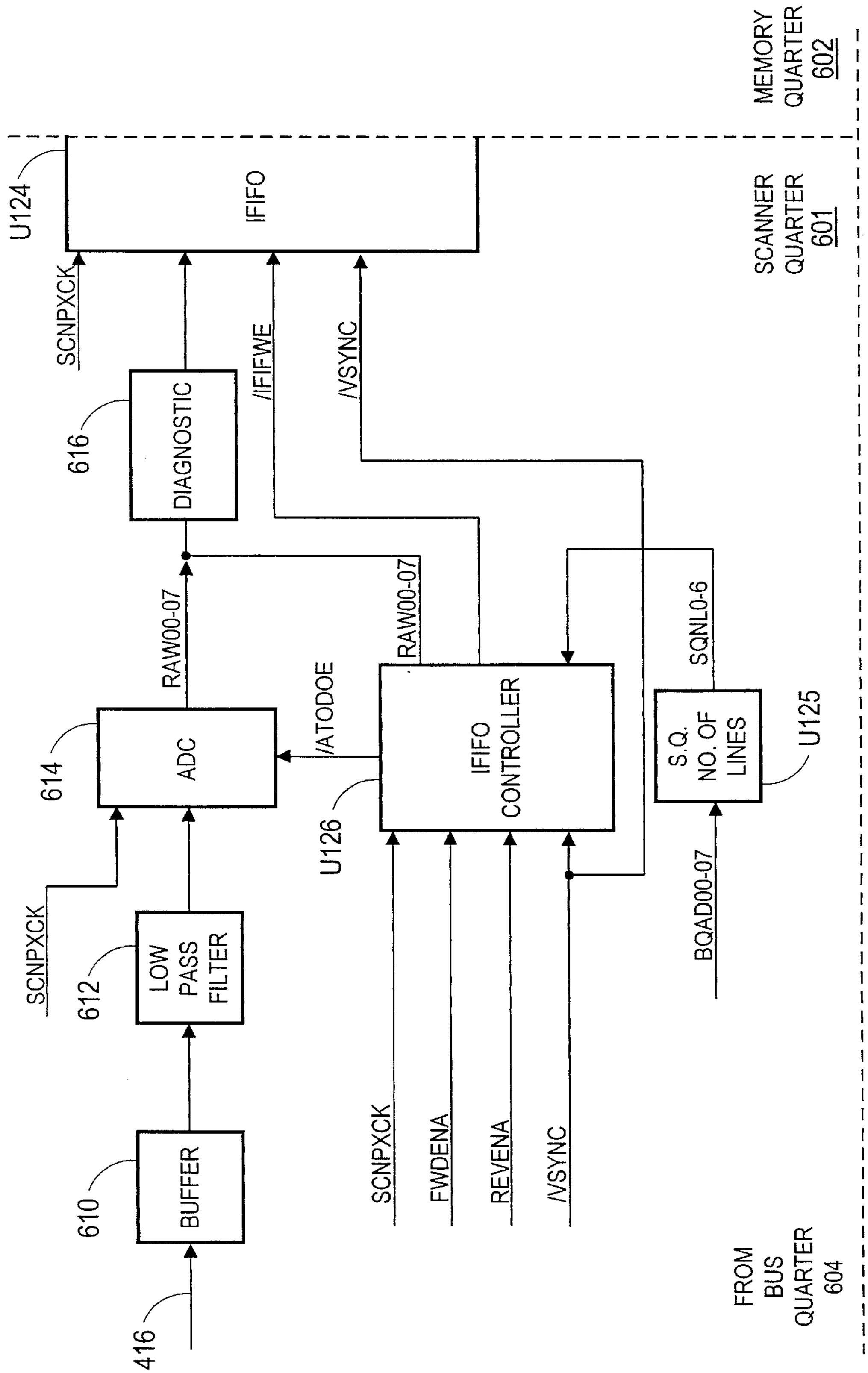
FIG. 6 is a block diagram of a scanner quarter of a surface data processor according to the present invention.
Figure 7A:
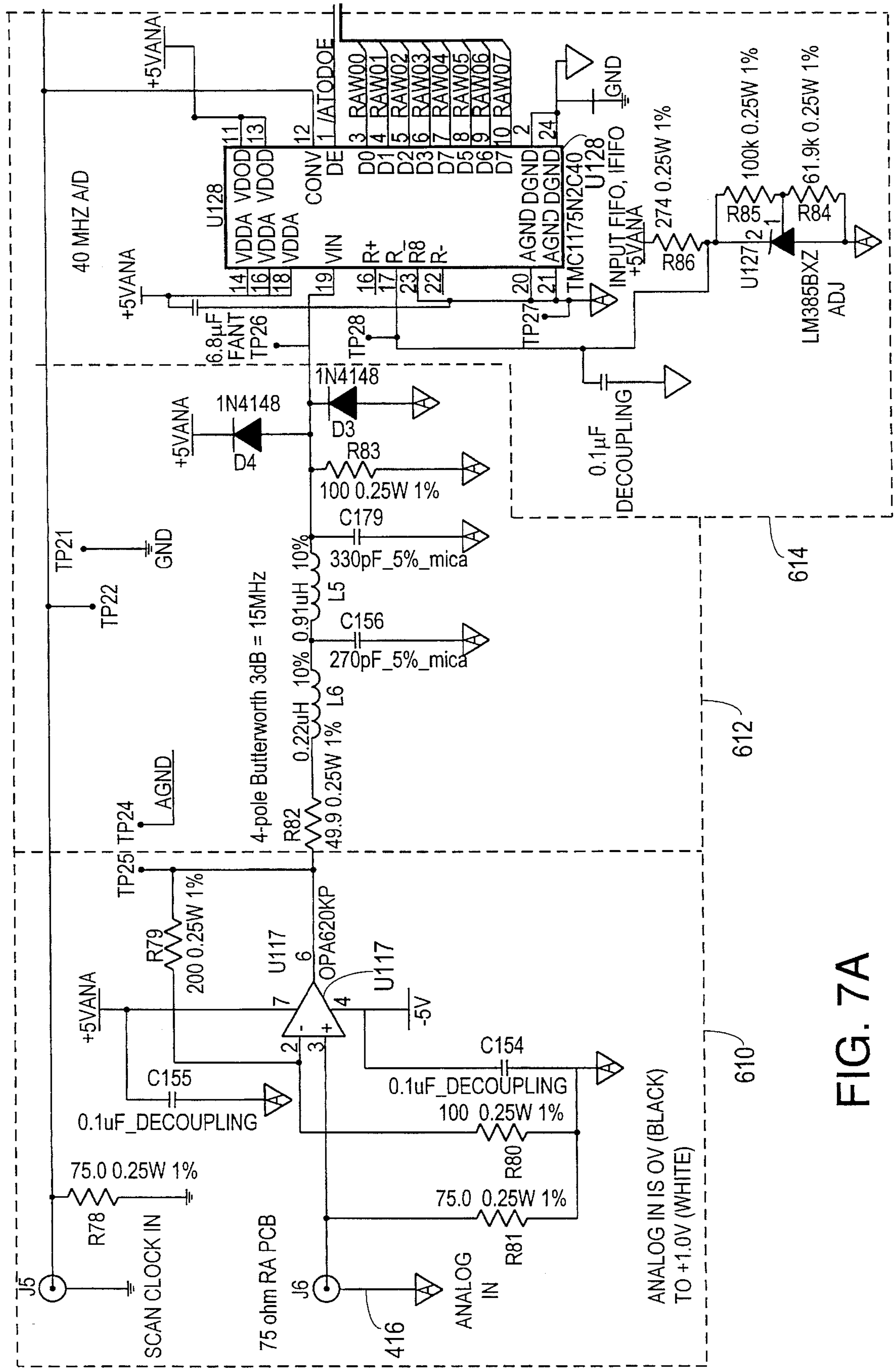
FIGS. 7*a*–7*b* are schematic diagrams of circuitry within the scanner quarter of FIG. 6, FIGS. 8 and 9 are block diagrams of a memory quarter of a surface data processor according to the present invention.
Figures 1, 7B:
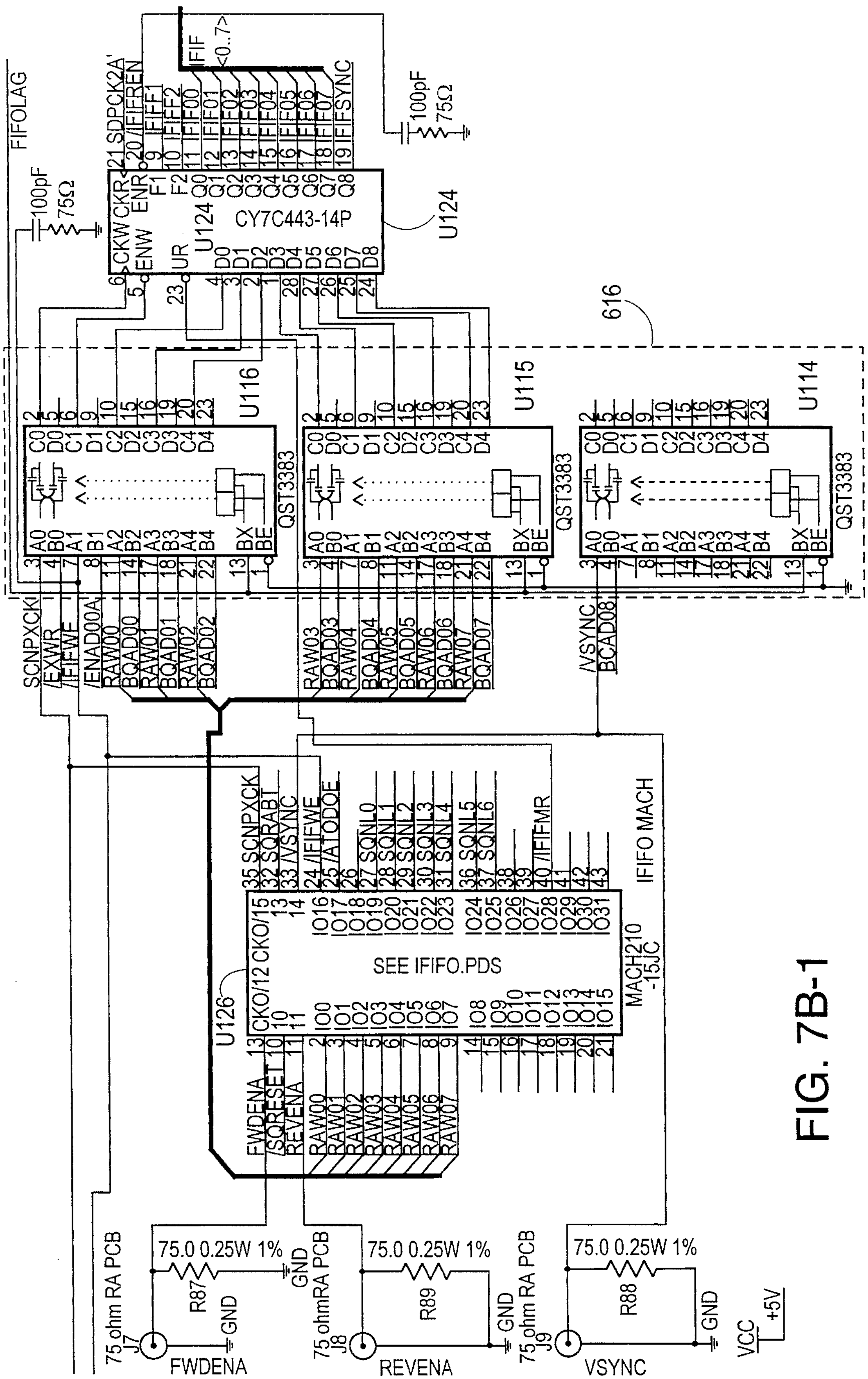
Figures 2, 7B:
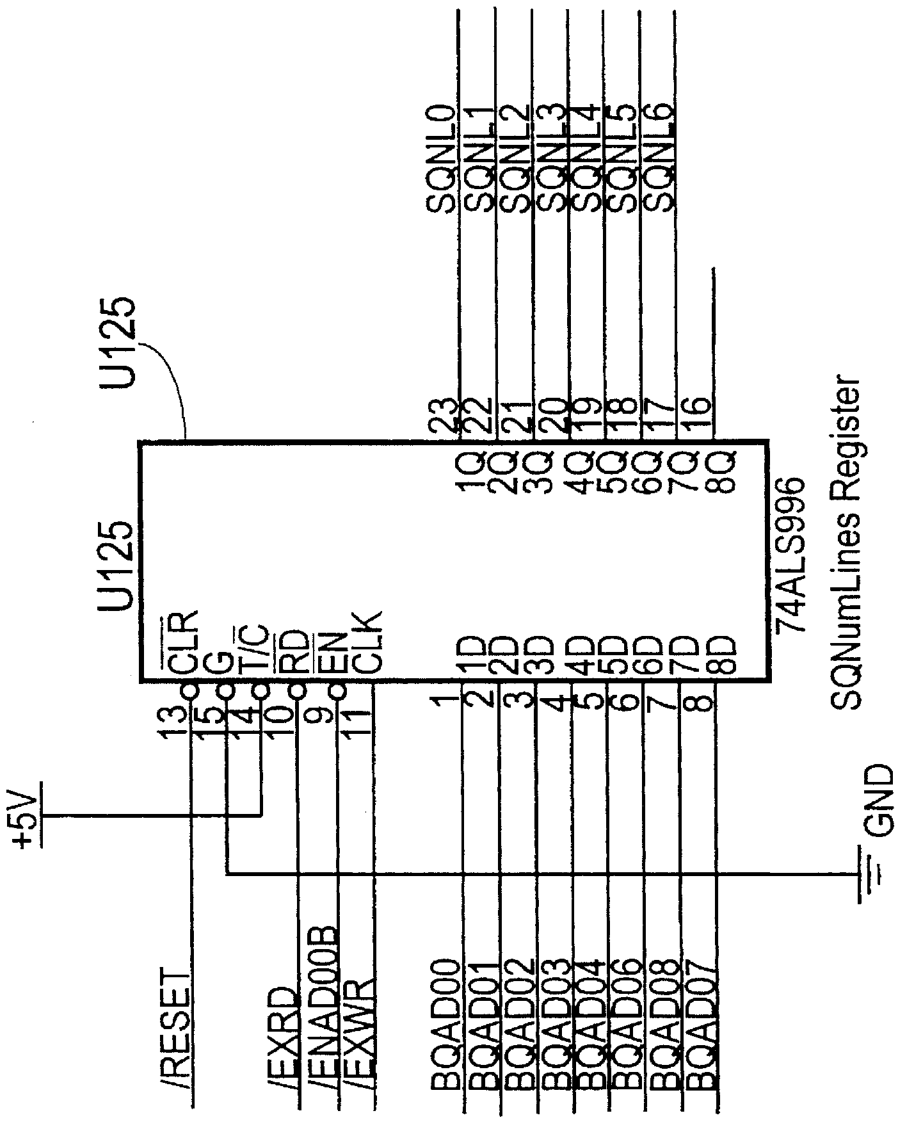

FIG. 6 is a block diagram of the scanner quarter 601 of SDP 426. Scanner quarter 601 is located within frame grabber 424. FIGS. 7*a*–7*b* are schematic diagrams of circuitry within scanner quarter 601. In general, scanner quarter 601 digitizes the analog imaging signal 416, selects which lines of scanning pattern 502 will be used to create the target image (i.e., the lines generated during forward sweeps of the resonant scanner, the lines generated during reverse sweeps of the resonant scanner, or the lines generated during both the forward and reverse sweeps), selects how many lines will be used to create the target image, and inserts frame number sync bytes into the digitized imaging signal to indicate the start of a new frame of data and the frame number of the new frame of data.

As illustrated in FIGS. 6 and 7*a*, analog imaging signal 416 is buffered and amplified by buffer 610. Buffer 610 includes operational amplifier U117 and the illustrated resistors and capacitors (FIG. 7*a*). Operational amplifier U117 is a conventional part available from Burr-Brown as part number OPA620KP. The output of buffer 610 is provided to low pass filter 612. Low pass filter 612 filters any high frequency components of imaging signal 416, thereby avoiding aliasing of the image. In one embodiment, low pass filter 612 uses resistors, inductors and capacitors in a conventional configuration (FIG. 7*a*) to perform the filtering function.

Figure 5B:
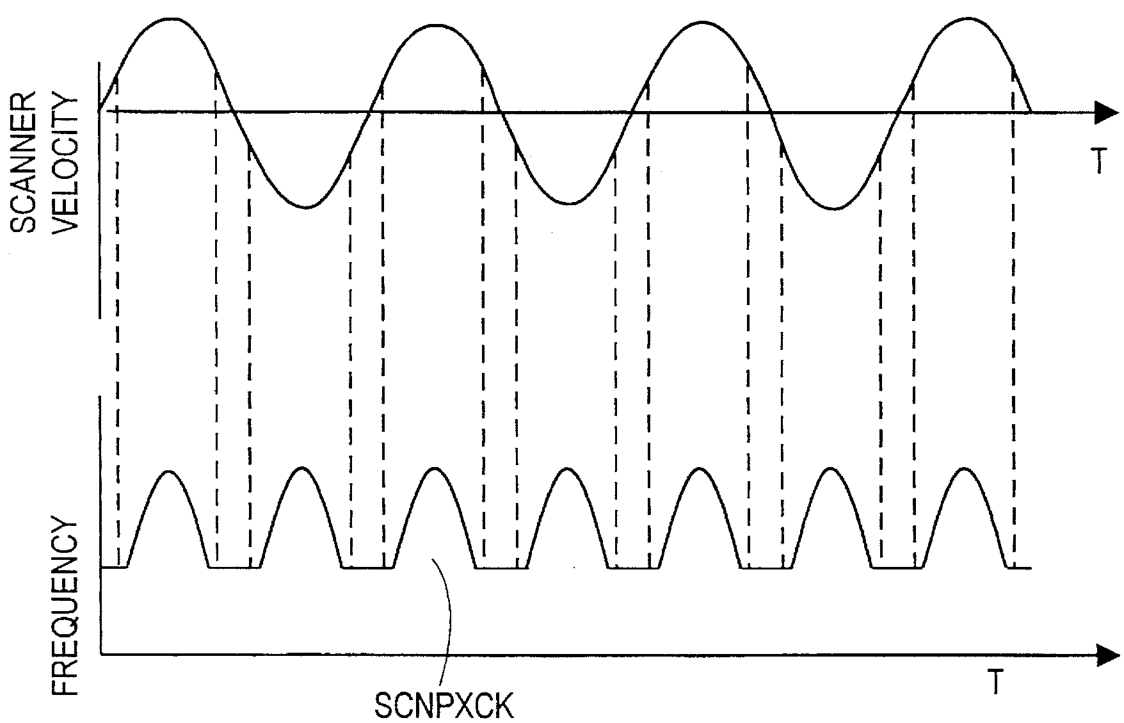
FIG. 5*b* is a waveform diagram illustrating the scanner velocity and the frequency of the SCNPXCK signal.

The output of low pass filter 612 is provided to an input of analog to digital converter (ADC) 614 (FIGS. 6, 7*a*). In one embodiment of the present invention, ADC 614 includes a conventional 8-bit ADC U128 (FIG. 7*a*) available from Raytheon as part number TMC1175N2C40. ADC 614 is clocked with a scanner pixel clock signal (SCNPXCK) generated by the resonant line scanner. The frequency of the SCNPXCK signal changes in a sinusoidal manner, such that the frequency of the SCNPXCK signal is related to the velocity at which laser beam 418 is being scanned along the X-axis of scanning pattern 502 (FIG. 5*a*). As the velocity of laser beam 418 increases, the frequency of the SCNPXCK signal increases, and vice versa. Consequently, the SCNPXCK signal enables ADC 614 to output 8-bit pixel intensity values that are representative of imaging signal 416 at positions that are uniformly spaced along the X-axis of target 412. In one embodiment, the sinusoidal SCNPXCK signal has a peak frequency of 16 Mhz and an average frequency of 10 MHz. FIG. 5*b* is a waveform diagram illustrating the scanner velocity and the frequency of the SCNPXCK signal.

The 8-bit pixel intensity values output from ADC 614 are transmitted to input fifo (IFIFO) U124 through diagnostics block 616 on an 8-bit data bus (RAW00–07). In the present invention, diagnostics block 616 passes the 8-bit pixel intensity values without changes. The write operations of IFIFO U124 are clocked by the SCNPXCK signal and enabled by a write enable signal (/IFIFWE). IFIFO controller U126 is a programmable logic chip which is clocked by the SCNPXCK signal. IFIFO controller U126 receives three inputs generated by the scanning subsystem: a forward enable signal (FWDENA), a reverse enable signal (REVENA), and a frame synchronizing signal (/VSYNC). IFIFO controller U126 is a conventional programmable logic device (PLD) available from Advanced Micro Devices (AMD) as part number MACH210-15JC. The FWDENA signal is at a logic high state as laser beam 418 sweeps in the positive X direction along scanning pattern 502 (FIG. 5*a*) (i.e., during "forward" sweeps). The FWDENA signal is at a logic low state near the ends of each sweep and during the time that laser beam 418 sweeps in the negative X direction along scanning pattern 502 (FIG. 5*a*) (i.e., during "reverse" sweeps). If the host work station 420 instructs the IFIFO controller U126 to utilize the FWDENA signal, IFIFO controller U126 generates a write enable signal (/IFIFWE) which enables the output of ADC 614 to be written into IFIFO U124 during the time the FWDENA signal is at a logic high state (i.e., during forward sweeps).

Similarly, the REVENA signal applies a logic high signal to IFIFO controller U126 during "reverse" sweeps of laser beam 418. The REVENA signal is at a logic low state near the ends of each sweep and during the "forward" sweeps of laser beam 418. If host work station 420 instructs IFIFO controller U126 to utilize the REVENA signal, IFIFO controller U126 generates the write enable signal (/IFIFWE) during the time that the REVENA signal is at a logic high state, thereby enabling the output of ADC 614 to be written into IFIFO U124 during reverse sweeps.

The host work station 420 can instruct IFIFO controller U126 to utilize either one of the FWDENA or REVENA signals, or both the FWDENA and REVENA signals. When both the FWDENA and REVENA signals are utilized, pixel intensity values are written to IFIFO U124 from ADC 614 during both forward and reverse sweeps of laser beam 418 along scanning pattern 502 (FIG. 5*a*). Because the FWDENA and REVENA signals are at logic low states at the ends of the sweeps, the pixel intensity values obtained at the end of each sweep (i.e., when the Y-mirror 408 is moving laser beam 418 from line to line on scanning pattern 502) are not written to IFIFO U124. The resonant line scanner also generates a /VSYNC signal immediately before the start of each new frame of imaging information. The /VSYNC signal is provided to both IFIFO controller U126 and IFIFO U124. The IFIFO controller U126 writes an 8-bit frame number sync byte into IFIFO U124 each time the /VSYNC signal is received. This frame number sync byte indicates the frame number of the new frame of imaging information. The frame number sync byte is initially set to zero and is incremented by IFIFO controller U126 each time the IFIFO controller U126 receives a /VSYNC signal. To write the frame number sync byte into IFIFO U124, the IFIFO controller U126 generates an ADC output disable signal (/ATODOE) which disables the outputs (RAW00–07) of ADC 614 and enables the outputs (RAW00–07) of the IFIFO controller U126. IFIFO controller also generates the write enable signal (/IFIFWE) so that the frame number sync byte is written into IFIFO U124. At the same time, the one-bit /VSYNC signal is written into IFIFO U124 as the ninth input bit. This ninth input bit differentiates the 8-bit frame number sync bytes from the 8-bit pixel intensity values.

IFIFO controller U126 can also limit the number of lines of scanning pattern 520 (FIG. 5*a*) which are written into IFIFO U124. To do this, host work station 420 transmits the desired number lines per frame to the scanner quarter number of lines register U125 on the bus quarter address bus (BQAD00–07). The desired number of lines per frame is transmitted from register U125 to IFIFO controller U126 as a control signal on a 7-bit bus (SQNL0–6). In one embodiment, scanner pattern 502 has up to 512 lines and the 7-bit control signal allows the number of lines in scanner pattern 502 to be specified in multiples of 4-lines. After IFIFO controller U126 receives a /VSYNC signal indicating that a new frame is beginning, IFIFO controller U126 begins counting the number of lines of data which are received. When this number exceeds the number defined by the 7-bit control signal, IFIFO controller U126 stops generating the input fifo write enable signal (/IFIFWE) such that no pixel intensity values are written to IFIFO U124 until another /VSYNC signal is received (i.e., another frame begins). In one embodiment, the number of lines of data used in each frame is equal to the number of lines in scanner pattern 502 (FIG. 5*a*).

In the manner previously described, selected 8-bit pixel intensity values from ADC 614 and 8-bit frame number sync bytes from IFIFO controller U126 are written into 9-bit IFIFO U124 at a variable frequency which corresponds to the frequency of the SCNPXCK signal.

Figure 8:
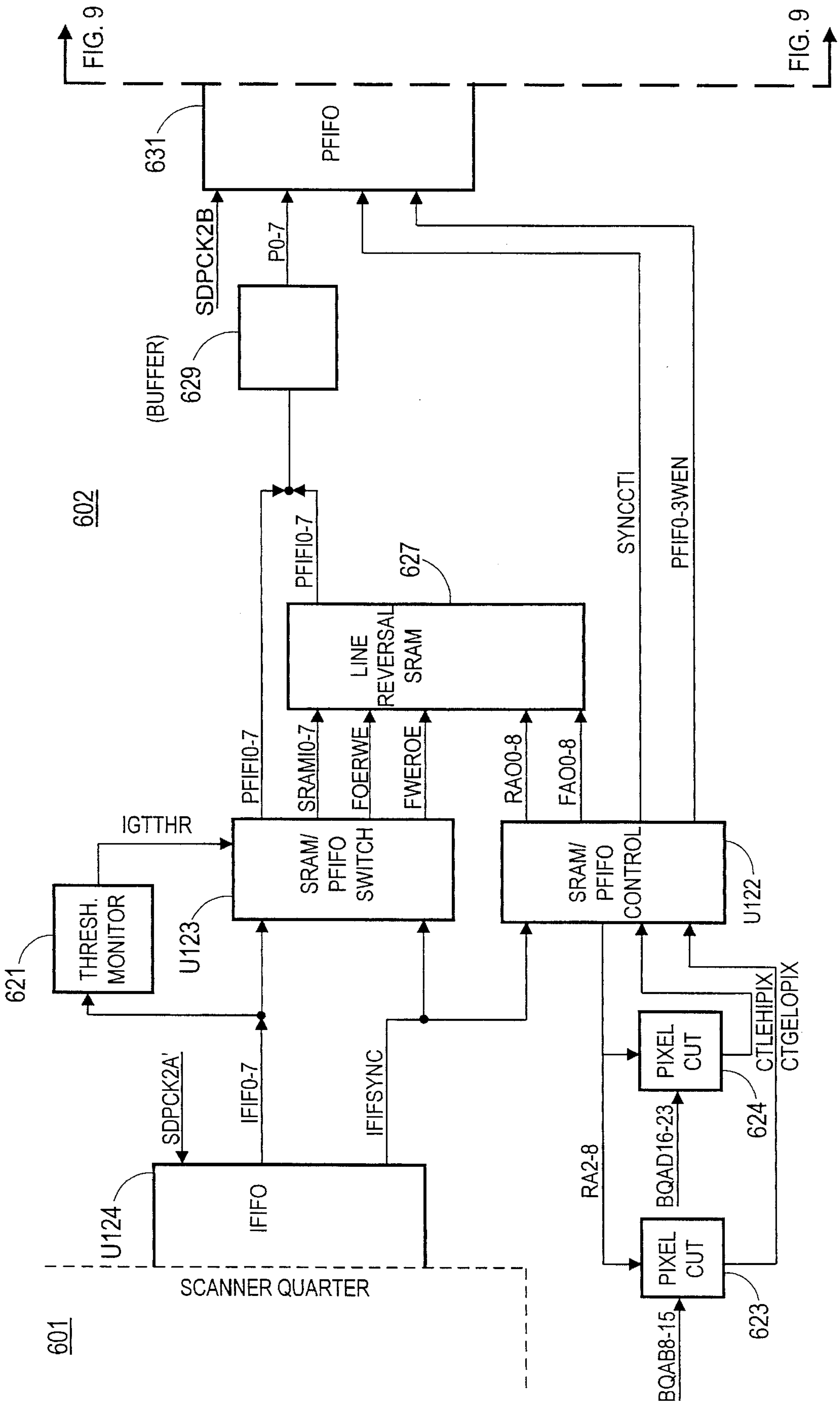
Figure 9:
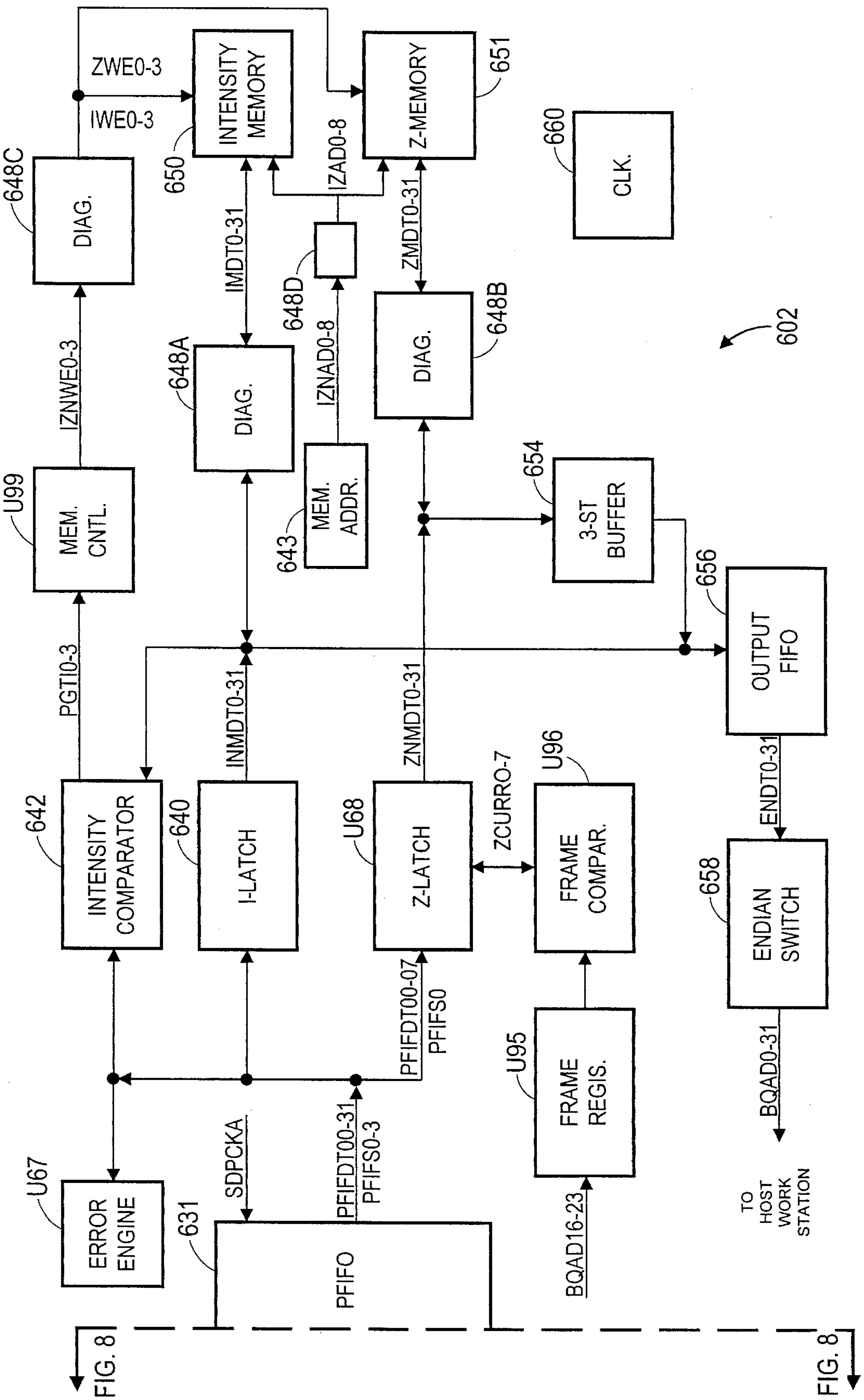

FIGS. 8 and 9 are block diagrams of memory quarter 602 of SDP 426. Memory quarter 602 is located within frame grabber 424 (FIG. 4). FIGS. 10*a*–10*l* are schematic diagrams of circuitry within memory quarter 602. Memory quarter 602 includes threshold monitor 621, memory quarter pixel cutting blocks 623 and 624, line reversal SRAM block 627, parallelizing fifo (PFIFO) block 631, SRAM/PFIFO data switch U123, SRAM/PFIFO controller U122, buffer 629, intensity comparator 642, 32-bit intensity latch (I-latch) 640, 32-bit Z-latch U68, three state buffer 654, error engine U67, memory controller U99, memory address control block 643, intensity memory 650, Z-memory 651, output fifo 656, clock generation unit 660, diagnostic blocks 648*a*–*d*, microcontroller block 646, frame register U95 and frame comparator U96. The 8-bit pixel intensity values and frame number sync bytes are read out of IFIFO U124 into memory quarter 602 on to an 8-bit data bus (IFIF00–07). The ninth bit of IFIFO U124, which indicates whether the value being transmitted through IFIFO U124 is a pixel intensity value or a frame number sync byte, is read out of IFIFO U124 as control signal IFIFSYNC.

The read operations of IFIFO U124 are clocked by a constant frequency clock (SDPCK2A) generated by clock generation unit 660 in memory quarter 602 (FIG. 101). Thus, the output of IFIFO U124 has a constant frequency. The frequency of the SDPCK2A signal and the operating characteristics of IFIFO U124 are selected to assure that the pixel values can be read out of IFIFO U124 without overrunning IFIFO U124. In one embodiment, the frequency of the SDPCK2A clock signal is 20 Mhz and IFIFO U124 is a conventional fifo available from Cypress Semiconductor as part number CY7C443-14P. Because the SDPPXCK signal clocks the IFIFO U124 write operations at an average frequency of 10 MHz and the SDPCK2A signal clocks the IFIFO U124 read operations at a constant frequency of 20 MHz and because IFIFO U124 is deep enough to hold an entire line of data generated during a forward or reverse sweep, IFIFO U124 does not overrun.

Figures 1, 10A:
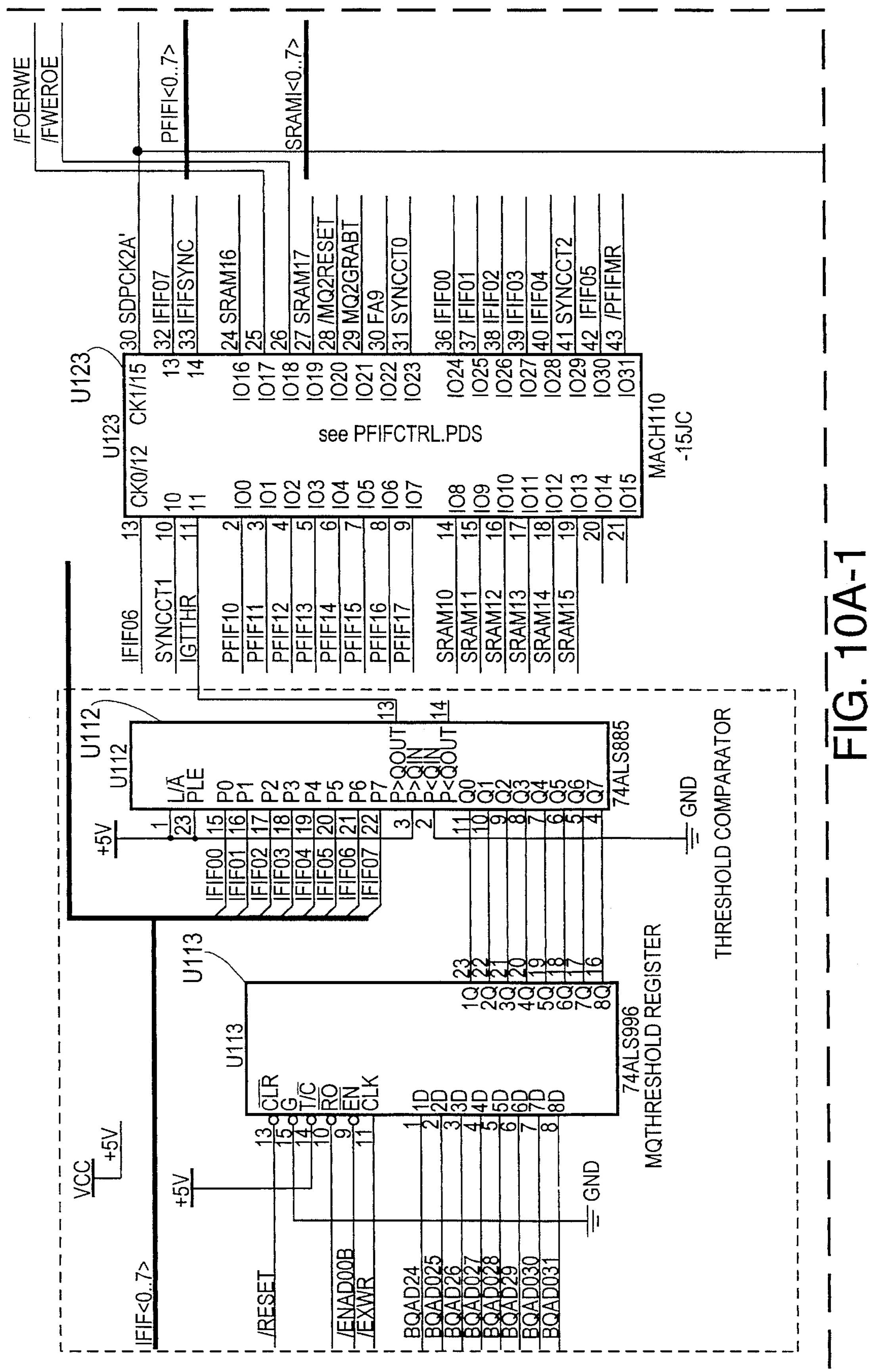
FIGS. 10*a*–10*l* are schematic diagrams of circuitry within the memory quarter of FIGS. 8 and 9, FIGS. 10*m*–10*n* are simplified block diagrams illustrating the creation of a surface image from a target.
Figures 2, 10A:
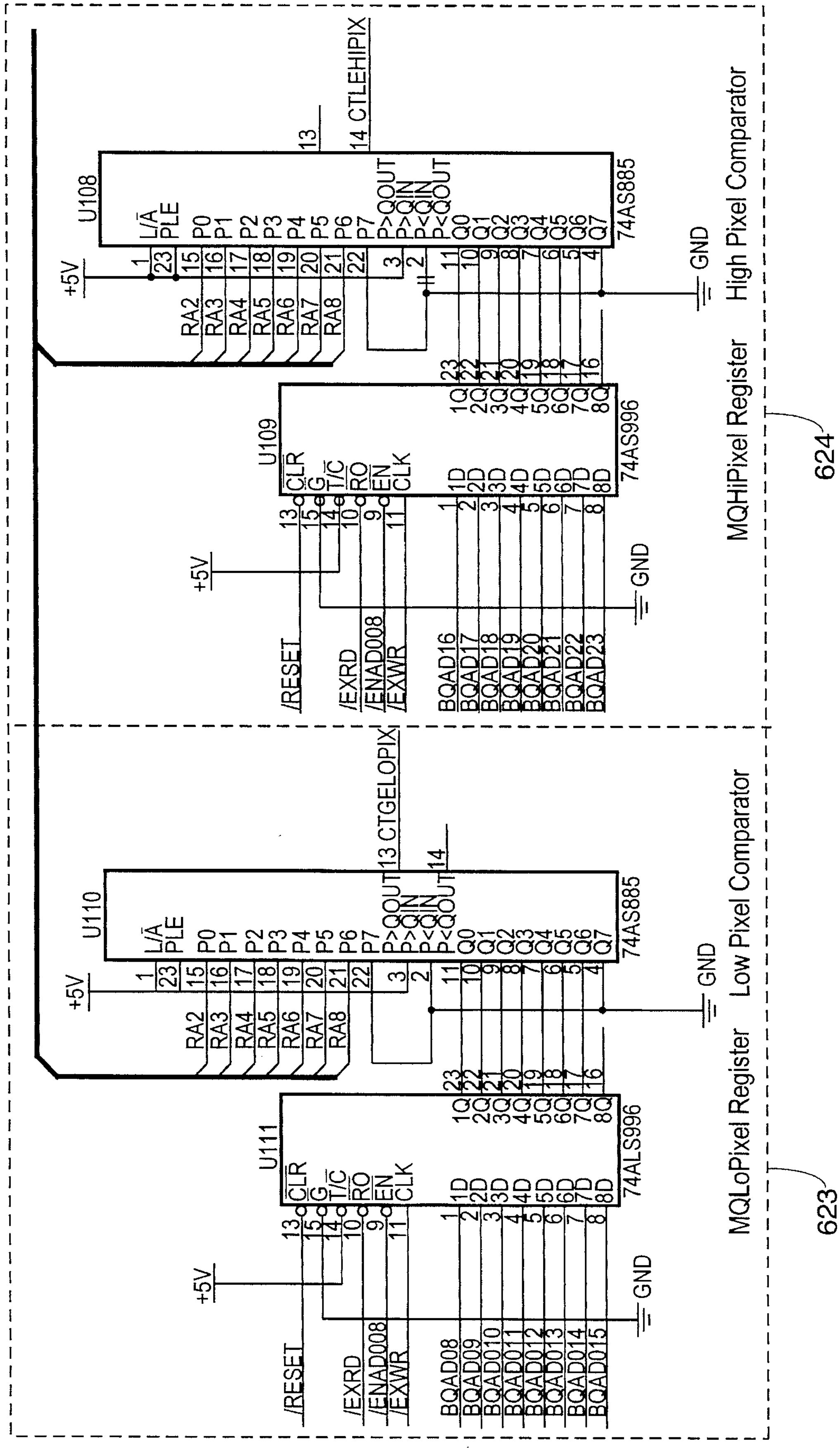
Figures 3, 10A:
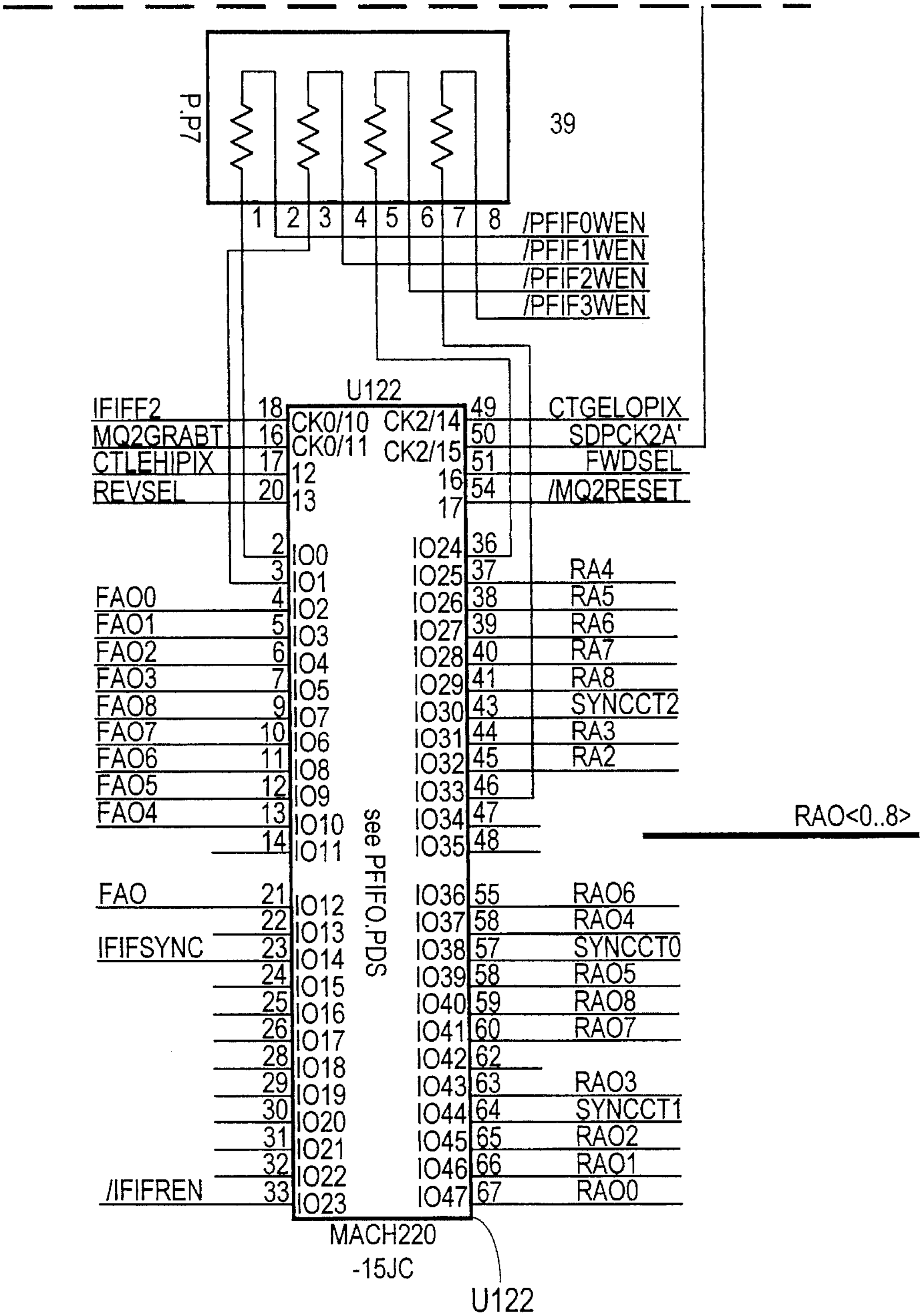

The 8-bit output of IFIFO U124 is provided to threshold monitor 621 on 8-bit bus (IFIF00–07). Threshold monitor 621 includes a threshold register U113 and a threshold comparator (FIG. 10*a*). Threshold register U113 is a conventional part available from Texas Instruments (TI) as part number 74ALS996. Threshold comparator U112 is a conventional part available from TI as part number 74AS885. The 8-bit output of IFIFO U124 is provided to an input of threshold comparator U112. The other input to threshold comparator U112 is the 8-bit output of threshold register U113. The output of threshold register U113 is a threshold value which is transmitted to threshold register U113 from host work station 420 on bus quarter address bus BQAD24–31. The threshold value is a value representative of the intensity level at which meaningful pixel intensity values are obtained. If the value of the 8-bit output of IFIFO U124 is greater than the threshold value, threshold comparator U112 generates an enabling signal (IGTTHR) which is transmitted to SRAM/PFIFO data switch U123. When SRAM/PFIFO data switch U123 receives this enabling signal (IGTTHR), the 8-bit output of IFIFO U124 is passed through SRAM/PFIFO data switch U123 on 8-bit bus (SRAMI0–7). If SRAM/PFIFO data switch U123 does not receive this enabling signal (IGTTHR), SRAM/PFIFO data switch U123 generates an 8-bit signal having a zero value and transmits this zero signal on 8-bit bus SRAMI0–7. SRAM/PFIFO data switch U123 is a conventional programmable array logic device (PAL) available from AMD as part number MACH110-15JC.

Figures 1, 10B:
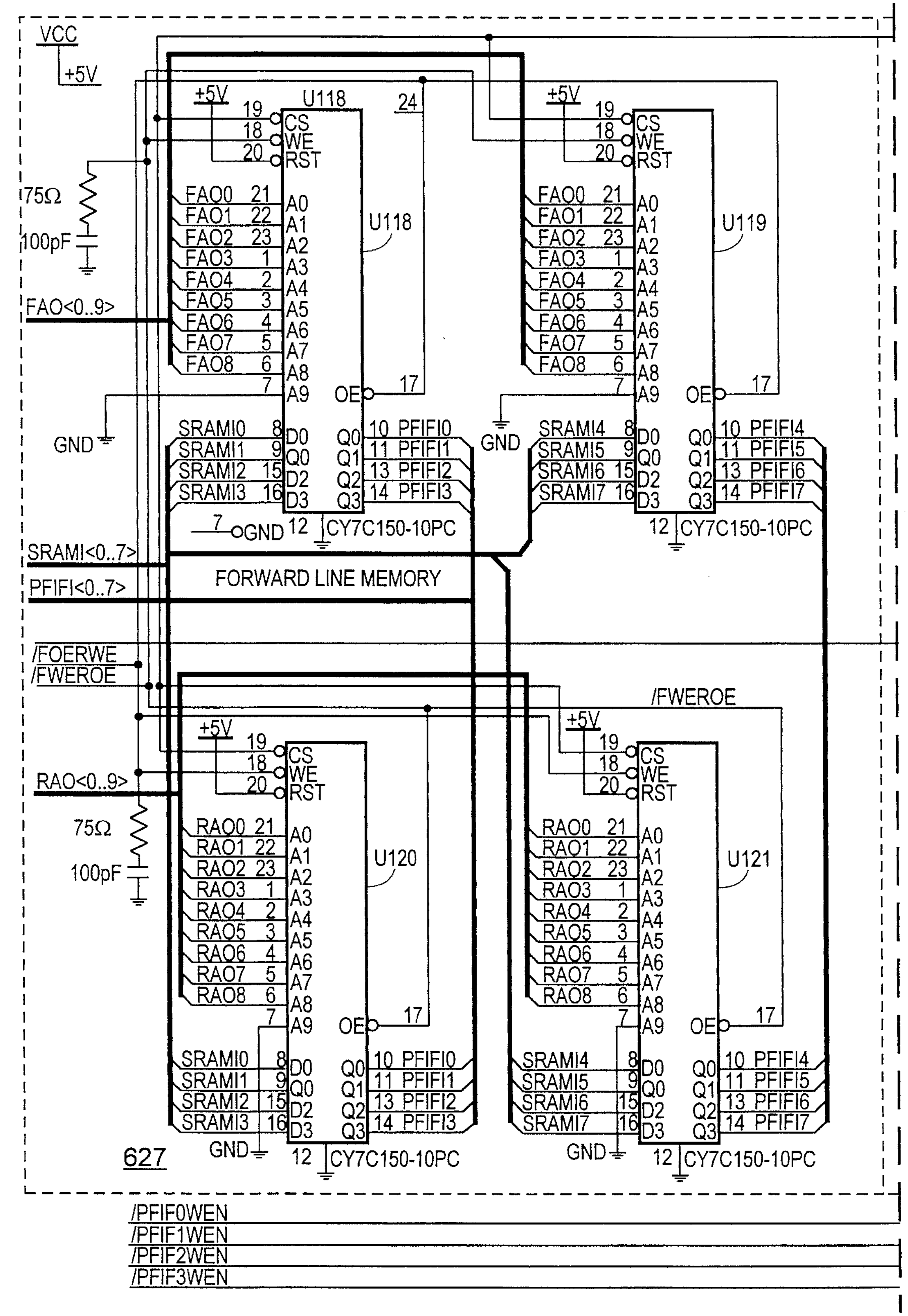
Figures 2, 10B:
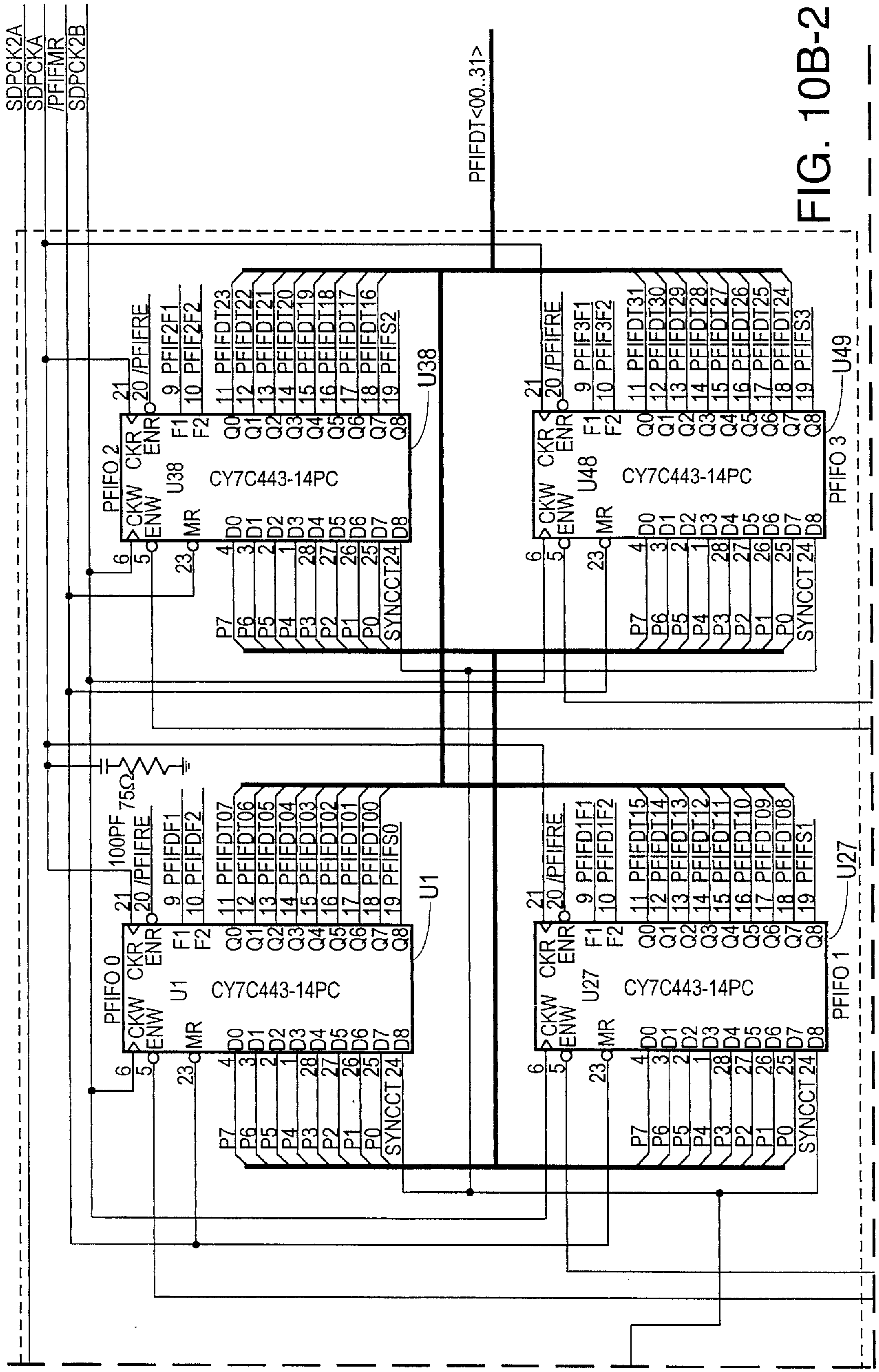
Figures 1, 10C:
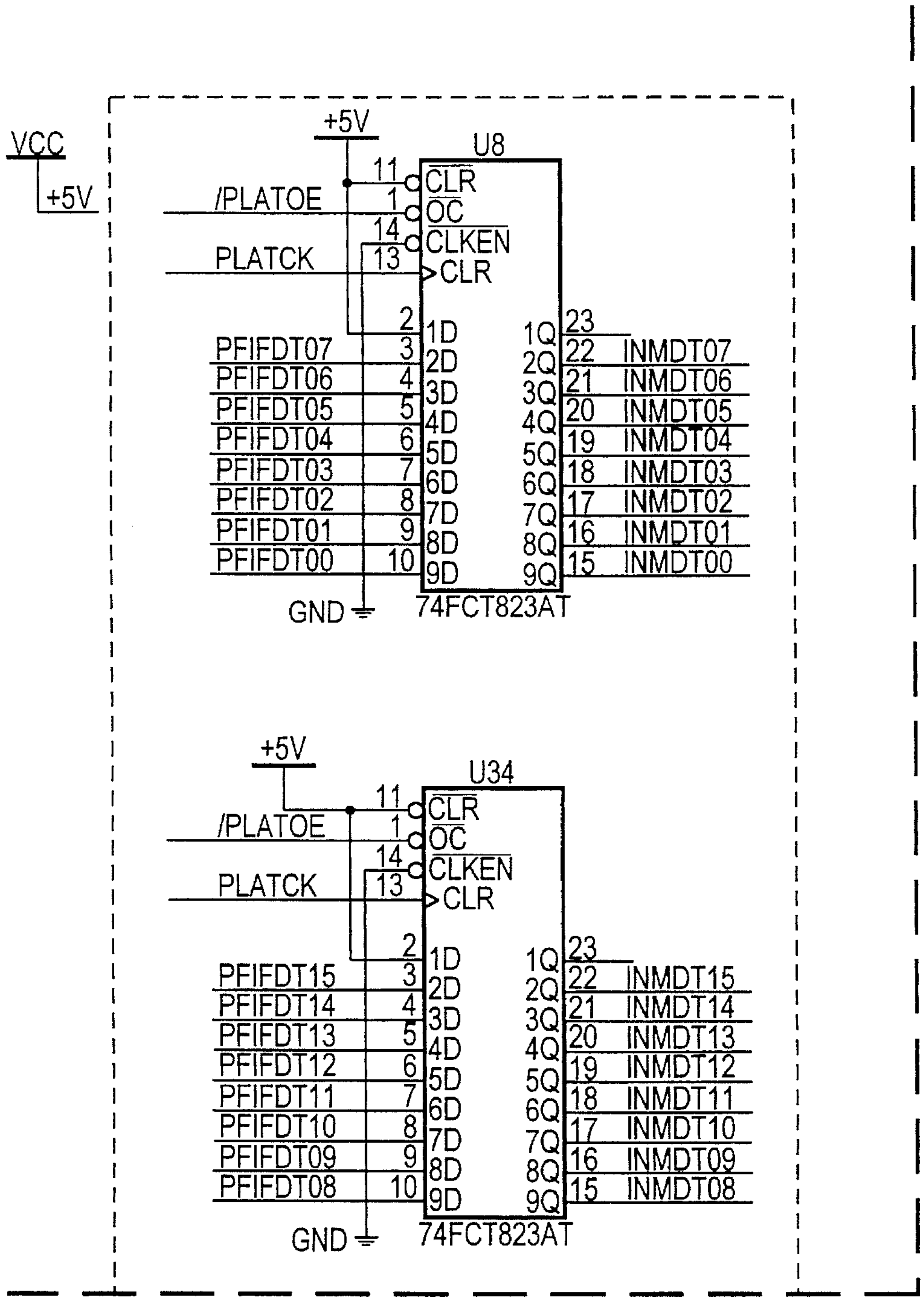
Figures 2, 10C:
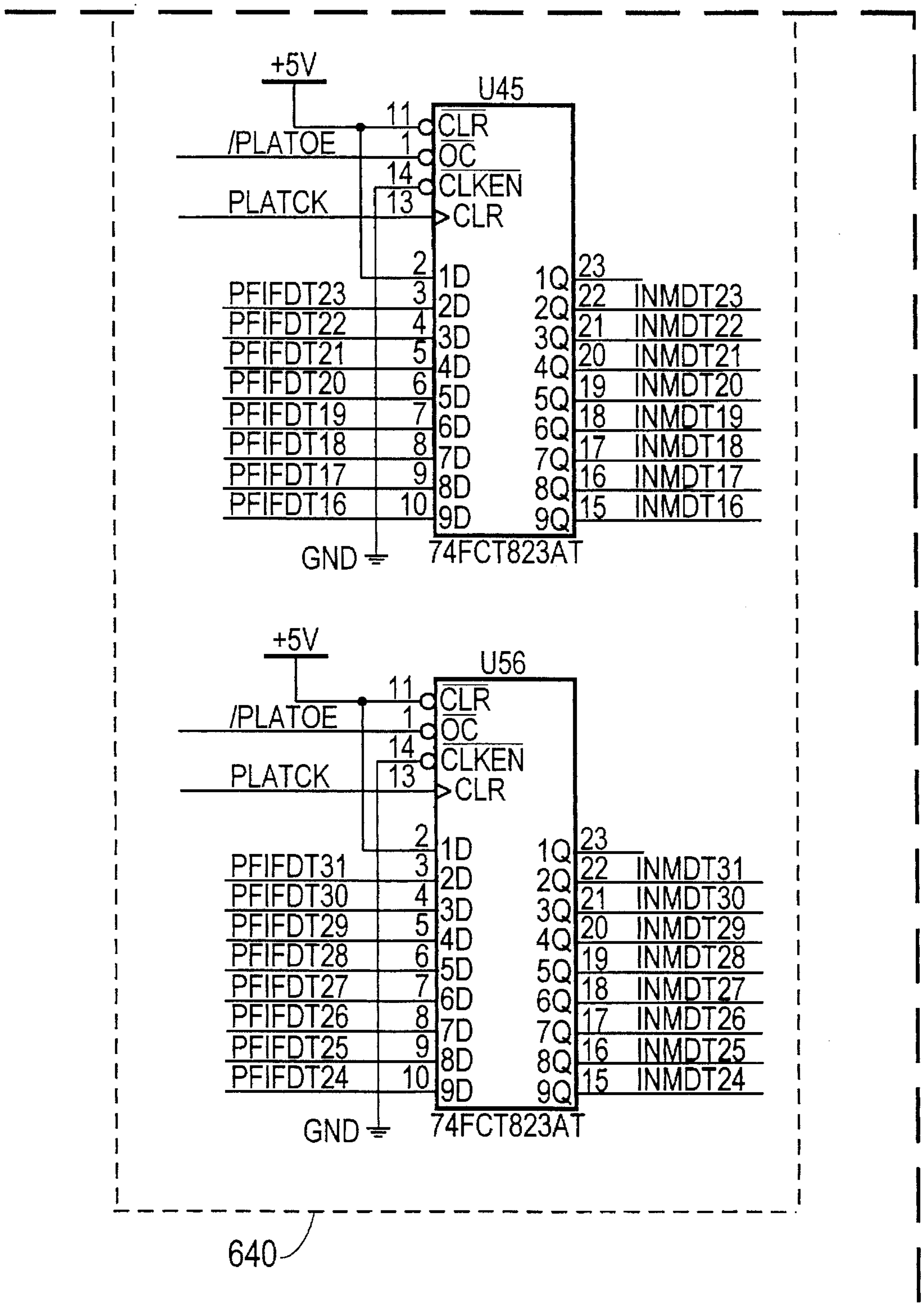
Figures 3, 10C:
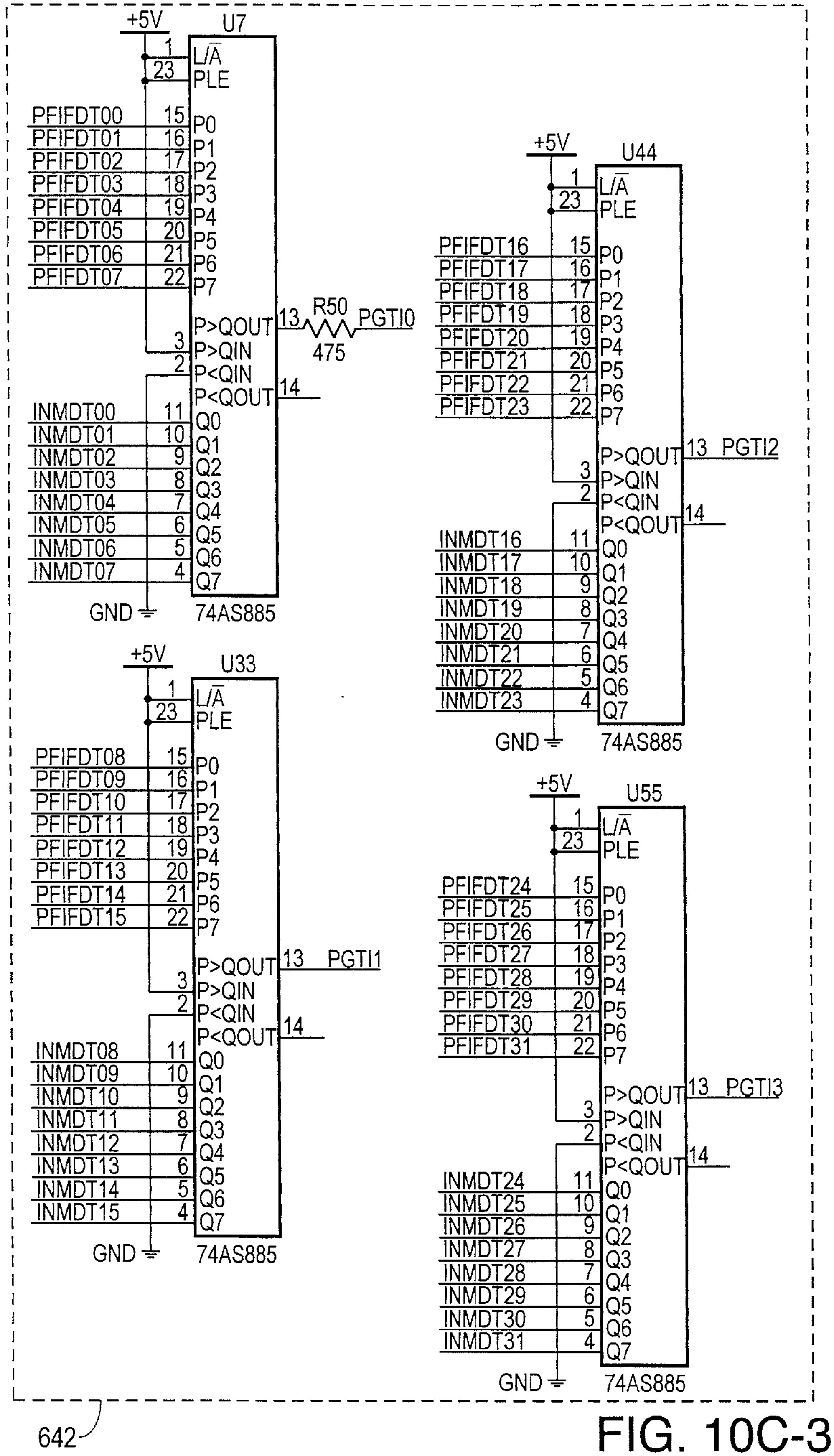
Figures 1, 10D:
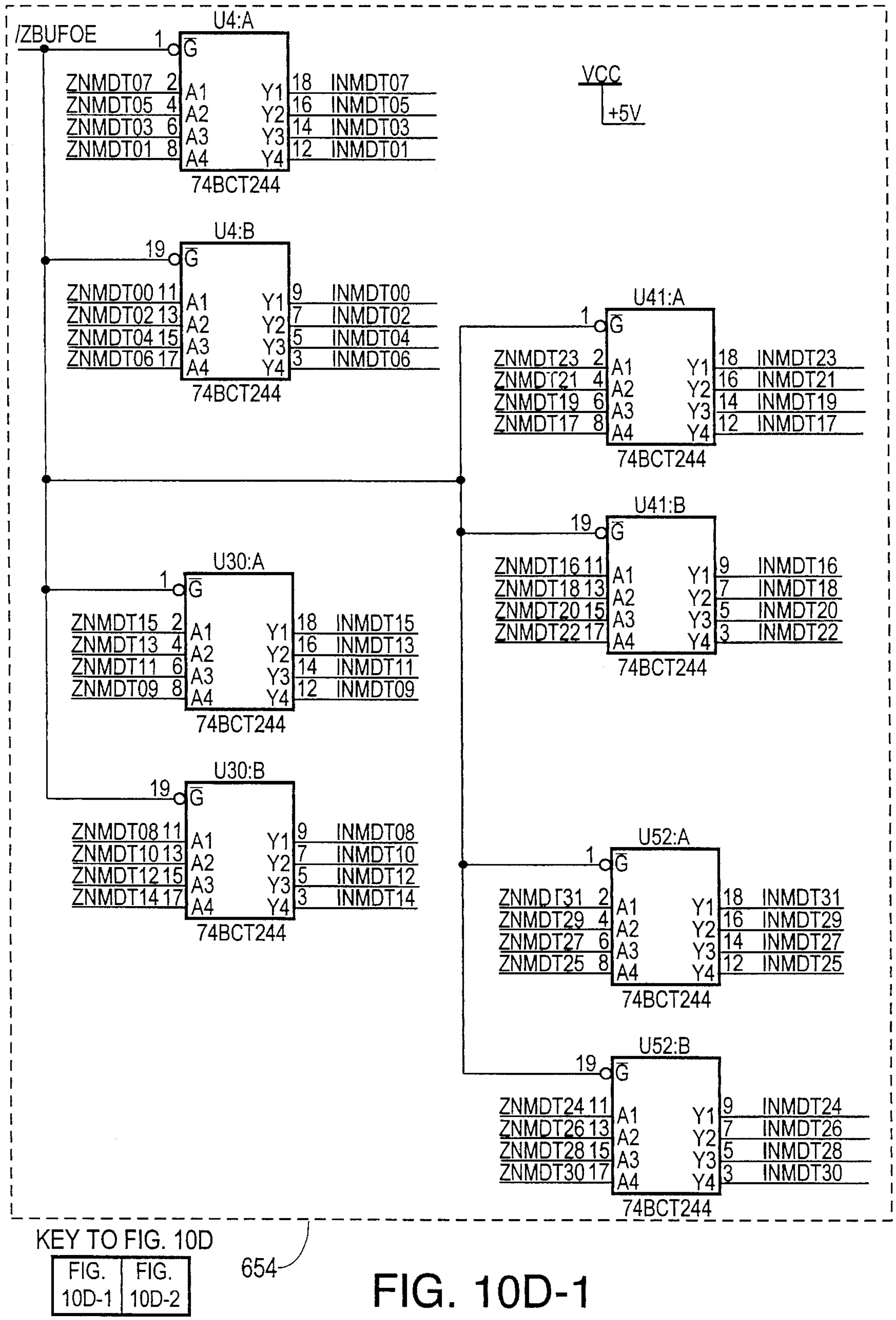
Figures 2, 10D:
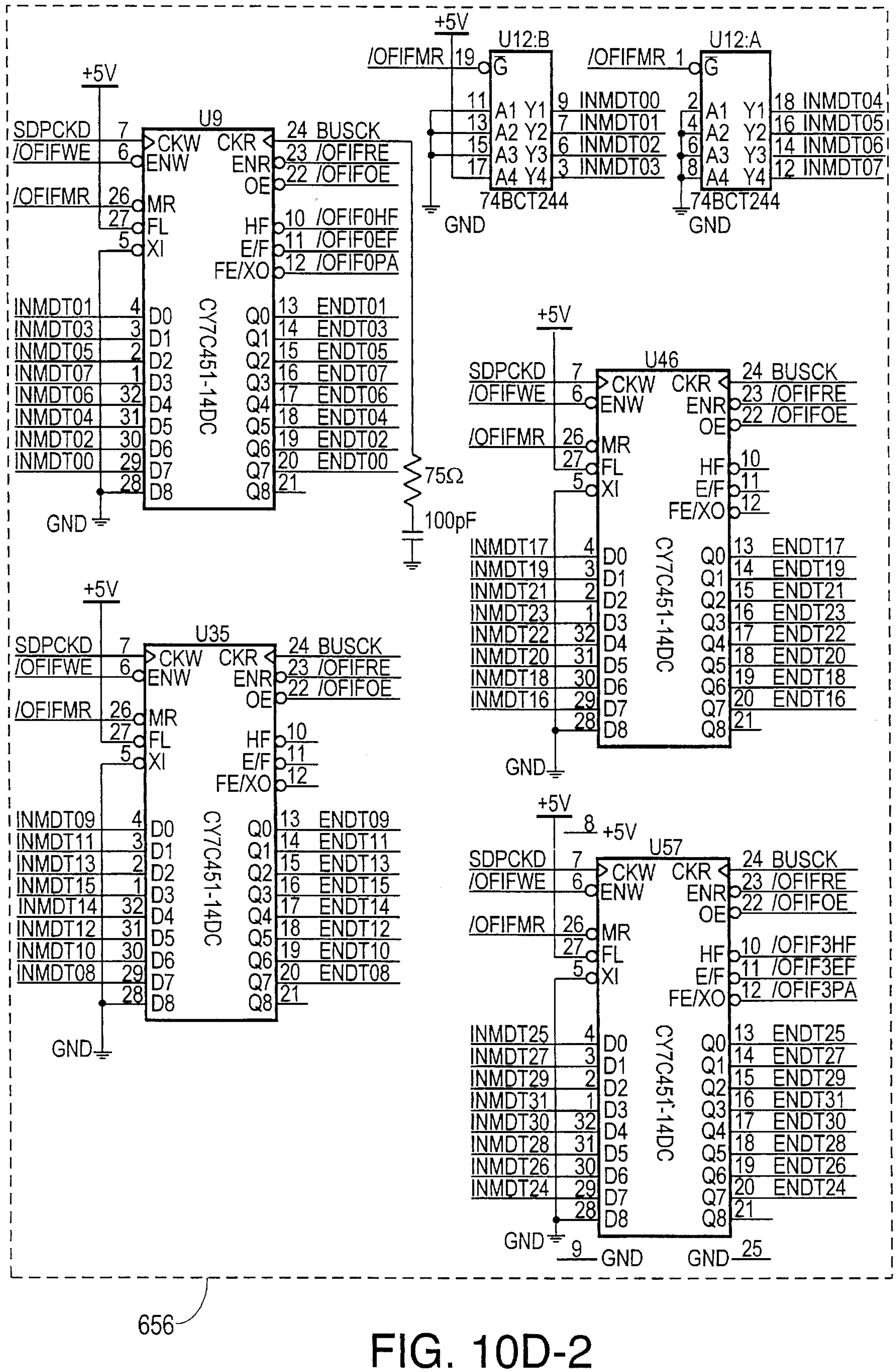
Figure 10E:
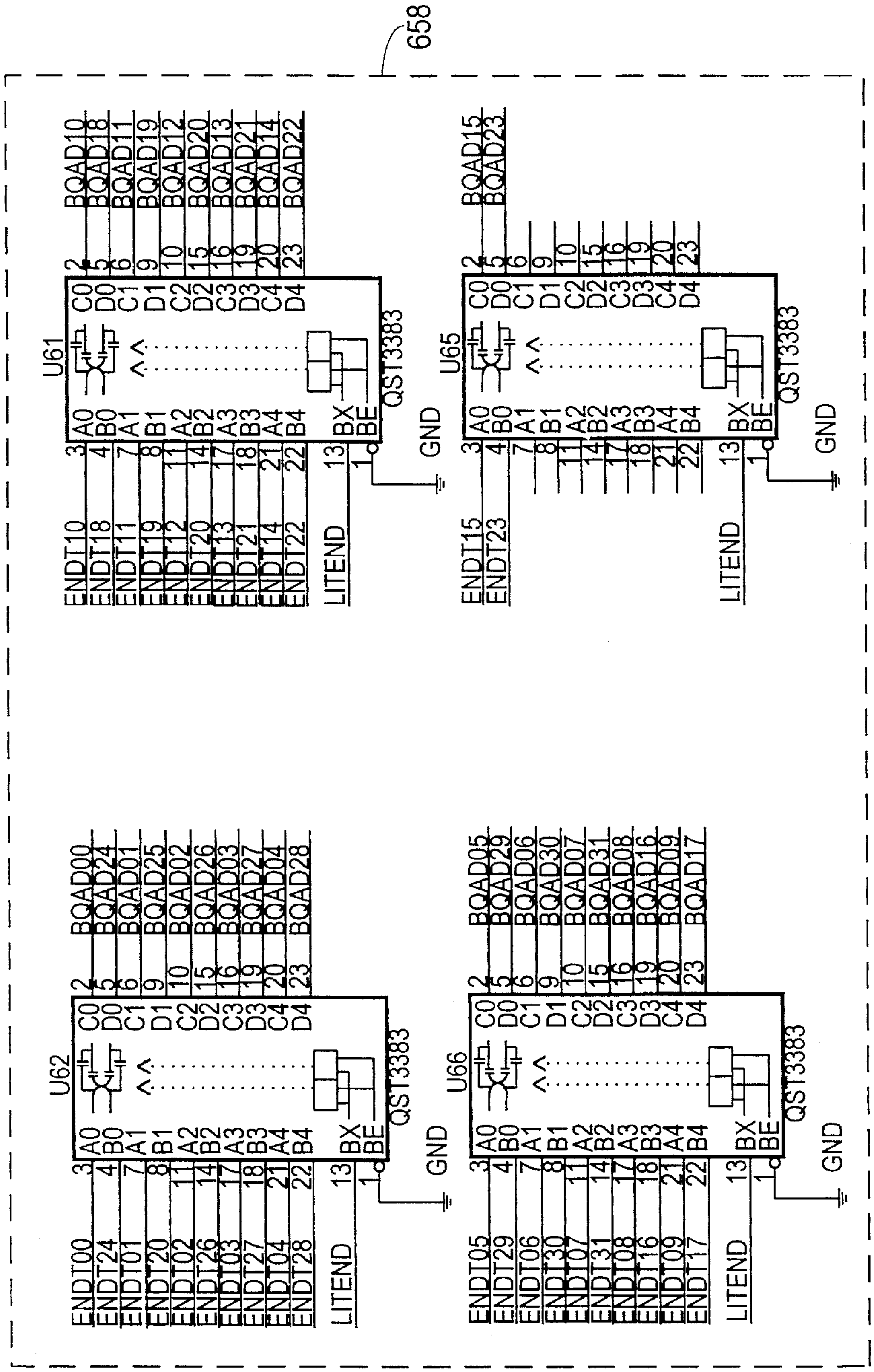
Figures 1, 10F:
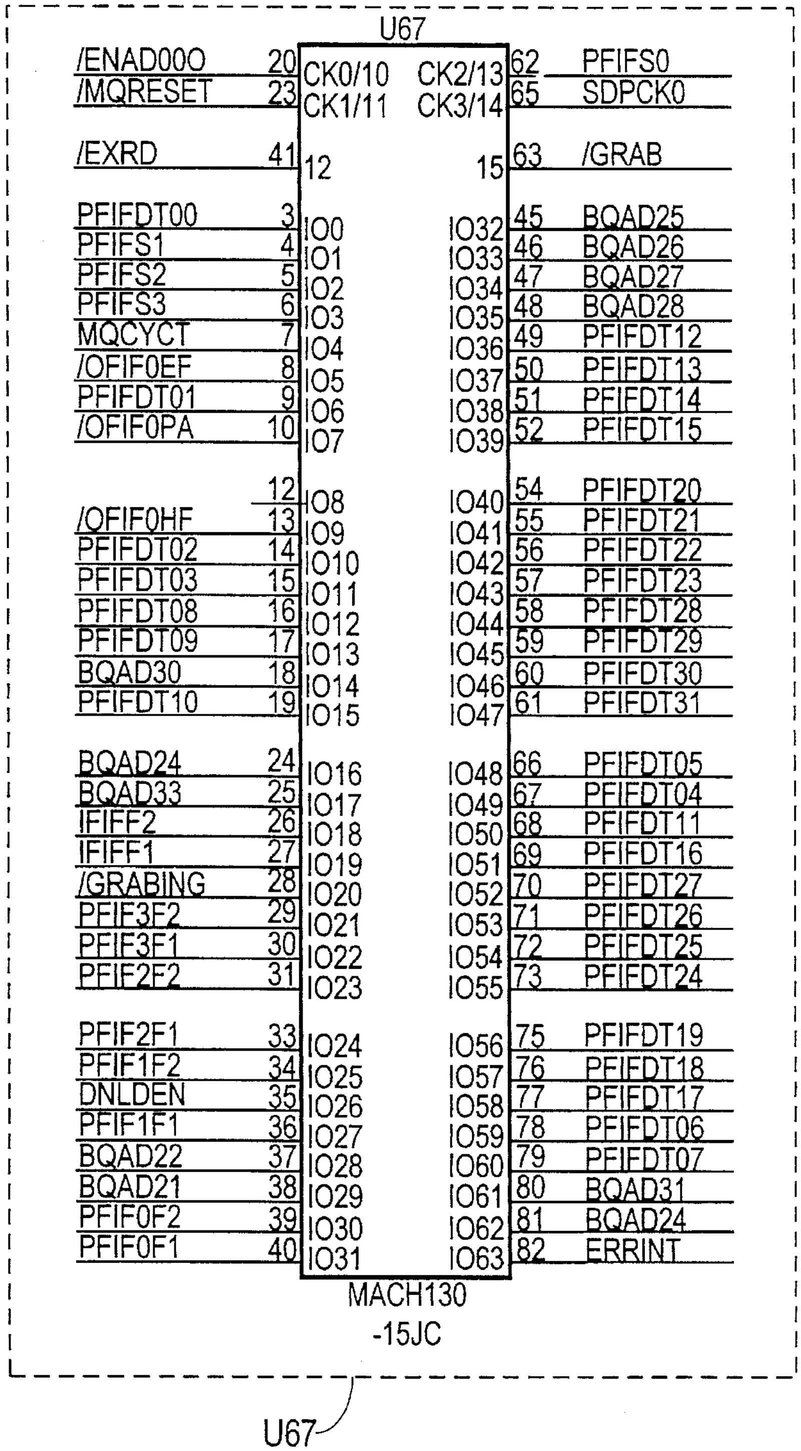
Figures 2, 10F:
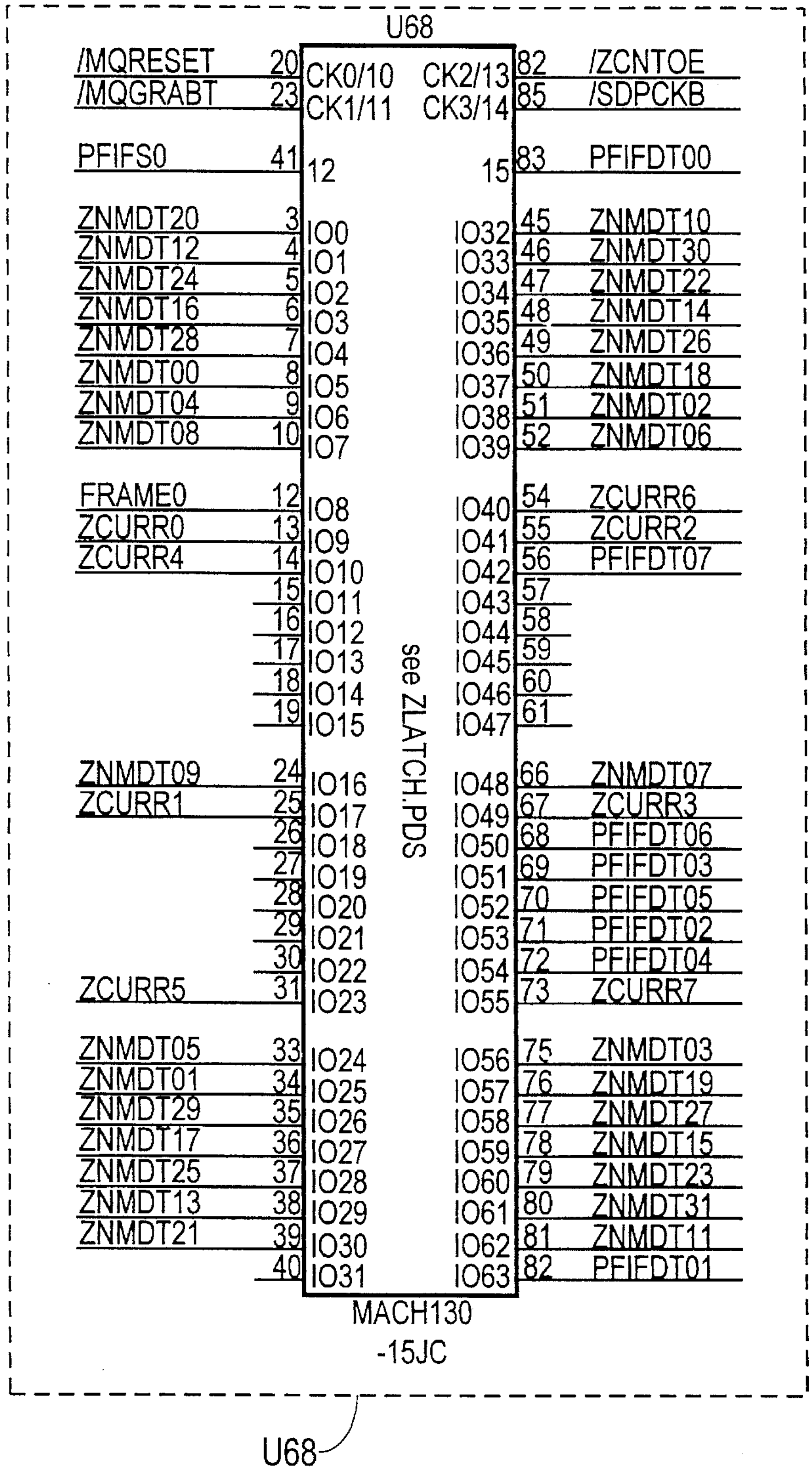
Figures 3, 10F:
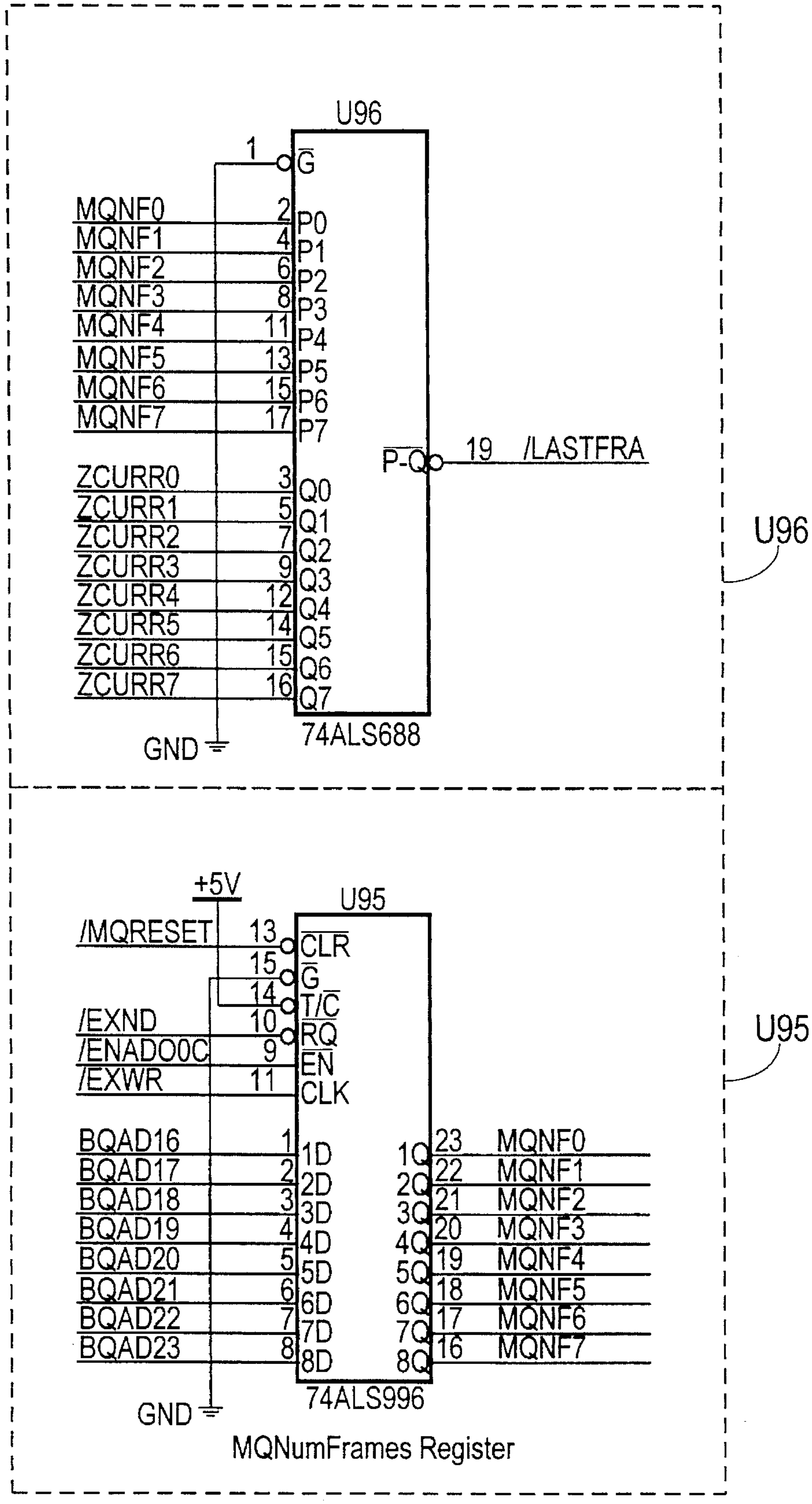

The SRAM/PFIFO data switch U123 also receives the 1-bit IFIFSYNC output from IFIFO U124. When the IFIFSYNC output indicates that the 8-bit output of IFIFO U124 represents a frame number sync byte, SRAM/PFIFO data switch U123 outputs this frame number sync byte on 8-bit data bus PFIFI0–7. This PFIFI0–7 output is provided to PFIFO block 631 through buffer 629. Buffer 629 includes a number of resistors which assure that the lines connecting the various elements behave properly when the high speed signals are transmitted (FIG. 10*b*).

The 8-bit pixel intensity values output from SRAM/PFIFO data switch U123 on bus SRAMI0–7 are transmitted to line reversal SRAM block 627. Line reversal SRAM block 627 includes four conventional SRAM memory blocks U118–U121 (FIG. 10*b*) which are available from Cypress Semiconductor as part number CY7C150-10PC. SRAM/PFIFO data switch U123 generates a forward output enable and reverse write enable signal (/FOERWE) and transmits this signal to the output enable ports of SRAM memory blocks U118–U119 and the write enable ports of SRAM memory blocks U120–U121. SRAM/PFIFO data switch U123 also generates a forward write enable and reverse output enable signal (/FWEROE) and transmits this signal to the write enable ports of SRAM memory blocks U120–U121 and the output enable ports of SRAM memory blocks U118–U119. The /FOERWE and /FWEROE signals are complementary signals. During the forward sweeps along scanner pattern 502 (FIG. 5*a*), the /FWEROE signal is enabled and the /FOERWE signal is disabled. Thus, during each forward sweep, a line of pixel intensity values are written into SRAM memory blocks U118–U119 and a line of pixel intensity values are read out of SRAM memory blocks U120–U121. During reverse sweeps along scanner pattern 502 (FIG. 5*a*), the /FOERWE signal is enabled and the /FWEROE signal is disabled. Thus, during each reverse sweep, a line of pixel intensity values are written into SRAM memory blocks U120–U121 and a line of pixel intensity values are read out of SRAM memory blocks U118–119.

SRAM memory blocks U118–U121 are addressed by SRAM/PFIFO controller U122. SRAM/PFIFO controller U122 is a conventional programmable array logic device (PAL) available from AMD as part number MACH220-15JC. SRAM/PFIFO controller U122 contains counters that use the SDPCK2A signal to generate a 9-bit forward address output and a 9-bit reverse address output. The forward address output is transmitted to SRAM memory blocks U118–U119 on address bus FAO0–8 and the reverse address output is transmitted to SRAM memory blocks U120–U121 on address bus RAO0–8 (FIG. 10*b*). The forward address output and reverse address output of SRAM/PFIFO controller U122 identify the addresses to be accessed for read and write operations within SRAM memory blocks U118–U119 and SRAM memory blocks U120–U121, respectively. The forward address output is a cyclical signal which causes the pixel intensity values received during each forward sweep along scanner pattern 502 (FIG. 5*a*) to be written and read within SRAM memory blocks U118–U119 in a first in, first out basis. This preserves the order of the pixel intensity values received during forward sweeps of the scanner. The reverse address output is a cyclical signal which causes pixel intensity values received during each reverse sweep along scanner pattern 502 (FIG. 5*a*) to be written and read within SRAM memory blocks U120–U121 in a last in, first out basis. This reverses the order of the pixel intensity values received during reverse sweeps of the scanner. In this manner, the pixel intensity values are transmitted from SRAM memory blocks U118–U121 in an order which is standard for generating an image on a video monitor (i.e., with each line of pixel intensity values organized in a "left to right" manner). The outputs of SRAM memory blocks U118–U121 are transmitted to PFIFO block 631 through buffer 629 on 8-bit data bus PFIFI0–7.

SRAM/PFIFO controller U122 also generates four PFIFO write enable signals (PFIF0–3WEN) which enable pixel intensity values and frame number sync bytes to be written into PFIFO block 631.

Each of the four PFIFO write enable signals (PFIF0–3WEN) enables a separate parallelizing FIFO within PFIFO block 631. Thus, the PFIF0WEN, PFIF1WEN, PFIF2WEN and PFIF3WEN signals enable write operations within PFIFO U1, PFIFO U27, PFIFO U38 and PFIFO U49, respectively (FIG. 10*b*). PFIFOs U1, U27, U38 and U49 are conventional fifos available from Cypress Semiconductor as part number CY7C443-14PC.

When SRAM/PFIFO controller U122 detects that the IFIFSYNC signal is enabled (i.e., when a frame number sync byte is received), the SRAM/PFIFO controller U122 generates all four PFIFO write enable signals (PFIF0–3WEN), thereby writing the 8-bit frame number sync byte into each of PFIFOs U1, U27, U38 and U49. Upon receiving the IFIFSYNC signal, the SRAM/PFIFO controller U122 also generates a 1-bit sync signal, SYNCCT1, which is transmitted as a ninth input bit to each of PFIFOs U1, U27, U38 and U49. This ninth input bit identifies the frame number sync bytes written to PFIFOs U1, U27, U38 and U49.

When the IFIFSYNC signal is not enabled (i.e., when pixel intensity values are being received), the SRAM/PFIFO controller U122 sequentially generates the four PFIFO write enable signals (PFIF0–3WEN), such that the 8-bit pixel intensity values are sequentially written into PFIFOs U1, U27, U38 and U49. For example, the first, second, third and fourth pixel intensity values are written into PFIFOs U1, U27, U37 and U49, respectively. The write operations into PFIFOs, U1, U27, U38 and U49 are clocked by a SDPCK2B signal generated by the memory quarter clock generation block 660.

The 8-bit pixel intensity values stored in PFIFOs U1, U27, U38 and U49 are simultaneously read out of these four PFIFOs as 32-bit pixel intensity words on data bus PFIFDT0–31. Each 32-bit pixel in intensity word contains information previously represented by four 8-bit pixel intensity values. In this manner, the 8-bit pixel intensity values are parallelized into 32-bit words for more efficient data handling by the frame grabber 424 and host work station 420. Similarly, the 8-bit frame number sync bytes stored in PFIFO's U1, U27, U38 and U49 are simultaneously read out of these four PFIFOs as 32-bit frame number sync words. Each 32-bit frame number sync word contains information previously represented by a single 8-bit frame number sync byte (repeated four times). PFIFOs U1, U27, U38 and U49 also each generate 1-bit control signals PFIFS0, PFIFS1, PFIFS2 and PFIFS3, respectively, which indicate whether the 32-bit output of FIFO block 631 represents a frame number sync word or a pixel intensity word.

Memory quarter pixel cutting blocks 623–624 allow the host workstation 420 to specify which 8-bit pixel intensity values are transmitted to PFIFOs U1, U27, U38 and U49. Host work station 420 transmits a signal corresponding to the desired position of the left-most pixel in scanning pattern 502 (low pixel address) to the memory quarter low pixel register U111 on bus quarter address bus (BQAD8–15) (FIG. 10*a*). Host workstation 420 also transmits a signal corresponding to the desired position of the right-most pixel in scanning pattern 502 (high pixel address) to the memory quarter high pixel register U109 on bus quarter address bus (BQAD1–23) (FIG. 10*a*). Memory quarter high and low pixel registers U111 and U109 are conventional registers available from TI as part number 74ALS996. The low and high pixel addresses stored in low and high pixel registers U111 and U109 are transmitted to low and high pixel comparators U110 and U108, respectively. Low and high pixel comparators U110 and U108 are conventional comparators available from TI as part number 74AS885. Low and high pixel comparators U110 and U108 also receive the current pixel address from SRAM/PFIFO control block U122 on bus RA2–8. When the current pixel address is greater than or equal to the low pixel address, the output (CTGELOPIX) of the low pixel comparator U110 is enabled. When the current pixel address is less than or equal to the high pixel address, the output (CTLEHIPIX) of the high pixel comparator U108 is enabled. The SRAM/PFIFO controller U122 will only generate PFIFO write enable signals (PFIF0–3WEN) when the output (CTGELOPIX) of the low pixel comparator U110 and the output (CTLE-HIPIX) of the high pixel comparator U108 are enabled. This effectively "cuts" the imaging information at the low and high pixel addresses.

The output of PFIFO block 631 is routed in several different ways, depending upon the function to be performed by the SDP 426. Four possible functions of SDP 426 include: (1) generating a live image of target 412 (2) generating a volume image of target 412 (3) generating and displaying a surface image of target 412 (4) generating a surface image of target 412 and downloading this surface image to host work station 420.

Figures 1, 10G:
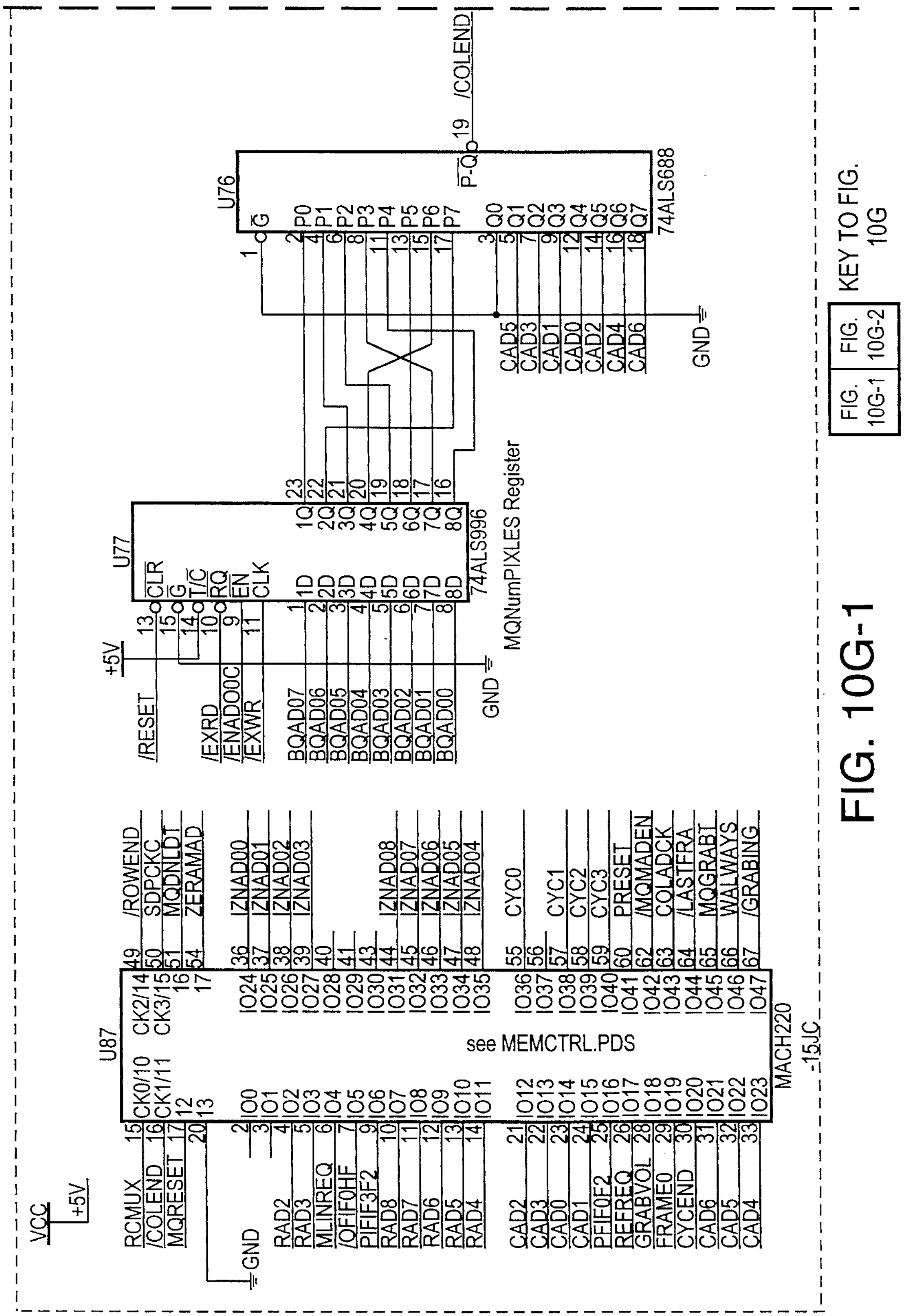
Figures 2, 10G:
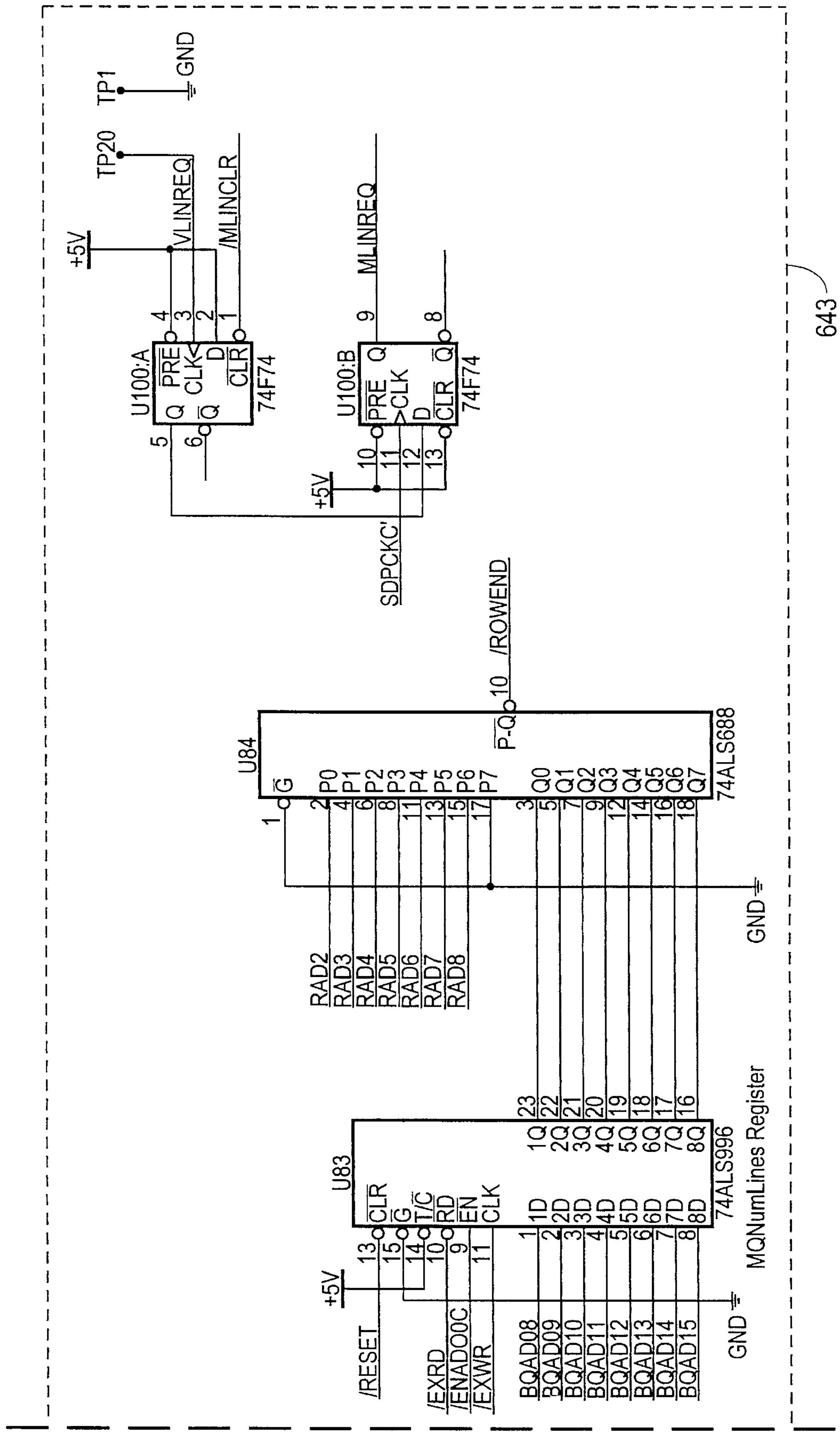
Figures 1, 10H:
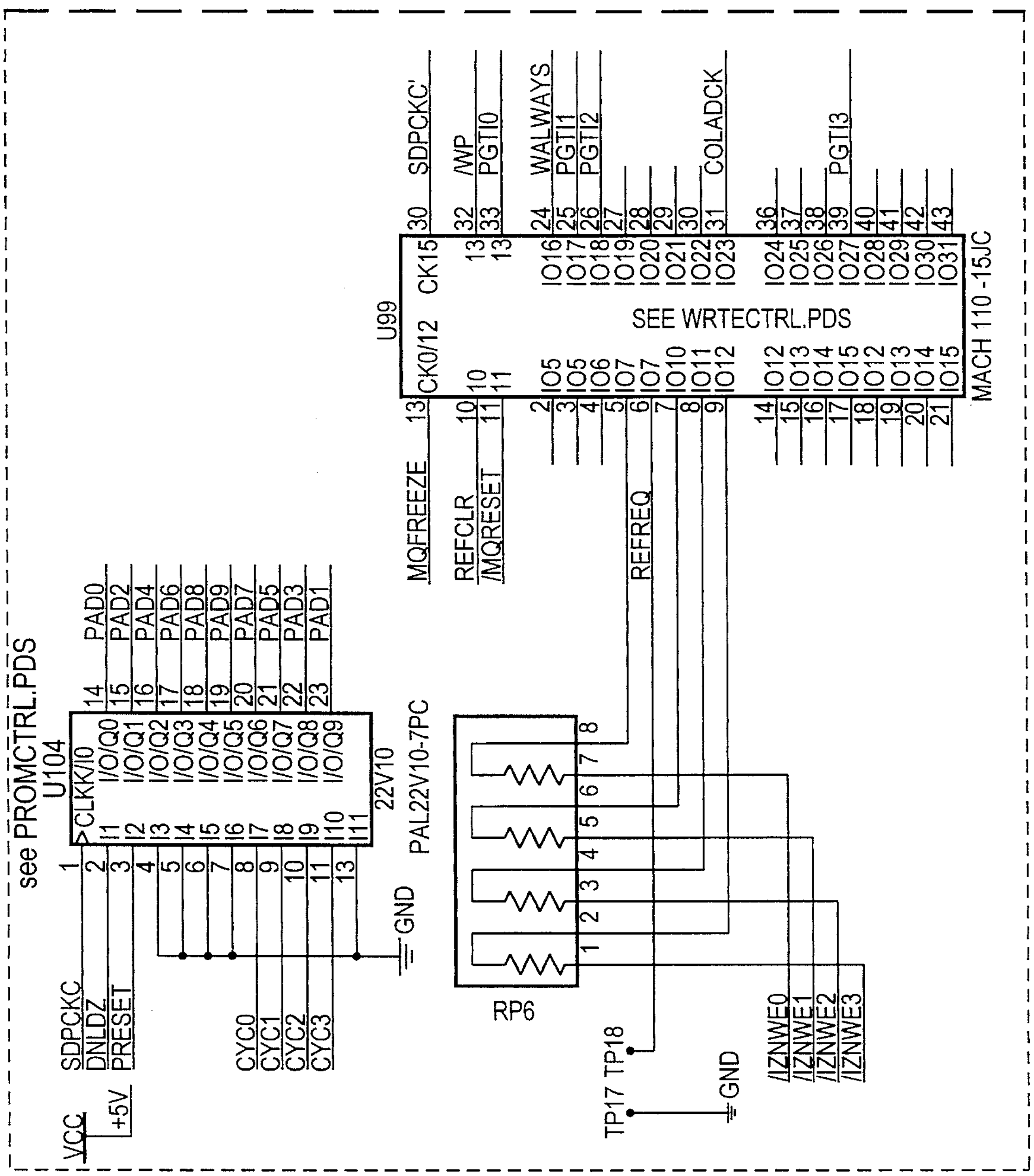
Figures 2, 10H:
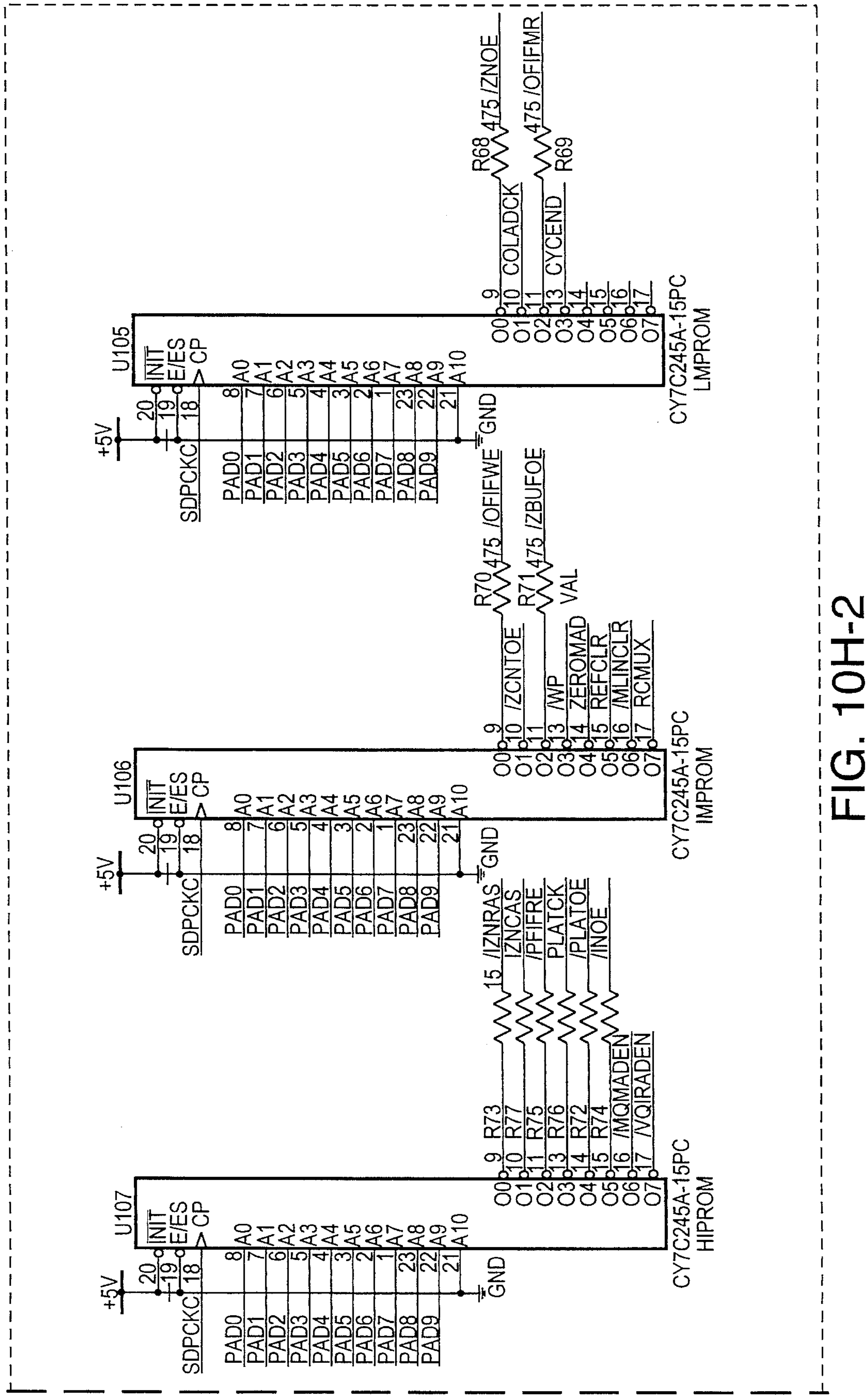
Figures 1, 10I:
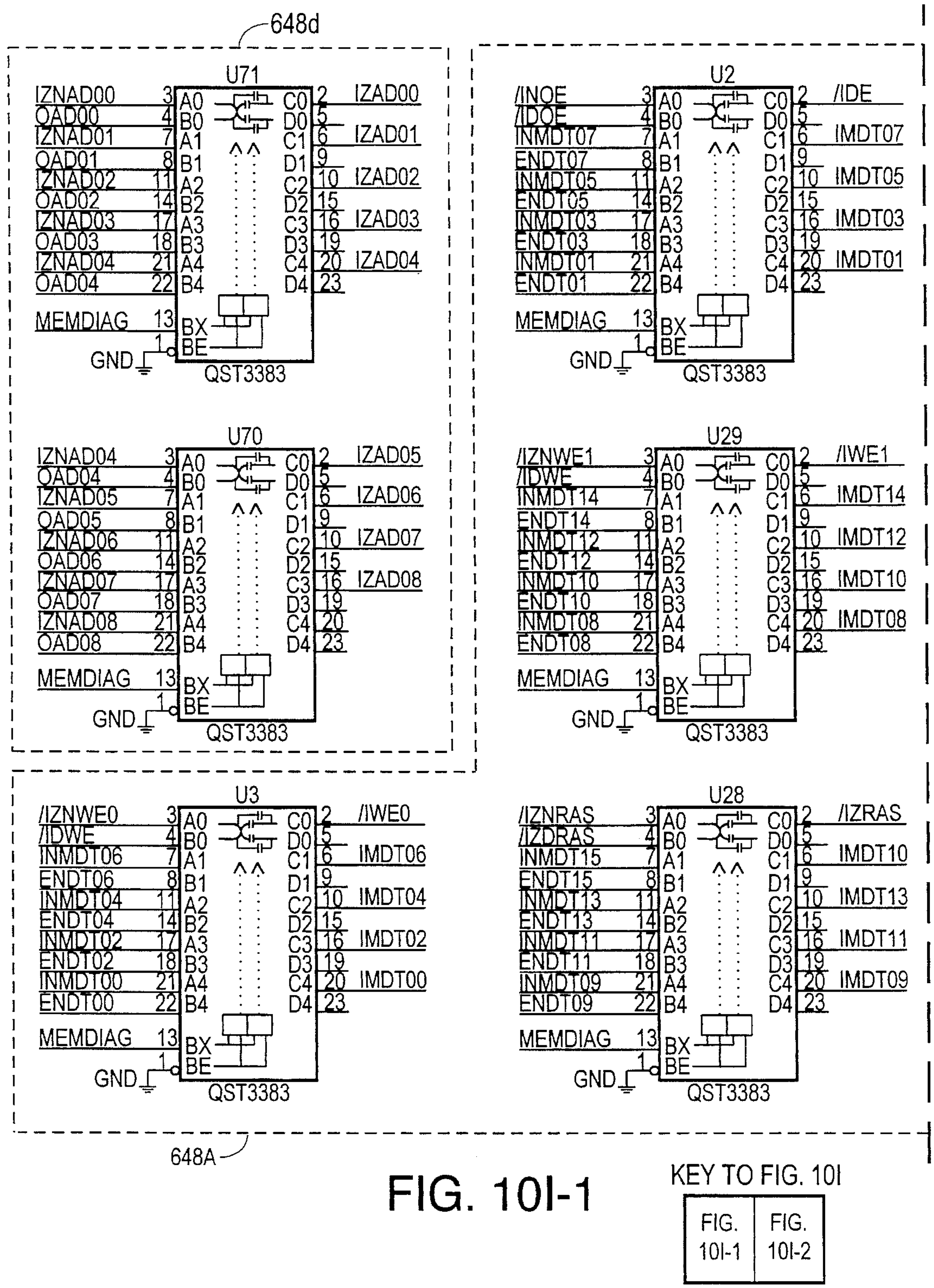
Figures 2, 10I:
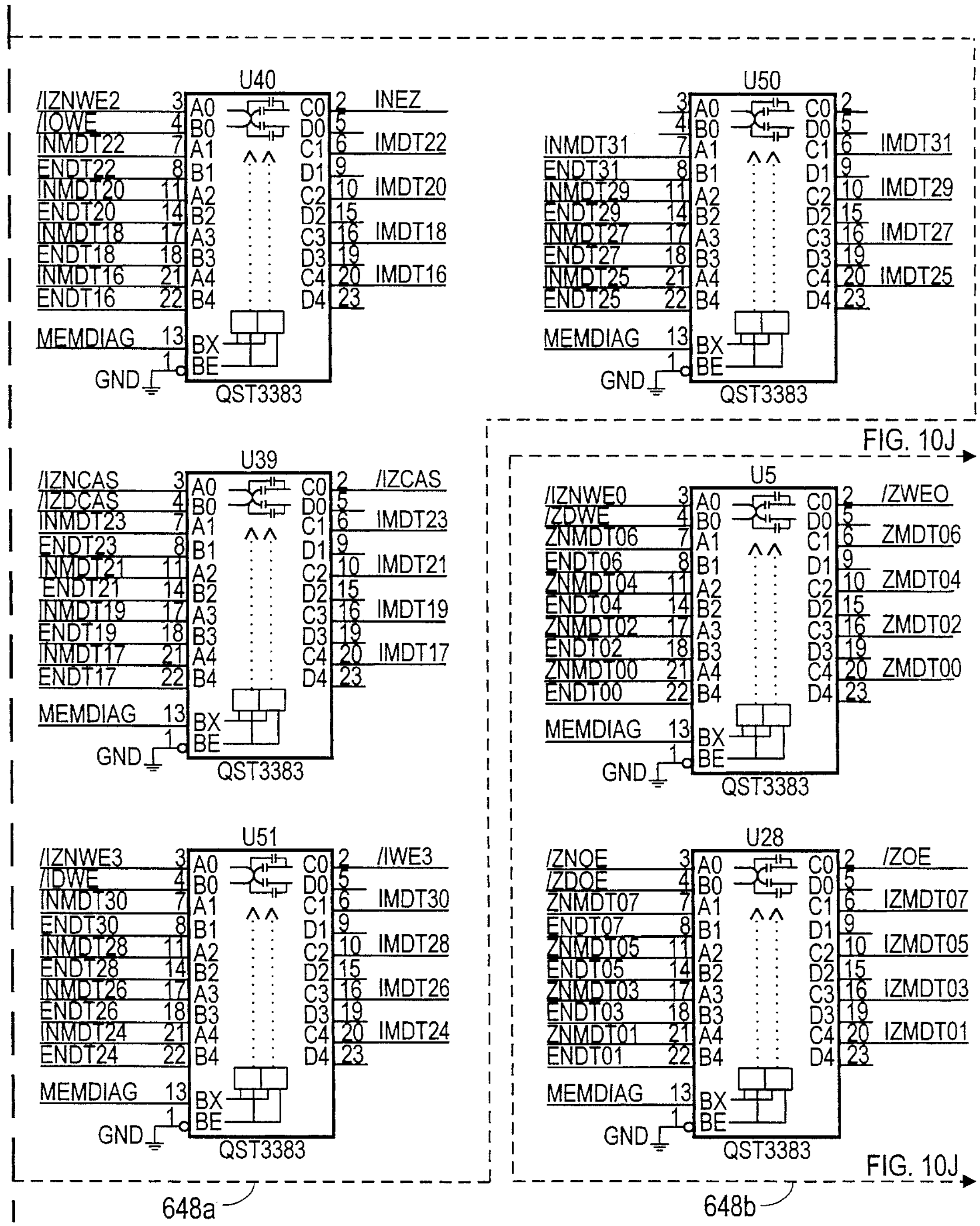
Figure 10J:
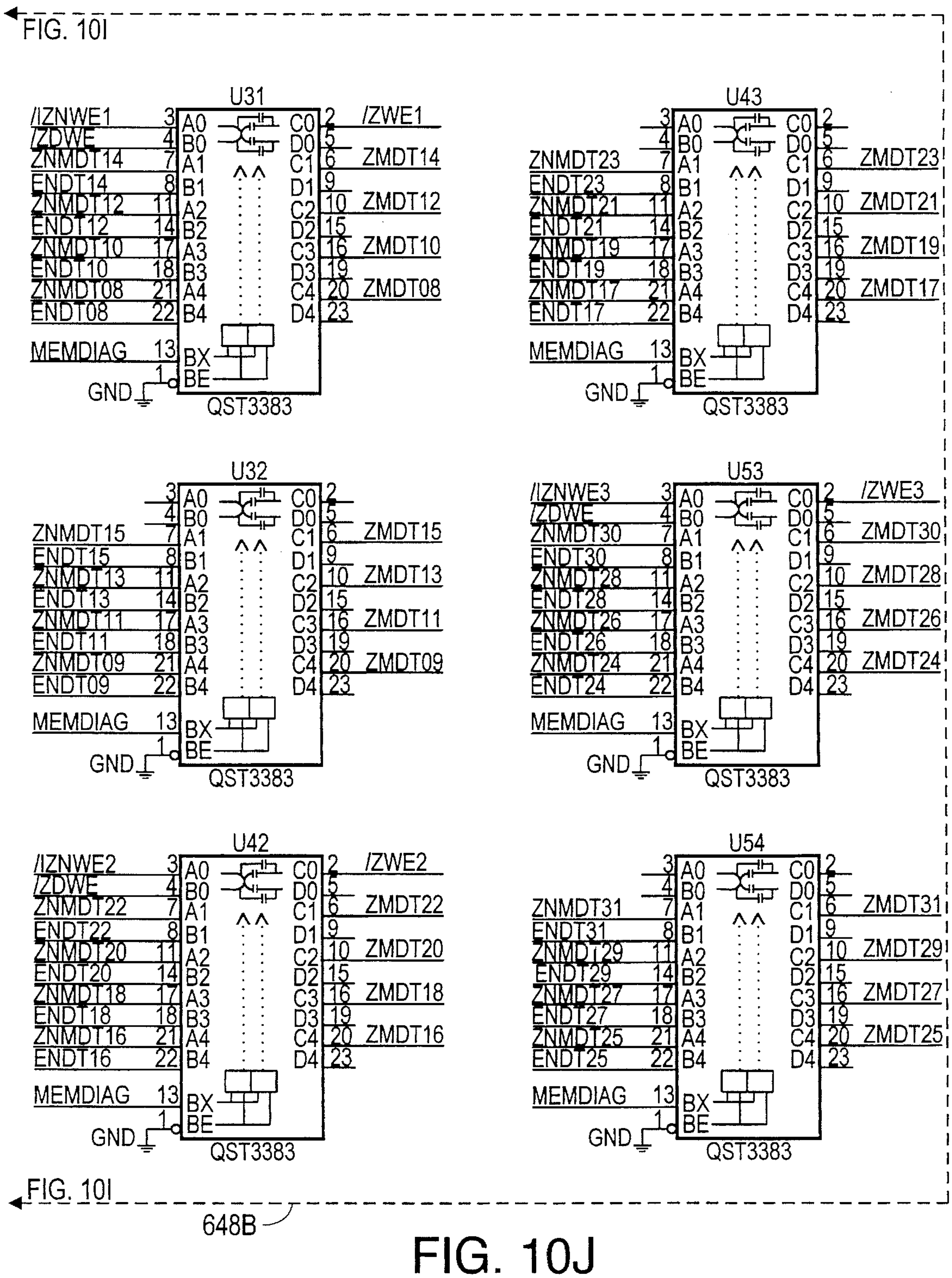
Figures 1, 10K:
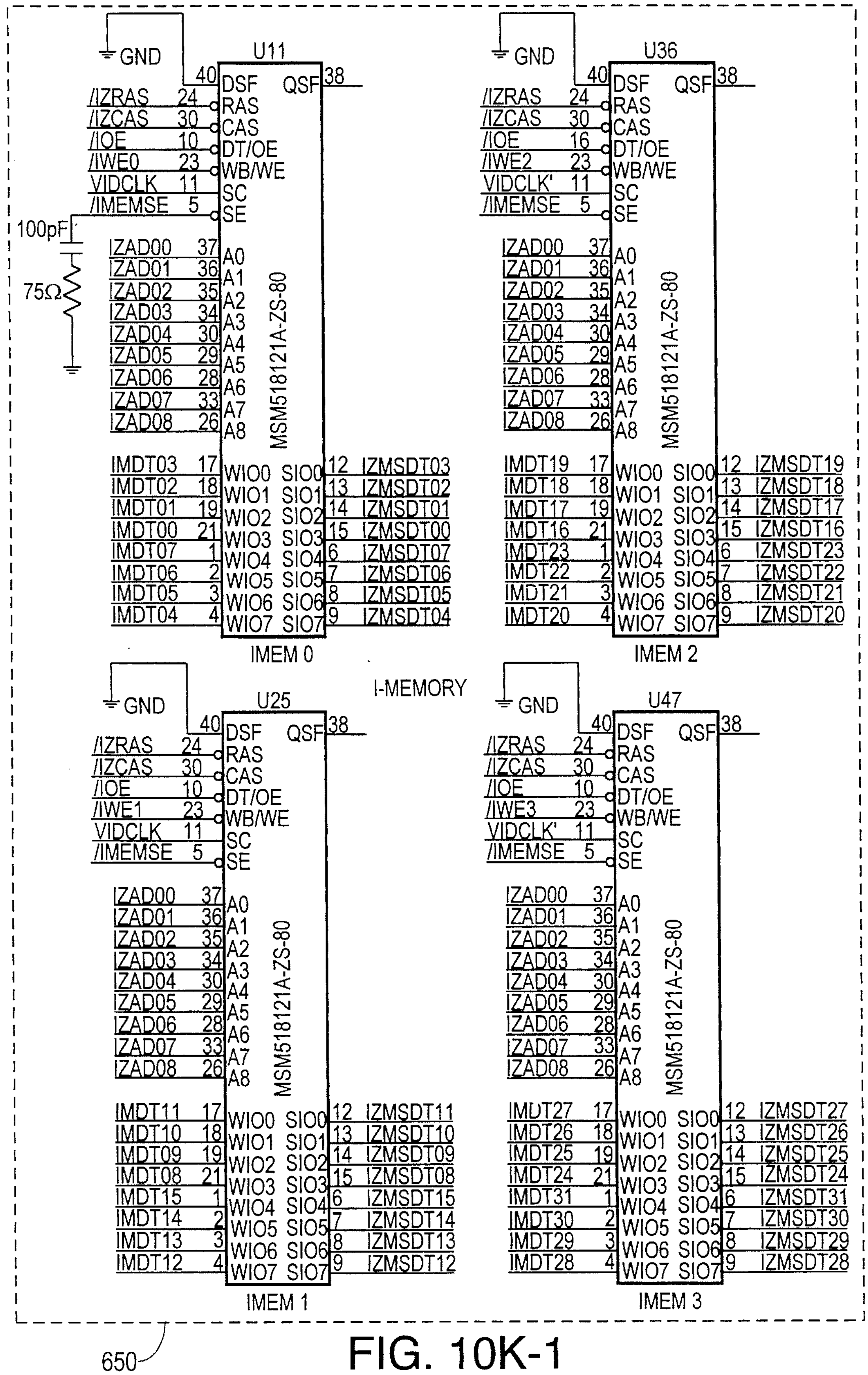
Figures 2, 10K:
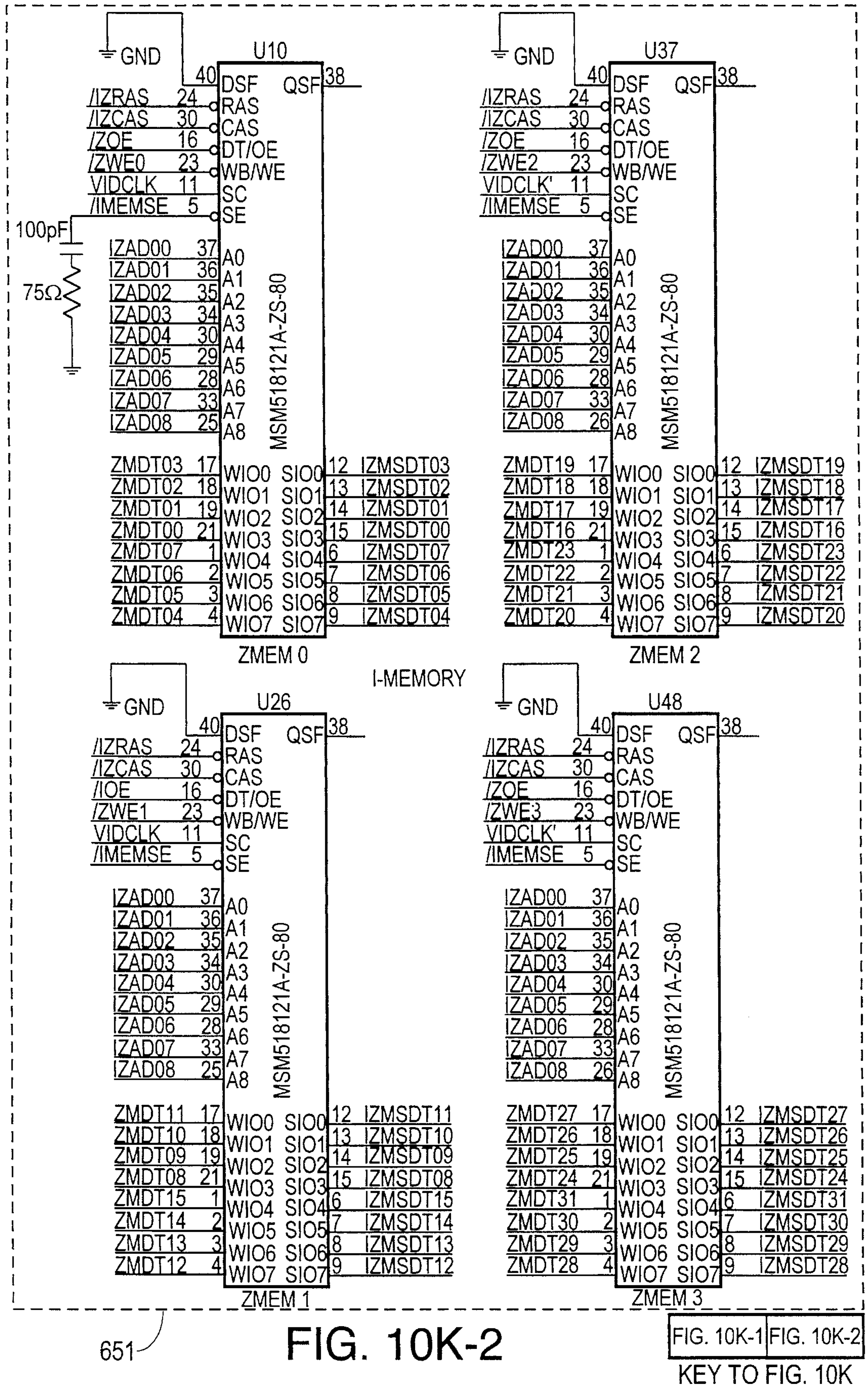
Figure 10L:
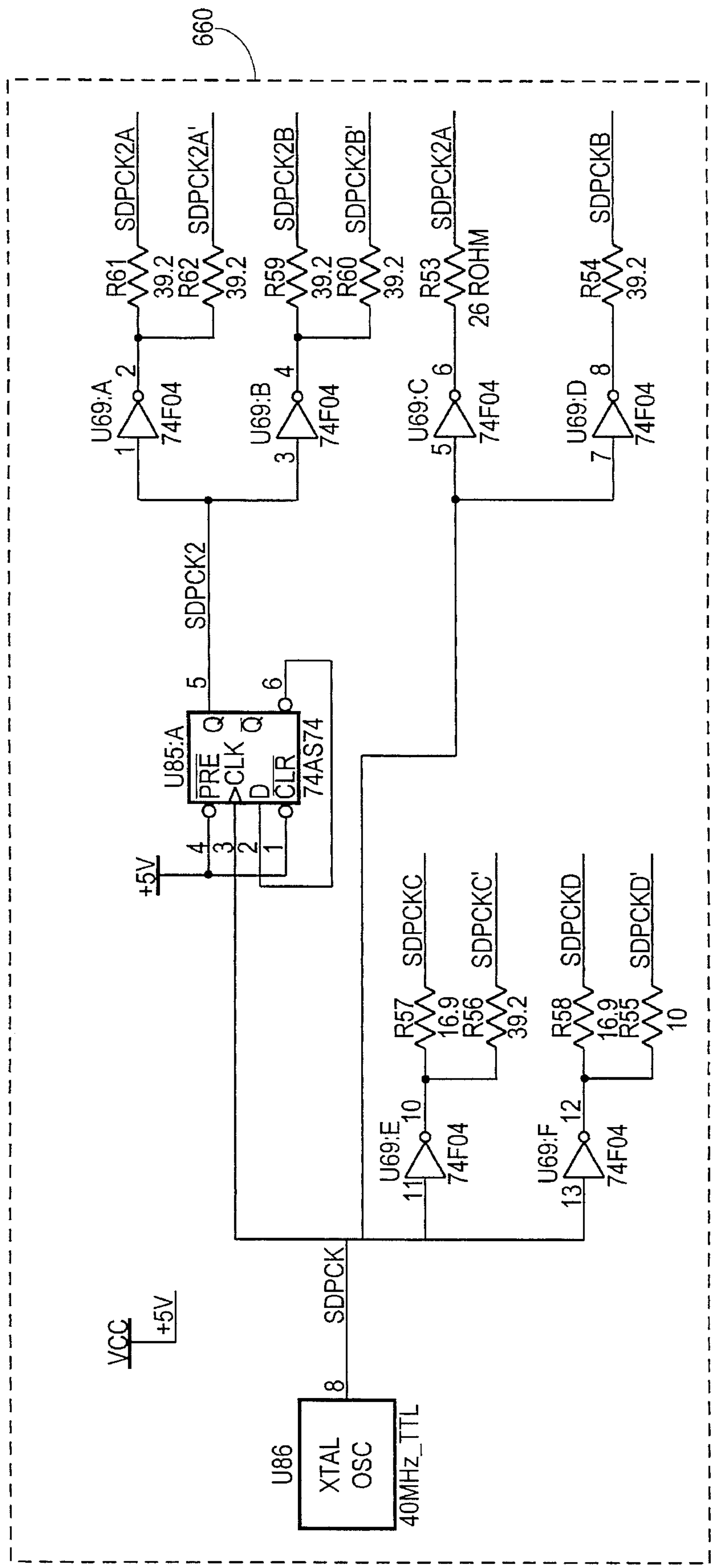
Figure 1:
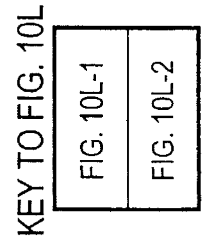
Figures 2, 10L:
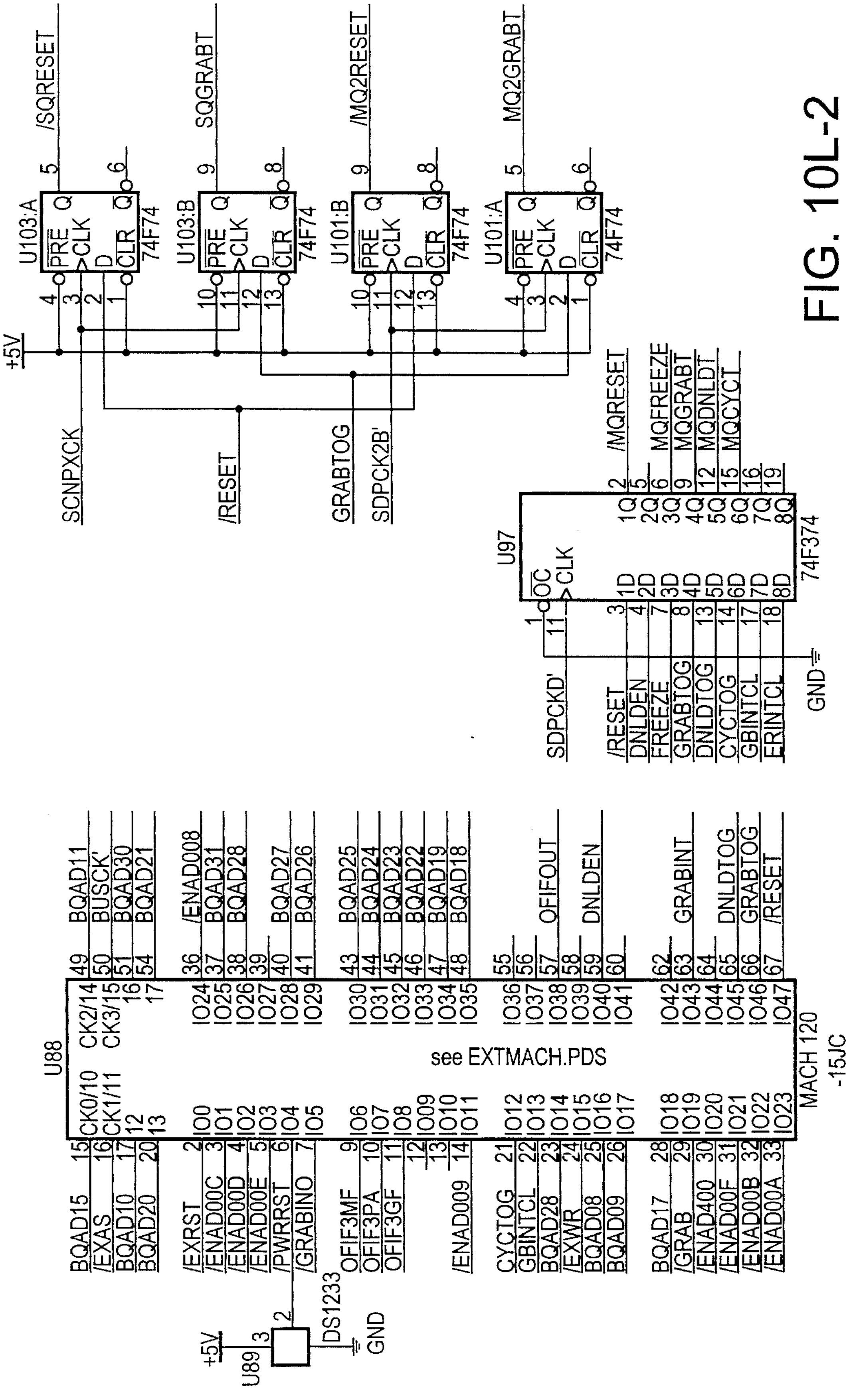

To generate a live image of target 412, the 32-bit pixel intensity words stored in PFIFO block 631 are transmitted to 32-bit I-latch 640 on data bus PFIFOT0–31. I-latch 640 consists of four 8-bit latches, U8, U34, U45 and U56, (FIG. 10*c*) which are conventional latches available from Harris Semiconductor as part number 74FCT823AT. 8-bit latches U8, U34, U45 and U56 each receives an 8-bit pixel intensity value from PFIFOs U1, U27, U38 and U49, respectively. When I-latch 640 is clocked, the 32-bit pixel intensity word stored in I-latch 640 is transmitted to diagnostic block 648*a* on data bus INMDT00–31. Diagnostic block 648*a* includes diagnostic switches U2, U3, U28, U29, U39, U40, U50 and U51 (FIG. 10*i*). These diagnostic switches do not change the 32-bit pixel intensity words in this embodiment of the present invention. Thus, the 32-bit pixel intensity words are transmitted from diagnostic block 648*a* to intensity memory 650 on bus IMDT0–31. Intensity memory 650 includes four conventional 512×512×8 video random access memories (VRAMs) U11, U25, U36 and U47, available from OKI Semiconductor as part number MSM518121A-ZS-80 (FIG. 10K). To generate a live image of target 412, the 32-bit pixel intensity words stored in intensity memory 650 are sequentially read out to the monitor 422 through the video quarter 603 as described later in the specification.

To generate a volume image of target 412, a set of 32-bit pixel intensity words representing a fixed number of frames are transmitted from PFIFO block 631 to the host work station 420. This is accomplished by routing the 32-bit pixel intensity words through 32-bit I-latch 640 to output fifo 656. Microcode within IMPROM U106 of microcontroller block 646 (FIG. 10*h*) controls this routing. In order to generate a volume image, the relative heights of the frames along the Z-axis must be known. When generating a volume image, the frame number is implicit in the order that the frames travel over the bus and arrive in host work station 420.

The 32-bit data in output fifo 656 is read out through endian switch 658 to the bus quarter address bus (BQAD00–31). The bus quarter address data bus (BQAD00–31) provides this data to host work station 420 through the bus quarter 604 as discussed later in the specification. Endian switch 658 includes four endian switches, U61, U62, U65 and U66 (FIG. 10*e*) which are available from Quality Semiconductor as part number QST3383. The endian switches U61, U62, U65 and U66 can be used to re-order bytes within the 32-bit word to accomodate different operating system conventions. The host work station 420 then manipulates the data received to generate a volume image of the target 412.

The number of frames used to generate a volume image is determined by frame comparator U96 and frame register U95. Z-latch U68 generates an frame count signal which is incremented each time Z-latch U68 receives a frame number sync word. Therefore this frame count signal is representative of the current frame number. The frame count signal is transmitted to frame comparator U96 on bus ZCURR0–7. Frame comparator U96 is a conventional comparator available from TI as part number 74ALS688. The other input to frame comparator U96 is an 8-bit frame limit signal which defines the number of frames used to generate the volume image. This frame limit signal is stored in the memory quarter number of frames register U95 which is a conventional register available from TI as part number 74ALS996. The frame limit signal is received from the host work station 420 on bus quarter address bus BQAD16–23. The frame limit signal is provided from register U95 to comparator U96 on bus MQNF0–7. When the number of frames received by Z-latch U68 exceeds the number of frames specified by the frame limit signal, the output of frame register U96 (/LASTFRA) is asserted and is provided to memory controller U87 (FIG. 10*g*). Memory controller U87 then completes the transfer of the last frame and generates an interrupt signal to indicate the volume acquisition is complete.

In general, a surface image of target 412 is created by comparing the pixel intensity values of a plurality of frames at each position on scanning pattern 502 (FIG. 5*a*). The maximum pixel intensity value detected at each position on scanning pattern 502 is stored at addresses in intensity memory 650. Each of these addresses in intensity memory 650 corresponds to a position along scanning pattern 502. The numbers of the frames at which each of the maximum pixel intensity values were detected are stored at addresses in Z-memory 651. Each address in Z-memory 651 corresponds to both a position along scanning pattern 502 and an address in intensity memory 650. The maximum intensity pixel values stored in intensity memory 650 represent the reflectivity of the surface of target 412. The frame number sync bytes stored in Z-memory 651 represent the height of the surface of target 412 at the sampled positions along the scanning pattern 502.

Figure 10M:
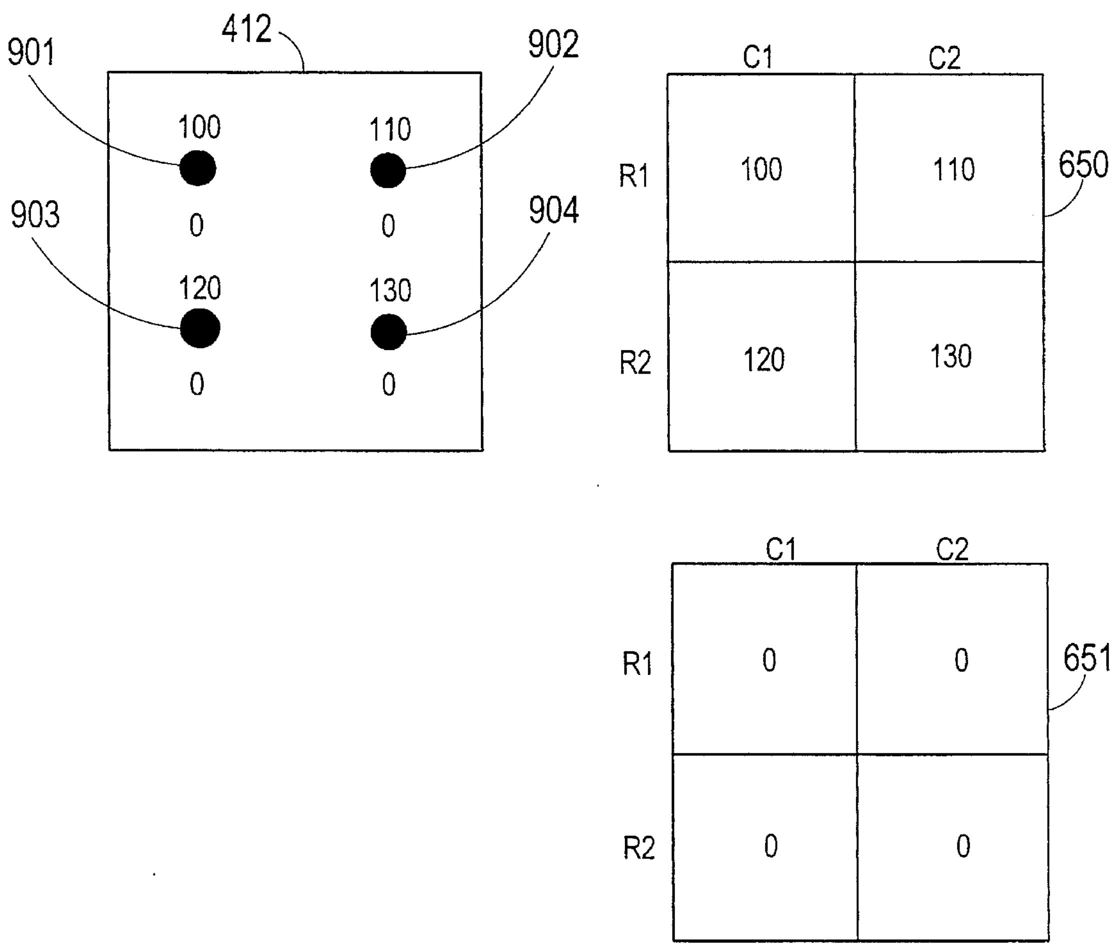
Figure 10N:
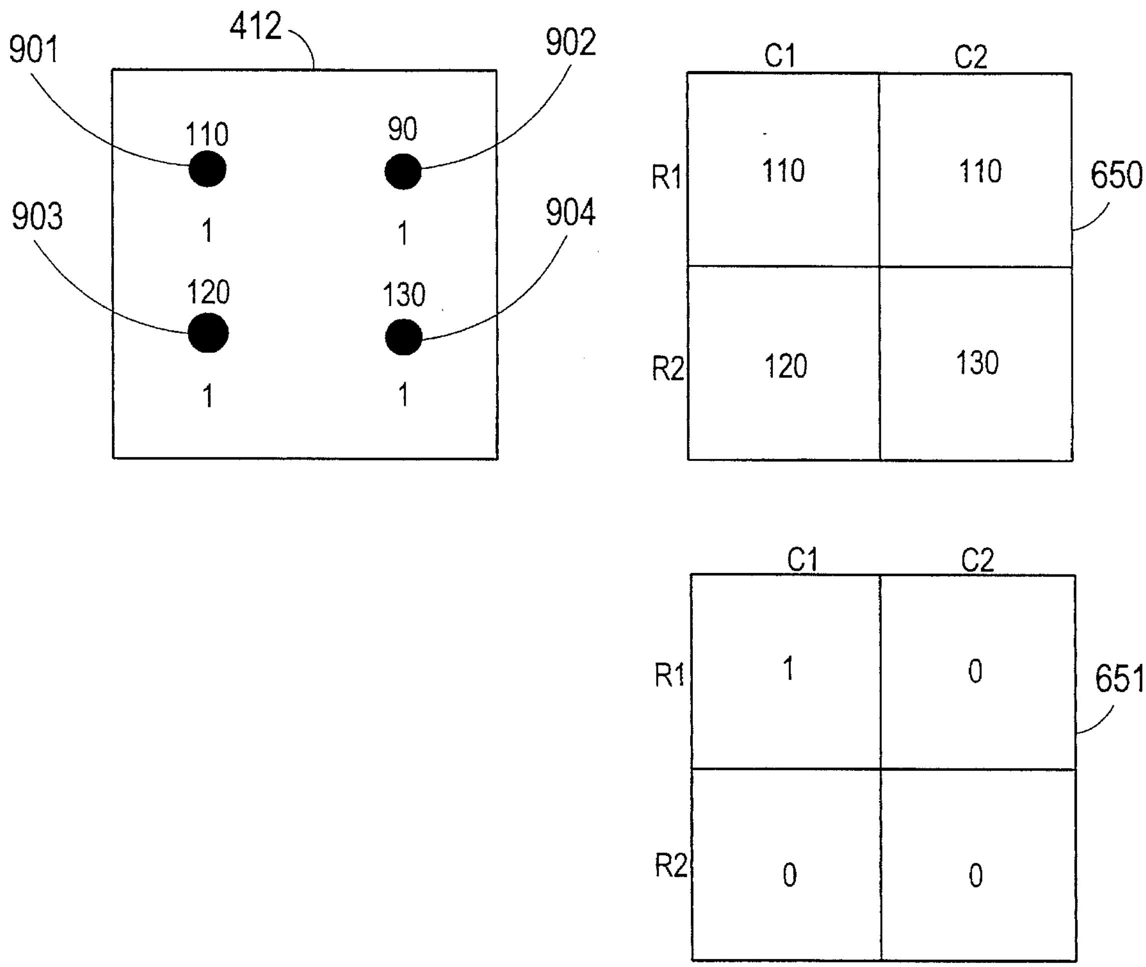

FIGS. 10*m*–10*n* are simplified block diagrams illustrating the creation of a surface image from target 412. Four pixels are sampled on target 412 at positions 901–904. The numbers above positions 901–904 represent the pixel intensity values measured at those positions and the numbers below positions 901–904 represent the frame number sync byte of the illustrated scan pattern. The first frame of pixel intensity values is written into the intensity memory 650, as illustrated in FIG. 10*m*. Each pixel intensity value is written to an address within intensity memory 650 which corresponds to the physical position at which the pixel intensity value was measured on the surface of target 412. For example, the pixel intensity value of position 901 (i.e., 100) is written into address C1/R1 of intensity memory 650. The frame number sync bytes for the first frame are also written into the Z-memory 651. Each time a pixel intensity value is written to an address within intensity memory 650, a corresponding frame number sync byte is simultaneously written to a corresponding address within Z-memory 651. For example, when the pixel intensity value of position 901 (i.e., 100) is written into address C1/R1 of intensity memory 650, the frame number sync byte of position 901 (i.e., 0) is written into address C1/R1 of Z-memory 651. FIG. 10*m* illustrates the contents of intensity memory 650 and Z-memory 651 after the first frame has been processed.

The pixel intensity values of the second frame (illustrated on target 412 of FIG. 10*n*) are then compared with the corresponding pixel intensity values stored in the intensity memory 650. For example, the pixel intensity value measured at position 901 in the second frame (i.e., 110) is compared to the pixel intensity value previously measured at position 901 and stored in address C1/R1 of intensity memory 650 (i.e., 100). If the pixel intensity value of the current frame is greater than the pixel intensity value stored in the corresponding address of intensity memory 650, the pixel intensity value stored in the corresponding address of the intensity memory 650 is overwritten with the pixel intensity value of the current frame. Thus, in FIG. 10*n*, intensity value previously stored in address C1/R1 of intensity memory 650 (i.e., 100) is overwritten with the intensity pixel value measured at position 901 in the second frame (i.e., 110). Each time a pixel intensity value in an address within intensity memory 650 is overwritten, a corresponding frame number sync byte in a corresponding address within Z-memory 651 is simultaneously overwritten with the current frame number sync byte. For example, when the pixel intensity value stored in address C1/R1 of intensity memory 650 (i.e., 100) is overwritten with the pixel intensity of position 901 of the second frame (i.e., 110), the frame number sync byte of the second frame (i.e., 1) is written into address C1/R1 of Z-memory 651. If the pixel intensity value of the current frame is not greater than the pixel intensity value stored in the corresponding address within intensity memory 650, then neither the pixel intensity value stored in the corresponding address of intensity memory 650 nor the frame number sync byte stored in the corresponding address of the Z-memory 651 are overwritten. FIG. 10*n* illustrates the contents of intensity memory 650 and Z-memory 651 after the second frame has been processed.

This method is repeated, with the pixel intensity values of each frame being compared with the corresponding pixel intensity values stored in the intensity memory 650. After the desired number of frames have been scanned, the intensity memory 650 contains the maximum pixel intensity value detected at each position 901–904 on target 412 and the Z-memory contains the frame number sync byte indicating during which frame each maximum pixel intensity value was detected. Because the pixel intensity values are greater when the laser is focused on the surface of target 412, the maximum pixel intensity values stored in intensity memory 650 are representative of the surface of target 412.

Turning now to FIG. 9, to generate a surface image of the target 412, the 32-bit pixel intensity words of the first frame are transmitted from PFIFO block 631, through I-latch 640 and diagnostic block 648*a*, to intensity memory 650 in a manner similar to that previously described in connection with the generation of a live image of target 412. Microcode within microcontroller block 646 (FIG. 10*h*) controls this routing.

Similarly, 32-bit frame number sync words of the first frame are transmitted from PFIFO block 631, through Z-latch U68 and diagnostic block 648*b* to Z-memory 651. Microcode within microcontroller block 646 (FIG. 10*h*) controls this routing. The 32-bit frame number sync words are transmitted to Z-memory 651 as follows. An 8-bit frame number sync byte is transmitted from PFIFO U1 to 32-bit Z-latch U68 on bus lines PFIFDT0–7. The PFIFS0 output from PFIFO U1 is also transmitted to Z-latch U68. The 32-bit Z-latch U68 is a conventional PLD available from AMD as part number MACH130-15JC. When the PFIFS0 output received by Z-latch U68 is enabled (i.e., when PFIFO block 631 is transmitting a frame number sync word), Z-latch U68 generates four 8-bit outputs to recreate the 32-bit frame number sync word and transmits this frame number sync word to diagnostic block 648*b* on data bus ZNMDT00–31. Diagnostic block 648*b* includes diagnostic switches U5, U6, U31, U32, U42, U43, U53 and U54 (FIGS. 10*i*–10*j*) which do not change the 32-bit frame number sync words. Thus, the 32-bit frame number sync words are routed from diagnostic block 648*b* to Z-memory 651 on data bus ZMDT0–31. Z-memory 651 includes four conventional 512×512×8 video random access memories (VRAMs) U10, U26, U37 and U48 (FIG. 10*k*), available from OKI Semiconductor as part number MSM518121A-ZS-80.

When generating a surface image, the 32-bit pixel intensity words of the first frame are written to intensity memory 650 such that 8-bit pixel intensity values are written in each I-memory VRAM U11, U25, U36 and U47 (FIG. 10*k*). For example, the first, second, third and fourth 8-bit intensity values of the first frame) are written into I-memory VRAMS U11, U25, U36 and U47, respectively, when the first 32-bit pixel intensity word of the first frame is written into intensity memory 650. Each of the first, second, third and fourth 8-bit intensity values are written into the same first address within their respective I-memory VRAM. Each pixel intensity value corresponds to a position along scanning pattern 502. The 32-bit frame number sync words of the first frame are written to Z-memory 651 such that 8-bit frame number sync bytes are written in each Z-memory VRAM U10, U26, U37, and U48 (FIG. 10*k*). For example, the 8-bit frame number sync byte of the first frame is written into Z-memory VRAMs U10, U26, U37 and U48 when the first 32-bit frame number sync word is written into Z-memory 651. Each of the first, second, third and fourth 8-bit frame number sync bytes are written into the same first address within their respective Z-memory VRAM. That is, the first address provided to the I-memory VRAMs on bus IZAD0–8 is simultaneously provided to the Z-memory VRAMS to address the 8-bit frame number sync bytes. Thus, for each 8-bit pixel intensity value stored in intensity memory 650 there is a corresponding 8-bit frame number sync byte stored in the same address in Z-memory 651.

Memory address control block 643 generates the addresses for intensity memory 650 and Z-memory 651 (FIGS. 9, 10*g*). Memory controller U87 of memory address control block 643 (FIG. 10*g*) generates a column address (CAD0–6) and a row address (RAD2–8) which are used to address intensity memory 650 and Z-memory 651. The column address (CAD0–6) runs from zero to a number equal to the contents of memory quarter number of lines register U77. This number is preferably the memory quarter high pixel address minus memory quarter low pixel address. The row address (RAD2–8) runs from zero to a number equal to the contents of the memory quarter number of lines register U83. This number is preferably equal to the number of lines specified by the scanner quarter number of lines register U125.

The column address (CAD0–6) and row address (RAD2–8) are provided to the memory quarter number of pixels comparator U76 and the memory quarter number of lines comparator U84, respectively (FIG. 10*g*). The memory quarter number of pixels comparator U76 and the memory quarter number of lines comparator U84 are conventional comparators available from TI as part numbers 74ALS688. The memory quarter number of pixels comparator U76 also receives an input from register U77 which indicates the desired number of pixels to be used in generating the target image. Register U77 receives this information from the host work station 420 on bus quarter address bus BQAD00–07. When the column address exceeds the input from register U77, the memory quarter number of pixels comparator U76 generates a signal /COLEND which resets the column address (CAD0–6) to zero and increments the row address (RAD2–8).

The memory quarter number of lines comparator U84 also receives an input from register U83 which indicates the desired number of lines to be used in generating the target image. Register U83 receives this information from the host work station 420 on bus quarter address bus BQAD08–15. When the row address exceeds the input from register U83, the memory quarter number of lines comparator U84 generates a signal /ROWEND which resets the row address (RAD2–8) to zero.

Memory controller U87 (FIG. 10g) multiplexes the column addresses (CAD0–6) and the row addresses (RAD2–8) to generate memory addresses on bus IZNAD00–08 to address intensity memory 650 and Z-memory 651. Each of these memory addresses is transmitted through diagnostic block 648d (FIG. 10i) to intensity memory 650 and Z-memory 651 on bus IZAD00–08 (FIG. 10k). Memory address control block 643 thereby simultaneously provides the same address to intensity memory 650 and Z-memory 651 and effectively top left justifies the imaging values in intensity memory 650 and Z-memory 651.

The 32-bit pixel intensity words of the second frame (for example, the first four pixel intensity values of the second frame), are transmitted from PFIFO block 631 to I-latch 640 and to intensity comparator 642 on data bus PFIFDT00–31. The 32-bit frame number sync word of the second frame is also transmitted from PFIFO block 631 to Z-latch U68. Intensity comparator 642 includes four conventional 8-bit comparators U7, U33, U44 and U55 (FIG. 10c) which are available from TI as part number 74AS885. Each comparator U7, U33, U44 and U55 receives an 8-bit pixel intensity value from PFIFO block 631 on bus lines PFIFDT00–07, PFIFDT08–15, PFIFDT16–23 and PFIFDT24–31, respectively. The corresponding pixel intensity values stored in I-memory VRAMS U11, U25, U36 and U47 of I-memory 650 (for example, the first four 8-bit pixel intensity values of the first frame) are transmitted to intensity comparator 642 (through diagnostic blocks 648a) on bus lines INMDT00–07, INMD08–15, INMDT16–23 and INMDT24–31. Intensity comparator 642 then compares the 8-bit pixel intensity values of the second frame with the corresponding 8-bit pixel intensity values retrieved from intensity memory 650. If an 8-bit pixel intensity value of the second frame is greater than the corresponding 8-bit pixel intensity value retrieved from intensity memory 650, the output of the 8-bit comparator making this comparison is enabled. Thus, if the first pixel intensity value of the second frame is compared with the first pixel intensity value of the first frame in 8-bit comparator U7, and the first pixel intensity value of the second frame is greater than the first pixel intensity value of the first frame, the output PGTI0 of comparator U7 is enabled.

The 8-bit comparators U7, U33, U44 and U55 generate outputs PGTI0, PGTI1, PGTI2 and PGTI3, respectively. These outputs are provided to memory write control block U99 (FIG. 10h). Memory write control block U99 generates the write enable signals /IZNWE0, /IZNWE1, /IZNWE2 and /IZNWE3 in response to outputs PGTI0, PGTI1, PGTI2 and PGTI3, respectively. Write enable signals /IZNWE0–3 are transmitted through diagnostic block 648c to intensity memory 650 and Z-memory 651. Diagnostic block 648c does not alter the write enable signals /IZNWE0–3. Thus, write enable signal /IZNWE0 is transmitted to I-memory VRAM U11 (as signal /IWE0) and Z-memory VRAM U10 (as signal /ZWE0), write enable signal /IZNWE1 is transmitted to I-memory VRAM U25 (as signal /IWE1) and Z-memory VRAM U26 (as signal /ZWE1), write enable signal /IZNWE2 is transmitted to I-memory VRAM U36 (as signal /IWE2) and Z-memory VRAM U37 (as signal /ZWE2), and write enable signal /IZNWE3 is transmitted to I-memory VRAM U47 (as signal /IWE3) and Z-memory VRAM U48 (as signal /ZWE3) (FIG. 10k).

Thus, in the example above, the output PGTI0 output of 8-bit comparator U7 results in a write enable signal which is simultaneously transmitted to both I-memory VRAM U11 and Z-memory VRAM U10. At this time, I-latch 640 is applying the first 8-bit pixel intensity value of the second frame to the inputs of I-memory VRAM U11 and Z-latch U68 is applying the 8-bit frame number sync byte of the second frame to the inputs of Z-memory VRAM U10. As a result, the first 8-bit pixel intensity value of the first frame is overwritten with the first 8-bit pixel intensity value of the second frame and the corresponding 8-bit frame number sync byte of the first frame is overwritten with the 8-bit frame number sync byte of the second frame.

The above described process is repeated until the desired number of frames has been scanned. At the end of this process, the intensity memory 650 contains an array of pixel intensity values, with each pixel intensity value corresponding to a maximum pixel intensity value detected for a given position along scanning pattern 502. Z-memory contains an array of frame number sync words, each frame number sync word indicating the frame number at which each maximum pixel intensity value was detected. The number of frames used to generate the surface image is controlled by the Z-latch U68, frame comparator U96 and frame register U95 in the manner previously described in connection with the generation of a volume image.

In one embodiment, the surface image stored in intensity memory 650 is transmitted through the video quarter 603 and displayed on the monitor 422 as described below. In another embodiment, the surface images stored in intensity memory 650 and Z-memory 651 are downloaded to the host work station 420 through the output fifo 656 for further processing. When performing this downloading operation, 3-state buffer 654 ensures that either intensity memory 650 or Z-memory 651 is providing data to output fifo 656 at any given time. 3-state buffer 654 includes conventional buffers U4:A, U4:B, U30:A, U30:B, U41:A, U41:B, U52:A, U52:B (FIG. 10d) which are available from TI as part number 74BCT244. 3-state buffer 654 is controlled by a control signal /ZBUFOE generated by microcode in IMPROM U106 of microcontroller 646. When the /ZBUFOE signal is asserted, the output of 32-bit latch 640 is disabled and the output of Z-latch U68 is routed through 3-state buffer 654 to output fifo 656 on data bus INMDT0–31.

One advantage of the present invention is that the surface image has already been generated within the SDP 426 before the surface image is downloaded to the host work station 420 on the work station I/O bus. Thus, all of the data required to generate the surface image does not have to be sent over the work station I/O bus. Because a lesser volume of data passes over this I/O bus, other functions requiring the use of the I/O bus are not hindered. This results in faster processing of surface image information. Another advantage of the present invention is that is that a surface image can be generated outside the host microprocessor 420, thereby allowing the host microprocessor 420 to perform other tasks.

Error engine U67 (FIG. 10f) receives the outputs of PFIFO block 631. Error engine U67 is a conventional PLD available from AMD as part number MACH 130-15JC. As previously described, each time PFIFO block 631 receives a frame number sync word, all four output bits PFIFS0–3 should be enabled and each of the four 8-bit frame number sync bytes present on bus lines PFIFDT00–07, PFIFDT08–15, PFIFDT16–23 and PFIFDT24–31 should indicate the same frame number. If either of these conditions is not true, error engine U67 generates an error signal to indicate this condition to the host work station 420. The host work station 420 then resets the frame grabber 424 so that proper synchronization is re-acquired.

Figure 11:
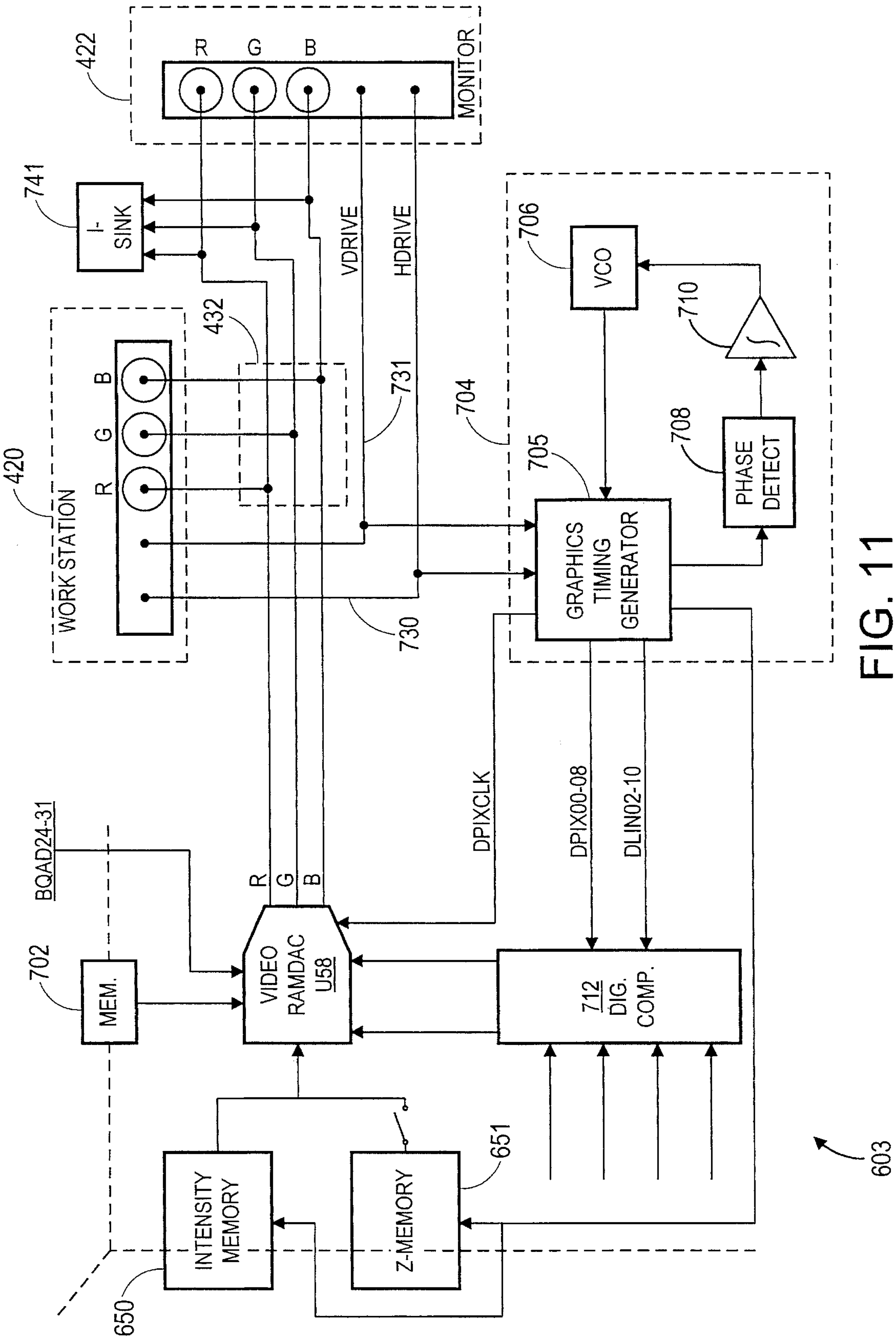
FIG. 11 is a block diagram of a video quarter of a surface data processor according to the present invention.

FIG. 11 is a block diagram of video quarter 603 of SDP 426. FIGS. 12*a*–12*e* are schematic diagrams illustrating circuitry located within video quarter 603. Video quarter 603 includes intensity memory 650, Z-memory 651, video RAMDAC U58, graphics timing generator 705, voltage controlled oscillator (VCO) 706, phase detector 708, integrator 710, digital comparator 712, graphics memory 702, constant current sink 741, coaxial cables 1501–1506, lines 730–731, workstation 420 and monitor 422.

The 32-bit output of either intensity memory 650 or Z-memory 651 is coupled to video RAMDAC U58 on bus IZMSDT0–31, depending on the /INOE and /ZNOE outputs of HIPROM U107 and LOPROM U105, respectively, of the microcontroller block 646 (FIG. 10*h*). The /INOE and /ZNOE outputs are transmitted through diagnostic blocks 648*a* (U2) and 648*b* (U6) as the outputs, /IOE and /ZOE (FIG. 10*i*). Outputs /IOE and /ZOE are transmitted to the intensity memory 650 and the Z-memory, respectively (FIG. 10*k*). The /IOE and /ZOE outputs will enable either the output of the intensity memory 650 or the output of the Z-memory 651 to be transmitted to video RAMDAC U58. In the embodiment described below, the 32-bit pixel intensity words stored in intensity memory 650 are transmitted to video RAMDAC U58.

Figures 2, 12A:
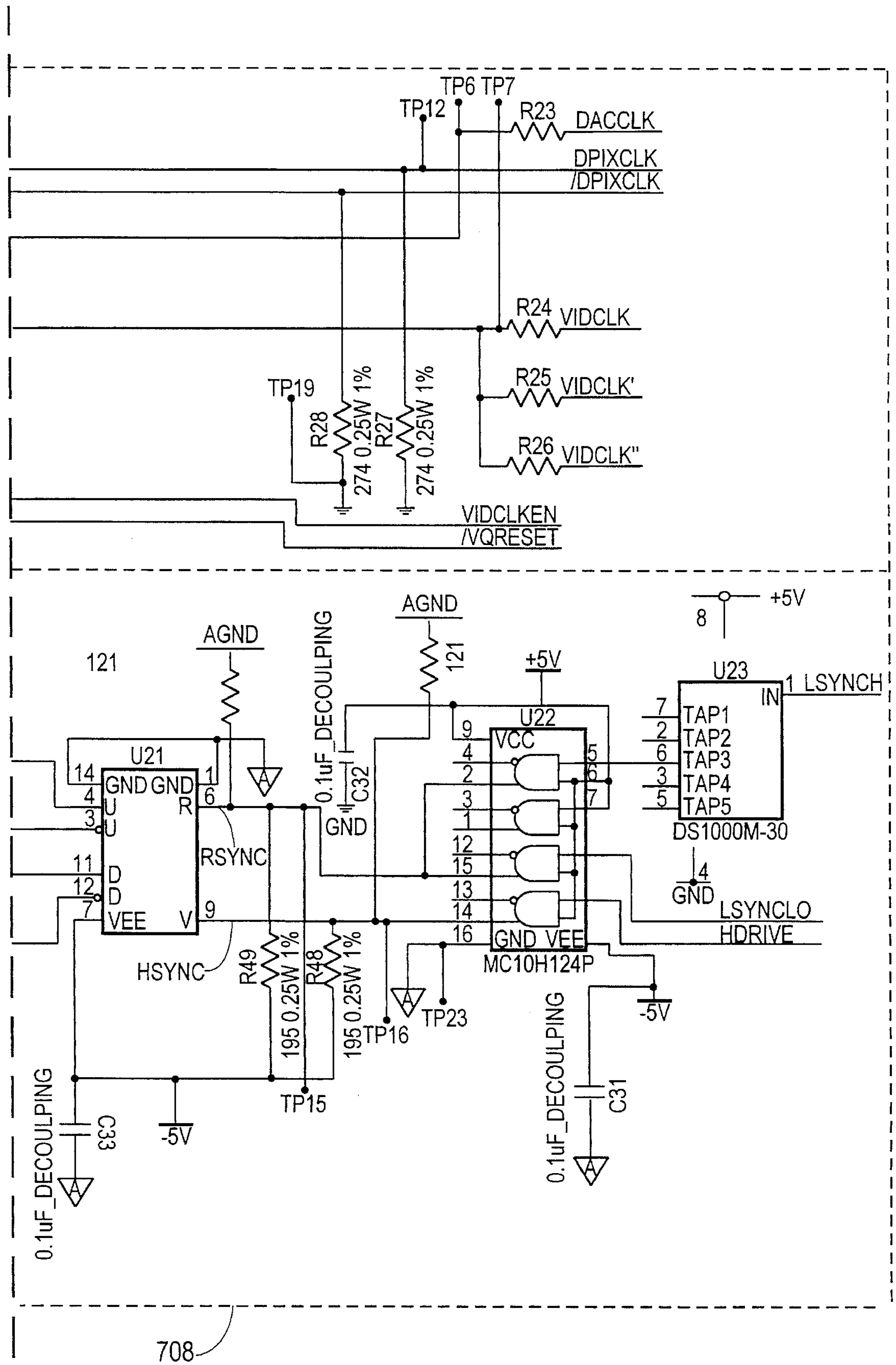
FIGS. 12*a*–12*e* are schematic diagrams of circuitry located within the video quarter of FIG. 11.
Figures 3, 12A:
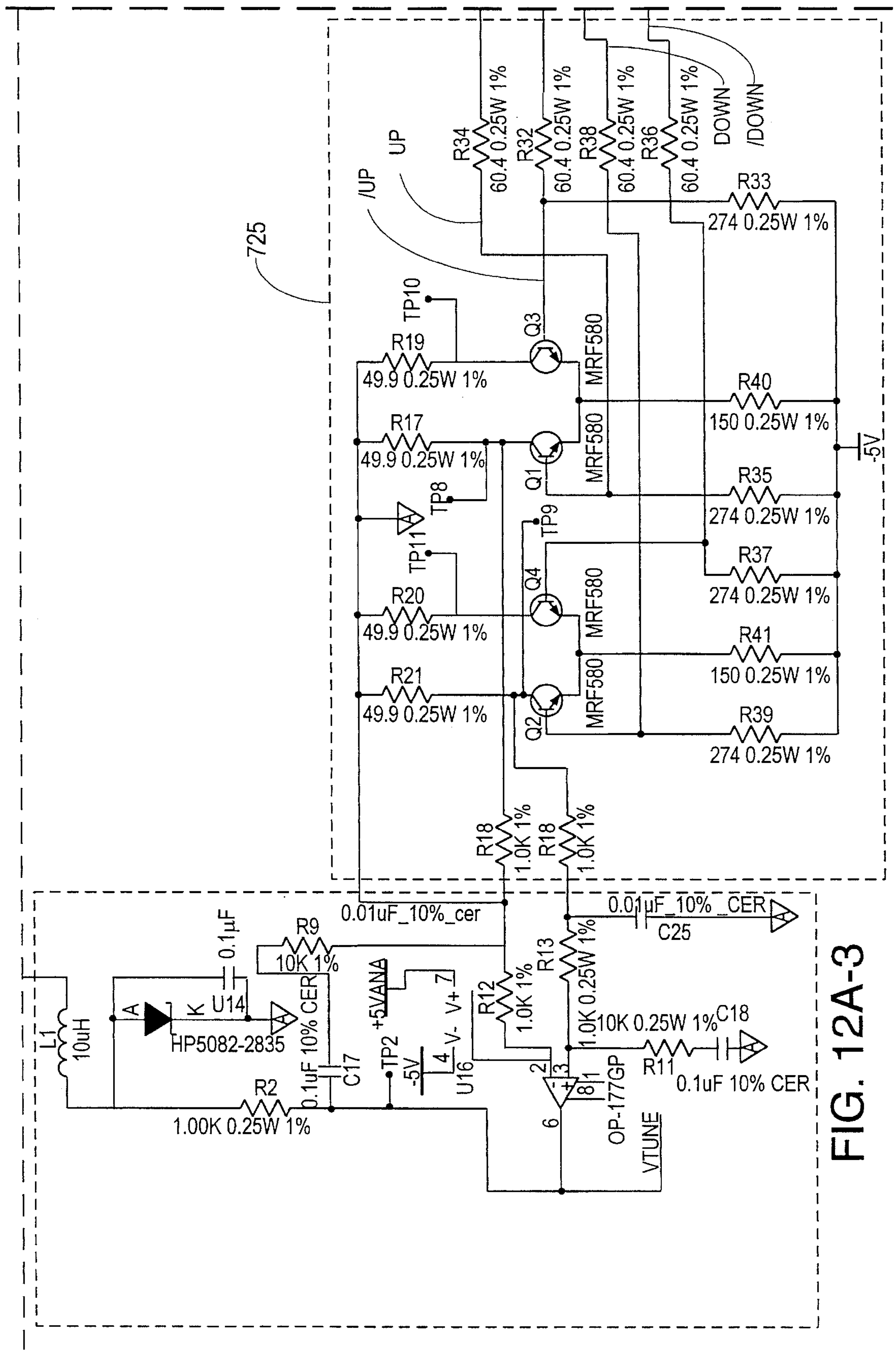
Figures 1, 12B:
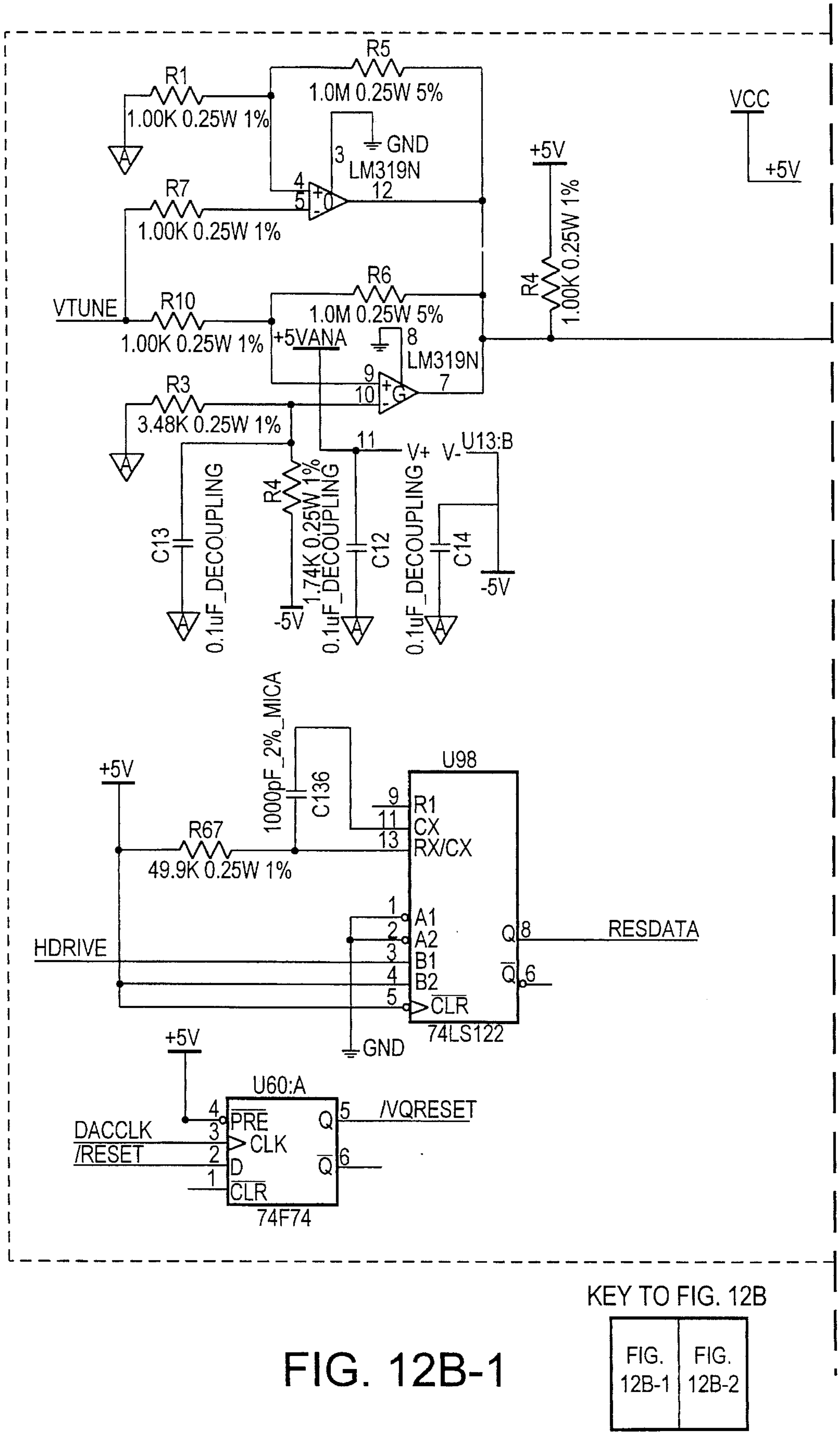
Figures 2, 12B:
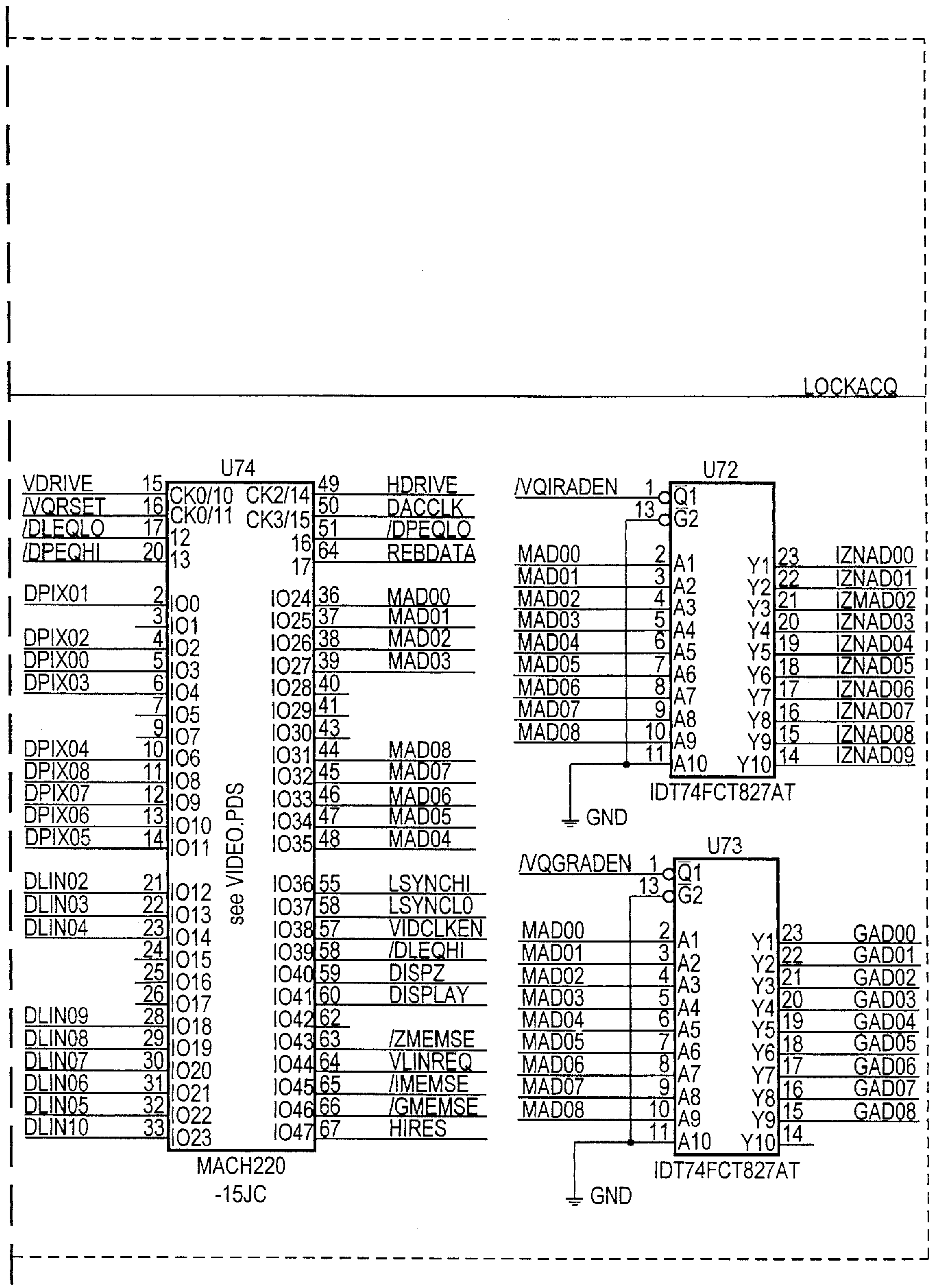
Figures 1, 12C:
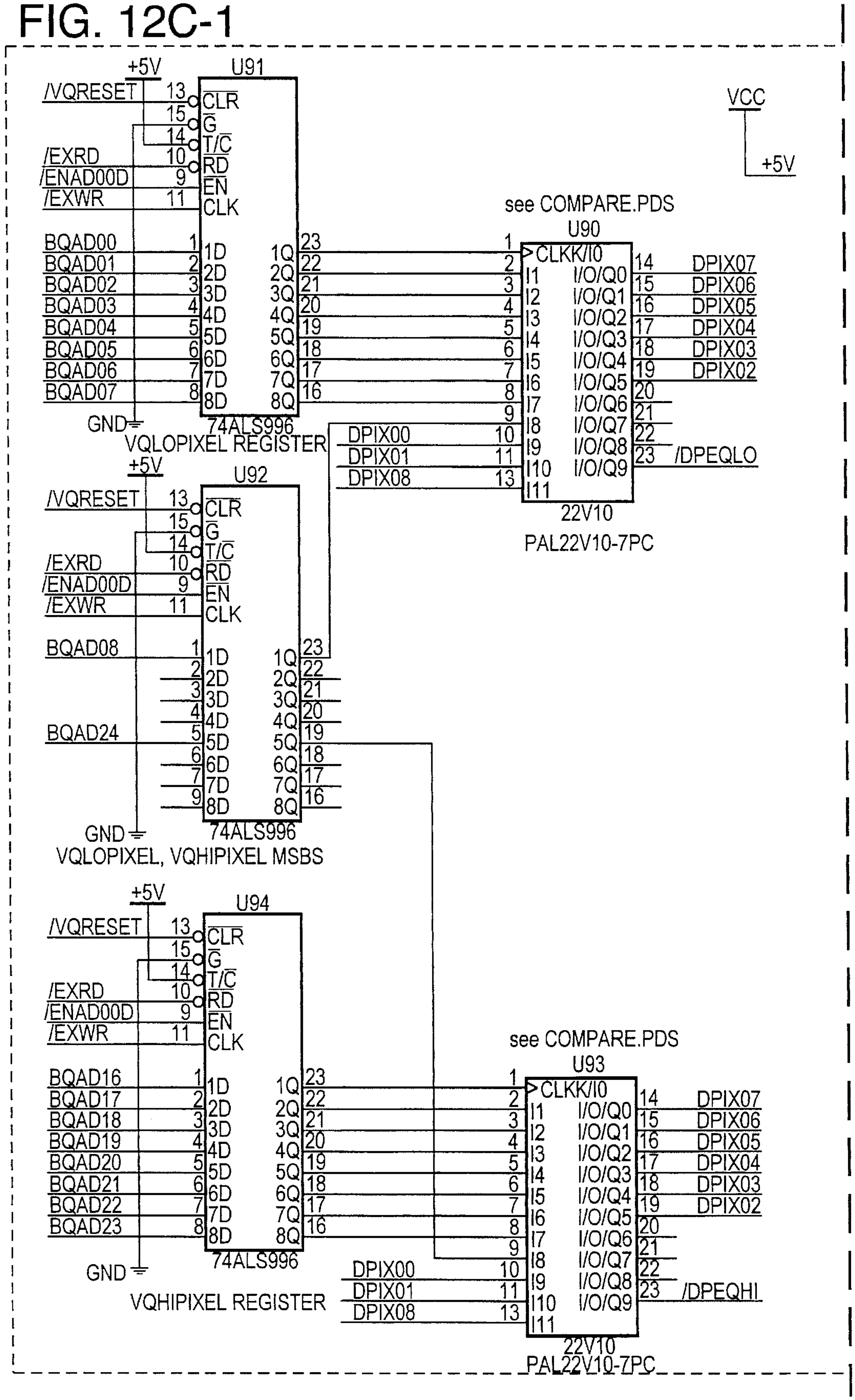
Figures 2, 12C:
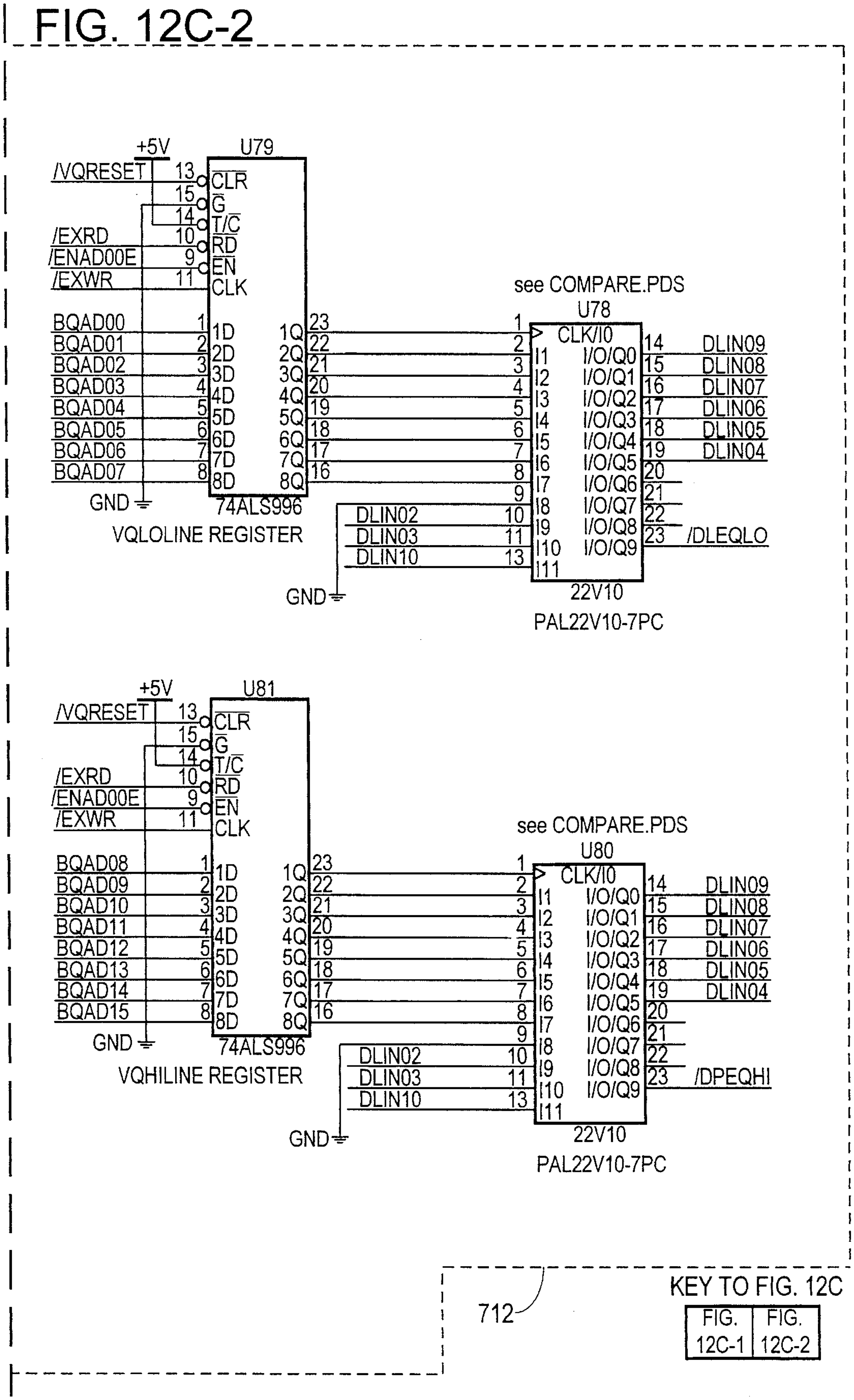
Figures 1, 12D:
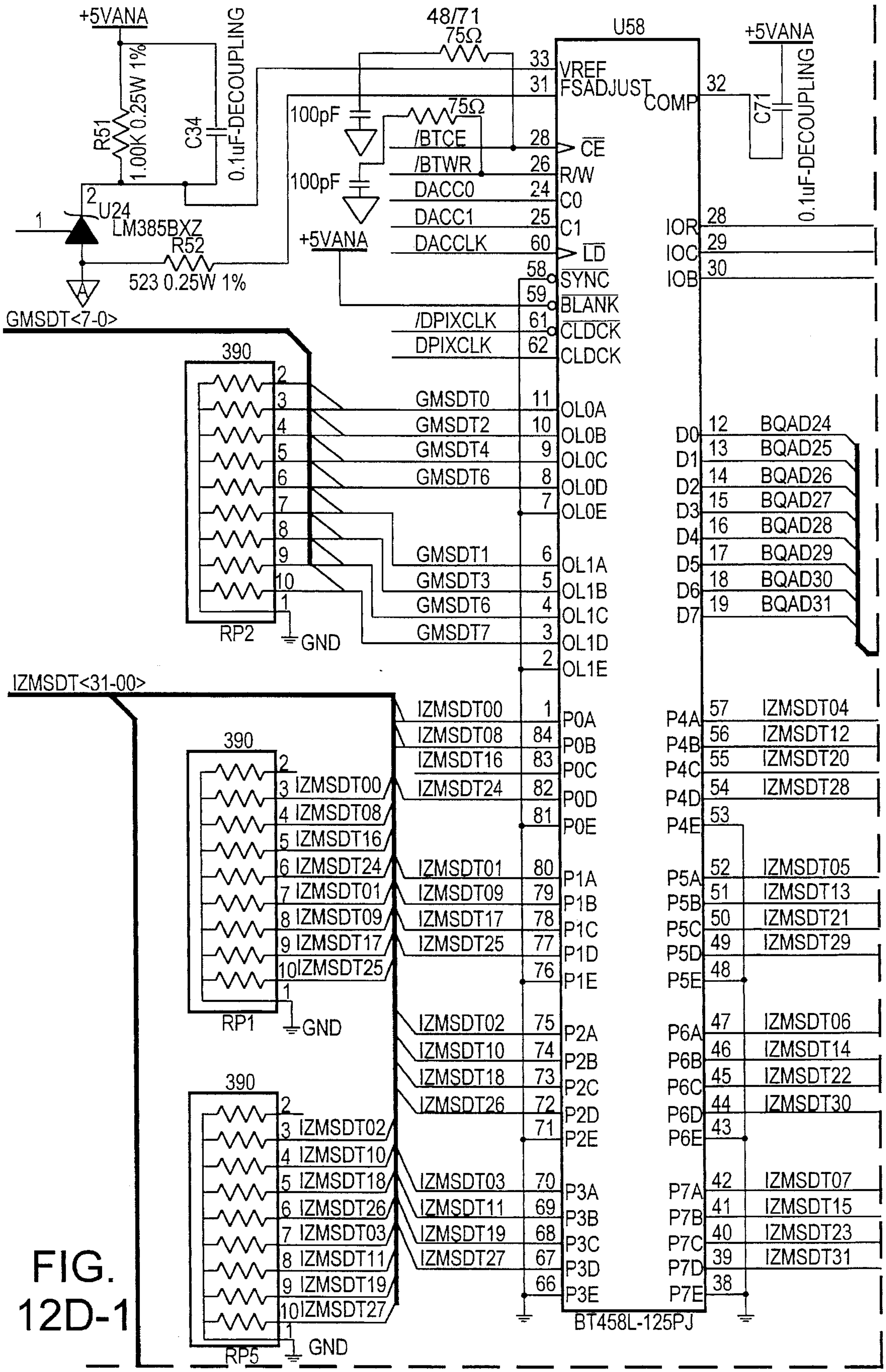
Figures 2, 12D:
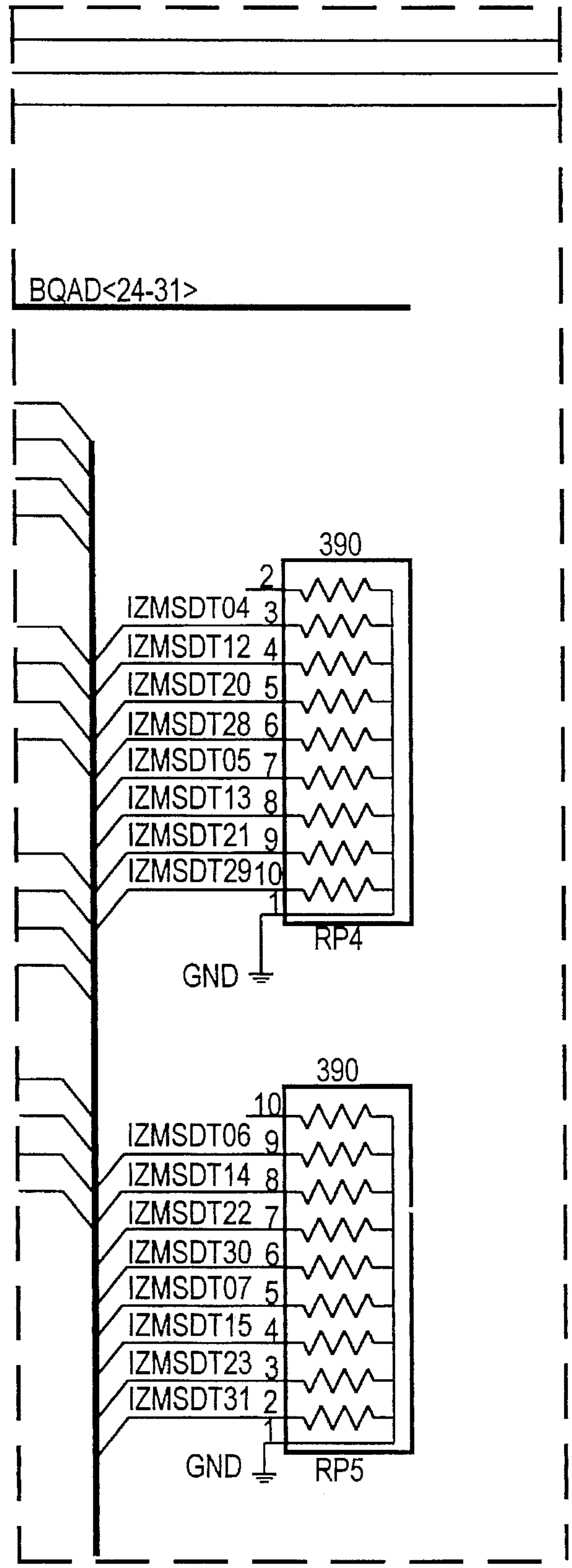
Figures 3, 12D:
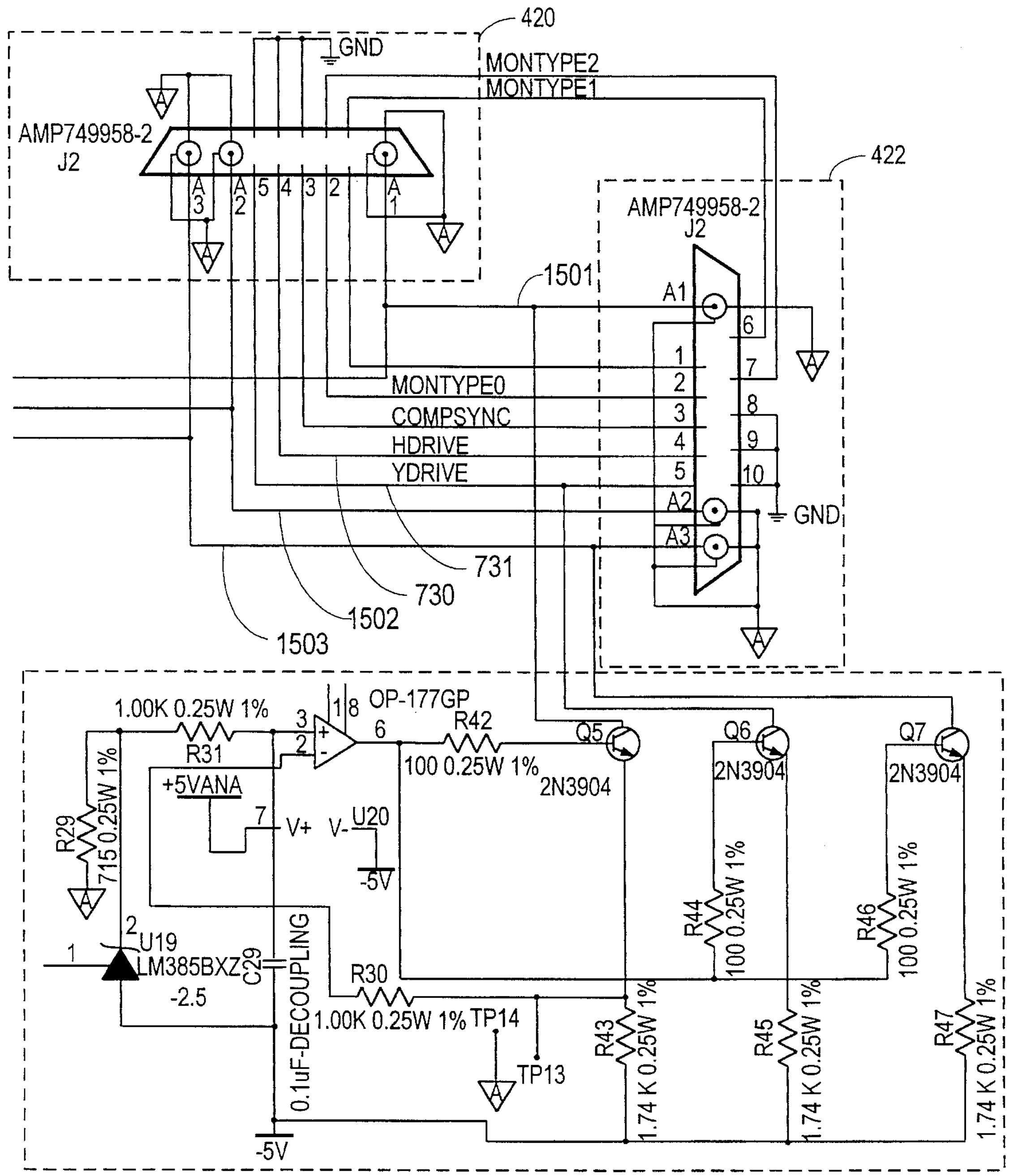
Figure 12D:
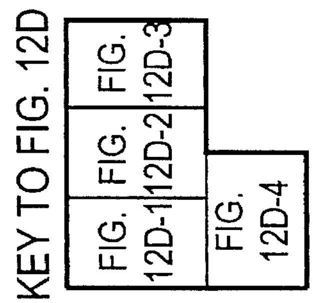
Figure 4:
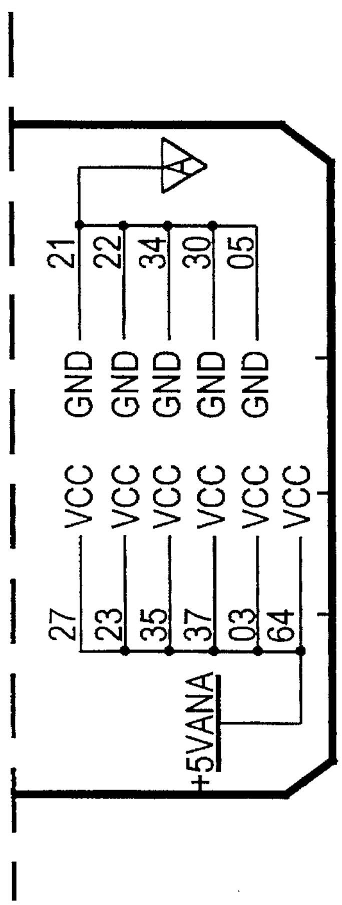
Figure 12E:
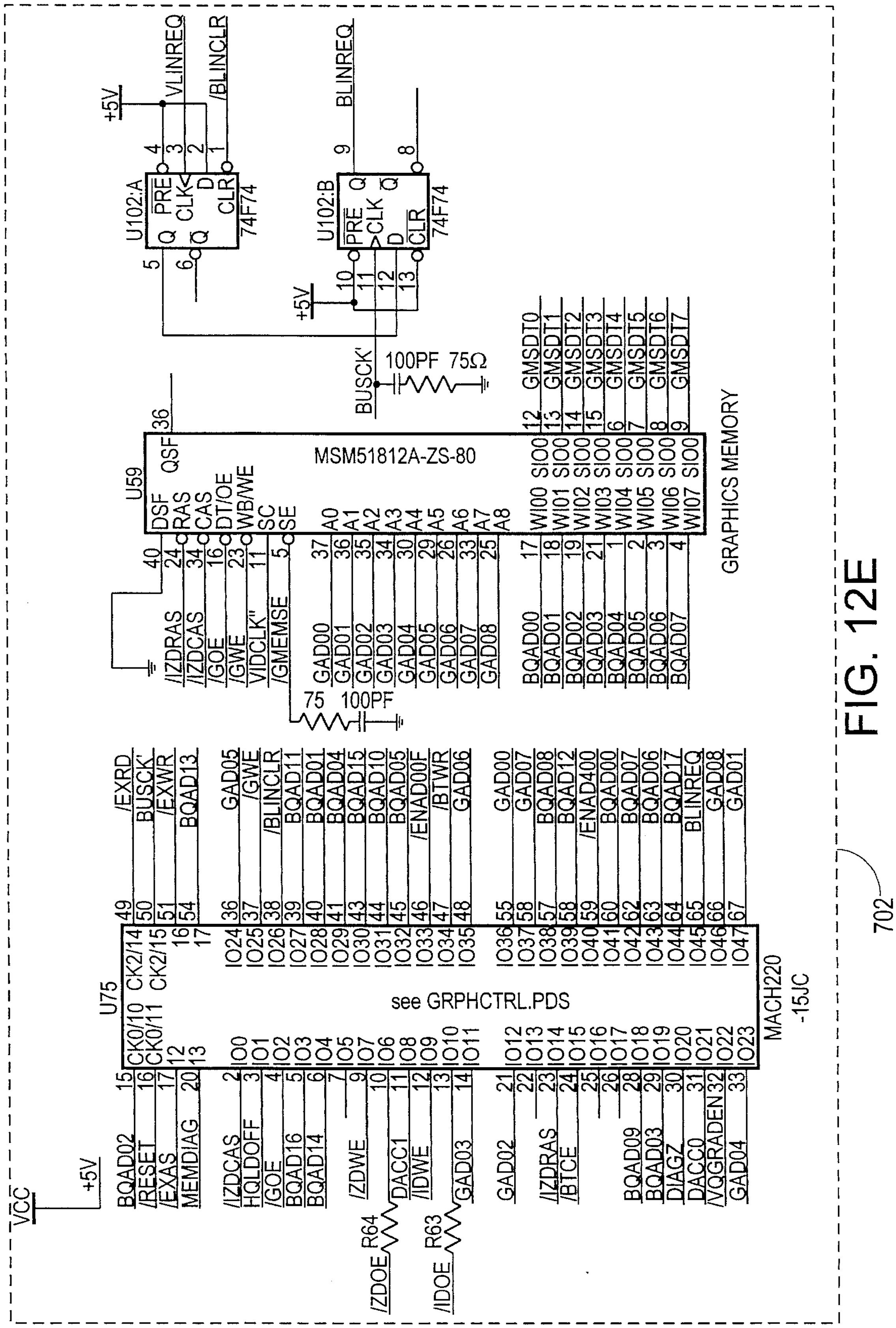

Video RAMDAC U58 also receives 8-bit pixel intensity values from graphics memory 702 on bus GMSDT0–7 (FIGS. 12*d*, 12*e*). Graphics memory 702 includes graphics VRAM U59 and graphics controller U75 (FIG. 12*e*). Graphics VRAM U59 is a conventional VRAM available from OKI Semiconductor as part number MSM518121A-Z5-80. Graphics controller U75 is a standard PLD available from AMD as part number MACH220-15JC. The inputs to graphics VRAM U59 and graphics controller U75 are provided by host work station 420. The output of graphics memory 702 is typically an overlay image, such as cross hairs.

Video RAMDAC U58 is a conventional device, such as the Brooktree BT458 monolithic CMOS 256 Color Palette RAMDAC. Video RAMDAC mulitiplexes the 8-bit pixel intensity values of the graphics overlay image with the 32-bit pixel intensity words received from intensity memory 650 to create a stream of 8-bit pixel intensity values. Each 8-bit pixel intensity value has one of 256 levels. Video RAMDAC U58 includes a color look-up table to assign a color to each of these 256 levels, such that the pixel intensity values are false colored for display on monitor 422. The color lookup table in video RAMDAC U58 is initialized by a signal transmitted from the host workstation 420 on the bus quarter address bus (BQAD24–31) (FIG. 12*d*). The stream of 8-bit pixel intensity values is provided to an 8-bit digital to analog converter (DAC) within video RAMDAC U58. In response, video RAMDAC U68 generates red, green and blue (RGB) video output signals. These video output signal are collectively referred to as SDP video signal 428.

The SDP video signal 428 of video RAMDAC U58 is provided to summing node 432 (FIG. 11). The host work station 420 generates a host video signal 430 which is also provided to summing node 432.

Figure 13:
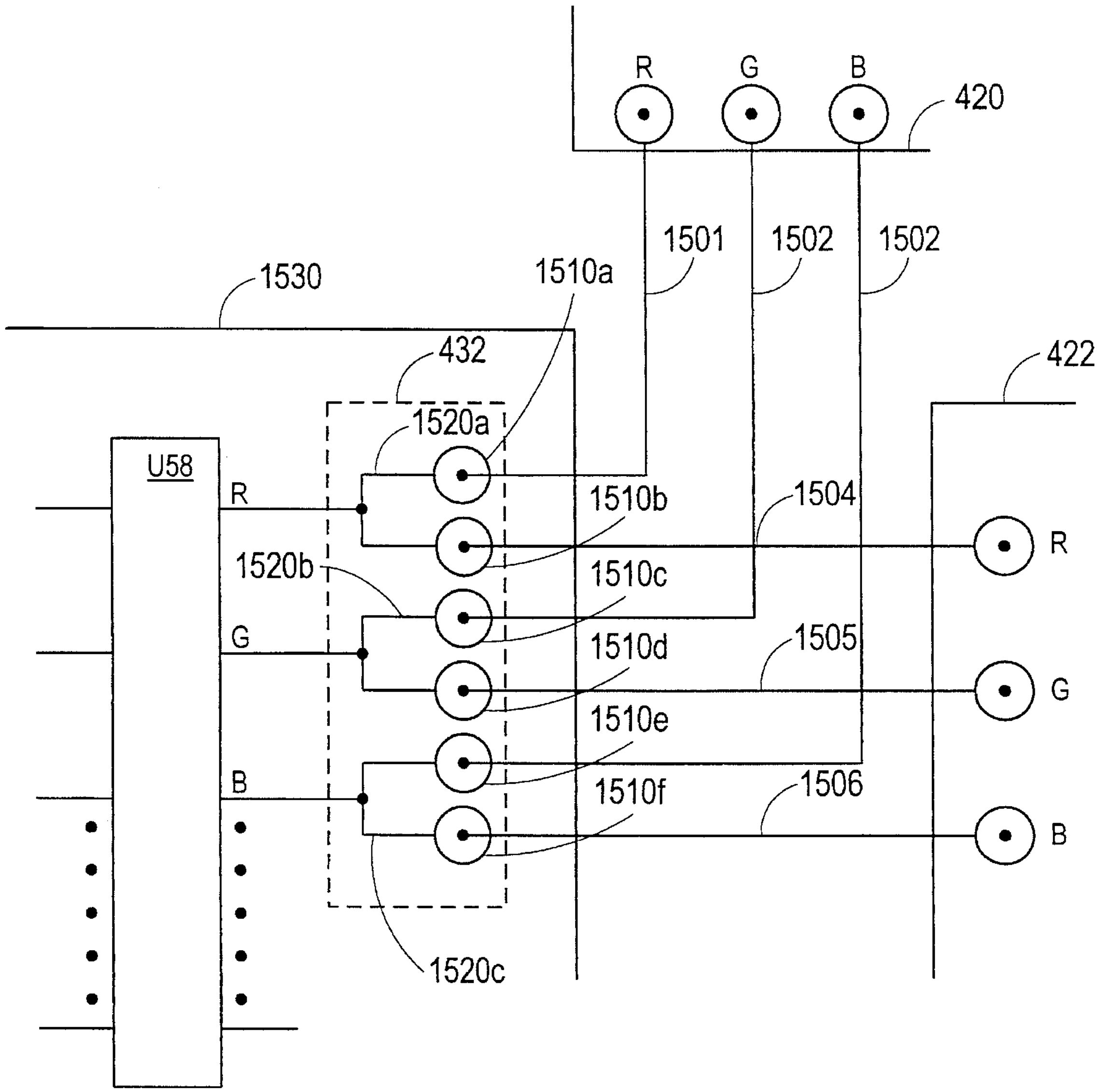
FIG. 13 is a schematic diagram illustrating the creation of summing node in the video quarter of FIG. 11.

FIG. 13 is a schematic diagram illustrating the creation of summing node 432. The R, G and B output pins of video RAMDAC U58 are connected to 75-ohm traces 1520*a*, 1520*b* and 1520*c*, respectively. The 75-ohm traces 1520*a*–*c* are fabricated on printed circuit board 1530. Coaxial cables 1501–1503 are approximately the same length and coaxial cables 1504–1506 are also approximately the same length. Coaxial cable 1501 is connected to the R output of host work station 420 and the connector point 1510*a* of 75-ohm trace 1520*a*. Coaxial cable 1504 is connected to the R input of monitor 422 and to the connector point 1510*b* of 75-ohm trace 1520*a*. Coaxial cable 1502 is connected to the G output of host work station 420 and the connector point 1510*c* of 75-ohm trace 1520*b*. Coaxial cable 1505 is connected to the G input of monitor 422 and to the connector point 1510*d* of 75-ohm trace 1520*b*. Coaxial cable 1503 is connected to the B output of host work station 420 and the connector point 1510*e* of 75-ohm trace 1520*c*. Coaxial cable 1506 is connected to the B input of monitor 422 and to the connector point 1510*f* of 75-ohm trace 1520*c*. This configuration retains a matched transmission lines with a balanced 75-ohm load, even if the length of coaxial cables 1501–1503 is different than the length of coaxial cables 1504–1506. This balanced loading is required to avoid reflected signals which could otherwise occur in the presence of the high frequency video signals (108 Mhz) which are transmitted on coaxial cables 1501–1506.

Figure 14:
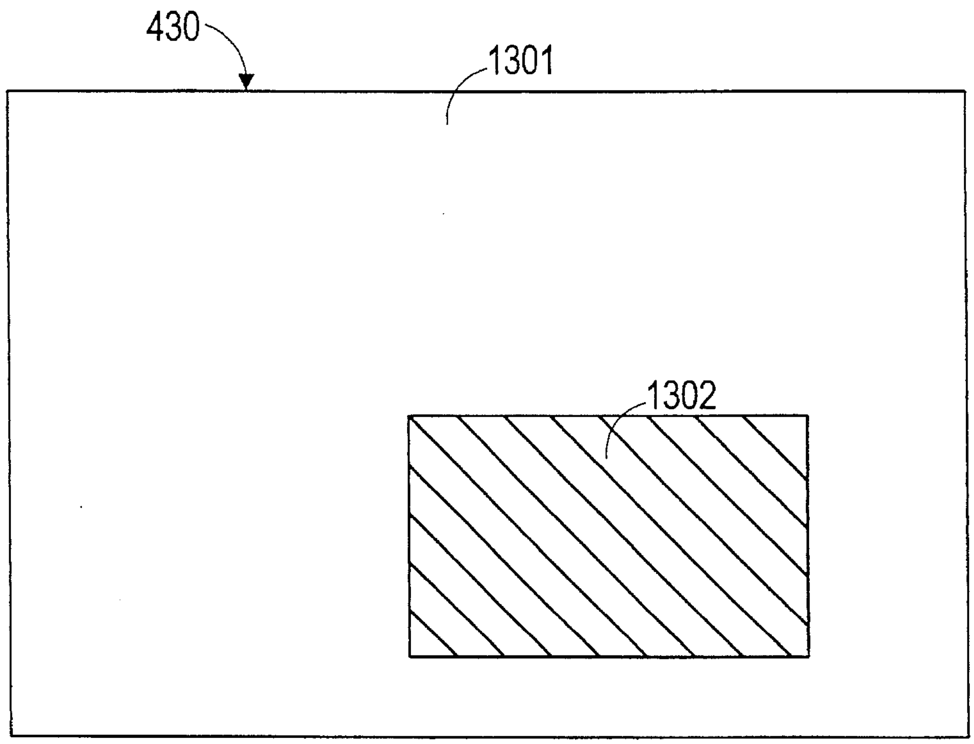
FIG. 14 is a schematic representation of a host video signal.
Figure 15:
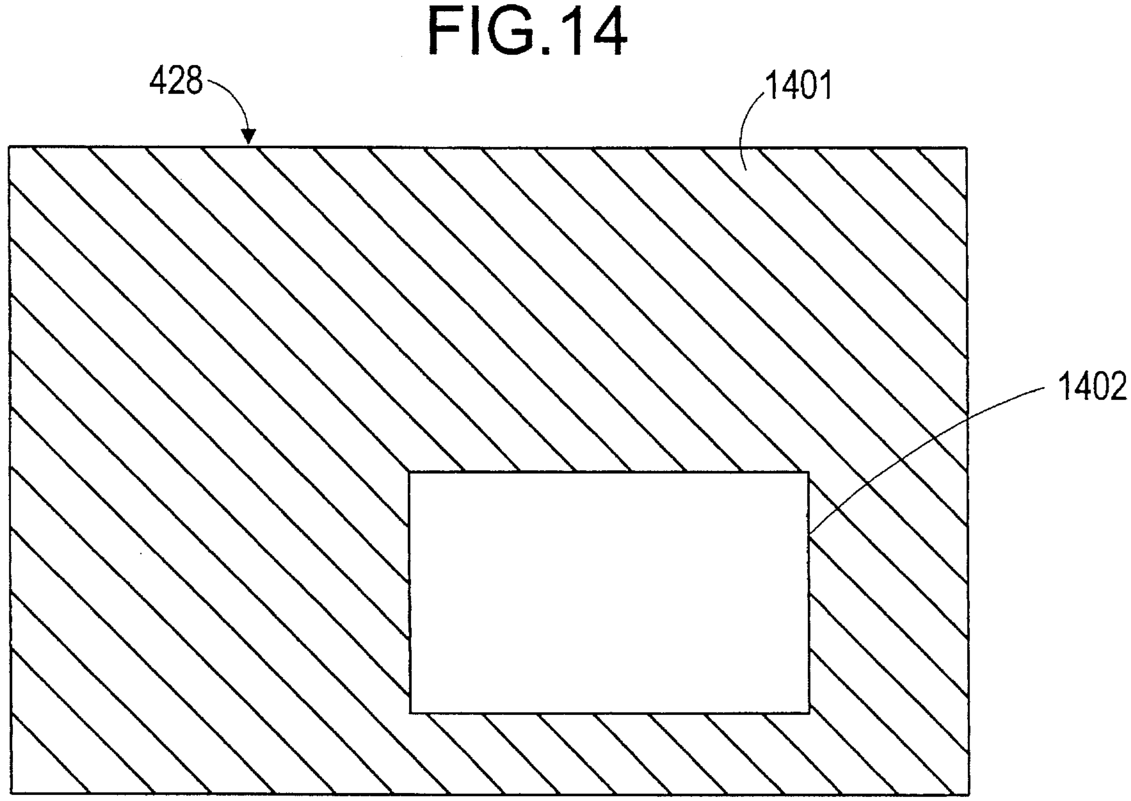
FIG. 15 is a schematic representation of an SDP video signal.

FIG. 14 is a schematic representation of how host video signal 430, by itself, would appear on the screen of monitor 422. FIG. 15 is a schematic representation of how SDP video signal 428, by itself, would appear on the screen of monitor 422. Host video signal 430 includes a background section 1301 and a window section 1302. In one embodiment of the present invention, background section 1301 depicts information such as various operating parameters of the microscope 400. Blank window section 1302 of video image 430 is blank. That is, the intensity value of the pixels within this window is zero (i.e., the window is black).

Video signal 428 of video RAMDAC U58 includes frame section 1401 and target image window 1402. The intensity value of the pixels in frame section 1401 is zero. The intensity values of the pixels within target image window 1402 are representative of the image of target 412. Consequently, when SDP video signal 428 is added to host video signal 430, the target image window 1402 is displayed within background section 1301.

The SDP video signal 428 can only be added to host video signal 430 in a meaningful manner when the output of video RAMDAC U58 is synchronized, pixel for pixel, with the video signal 430.

Because host work station 420 does not supply a pixel clock output, a phase locked loop circuit 704 (FIG. 11) is used to regenerate the host work station pixel clock from the clock signals available at the output of host work station 420. The clock signals generated by host work station 420 include a horizontal sync signal (HDRIVE) and a vertical sync signal (VDRIVE). The HDRIVE signal has a frequency representative of the frequency at which lines of video information are generated horizontally across monitor 422. The VDRIVE signal has a frequency representative of the frequency at which frames of video information are generated on monitor 422. In one embodiment, the VDRIVE has a frequency of 60 hz. As illustrated in FIG. 11, the HDRIVE and VDRIVE signals are tapped off lines 730–731 and provided to graphics timing generator 705.

Voltage controlled oscillator (VCO) 706 generates the display pixel clock (DPIXCLK) which clocks the output of the video RAMDAC U58. VCO 706 includes an oscillator chip U15 (FIG. 12*a*). Oscillator chip U15 is a conventional ECL clock oscillator, available from Motorola as part number MC1648P. The frequency of the output of oscillator chip U15 is controlled by an L-C tuned circuit which includes inductor L2 and variable capacitance diodes D1 and D2. By changing the voltage applied to the variable capacitance diodes D1 and D2, the capacitances of the variable capacitance diodes D1 and D2 are changed, thereby changing the frequency of the output signal of oscillator chip U15. The various other circuit elements coupled to oscillator chip U15 are known in the art.

The output of oscillator chip U15 is provided to level shifter U17 (FIG. 12*a*). Level shifter U17, available from Motorola as part number MC10H116P, shifts the ECL clock output of oscillator chip U15 to a higher ECL level, such that the output of level shifter U17 is compatible with the downstream clock generator chip U18 (FIG. 12*a*). In response to the output of level shifter U17, clock generator chip U18 generates several clock signals which are used operate video RAMDAC U58. These clock signals include the DPIXCLK, /DPIXCLK and DACCLK signals. The DPIXCLK and /DPIXCLK signals are the pixel clocks used to clock video RAMDAC U58 (FIG. 12*d*). The DACCLK signal is the DPIXCLK signal divided by four. Clock generator chip U18 is a conventional chip available from Brooktree as part number BT438KC.

The DACCLK signal is provided to video controller U74 (FIG. 12*b*). Video controller U74 is a conventional PLD, available from AMD as part number MACH220-15JC. Video controller U74 further divides the DACCLK signal to create either an LSYNCHI signal or an LSYNCLO signal. The LSYNCLO signal approximates the HDRIVE signal generated by host work station 420 when monitor 422 is a known low resolution monitor and the LSYNCHI signal approximates the HDRIVE signal generated by host work station 420 when monitor 422 is a known high resolution monitor.

To determine whether a low or high resolution monitor is being used, the HDRIVE signal from host work station 420 is provided to monostable device U98 in graphics timing generator 705 (FIG. 12*b*). Each time the monostable device U98 receives a pulse from the HDRIVE signal, the RC circuit coupled to the monostable device U98 is charged. The HDRIVE signal has a different frequency for different resolution monitors. In one embodiment, the HDRIVE signal of a high resolution monitor has a frequency of approximately 65 khz and the HDRIVE signal of a low resolution monitor has a frequency of approximately 44 khz. The frequency of the HDRIVE signal of the high resolution monitor and the time constant of the RC circuit are such that the capacitor will not have time to discharge significantly between pulses. Thus, the output of monostable U98, RESDATA, remains high when a high resolution monitor is being used. Because the HDRIVE signal of the low resolution monitor has a lower frequency, the RC circuit has more time to discharge between pulses when a low resolution monitor is being used. Thus, the RESDATA signal rises and decays when a low resolution monitor is being used. The RESDATA signal is provided to video controller U74. The video controller U74 determines from the RESDATA signal whether a high or low resolution monitor is being used and internally sets its counters and registers based on this information.

If a low resolution monitor is being used, the video controller U74 generates a LSYNCLO signal. The LSYNCLO signal has a frequency which is equivalent to the frequency of the DPIXCLK signal divided by the number of pixels in each horizontal line of the low resolution monitor. In one embodiment, the low resolution monitor has 1024 pixels per line. Thus, to create the LSYNCLO signal, the video controller U74 divides the DACCLK signal by the appropriate number. If a high resolution monitor is being used, video controller U74 generates a LSYNCHI signal. The LSYNCHI signal has a frequency which is equivalent to the frequency of the DPIXCLK signal divided by the number of pixels in each horizontal line of the high resolution monitor. In one embodiment, this high resolution monitor has 1280 pixels per line. Thus, to create the LSYNCHI signal, the DACCLK signal is divided by the appropriate number. In one embodiment, the video controller U74 is unable to precisely divide the DACCLK signal by the appropriate number to obtain the LSYNCHI signal. Thus, a delay block U23 (FIG. 12*a*) (available from Dallas Semiconductor as part number DS1000M-30) adjusts the LSYNCHI signal to provide an offset which results in a properly divided LSYNCHI signal.

The LSYNCHI and LSYNCLO signals are horizontal drive signals, derived from VCO 706, which indicate the frequency at which the DPIXCLK is scanning horizontal lines on monitor 422. The LSYNCHI and LSYNCLO signals are provided to level shifter U22 within the phase detector 708 (FIG. 12*a*). Level shifter U22 converts the LSYNCHI and LSYNCLO signals from TTL based signals to ECL based signals. Level shifter U22 is a conventional part available from Motorola as part number MC10H124P. The OR'ed combination of the ECL based LSYNCHI and LSYNCLO signals is provided to the R input of phase comparator U21 as the signal, RSYNC. Because only one of the LSYNCHI or LSYNCLO signals is enabled (depending upon the resolution of the monitor used), the RSYNC signal is representative of either the LSYNCHI or the LSYNCLO signal. The HDRIVE signal from host work station 420 is also provided to level shifter U22. Level shifter U22 converts the HDRIVE signal into an ECL based signal, HSYNC. The HSYNC signal is provided to the V input of phase comparator U21. The conversion from TTL to ECL is performed because of the high frequency of the signals being measured and controlled.

Phase comparator U21 is a conventional part, available from Motorola as part number MC12040P. Phase comparator U21 compares the RSYNC and HSYNC signals. As previously described, the RSYNC signal represents the actual horizontal line scan frequency of the output signal generated by VCO 706 and the HSYNC signal represents the actual horizontal line scan frequency of the host video signal 430 (i.e., the desired horizontal line scan frequency of VCO 706). Any difference between the RSYNC and HSYNC signals indicates that the signal generated by VCO 706 is either lagging or leading the line scan frequency of the host work station 420. If such a phase difference exists between the RSYNC and HSYNC signals, the phase comparator U21 generates a pair of complementary output pulses which are proportional in length to the time error between the RSYNC and HSYNC signals. If the RSYNC signal leads the HSYNC signal, the phase comparator U21 generates complementary output pulses, DOWN and /DOWN, at its D and /D outputs, respectively. As discussed below, these pulses will reduce (i.e., pump down) the frequency of the signal generated by VCO 706, thereby reducing the phase difference between RSYNC and HSYNC. If the RSYNC signal lags the HSYNC signal, the phase comparator U21 generates complementary output pulses, UP and /UP, at its U and /U outputs, respectively. As discussed below, these pulses will increase (i.e., pump up) the frequency of the signal generated by VCO 706, thereby reducing the phase difference between RSYNC and HSYNC.

The output pulses generated by phase comparator U21 are provided to level shifter 725 (FIG. 12*a*). Level shifter 725 utilizes four high speed differential transistors Q1–Q4. The UP and /UP pulses from phase comparator U21 are provided to the bases of transistors Q1 and Q3, respectively. Similarly, the DOWN and /DOWN pulses from phase comparator U21 are provided to the bases of transistors Q2 and Q4, respectively. The emitters of transistors Q1–Q4 are coupled (through various resistors) to a constant negative voltage source and the collectors of transistors Q1–Q4 are coupled (through various resistors) to ground. The collector of transistor Q1 is also coupled to an inverting input of operational amplifier U16 of integrator 710. The collector of transistor Q2 is also coupled to a non-inverting input of operational amplifier U16. Integrator 710 includes high precision operational amplifier U16 and the various illustrated conventional circuit elements. Operational amplifier U16 is available as part number OP-177GP from Analog Devices. The output of integrator 710 is applied to the tuning circuit of VCO 706.

When there is no phase difference between the RSYNC and HSYNC signals, the UP and DOWN signals are low and the UP and /DOWN signals are high, thereby opening transistors Q1 and Q2 and closing transistors Q3 and Q4. As a result, the inverting and non-inverting inputs of operational amplifier U16 are both connected to ground (i.e., zero). During these conditions, there is no difference between the inputs of integrator 710 and the output of integrator 710 is zero. If the RSYNC signal leads the HSYNC signal, the UP signal goes high and the /UP signal goes low for a period of time proportional to the phase difference between the RSYNC and HSYNC signals. As a result, transistor Q1 is closed and transistor Q3 is opened. This transmits a negative voltage pulse from the constant negative voltage source, through Q1, to the inverting input of the operational amplifier U16. Because the non-inverting input of the operational amplifier U16 remains tied to ground, a difference exists between the inputs of integrator 710 for the duration of the negative voltage pulse. This negative voltage pulse increases the output voltage of the integrator by an amount which is proportional to the duration of the negative voltage pulse (i.e., is proportional to the phase difference between the HSYNC and RSYNC signals). The increased output voltage of the integrator is applied to the tuning circuit of VCO 706, thereby increasing the frequency of the signal generated by VCO 706.

Similarly, if the RSYNC signal lags the HSYNC signal, the DOWN signal goes high and the /DOWN signal goes low for a period of time proportional to the phase difference between the RSYNC and HSYNC signals. As a result, transistor Q2 is closed and transistor Q4 is opened, thereby transmitting a negative voltage pulse from the constant negative voltage source, through Q2, to the non-inverting input of operational amplifier U16. Because the inverting input of operational amplifier U16 remains tied to ground, a difference exists between the inputs of integrator 710 for the duration of the negative voltage pulse. This negative voltage pulse reduces the output voltage of integrator 710 by an amount which is proportional to the duration of the negative voltage pulse (i.e., is proportional to the phase difference between the RSYNC and HSYNC signals). The reduced output voltage of the integrator is applied to the tuning circuit of the VCO 706, thereby reducing the frequency of the signal generated by VCO 706.

One advantage of level shifter 725 is that when the RSYNC and HSYNC signals are in phase, both the inverting and non-inverting input terminals of the operational amplifier U16 are tied to ground. Thus small differences between the quiescent UP and DOWN signals caused by imperfections within the phase comparator U21 or by the heating of phase comparator U21 will not be transmitted to the inputs of the integrator 710.

Because the period associated with the generation of one pixel on monitor 422 is approximately 9 nanoseconds (for a high resolution monitor), and the phase locked loop circuit 704 synchronizes the output signals of video RAMDAC U58 and the work station 420 pixel for pixel, transistors Q1–Q4 should have a response time that is at least as fast as 9 nanoseconds. In one embodiment, transistors Q1–Q4 are 5 gigahertz transistors available from Motorola as part number MRF580. By utilizing such transistors, the outputs of video RAMDAC U58 and host work station 420 can be synchronized to within 100 picoseconds.

Once synchronized, the video controller U74 uses the VDRIVE, HDRIVE and DACCLK signals to generate a display pixel address (DPIX00–08) which indicates the horizontal position of the pixel being accessed on monitor 422 and a display line address (DLIN02–10) which indicates the vertical position of the pixel being accessed on monitor 422. The display pixel address (DPIX00–08) is input to comparator U90 of digital comparator 712 (FIG. 12*c*). The other input to comparator U90 is a low pixel address generated by the host work station 420 which indicates the address of the horizontal position at which the target image window 1402 (FIG. 14) is to begin on monitor 422. The low pixel address is provided to comparator U90 from the video quarter low pixel register U91. The video quarter low pixel register U91 receives the low pixel address from the host work station 420 on bus quarter address bus BQAD00–07. When the display pixel address (DPIX00–08) equals or exceeds the low pixel address, comparator U90 outputs a signal (/DPEQLO) to video controller U74 which indicates that this condition exists.

The display pixel address (DPIX00–08) is also input to comparator U93 of digital comparator 712 (FIG. 12*c*). The other input to comparator U93 is a high pixel address which indicates the address of the horizontal position at which the target image window 1402 (FIG. 14) is to end on monitor 422. The high pixel address is provided to comparator U93 from the video quarter high pixel register U94. The video quarter high pixel register U94 receives the high pixel address from the host work station 420 on bus quarter address bus BQAD016–23. When the display pixel address (DPIX00–08) equals or exceeds the high pixel address, comparator U90 outputs a signal (/DPEQHI) to the video controller U74 which indicates that this condition exists.

Similarly, the display line address (DLIN02–10) is input to comparator U78 of digital comparator 712 (FIG. 12*c*). The other input to comparator U78 is a low line address which indicates the address of the vertical position at which the target image window 1402 (FIG. 14) is to start on the monitor 422. The low line address is provided to comparator U78 from the video quarter low line register U79. The video quarter low line register U79 receives the low line address from the host work station 420 on bus quarter address bus BQAD00–07. When the display line address (DLIN02–10) equals or exceeds the low line address, comparator U78 outputs a signal (/DLEQHI) to the video counter/register block U74 which indicates that this condition exists.

Additionally, the display line address (DLIN00–08) is input to comparator U80 of digital comparator 712 (FIG. 12*c*). The other input to comparator U80 is a high line address which indicates the address of the vertical position at which the target image window 1402 (FIG. 14) is to end on the monitor 422. The high line address is provided to comparator U80 from the video quarter high line register U81. The video quarter high line register U81 receives the high line address from the host work station 420 on bus quarter address bus BQAD08–15. When the display line address equals or exceeds the high line address, comparator U80 outputs a signal (/DLEQHI) to the video controller U74 which indicates that this condition exists.

Video controller U74 (FIG. 12*b*) enables a video clock enable output (VIDCLKEN) when the /DLEQLO and /DPEQLO signals are enabled and the /DLEQHI and /DPEQHI signals are not enabled (i.e., during the time that monitor 422 is accessing a pixel within the target image window 1402 of FIG. 14). The VIDCLKEN signal is provided to clock generator chip U18 (FIG. 12*a*), thereby enabling the clock generator chip U18 to generate the clock signals which enable the video RAMDAC U58. In this manner, the video RAMDAC U58 is turned on and off at the appropriate time to place the target image in the target image window 1402.

Video controller U74 also uses the VDRIVE, HDRIVE and DACCLK signals to generate a memory address (MAD0–8) which is used to address each of the 512 rows of pixel data stored in intensity memory 650. This memory address (MAD0–8) is buffered by block U72 (FIG. 12*b*) and diagnostics blocks 648*d* (FIG. 10*i*) before being provided to intensity memory 650 on bus IZAD00–07.

The RGB outputs of video RAMDAC U58 are analog currents which are offset from zero amps by a small positive constant current. This offset is used by video RAMDAC U58 to transmit synchronizing information. However, the RGB outputs of the host work station 420 already include this offset and synchronizing information. Thus, the offset and synchronizing information added by the video RAMDAC U58 is unnecessary and tends to lighten the image sent to the monitor 422. To eliminate the offset of the output of the video RAMDAC, to offset this offset, the constant current sink 741 is added to coaxial cables 1501–1506. Constant current sink 741 provides a high impedance path so as not to unbalance the 75 ohm coaxial cables 1501–1506. FIG. 12*d* illustrates one embodiment of constant current sink 741.

Figure 16:
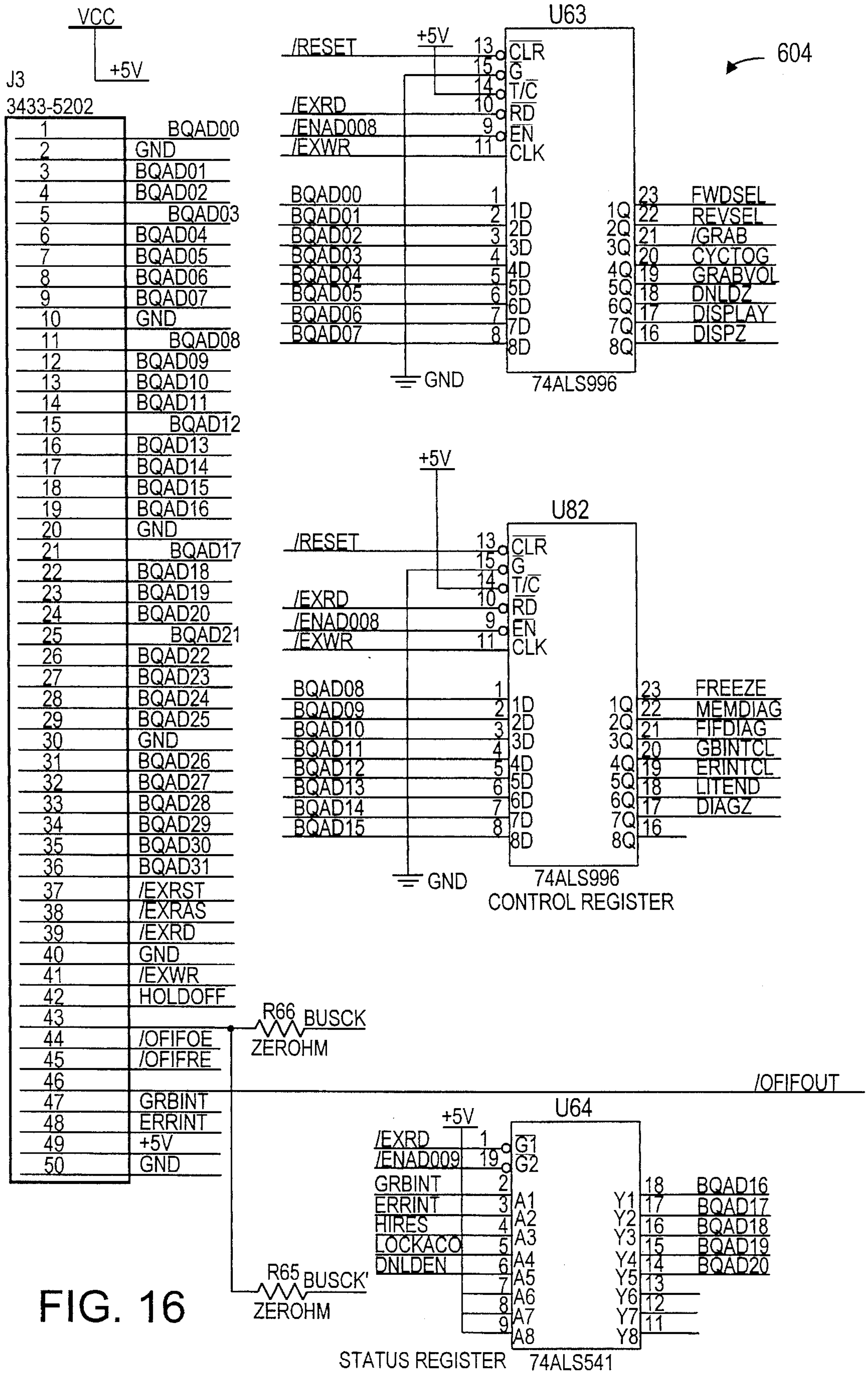
FIG. 16 is a schematic diagram of interface elements used to couple the bus quarter to the scanner quarter, memory quarter, and video quarter.
Figure 17A:
FIGS. 17*a*–17*b* are schematic diagrams of power supplies used to supply the various components of a surface data processor.
Figure 17B:

FIG. 16 is a schematic diagram of interface elements used to couple bus quarter 604 to scanner quarter 601, memory quarter 602 and video quarter 603. These interface elements include bus connector J3, control registers U63 and U82 and status register U64. FIGS. 17*a*–17*b* are schematic diagrams of the power supplies used to supply the various components of SDP 426.

Figure 18:
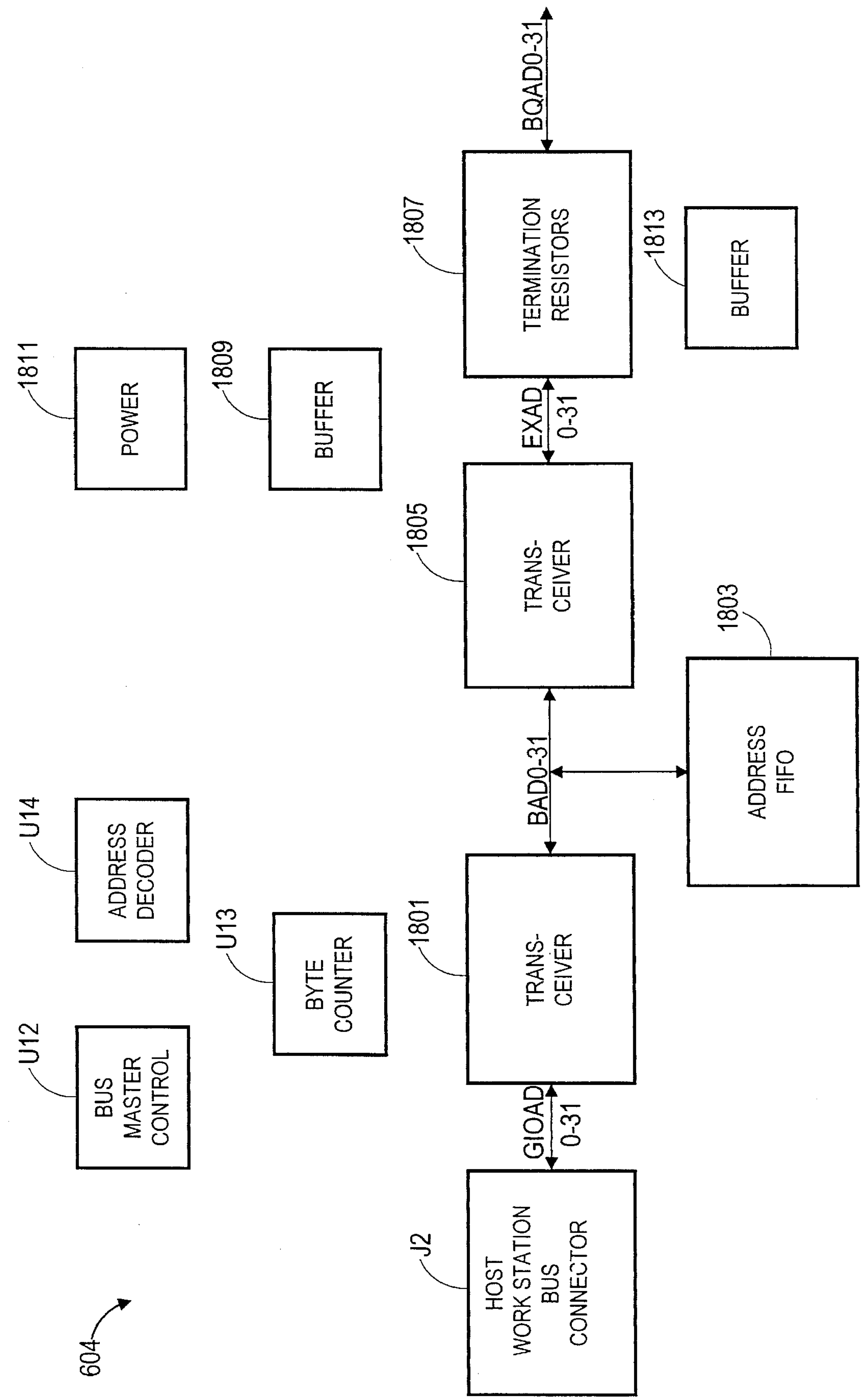
FIG. 18 is a block diagram of a bus quarter.

FIG. 18 is a block diagram of bus quarter 604, including host work station bus connector J2, transceiver block 1801, address fifo 1803, transceiver block 1805, termination resistor block 1807, buffer block 1809, power supplies 1811, buffer block 1813, bus master controller U12, address decoder U14, byte counter U13. FIGS. 19*a–h* are schematic diagrams of circuitry in bus quarter 604.

Figures 1, 19A:
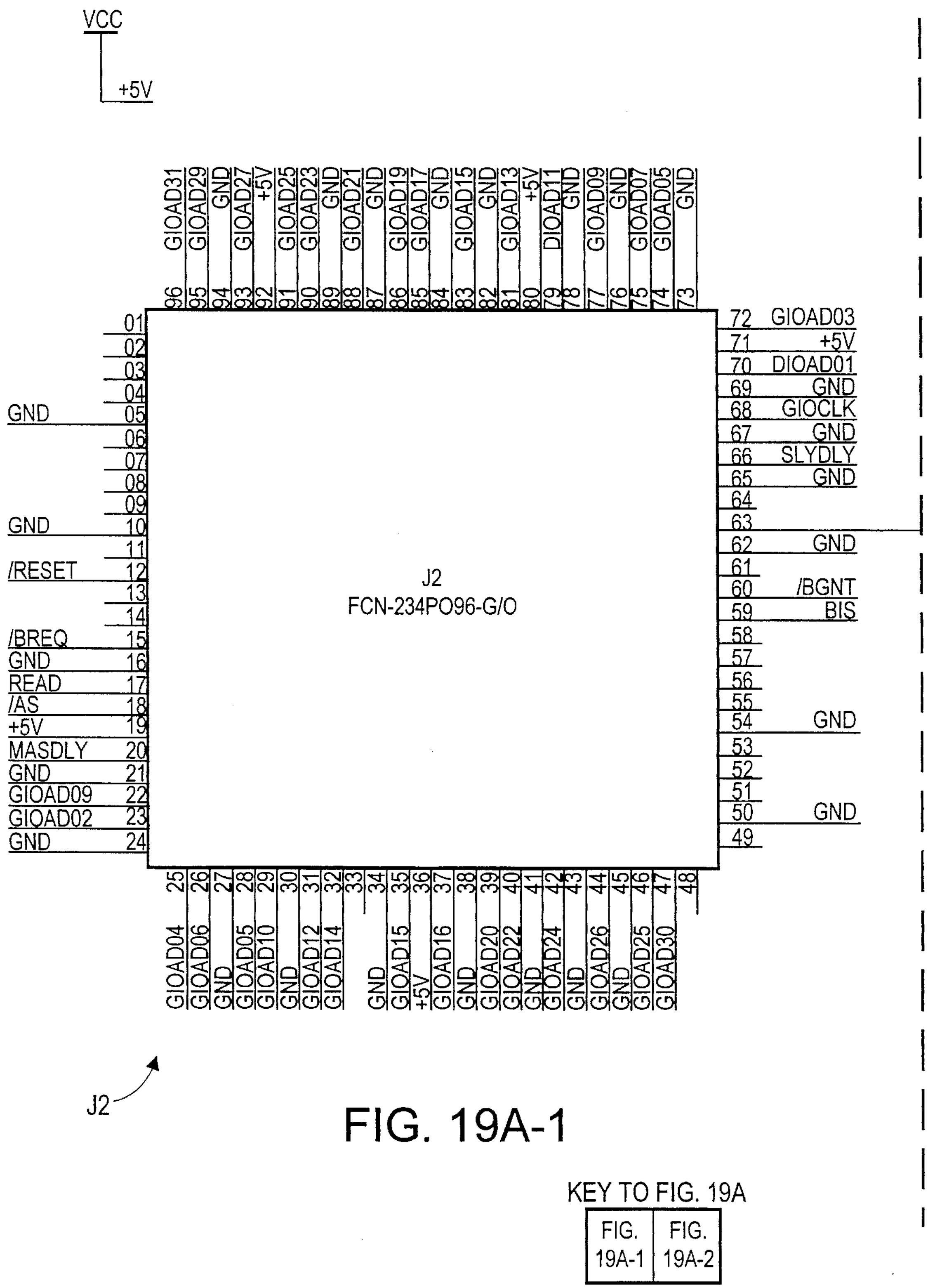
FIGS. 19*a*–*h* are schematic diagrams of circuitry in the bus quarter of FIG. 18.
Figures 2, 19A:
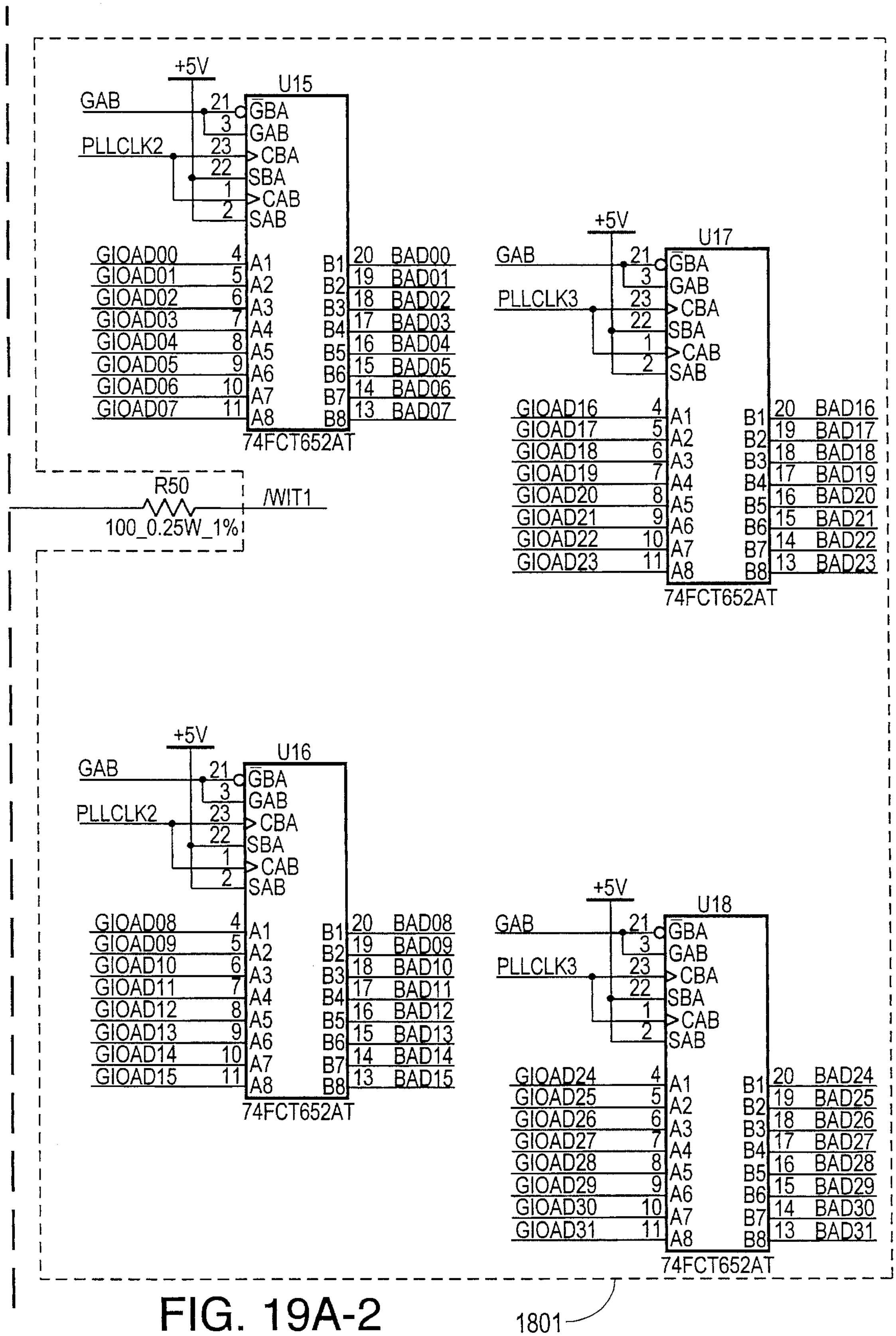
Figures 2, 19B:
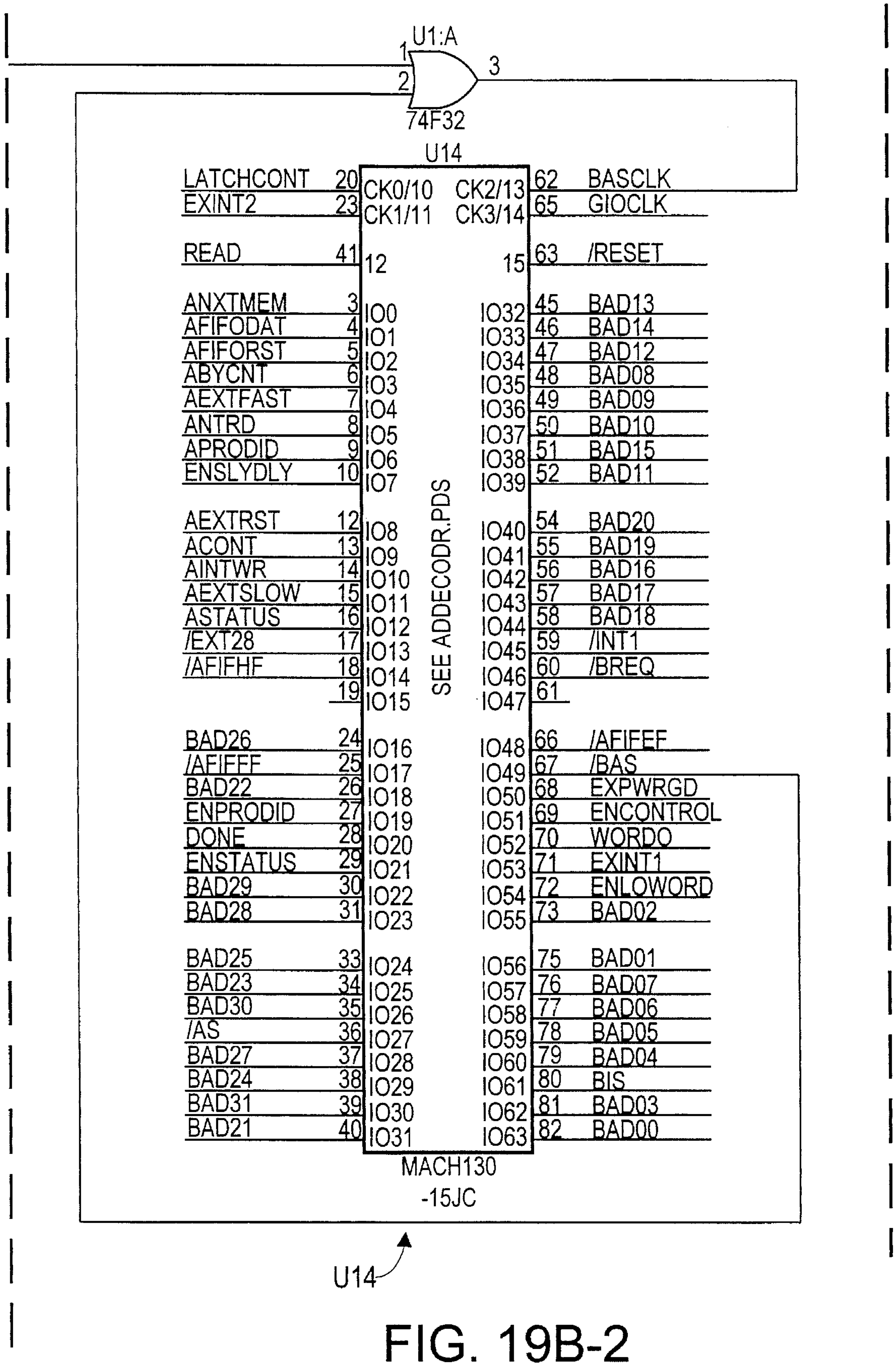
Figures 1, 19C:
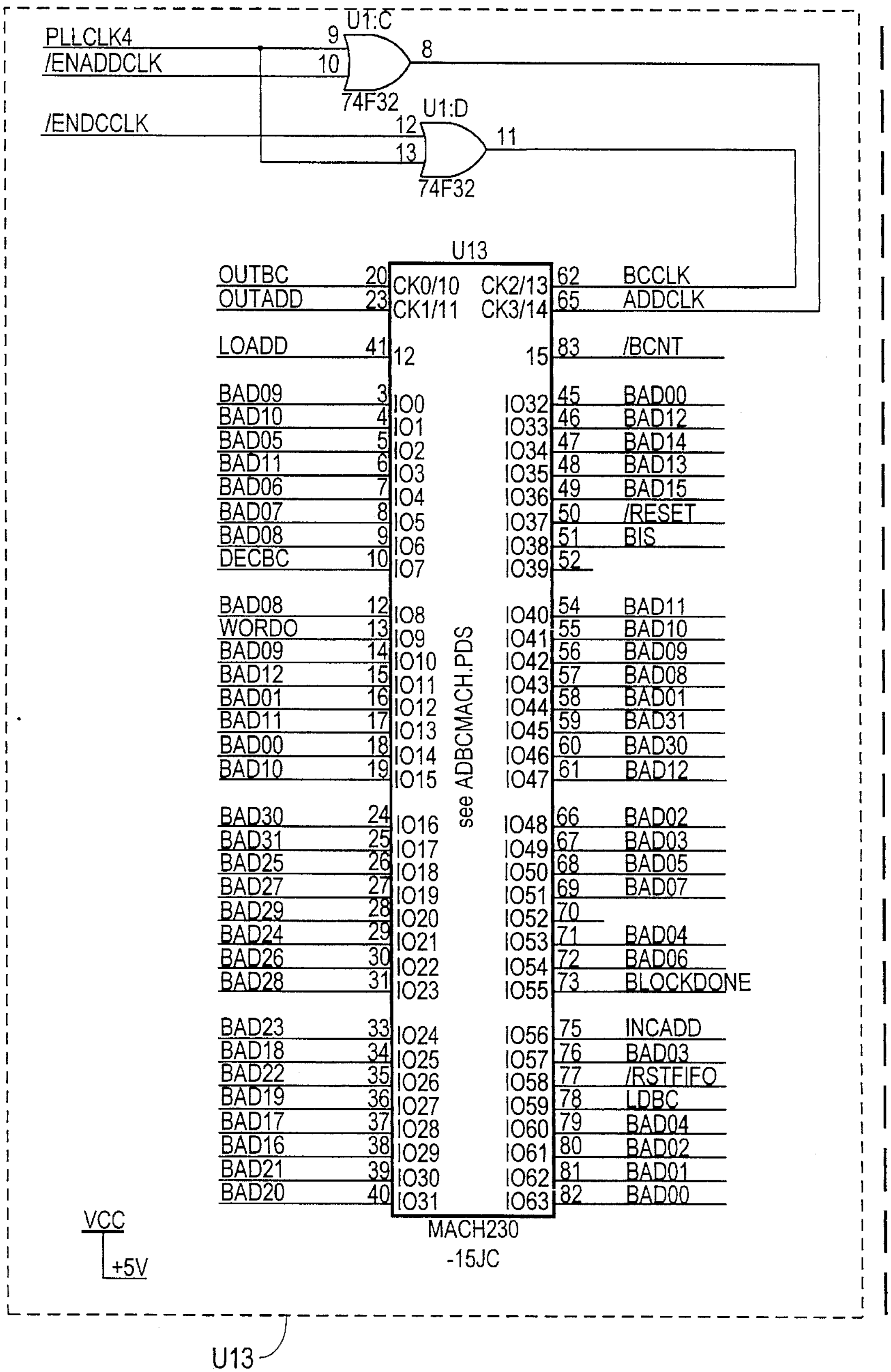
Figures 2, 19C:
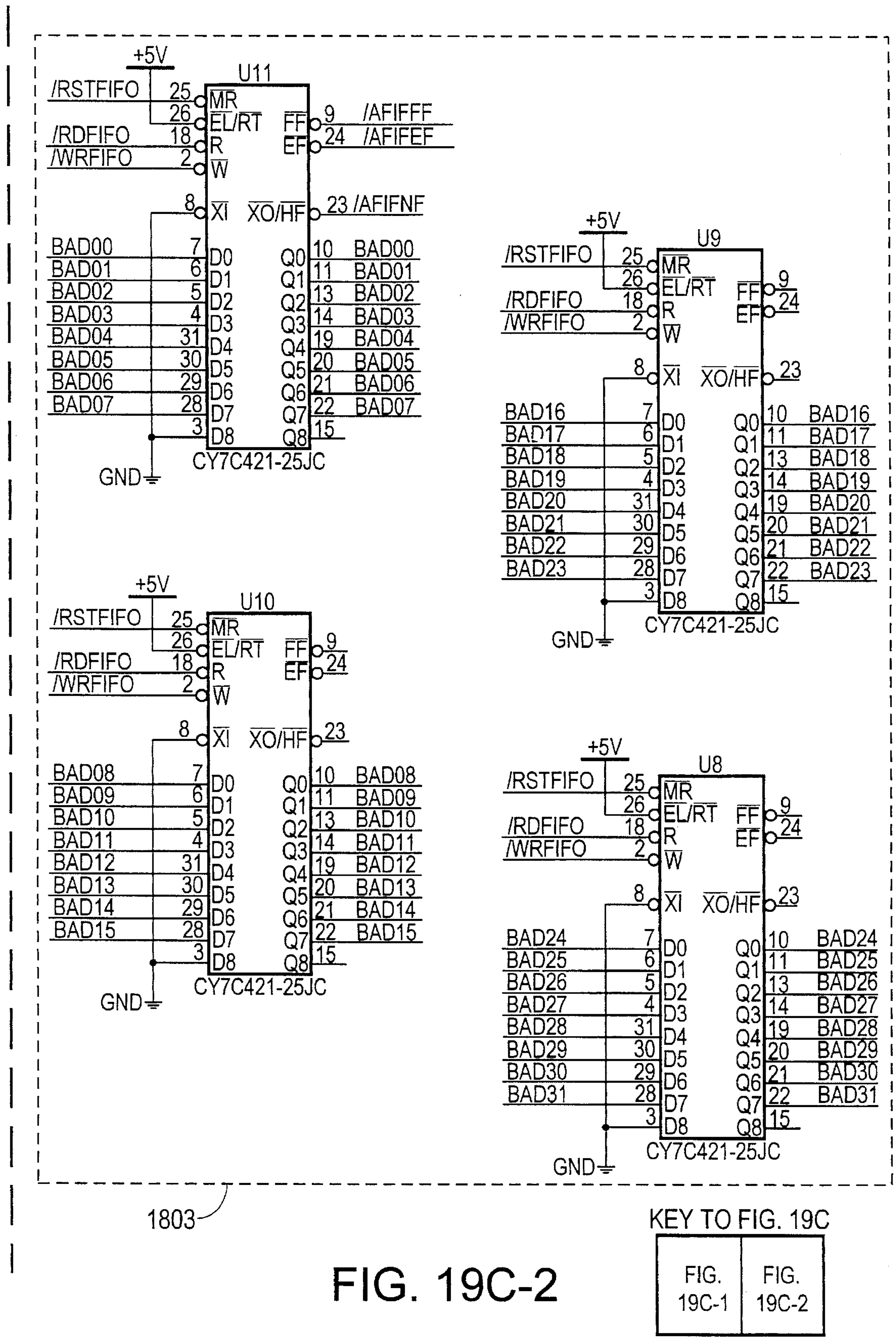

Data from I-latch 640, intensity memory 650 or Z-memory 651 is downloaded to host work station 420 through bus quarter 604. To perform a download operation, host work station 420 transmits addresses and byte counts to transceiver block 1801 on bus GIOAD0–31 (FIG. 19*a*). Transceiver block 1801 includes four transceivers U15–U18 commonly available from IDT as part number 74FCT652AT. Transceivers U15–U18 pass the addresses and byte counts from bus connector J2 to address fifo 1803 on bus BAD0–31 (FIG. 19*c*). Address fifo 1803 includes four address fifos U8–U11, available from Cypress Semiconductor as part number CY7C421-25JC. The addresses and byte counts loaded into address fifo 1803 designate memory space within host work station 420 which is allocated to receive data.

After the address fifo 1803 has been loaded, the bus master controller U12, address decoder U14 and byte counter U13 control the writing of data values into bus quarter 604. Bus master controller U12 is a conventional PLD available from AMD as part number MACH230-15JC (FIG. 19*b*). Address decoder U14 is a conventional PLD available from AMD as part number MACH130-15JC (FIG. 19*b*). Byte counter U13 is a conventional PLD available from AMD as part number MACH230-15JC (FIG. 19*c*). Because the bus master controller U12, address decoder U14 and byte controller U13 control the downloading of data into host work station 420, the host work station 420 is not burdened with this task.

Figures 1, 19D:
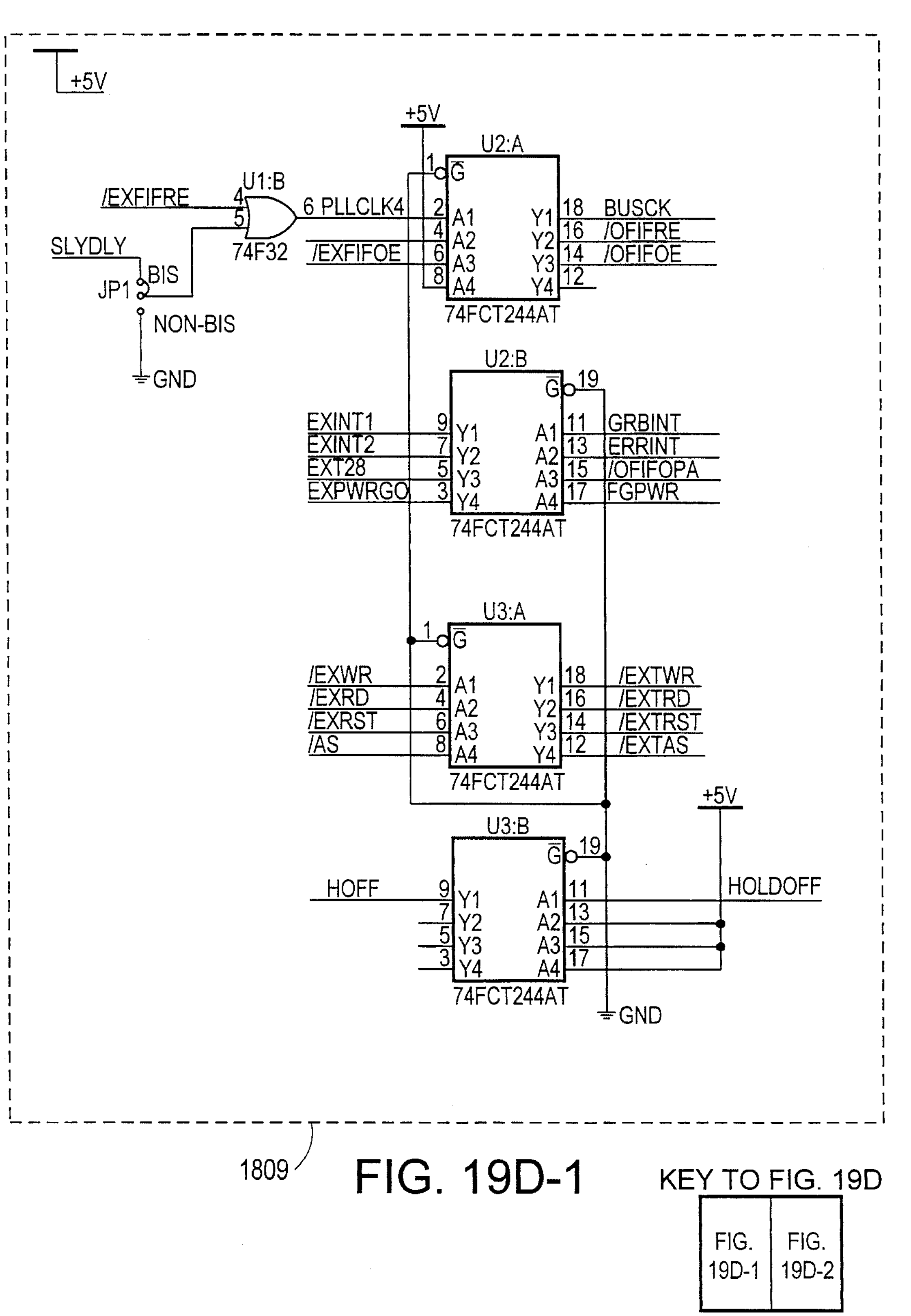
Figures 2, 19D:
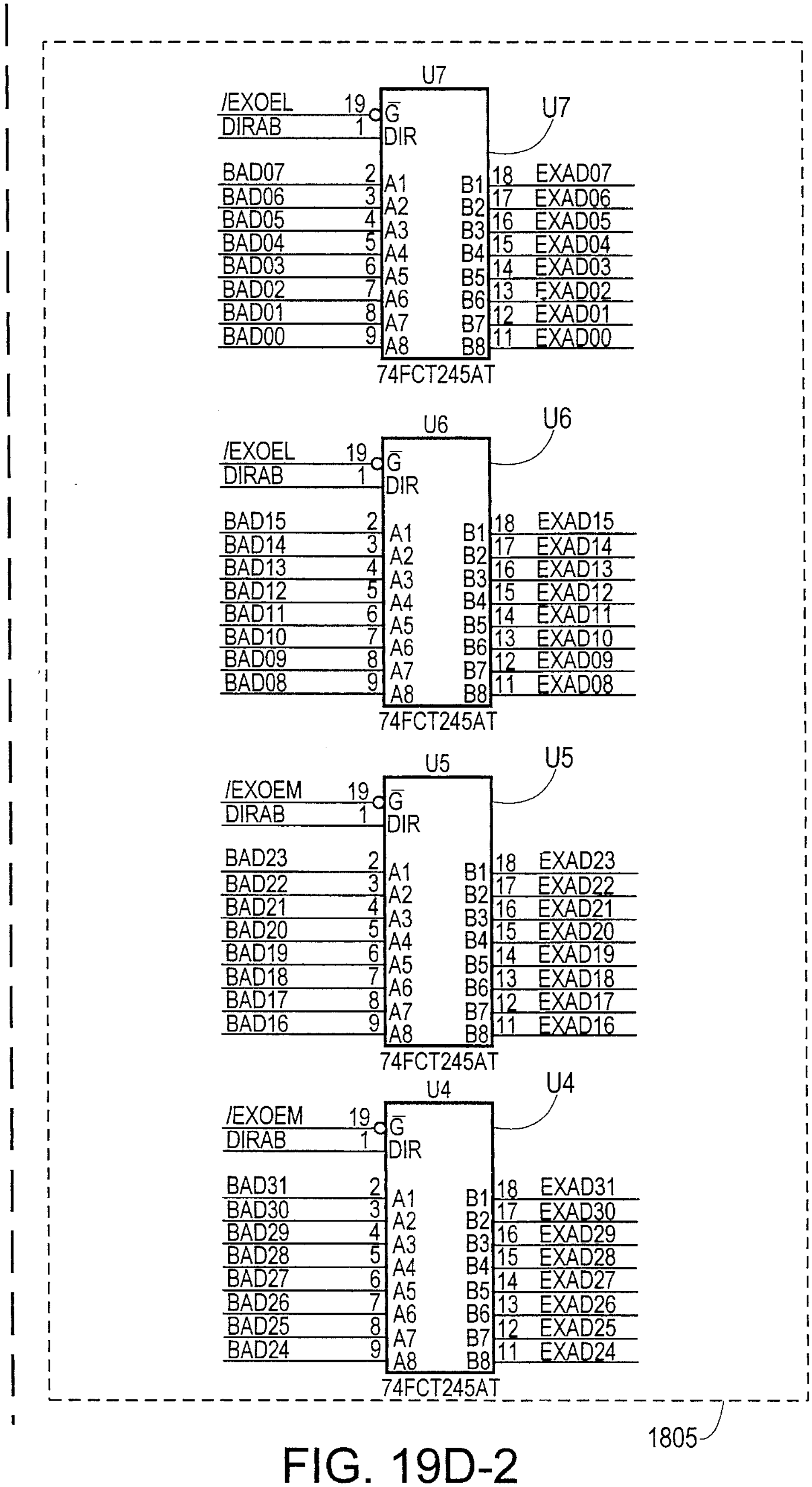
Figure 19E:
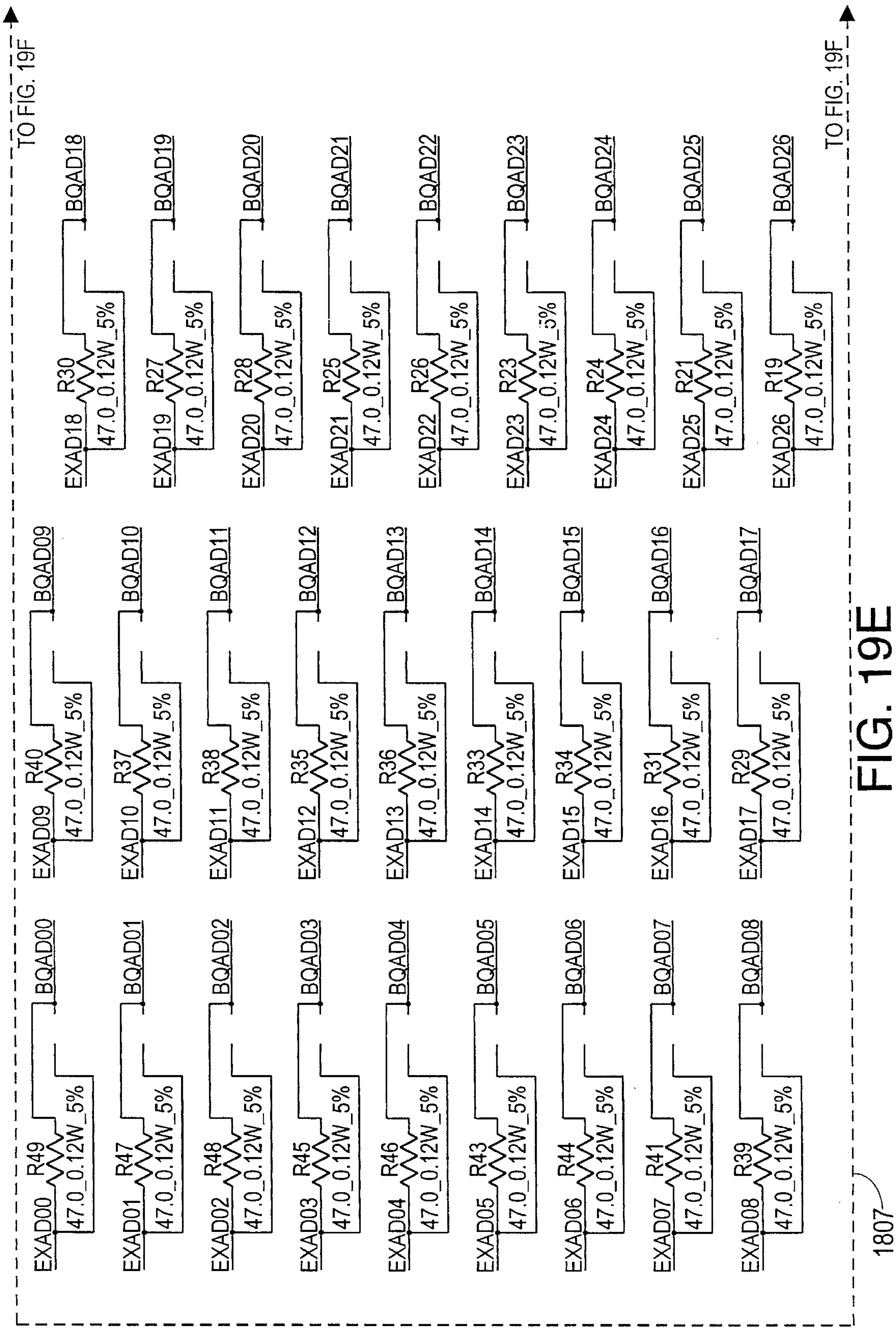
Figures 1, 19F:
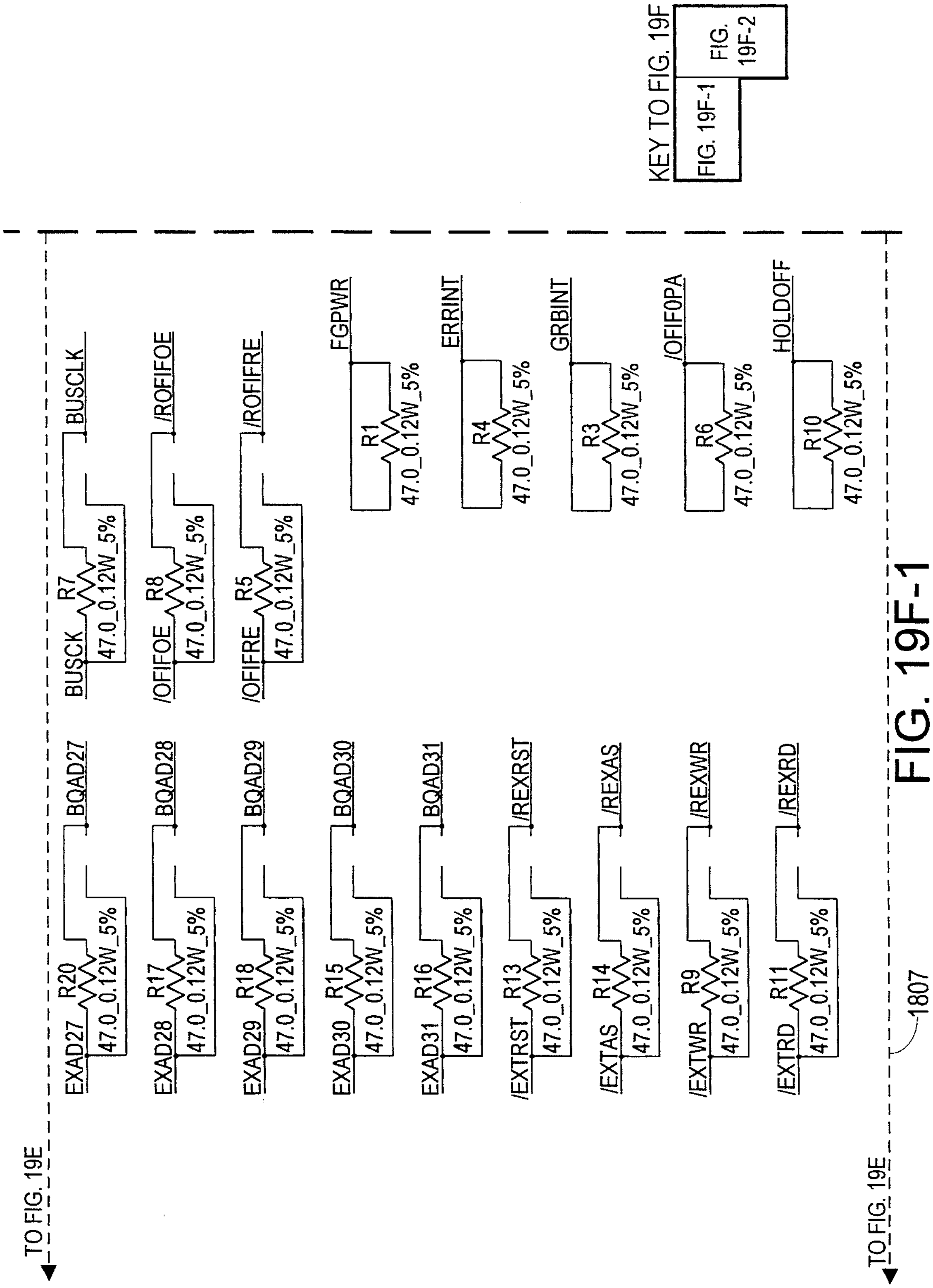
Figures 2, 19F:
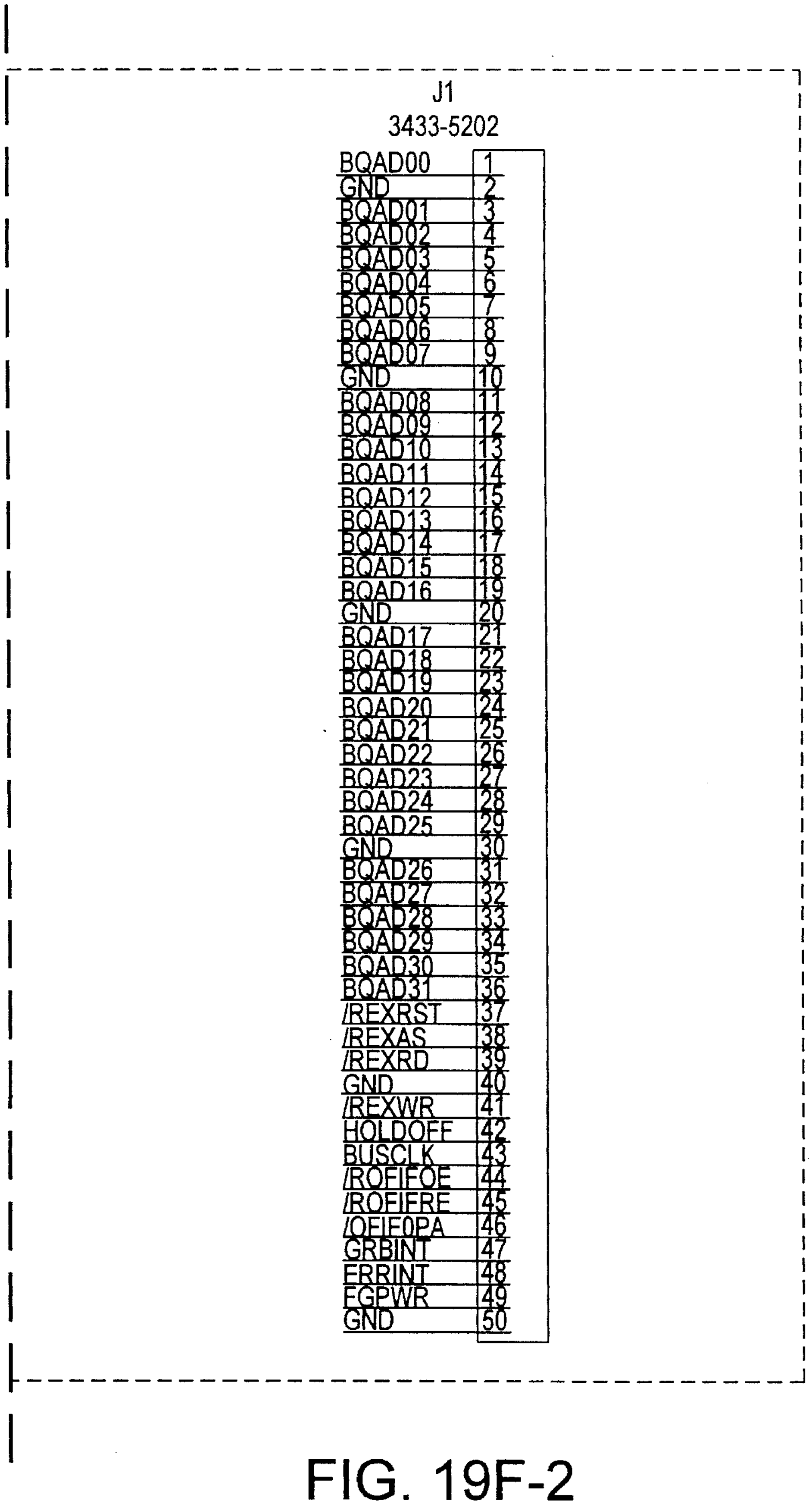
Figure 19:
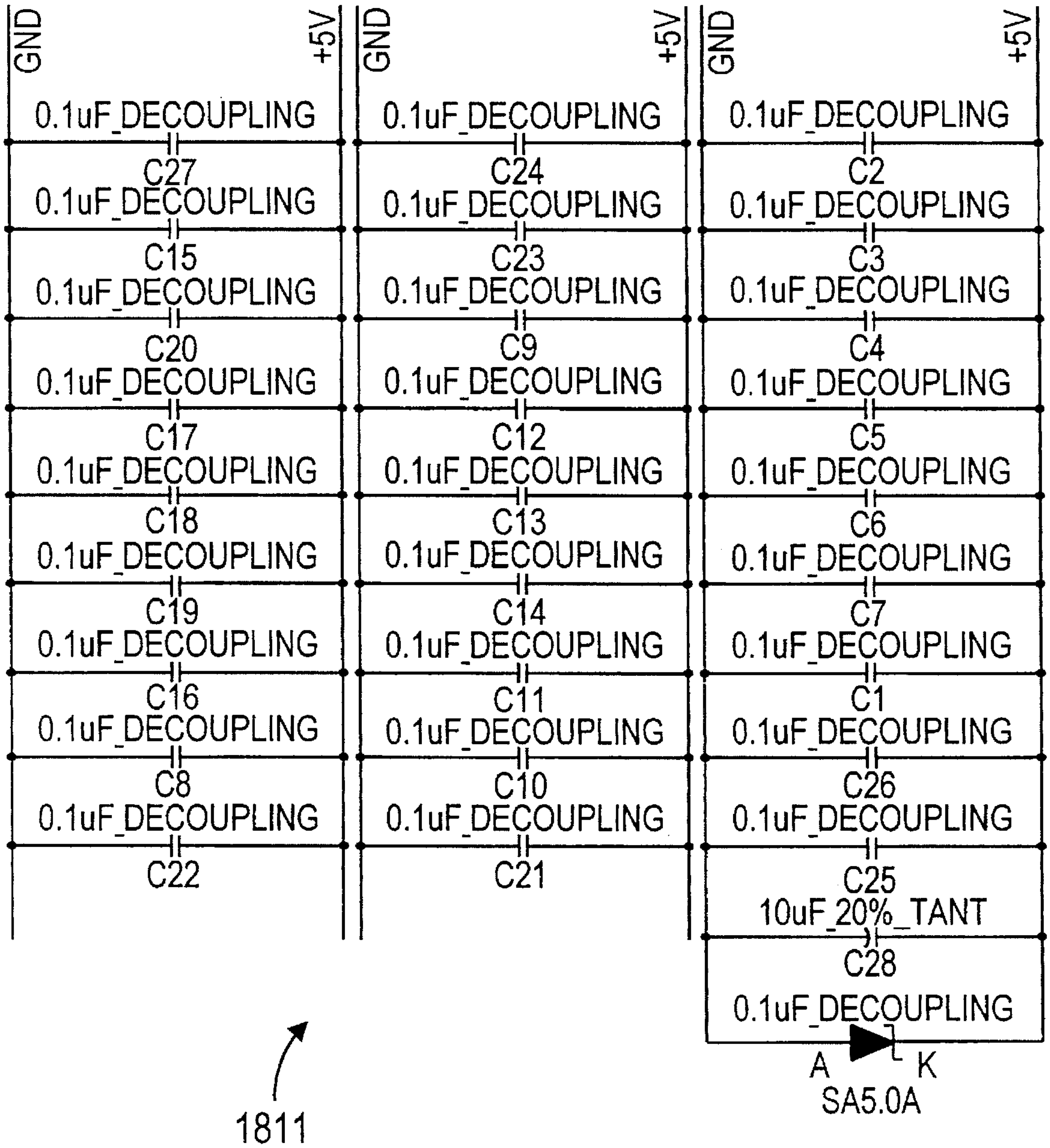
Figure 19H:
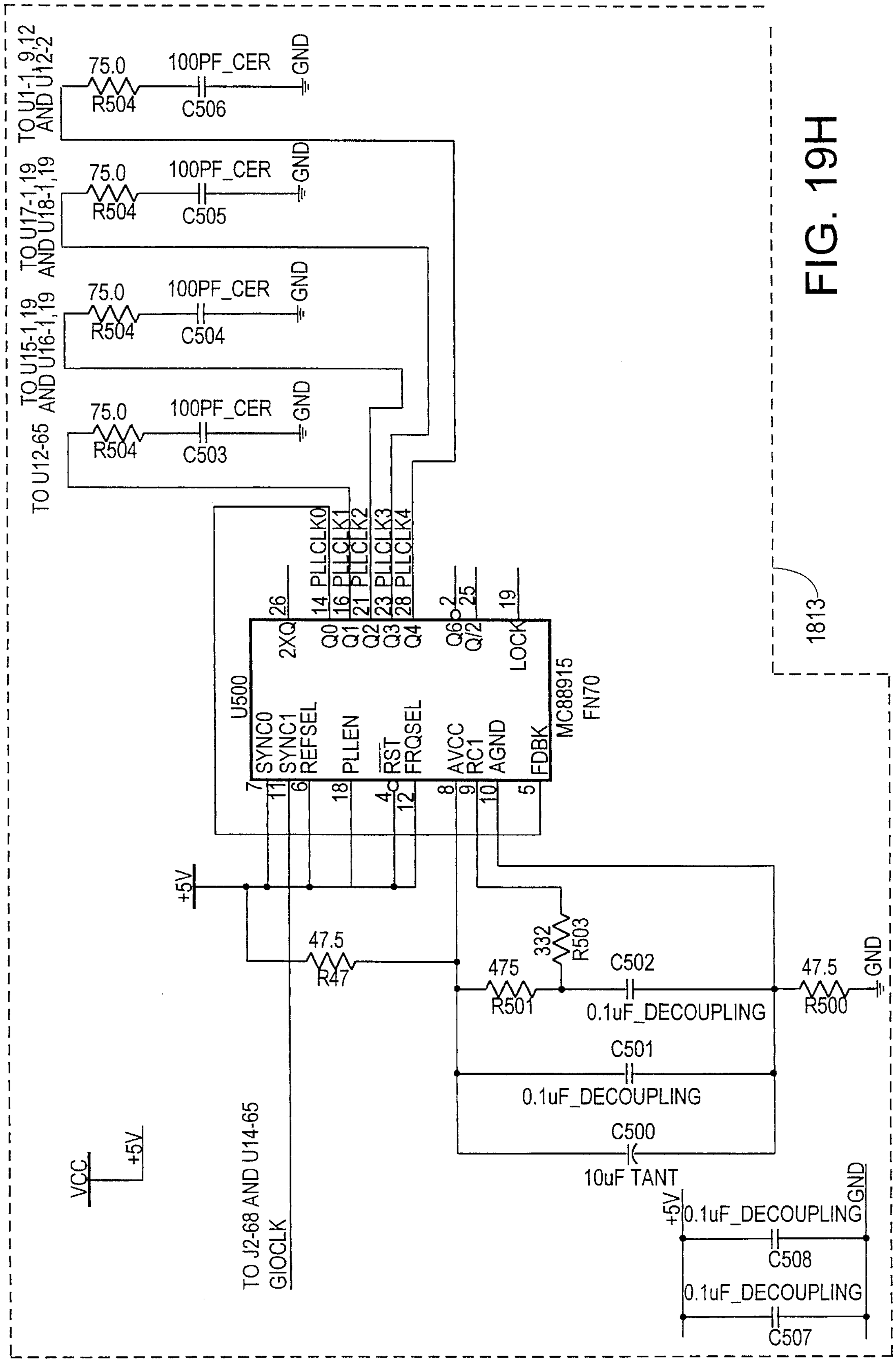

The data from I-latch 640, intensity memory 650 or Z-memory 651 is transmitted to termination resistor block 1807 on bus quarter address bus BQAD0–31. Termination resistor block 1807 includes series resistors R0–R49 which act to maintain the integrity of the high speed data which is transferred through termination resistor block 1807 (FIGS. 19*e*–19*f*). Termination resistor block 1807 also includes connector J1 (FIG. 19*f*) which is connected to connector J3 (FIG. 16). Data is transferred between termination resistor block 1807 and transceiver block 1805 on bus EXAD0–31. Transceiver block 1805 includes transceivers U4–U7, which are available from IDT as part number 74FCT245AT (FIG. 19*d*). Transceiver block 1805 provides drive capablity and transmits data to bus BAD0–31.

To perform a download, the addresses and byte counts previously stored in address fifo 1803 are used to perform direct memory access (DMA) of the data transmitted through termination resistor block 1807 and transceiver block 1805.

Bus quarter 604 also includes buffer block 1809 (FIG. 19*d*) which provides control signals to the output fifo 656 and status sugnals to various elements of SDP 426. In addition, bus quarter 604 includes buffer block 1813 (FIG. 19*h*) which serves as a 0-delay clock buffer to various elements of SDP 426. Bus quarter 604 also includes power supplies 1811 as illustrated in FIG. 19*g*.

In addition to facilitating a download of information from the SDP 426 to the host work station 420, bus quarter 604 also allows information to be communicated from the host work station 420 to the various elements of SDP 426.

Appendix A sets forth the complete control microcode used to control SDP 426.

While the present invention has been described with respect to several embodiments, the present invention is capable of numerous rearrangements and modifications which would be apparent to one of ordinary skill in the art. Accordingly, it is intended that the present invention be limited only by the claims set forth below.

APPENDIX

Master Document List
Design and Manufacturing

Rev 01 PAL and PROM Checksums

Source files and JEDEC files have same name as device with .PDS and .JED extensions respectively SDPFG PALS and MACHs

| Name | Device Type | Stock # | Checksum | Reference |
|---|---|---|---|---|
| IFIFO | MACH210 | 000158 | 49EE | U126 |
| PFIFO | MACH220 | 000722 | 3657 | U122 |
| PFIFCTRL | MACH110 | 000156 | E490 | U123 |
| MEMCTRL | MACH220 | 000722 | 1DEE | U87 |
| WRTECTRL | MACH110 | 000156 | 32A1 | U99 |
| PROMCTRL | PAL22V10 | 000701 | 978A | U104 |
| ZLATCH | MACH130 | 000157 | B864 | U68 |
| ERROR | MACH130 | 000157 | 307F | U67 |
| VIDEO | MACH220 | 000722 | 6691 | U74 |
| EXTMACH | MACH120 | 000721 | C29A | U88 |
| GRPHCTRL | MACH220 | 000722 | 323A | U75 |
| COMPARE | PAL22V10 | 000701 | 9140 | U78,80,90,93 |

SDPFG PROMs

| Name | Device Type | Stock # | Checksum | Reference |
|---|---|---|---|---|
| HIPROM | CY7C245A | 000714 | 00039C51 | U107 |
| IMPROM | CY7C245A | 000714 | 0003316F | U106 |
| LOPROM | CY7C245A | 000714 | 00002821 | U105 |

SDPIB MACHs

| Name | Device Type | Stock # | Checksum | Reference |
|---|---|---|---|---|
| ADDECODR | MACH130 | 000157 | 6B4F | U14 |
| ADBCMACH | MACH230 | 000685 | 8BF3 | U13 |
| BUSSTATE | MACH230 | 000685 | 712E | U12 |

```
TITLE      VIDEO QUARTER CONTROLLER

CHIP  VIDEO  MACH220

PIN   50   DACCLK                    ; CLOCK INPUT
PIN   49   HDRIVE                    ; CLOCK INPUT
PIN   16  /VQRESET                   ; INPUT
PIN   15   VDRIVE                    ; INPUT
PIN   54   RESDATA                   ; INPUT
PIN   51  /DPEQLO                    ; INPUT
PIN   20  /DPEQHI                    ; INPUT
PIN   17  /DLEQLO                    ; INPUT
PIN   58  /DLEQHI                    ; INPUT
PIN   60   DISPLAY                   ; INPUT
PIN   59   DISPZ                     ; INPUT
PIN    5   DPIX00      REGISTERED ; OUTPUT
PIN    2   DPIX01      REGISTERED ; OUTPUT
PIN    4   DPIX02      REGISTERED ; OUTPUT
PIN    6   DPIX03      REGISTERED ; OUTPUT
PIN   10   DPIX04      REGISTERED ; OUTPUT
PIN   14   DPIX05      REGISTERED ; OUTPUT
PIN   13   DPIX06      REGISTERED ; OUTPUT
PIN   12   DPIX07      REGISTERED ; OUTPUT
PIN   11   DPIX08      REGISTERED ; OUTPUT
NODE  31   DLIN00      REGISTERED ; DLIN00 output not required
NODE  34   DLIN01      REGISTERED ; DLIN01 output not required
PIN   21   DLIN02      REGISTERED ; OUTPUT
PIN   22   DLIN03      REGISTERED ; OUTPUT
PIN   23   DLIN04      REGISTERED ; OUTPUT
PIN   32   DLIN05      REGISTERED ; OUTPUT
PIN   31   DLIN06      REGISTERED ; OUTPUT
PIN   30   DLIN07      REGISTERED ; OUTPUT
PIN   29   DLIN08      REGISTERED ; OUTPUT
PIN   28   DLIN09      REGISTERED ; OUTPUT
PIN   33   DLIN10      REGISTERED ; OUTPUT
PIN   36   MAD00       REGISTERED ; OUTPUT
PIN   37   MAD01       REGISTERED ; OUTPUT
PIN   38   MAD02       REGISTERED ; OUTPUT
PIN   39   MAD03       REGISTERED ; OUTPUT
PIN   48   MAD04       REGISTERED ; OUTPUT
PIN   47   MAD05       REGISTERED ; OUTPUT
PIN   46   MAD06       REGISTERED ; OUTPUT
PIN   45   MAD07       REGISTERED ; OUTPUT
PIN   44   MAD08       REGISTERED ; OUTPUT
PIN   56   LSYNCLO     REGISTERED ; OUTPUT
PIN   55   LSYNCHI     REGISTERED ; OUTPUT
PIN   64   VLINREQ     REGISTERED ; OUTPUT
PIN   57   VDCLKEN     REGISTERED ; OUTPUT
PIN   65  /IMEMSE      REGISTERED ; OUTPUT
PIN   63  /ZMEMSE      REGISTERED ; OUTPUT
PIN   66  /GMEMSE      REGISTERED ; OUTPUT
PIN   67   HIRES       REGISTERED ; OUTPUT
NODE  11   WLIN        REGISTERED ; Display on Image Window Line 1 to n-1
NODE   9   WLINLST     REGISTERED ; Display on Image Window Line n
```

```
NODE  83   WPIXLST    REGISTERED ; Display on Image Window Pixel n

GROUP   MACH_SEG_A   DPIX00  DPIX01  DPIX02  DPIX03
GROUP   MACH_SEG_B   DPIX04  DPIX05  DPIX06  DPIX07  DPIX08
GROUP   MACH_SEG_C   DLIN00  DLIN01  DLIN02  DLIN03  DLIN04
GROUP   MACH_SEG_D   DLIN05  DLIN06  DLIN07  DLIN08  DLIN09  DLIN10
GROUP   MACH_SEG_E   MAD00   MAD01   MAD02   MAD03
GROUP   MACH_SEG_F   MAD04   MAD05   MAD06   MAD07   MAD08
GROUP   MACH_SEG_G   LSYNCLO LSYNCHI
GROUP   MACH_SEG_H   IMEMSE  ZMEMSE  GMEMSE

STRING  DPIX_279   '( DPIX08 * /DPIX07 * /DPIX06 * /DPIX05 *  DPIX04 *
                     /DPIX03 *  DPIX02 *  DPIX01 *  DPIX00)'; LORES Last Line
                                                            ; Pixel (DPIXLST)
STRING  DPIX_331   '( DPIX08 * /DPIX07 *  DPIX06 * /DPIX05 * /DPIX04 *
                      DPIX03 * /DPIX02 *  DPIX01 *  DPIX00)'; HIRES Last Line
                                                            ; Pixel (DPIXLST)
STRING  DPIX_481   '( DPIX08 *  DPIX07 *  DPIX06 *  DPIX05 * /DPIX04 *
                     /DPIX03 * /DPIX02 * /DPIX01 *  DPIX00)'; LORES End Line
                                                            ; Sync
STRING  DPIX_453   '( DPIX08 *  DPIX07 *  DPIX06 * /DPIX05 * /DPIX04 *
                     /DPIX03 *  DPIX02 * /DPIX01 *  DPIX00)'; HIRES End Line
                                                            ; Sync
STRING  DLIN_3     '( DLIN01 *  DLIN00)'; Last Display Line in 4-Line Group

EQUATIONS

HIRES.T       =    /VQRESET *  RESDATA * /HIRES
                 + /VQRESET * /RESDATA *  HIRES
                 +  VQRESET *  HIRES
HIRES.CLKF    =     HDRIVE
HIRES.RSTF    =     GND
HIRES.SETF    =     GND

DPIX00.T      =    /VQRESET * /HIRES * /DPIX_279
                 + /VQRESET * /HIRES *  DPIX_279 *  DPIX00
                 + /VQRESET *  HIRES * /DPIX_331
                 + /VQRESET *  HIRES *  DPIX_331 *  DPIX00
                 +  VQRESET *  DPIX00
DPIX00.CLKF   =     DACCLK
DPIX00.RSTF   =     GND
DPIX00.SETF   =     GND

DPIX01.T      =    /VQRESET * /HIRES * /DPIX_279 *  DPIX00
                 + /VQRESET * /HIRES *  DPIX_279 * /DPIX01
                 + /VQRESET *  HIRES * /DPIX_331 *  DPIX00
                 + /VQRESET *  HIRES *  DPIX_331 *  DPIX01
                 +  VQRESET *  DPIX01
DPIX01.CLKF   =     DACCLK
DPIX01.RSTF   =     GND
DPIX01.SETF   =     GND

DPIX02.T      =    /VQRESET * /HIRES * /DPIX_279 *  DPIX01 *  DPIX00
                 + /VQRESET * /HIRES *  DPIX_279 * /DPIX02
                 + /VQRESET *  HIRES * /DPIX_331 *  DPIX01 *  DPIX00
                 + /VQRESET *  HIRES *  DPIX_331 *  DPIX02
                 +  VQRESET *  DPIX02
DPIX02.CLKF   =     DACCLK
DPIX02.RSTF   =     GND
```

```
DPIX02.SETF  =   GND

DPIX03.T     =   /VQRESET * /HIRES * /DPIX_279 *  DPIX02 *  DPIX01 *  DPIX00
               + /VQRESET * /HIRES *  DPIX_279 * /DPIX03
               + /VQRESET *  HIRES * /DPIX_331 *  DPIX02 *  DPIX01 *  DPIX00
               + /VQRESET *  HIRES *  DPIX_331 * /DPIX03
               +  VQRESET *  DPIX03
DPIX03.CLKF  =   DACCLK
DPIX03.RSTF  =   GND
DPIX03.SETF  =   GND

DPIX04.T     =   /VQRESET * /HIRES * /DPIX_279 *  DPIX03 *  DPIX02 *  DPIX01
                          *  DPIX00
               + /VQRESET * /HIRES *  DPIX_279 *  DPIX04
               + /VQRESET *  HIRES * /DPIX_331 *  DPIX03 *  DPIX02 *  DPIX01
                          *  DPIX00
               + /VQRESET *  HIRES *  DPIX_331 *  DPIX04
               +  VQRESET *  DPIX04
DPIX04.CLKF  =   DACCLK
DPIX04.RSTF  =   GND
DPIX04.SETF  =   GND

DPIX05.T     =   /VQRESET * /HIRES * /DPIX_279 *  DPIX04 *  DPIX03 *  DPIX02
                          *  DPIX01 *  DPIX00
               + /VQRESET * /HIRES *  DPIX_279 *  DPIX05
               + /VQRESET *  HIRES * /DPIX_331 *  DPIX04 *  DPIX03 *  DPIX02
                          *  DPIX01 *  DPIX00
               + /VQRESET *  HIRES *  DPIX_331 * /DPIX05
               +  VQRESET *  DPIX05
DPIX05.CLKF  =   DACCLK
DPIX05.RSTF  =   GND
DPIX05.SETF  =   GND

DPIX06.T     =   /VQRESET * /HIRES * /DPIX_279 *  DPIX05 *  DPIX04 *  DPIX03
                          *  DPIX02 *  DPIX01 *  DPIX00
               + /VQRESET * /HIRES *  DPIX_279 * /DPIX06
               + /VQRESET *  HIRES * /DPIX_331 *  DPIX05 *  DPIX04 *  DPIX03
                          *  DPIX02 *  DPIX01 *  DPIX00
               + /VQRESET *  HIRES *  DPIX_331 *  DPIX06
               +  VQRESET *  DPIX06
DPIX06.CLKF  =   DACCLK
DPIX06.RSTF  =   GND
DPIX06.SETF  =   GND

DPIX07.T     =   /VQRESET * /HIRES * /DPIX_279 *  DPIX06 *  DPIX05 *  DPIX04
                          *  DPIX03 *  DPIX02 *  DPIX01 *  DPIX00
               + /VQRESET * /HIRES *  DPIX_279 * /DPIX07
               + /VQRESET *  HIRES * /DPIX_331 *  DPIX06 *  DPIX05 *  DPIX04
                          *  DPIX03 *  DPIX02 *  DPIX01 *  DPIX00
               + /VQRESET *  HIRES *  DPIX_331 * /DPIX07
               +  VQRESET *  DPIX07
DPIX07.CLKF  =   DACCLK
DPIX07.RSTF  =   GND
DPIX07.SETF  =   GND

DPIX08.T     =   /VQRESET * /HIRES * /DPIX_279 *  DPIX07 *  DPIX06 *  DPIX05
                          *  DPIX04 *  DPIX03 *  DPIX02 *  DPIX01 *  DPIX00
               + /VQRESET * /HIRES *  DPIX_279 * /DPIX08
               + /VQRESET *  HIRES * /DPIX_331 *  DPIX07 *  DPIX06 *  DPIX05
                          *  DPIX04 *  DPIX03 *  DPIX02 *  DPIX01 *  DPIX00
```

```
                  + /VQRESET *  HIRES *  DPIX_331 * /DPIX08
                  +  VQRESET *  DPIX08
DPIX08.CLKF   =     DACCLK
DPIX08.RSTF   =     GND
DPIX08.SETF   =     GND

DLIN00.T      =    /VQRESET * /HIRES * /VDRIVE *  DPIX_279
                  + /VQRESET * /HIRES *  VDRIVE *  DPIX_279 * /DLIN00
                  + /VQRESET *  HIRES * /VDRIVE *  DPIX_331
                  + /VQRESET *  HIRES *  VDRIVE *  DPIX_331 * /DLIN00
                  +  VQRESET *  DLIN00
DLIN00.CLKF   =     DACCLK
DLIN00.RSTF   =     GND
DLIN00.SETF   =     GND

DLIN01.T      =    /VQRESET * /HIRES * /VDRIVE *  DPIX_279 *  DLIN00
                  + /VQRESET * /HIRES *  VDRIVE *  DPIX_279 *  DLIN01
                  + /VQRESET *  HIRES * /VDRIVE *  DPIX_331 *  DLIN00
                  + /VQRESET *  HIRES *  VDRIVE *  DPIX_331 *  DLIN01
                  +  VQRESET *  DLIN01
DLIN01.CLKF   =     DACCLK
DLIN01.RSTF   =     GND
DLIN01.SETF   =     GND

DLIN02.T      =    /VQRESET * /HIRES * /VDRIVE *  DPIX_279 *  DLIN01 *  DLIN00
                  + /VQRESET * /HIRES *  VDRIVE *  DPIX_279 * /DLIN02
                  + /VQRESET *  HIRES * /VDRIVE *  DPIX_331 *  DLIN01 *  DLIN00
                  + /VQRESET *  HIRES *  VDRIVE *  DPIX_331 *  DLIN02
                  +  VQRESET *  DLIN02
DLIN02.CLKF   =     DACCLK
DLIN02.RSTF   =     GND
DLIN02.SETF   =     GND

DLIN03.T      =    /VQRESET * /HIRES * /VDRIVE *  DPIX_279 *  DLIN02 *  DLIN01
                             *  DLIN00
                  + /VQRESET * /HIRES *  VDRIVE *  DPIX_279 * /DLIN03
                  + /VQRESET *  HIRES * /VDRIVE *  DPIX_331 *  DLIN02 *  DLIN01
                             *  DLIN00
                  + /VQRESET *  HIRES *  VDRIVE *  DPIX_331 *  DLIN03
                  +  VQRESET *  DLIN03
DLIN03.CLKF   =     DACCLK
DLIN03.RSTF   =     GND
DLIN03.SETF   =     GND

DLIN04.T      =    /VQRESET * /HIRES * /VDRIVE *  DPIX_279 *  DLIN03 *  DLIN02
                             *  DLIN01 *  DLIN00
                  + /VQRESET * /HIRES *  VDRIVE *  DPIX_279 * /DLIN04
                  + /VQRESET *  HIRES * /VDRIVE *  DPIX_331 *  DLIN03 *  DLIN02
                             *  DLIN01 *  DLIN00
                  + /VQRESET *  HIRES *  VDRIVE *  DPIX_331 *  DLIN04
                  +  VQRESET *  DLIN04
DLIN04.CLKF   =     DACCLK
DLIN04.RSTF   =     GND
DLIN04.SETF   =     GND

DLIN05.T      =    /VQRESET * /HIRES * /VDRIVE *  DPIX_279 *  DLIN04 *  DLIN03
                             *  DLIN02 *  DLIN01 *  DLIN00
                  + /VQRESET * /HIRES *  VDRIVE *  DPIX_279 *  DLIN05
                  + /VQRESET *  HIRES * /VDRIVE *  DPIX_331 *  DLIN04 *  DLIN03
                             *  DLIN02 *  DLIN01 *  DLIN00
```

```
              + /VQRESET *  HIRES *  VDRIVE *  DPIX_331 * /DLIN05
              +  VQRESET *  DLIN05
DLIN05.CLKF  =   DACCLK
DLIN05.RSTF  =   GND
DLIN05.SETF  =   GND

DLIN06.T     =   /VQRESET * /HIRES * /VDRIVE *  DPIX_279 *  DLIN05 *  DLIN04
                          *  DLIN03 *  DLIN02 *  DLIN01 *  DLIN00
              + /VQRESET * /HIRES *  VDRIVE *  DPIX_279 * /DLIN06
              + /VQRESET *  HIRES * /VDRIVE *  DPIX_331 *  DLIN05 *  DLIN04
                          *  DLIN03 *  DLIN02 *  DLIN01 *  DLIN00
              + /VQRESET *  HIRES *  VDRIVE *  DPIX_331 * /DLIN06
              +  VQRESET *  DLIN06
DLIN06.CLKF  =   DACCLK
DLIN06.RSTF  =   GND
DLIN06.SETF  =   GND

DLIN07.T     =   /VQRESET * /HIRES * /VDRIVE *  DPIX_279 *  DLIN06 *  DLIN05
                          *  DLIN04 *  DLIN03 *  DLIN02 *  DLIN01 *  DLIN00
              + /VQRESET * /HIRES *  VDRIVE *  DPIX_279 * /DLIN07
              + /VQRESET *  HIRES * /VDRIVE *  DPIX_331 *  DLIN06 *  DLIN05
                          *  DLIN04 *  DLIN03 *  DLIN02 *  DLIN01 *  DLIN00
              + /VQRESET *  HIRES *  VDRIVE *  DPIX_331 * /DLIN07
              +  VQRESET *  DLIN07
DLIN07.CLKF  =   DACCLK
DLIN07.RSTF  =   GND
DLIN07.SETF  =   GND

DLIN08.T     =   /VQRESET * /HIRES * /VDRIVE *  DPIX_279 *  DLIN07 *  DLIN06
                          *  DLIN05 *  DLIN04 *  DLIN03 *  DLIN02 *  DLIN01
                          *  DLIN00
              + /VQRESET * /HIRES *  VDRIVE *  DPIX_279 * /DLIN08
              + /VQRESET *  HIRES * /VDRIVE *  DPIX_331 *  DLIN07 *  DLIN06
                          *  DLIN05 *  DLIN04 *  DLIN03 *  DLIN02 *  DLIN01
                          *  DLIN00
              + /VQRESET *  HIRES *  VDRIVE *  DPIX_331 * /DLIN08
              +  VQRESET *  DLIN08
DLIN08.CLKF  =   DACCLK
DLIN08.RSTF  =   GND
DLIN08.SETF  =   GND

DLIN09.T     =   /VQRESET * /HIRES * /VDRIVE *  DPIX_279 *  DLIN08 *  DLIN07
                          *  DLIN06 *  DLIN05 *  DLIN04 *  DLIN03 *  DLIN02
                          *  DLIN01 *  DLIN00
              + /VQRESET * /HIRES *  VDRIVE *  DPIX_279 * /DLIN09
              + /VQRESET *  HIRES * /VDRIVE *  DPIX_331 *  DLIN08 *  DLIN07
                          *  DLIN06 *  DLIN05 *  DLIN04 *  DLIN03 *  DLIN02
                          *  DLIN01 *  DLIN00
              + /VQRESET *  HIRES *  VDRIVE *  DPIX_331 * /DLIN09
              +  VQRESET *  DLIN09
DLIN09.CLKF  =   DACCLK
DLIN09.RSTF  =   GND
DLIN09.SETF  =   GND

DLIN10.T     =   /VQRESET * /HIRES * /VDRIVE *  DPIX_279 *  DLIN09 *  DLIN08
                          *  DLIN07 *  DLIN06 *  DLIN05 *  DLIN04 *  DLIN03
                          *  DLIN02 *  DLIN01 *  DLIN00
              + /VQRESET * /HIRES *  VDRIVE *  DPIX_279 * /DLIN10
              + /VQRESET *  HIRES * /VDRIVE *  DPIX_331 *  DLIN09 *  DLIN08
                          *  DLIN07 *  DLIN06 *  DLIN05 *  DLIN04 *  DLIN03
```

```
                       *  DLIN02 *  DLIN01 *  DLIN00
            + /VQRESET *  HIRES *  VDRIVE *  DPIX_331 * /DLIN10
            +  VQRESET *  DLIN10
DLIN10.CLKF  =   DACCLK
DLIN10.RSTF  =   GND
DLIN10.SETF  =   GND

LSYNCLO.T    =   /VQRESET * /HIRES *  DPIX_279 * /LSYNCLO
            + /VQRESET * /HIRES *  DPIX_481 *  LSYNCLO
            +  VQRESET *  LSYNCLO
LSYNCLO.CLKF =   DACCLK
LSYNCLO.RSTF =   GND
LSYNCLO.SETF =   GND

LSYNCHI.T    =   /VQRESET *  HIRES *  DPIX_331 * /LSYNCHI
            + /VQRESET *  HIRES *  DPIX_453 *  LSYNCHI
            +  VQRESET *  LSYNCHI
LSYNCHI.CLKF =   DACCLK
LSYNCHI.RSTF =   GND
LSYNCHI.SETF =   GND

MAD00.T      =    /VQRESET *  DPEQLO *  WLIN
            +  /VQRESET *  DPEQLO *  WLINLST * /DLIN_3
            +  /VQRESET *  DPEQLO *  WLINLST *  DLIN_3 *  MAD00
            +   VQRESET *  MAD00
MAD00.CLKF   =    DACCLK
MAD00.RSTF   =    GND
MAD00.SETF   =    GND

MAD01.T      =    /VQRESET *  DPEQLO *  WLIN *  MAD00
            +  /VQRESET *  DPEQLO *  WLINLST * /DLIN_3 *  MAD00
            +  /VQRESET *  DPEQLO *  WLINLST *  DLIN_3 *  MAD01
            +   VQRESET *  MAD01
MAD01.CLKF   =    DACCLK
MAD01.RSTF   =    GND
MAD01.SETF   =    GND

MAD02.T      =    /VQRESET *  DPEQLO *  WLIN *  MAD01 *  MAD00
            +  /VQRESET *  DPEQLO *  WLINLST * /DLIN_3 *  MAD01 *  MAD00
            +  /VQRESET *  DPEQLO *  WLINLST *  DLIN_3 *  MAD02
            +   VQRESET *  MAD02
MAD02.CLKF   =    DACCLK
MAD02.RSTF   =    GND
MAD02.SETF   =    GND

MAD03.T      =    /VQRESET *  DPEQLO *  WLIN *  MAD02 *  MAD01 *  MAD00
            +  /VQRESET *  DPEQLO *  WLINLST * /DLIN_3 *  MAD02 *  MAD01
                   *  MAD00
            +  /VQRESET *  DPEQLO *  WLINLST *  DLIN_3 *  MAD03
            +   VQRESET *  MAD03
MAD03.CLKF   =    DACCLK
MAD03.RSTF   =    GND
MAD03.SETF   =    GND

MAD04.T      =    /VQRESET *  DPEQLO *  WLIN *  MAD03 *  MAD02 *  MAD01
                         *  MAD00
            +  /VQRESET *  DPEQLO *  WLINLST * /DLIN_3 *  MAD03 *  MAD02
                   *  MAD01 *  MAD00
            +  /VQRESET *  DPEQLO *  WLINLST *  DLIN_3 *  MAD04
            +   VQRESET *  MAD04
```

```
MAD04.CLKF    =    DACCLK
MAD04.RSTF    =    GND
MAD04.SETF    =    GND

MAD05.T       =    /VQRESET *  DPEQLO *  WLIN *  MAD04 *  MAD03 *  MAD02
                             *  MAD01 *  MAD00
                +  /VQRESET *  DPEQLO *  WLINLST * /DLIN_3 *  MAD04 *  MAD03
                        *  MAD02 *  MAD01 *  MAD00
                +  /VQRESET *  DPEQLO *  WLINLST *  DLIN_3 *  MAD05
                +   VQRESET *  MAD05
MAD05.CLKF    =    DACCLK
MAD05.RSTF    =    GND
MAD05.SETF    =    GND

MAD06.T       =    /VQRESET *  DPEQLO *  WLIN *  MAD05 *  MAD04 *  MAD03
                             *  MAD02 *  MAD01 *  MAD00
                +  /VQRESET *  DPEQLO *  WLINLST * /DLIN_3 *  MAD05 *  MAD04
                        *  MAD03 *  MAD02 *  MAD01 *  MAD00
                +  /VQRESET *  DPEQLO *  WLINLST *  DLIN_3 *  MAD06
                +   VQRESET *  MAD06
MAD06.CLKF    =    DACCLK
MAD06.RSTF    =    GND
MAD06.SETF    =    GND

MAD07.T       =    /VQRESET *  DPEQLO *  WLIN *  MAD06 *  MAD05 *  MAD04
                             *  MAD03 *  MAD02 *  MAD01 *  MAD00
                +  /VQRESET *  DPEQLO *  WLINLST * /DLIN_3 *  MAD06 *  MAD05
                        *  MAD04 *  MAD03 *  MAD02 *  MAD01 *  MAD00
                +  /VQRESET *  DPEQLO *  WLINLST *  DLIN_3 *  MAD07
                +   VQRESET *  MAD07
MAD07.CLKF    =    DACCLK
MAD07.RSTF    =    GND
MAD07.SETF    =    GND

MAD08.T       =    /VQRESET *  DPEQLO *  WLIN *  MAD07 *  MAD06 *  MAD05
                             *  MAD04 *  MAD03 *  MAD02 *  MAD01 *  MAD00
                +  /VQRESET *  DPEQLO *  WLINLST * /DLIN_3 *  MAD07 *  MAD06
                        *  MAD05 *  MAD04 *  MAD03 *  MAD02 *  MAD01 *  MAD00
                +  /VQRESET *  DPEQLO *  WLINLST *  DLIN_3 *  MAD08
                +   VQRESET *  MAD08
MAD08.CLKF    =    DACCLK
MAD08.RSTF    =    GND
MAD08.SETF    =    GND

WLIN.T        =    /VQRESET * /HIRES *  DPIX_279 *  DLEQLO *  DLIN01 *  DLIN00
                                                 * /WLIN
                +  /VQRESET * /HIRES *  DPIX_279 *  DLEQHI *  DLIN01 *  DLIN00
                                                 *  WLIN
                +  /VQRESET *  HIRES *  DPIX_331 *  DLEQLO *  DLIN01 *  DLIN00
                                                 * /WLIN
                +  /VQRESET *  HIRES *  DPIX_331 *  DLEQHI *  DLIN01 *  DLIN00
                                                 *  WLIN

                +   VQRESET *  WLIN
WLIN.CLKF     =    DACCLK
WLIN.RSTF     =    GND
WLIN.SETF     =    GND

WLINLST.T     =    /VQRESET * /HIRES *  DPIX_279 *  DLEQHI *  DLIN01 *  DLIN00
                                                 * /WLINLST
                +  /VQRESET * /HIRES *  DPIX_279 * /DLEQHI *  DLIN01 *  DLIN00
```

```
                                                                 * WLINLST
                 + /VQRESET *  HIRES *  DPIX_331 * DLEQHI *  DLIN01 *  DLIN00
                                                                 * /WLINLST
                 + /VQRESET *  HIRES *  DPIX_331 * /DLEQHI * DLIN01 *  DLIN00
                                                                 * WLINLST
                 +  VQRESET *  WLINLST
WLINLST.CLKF =      DACCLK
WLINLST.RSTF =      GND
WLINLST.SETF =      GND

WPIXLST.T    =     /VQRESET *  DPEQHI *  WLIN    * /WPIXLST
                 + /VQRESET *  DPEQHI *  WLINLST * /WPIXLST
                 + /VQRESET * /DPEQHI *  WPIXLST
                 +  VQRESET *  WPIXLST
WPIXLST.CLKF =      DACCLK
WPIXLST.RSTF =      GND
WPIXLST.SETF =      GND

VLINREQ.T    =     /VQRESET *  DPEQHI *  WLIN    * /VLINREQ
                 + /VQRESET *  DPEQHI *  WLINLST * /VLINREQ
                 + /VQRESET *  DPEQLO *  VLINREQ
                 +  VQRESET *  VLINREQ
VLINREQ.CLKF =      DACCLK
VLINREQ.RSTF =      GND
VLINREQ.SETF =      GND

VDCLKEN.T    =     /VQRESET *  DPEQLO  *  WLIN    * /VDCLKEN
                 + /VQRESET *  DPEQLO  *  WLINLST * /VDCLKEN
                 + /VQRESET *  WPIXLST *  VDCLKEN
                 +  VQRESET *  VDCLKEN
VDCLKEN.CLKF =      DACCLK
VDCLKEN.RSTF =      GND
VDCLKEN.SETF =      GND

IMEMSE.T     =     /VQRESET *  VDCLKEN *  DISPLAY * /DISPZ * /IMEMSE
                 + /VQRESET * /VDCLKEN *  IMEMSE
                 +  VQRESET *  IMEMSE
IMEMSE.CLKF  =      DACCLK
IMEMSE.RSTF  =      GND
IMEMSE.SETF  =      GND

ZMEMSE.T     =     /VQRESET *  VDCLKEN *  DISPLAY *  DISPZ * /ZMEMSE
                 + /VQRESET * /VDCLKEN *  ZMEMSE
                 +  VQRESET *  ZMEMSE
ZMEMSE.CLKF  =      DACCLK
ZMEMSE.RSTF  =      GND
ZMEMSE.SETF  =      GND

GMEMSE.T     =     /VQRESET *  VDCLKEN *  DISPLAY * /GMEMSE
                 + /VQRESET * /VDCLKEN *  GMEMSE
                 +  VQRESET *  GMEMSE
GMEMSE.CLKF  =      DACCLK
GMEMSE.RSTF  =      GND
GMEMSE.SETF  =      GND
```

```
;PALASM Design Description

;---------------------------------- Declaration Segment ------------
TITLE    Error engine - holding device, zeroes error interrupt



CHIP  ERROR MACH130

;----------------------------------- PIN Declarations ---------------
PIN 3,9,14,15,67,66,78,79 PFIF0[0..7] ; INPUT
PIN 16,17,19,68,49,50,51,52 PFIF1[0..7] ; INPUT
PIN 69,77,76,75,54,55,56,57 PFIF2[0..7] ; INPUT
PIN 73,72,71,70,58,59,60,61 PFIF3[0..7] ; INPUT
PIN 62 PFIFS0 ; INPUT
PIN 4  PFIFS1 ; INPUT
PIN 5  PFIFS2 ; INPUT
PIN 6  PFIFS3 ; INPUT
PIN 40 F0F1 ; INPUT
PIN 39 F0F2 ; INPUT
PIN 36 F1F1 ; INPUT
PIN 34 F1F2 ; INPUT
PIN 33 F2F1 ; INPUT
PIN 31 F2F2 ; INPUT
PIN 30 F3F1 ; INPUT
PIN 29 F3F2 ; INPUT
PIN 65 SDPCK ; INPUT
PIN 23 /MQRESET ; INPUT
PIN 82 ERRINT COMB ; OUTPUT
PIN 35 DNLDEN ; INPUT
PIN 7  CYCTOG ; INPUT
PIN 83 /GRAB ; INPUT
PIN 28 /GRABING ; INPUT
PIN 8  /OFIF0EF ; INPUT
PIN 10 /OFIF0PA ; INPUT
PIN 13 /OFIF0HF ; INPUT
PIN 38,37,25,24,45,46,47,48,81,18,80 BQAD[5..15] REGISTERED ; OUTPUT
PIN 41 /EXRD ; INPUT
PIN 20 /ENAD009 ; INPUT
NODE ? ERRBIT10 REGISTERED
NODE ? DISABLE COMBINATORIAL
;----------------------------------- Boolean Equation Segment ------
;
; Error bits must latch when an error is detected. Reset
; is by toggling MQRESET only.
;
;
;

STRING OFIFOVFLOW       '(/OFIF0EF * /OFIF0PA * /OFIF0HF)'
STRING ERRBIT0          'BQAD[5]'
STRING ERRBIT1          'BQAD[6]'
STRING ERRBIT2          'BQAD[7]'
STRING ERRBIT3          'BQAD[8]'
STRING ERRBIT4          'BQAD[9]'
```

```
STRING ERRBIT5        'BQAD[10]'
STRING ERRBIT6        'BQAD[11]'
STRING ERRBIT7        'BQAD[12]'
STRING ERRBIT8        'BQAD[13]'
STRING ERRBIT9        'BQAD[14]'
STRING ERRBIT11       'BQAD[15]'

EQUATIONS

DISABLE = GND


BQAD[5..15].CLKF = SDPCK
BQAD[5..15].RSTF = MQRESET
BQAD[5..15].SETF = GND
BQAD[5..15].TRST = DISABLE

ERRBIT10.CLKF = SDPCK
ERRBIT10.RSTF = MQRESET
ERRBIT10.SETF = GND


ERRINT.TRST = VCC

; ERRBIT[0..7] - error if any two bits differ when synch is high

/ERRBIT0 =  /ERRBIT0 * PFIFS0 *   PFIF0[0] *  PFIF1[0] *  PFIF2[0] *  PFIF3[0]
          +  /ERRBIT0 * PFIFS0 * /(PFIF0[0] + PFIF1[0] + PFIF2[0] + PFIF3[0])
          +  /ERRBIT0 * /PFIFS0

/ERRBIT1 =  /ERRBIT1 * PFIFS0 *   PFIF0[1] *  PFIF1[1] *  PFIF2[1] *  PFIF3[1]
          +  /ERRBIT1 * PFIFS0 * /(PFIF0[1] + PFIF1[1] + PFIF2[1] + PFIF3[1])
          +  /ERRBIT1 * /PFIFS0

/ERRBIT2 =  /ERRBIT2 * PFIFS0 *   PFIF0[2] *  PFIF1[2] *  PFIF2[2] *  PFIF3[2]
          +  /ERRBIT2 * PFIFS0 * /(PFIF0[2] + PFIF1[2] + PFIF2[2] + PFIF3[2])
          +  /ERRBIT2 * /PFIFS0

/ERRBIT3 =  /ERRBIT3 * PFIFS0 *   PFIF0[3] *  PFIF1[3] *  PFIF2[3] *  PFIF3[3]
          +  /ERRBIT3 * PFIFS0 * /(PFIF0[3] + PFIF1[3] + PFIF2[3] + PFIF3[3])
          +  /ERRBIT3 * /PFIFS0

/ERRBIT4 =  /ERRBIT4 * PFIFS0 *   PFIF0[4] *  PFIF1[4] *  PFIF2[4] *  PFIF3[4]
          +  /ERRBIT4 * PFIFS0 * /(PFIF0[4] + PFIF1[4] + PFIF2[4] + PFIF3[4])
          +  /ERRBIT4 * /PFIFS0

/ERRBIT5 =  /ERRBIT5 * PFIFS0 *   PFIF0[5] *  PFIF1[5] *  PFIF2[5] *  PFIF3[5]
          +  /ERRBIT5 * PFIFS0 * /(PFIF0[5] + PFIF1[5] + PFIF2[5] + PFIF3[5])
          +  /ERRBIT5 * /PFIFS0

/ERRBIT6 =  /ERRBIT6 * PFIFS0 *   PFIF0[6] *  PFIF1[6] *  PFIF2[6] *  PFIF3[6]
          +  /ERRBIT6 * PFIFS0 * /(PFIF0[6] + PFIF1[6] + PFIF2[6] + PFIF3[6])
          +  /ERRBIT6 * /PFIFS0

/ERRBIT7 =  /ERRBIT7 * PFIFS0 *   PFIF0[7] *  PFIF1[7] *  PFIF2[7] *  PFIF3[7]
          +  /ERRBIT7 * PFIFS0 * /(PFIF0[7] + PFIF1[7] + PFIF2[7] + PFIF3[7])
          +  /ERRBIT7 * /PFIFS0

; ERRBIT8 - no error as long as all four synch bits are the same
```

```
/ERRBIT8 =  /ERRBIT8 * PFIFS0 *  PFIFS1 *  PFIFS2 *  PFIFS3
         +  /ERRBIT8 * /PFIFS0 * /PFIFS1 * /PFIFS2 * /PFIFS3


; ERRBIT9 - test FIFO flags, FIFOs fill up in order, PFIFO first
; /F1 /F2 = EMPTY
;  F1 /F2 = ALMOST EMPTY
;  F1  F2 = ALMOST FULL
; /F1  F2 = FULL
; PFIFO full is an overflow condition.
; PFIFO overflow is an error during a GRAB cycle, ie when GRABING.
; As PFIFO is loaded first, it is only necessary to check the 0 device
; flags for overflow.
; Valid FIFO flag combinations are:

;       PFIF0F1 PFIF0F2 PFIF1F1 PFIF1F2 PFIF2F1 PFIF2F2 PFIF3F1 PFIF3F2
;          0       0       0       0       0       0       0       0
;          1       0       0       0       0       0       0       0
;          1       0       1       0       0       0       0       0
;          1       0       1       0       1       0       0       0
;          1       0       1       0       1       0       1       0
;          1       1       1       0       1       0       1       0
;          1       1       1       1       1       0       1       0
;          1       1       1       1       1       1       1       0
;          1       1       1       1       1       1       1       1
;

/ERRBIT9 = /ERRBIT9 * /F0F1 * /F0F2 * /F1F1 * /F1F2 * /F2F1 * /F2F2 * /F3F1 * /F
         +  /ERRBIT9 * F0F1 * /F0F2 * /F1F1 * /F1F2 * /F2F1 * /F2F2 * /F3F1 * /
         +  /ERRBIT9 * F0F1 * /F0F2 *  F1F1 * /F1F2 * /F2F1 * /F2F2 * /F3F1 * /
         +  /ERRBIT9 * F0F1 * /F0F2 *  F1F1 * /F1F2 *  F2F1 * /F2F2 * /F3F1 * /
         +  /ERRBIT9 * F0F1 * /F0F2 *  F1F1 * /F1F2 *  F2F1 * /F2F2 *  F3F1 * /
         +  /ERRBIT9 * F0F1 *  F0F2 *  F1F1 * /F1F2 *  F2F1 * /F2F2 *  F3F1 * /
         +  /ERRBIT9 * F0F1 *  F0F2 *  F1F1 *  F1F2 *  F2F1 * /F2F2 *  F3F1 * /
         +  /ERRBIT9 * F0F1 *  F0F2 *  F1F1 *  F1F2 *  F2F1 *  F2F2 *  F3F1 * /
         +  /ERRBIT9 * F0F1 *  F0F2 *  F1F1 *  F1F2 *  F2F1 *  F2F2 *  F3F1 *

ERRBIT10 = GRABING * F0F1 * F0F2
         + ERRBIT10

ERRBIT11 = /CYCTOG * OFIFOVFLOW     ; OUTPUT FIFO OVERFLOW. LATCHES ITSELF.
         + /CYCTOG * ERRBIT11       ; MQRESET BY EITHER TOGGLE

;ERRINT = ERRBIT0 + ERRBIT1 + ERRBIT2 + ERRBIT3 + ERRBIT4
;       + ERRBIT5 + ERRBIT6 + ERRBIT7 + ERRBIT8 + ERRBIT9
;       + (DNLDEN * /GRAB * ERRBIT10)
;       + ERRBIT11

ERRINT = GND

;---------------------------------- Simulation Segment ------------

SIMULATION
TRACE_ON SDPCK PFIF0[0] PFIF0[1] PFIF1[0] PFIF1[1] PFIF2[0]
        PFIF2[1] PFIF3[0] PFIF3[1] PFIFS0 PFIFS1 PFIFS2 PFIFS3

SETF /SDPCK PFIF0[0] PFIF0[1] PFIF1[0] PFIF1[1] PFIF2[0]
        PFIF2[1] PFIF3[0] PFIF3[1] PFIFS0 PFIFS1 PFIFS2 PFIFS3
```

```
CLOCKF SDPCK
CLOCKF SDPCK
CLOCKF SDPCK

SETF     /PFIF0[0] PFIF0[1] /PFIF1[0] PFIF1[1] /PFIF2[0]
         PFIF2[1] /PFIF3[0] PFIF3[1]
CLOCKF SDPCK
CLOCKF SDPCK
CLOCKF SDPCK
CLOCKF SDPCK

SETF     /PFIF0[0] /PFIF0[1] /PFIF1[0] /PFIF1[1] /PFIF2[0]
         /PFIF2[1] /PFIF3[0] /PFIF3[1]
CLOCKF SDPCK
CLOCKF SDPCK
CLOCKF SDPCK
CLOCKF SDPCK

SETF     PFIF0[0] /PFIF0[1] PFIF1[0] /PFIF1[1] PFIF2[0]
         /PFIF2[1] PFIF3[0] /PFIF3[1]
CLOCKF SDPCK
CLOCKF SDPCK
CLOCKF SDPCK
CLOCKF SDPCK

SETF     PFIF0[0] /PFIF0[1] PFIF1[0] /PFIF1[1] PFIF2[0]
         PFIF2[1] PFIF3[0] /PFIF3[1]

CLOCKF SDPCK
CLOCKF SDPCK
CLOCKF SDPCK
CLOCKF SDPCK
CLOCKF SDPCK
SETF /PFIFS2
CLOCKF SDPCK
CLOCKF SDPCK
CLOCKF SDPCK

TRACE_OFF SDPCK PFIF0[0] PFIF0[1] PFIF1[0] PFIF1[1] PFIF2[0]
         PFIF2[1] PFIF3[0] PFIF3[1] PFIFS0 PFIFS1 PFIFS2 PFIFS3

;-----------------------------------------------------------------
```

```
;PALASM Design Description

;---------------------------------- Declaration Segment ------------
TITLE    22V10 as a 9-bit comparator


CHIP  COMPARE  PAL22V10

;---------------------------------- PIN Declarations ---------------
PIN  1          P0                                    ; INPUT
PIN  2          P1                                    ; INPUT
PIN  3          P2                                    ; INPUT
PIN  4          P3                                    ; INPUT
PIN  5          P4                                    ; INPUT
PIN  6          P5                                    ; INPUT
PIN  7          P6                                    ; INPUT
PIN  8          P7                                    ; INPUT
PIN  9          P8                                    ; INPUT
PIN  10         Q0                                    ; INPUT
PIN  11         Q1                                    ; INPUT

PIN  19         Q2                                    ; INPUT
PIN  18         Q3                                    ; INPUT
PIN  17         Q4                                    ; INPUT
PIN  16         Q5                                    ; INPUT
PIN  15         Q6                                    ; INPUT
PIN  14         Q7                                    ; INPUT
PIN  13         Q8                                    ; INPUT

PIN  23         /EQUAL                  COMBINATORIAL ; OUTPUT
PIN  22         INT1                    COMBINATORIAL ; OUTPUT
PIN  21         INT2                    COMBINATORIAL ; OUTPUT
PIN  20         INT3                    COMBINATORIAL ; OUTPUT

;---------------------------------- Boolean Equation Segment ------
EQUATIONS

INT1  =  (P0 :*: Q0) * (P1 :*: Q1) * (P2 :*: Q2)
INT2  =  (P3 :*: Q3) * (P4 :*: Q4) * (P5 :*: Q5)
INT3  =  (P6 :*: Q6) * (P7 :*: Q7) * (P8 :*: Q8)

EQUAL =   INT1 * INT2 * INT3

;---------------------------------- Simulation Segment ------------
SIMULATION
SETF P0 P1 P2 P3 P4 P5 P6 P7 P8
SETF Q0 Q1 Q2 Q3 Q4 Q5 Q6 Q7 Q8

SETF /Q0 Q1 Q2 Q3 Q4 Q5 Q6 Q7 Q8
SETF /P0 P1 P2 P3 P4 P5 P6 P7 P8

SETF P0 /P1 P2 P3 P4 P5 P6 P7 P8
SETF Q0 /Q1 Q2 Q3 Q4 Q5 Q6 Q7 Q8

SETF P0 P1 /P2 P3 P4 P5 P6 P7 P8
```

```
SETF Q0 /Q1 /Q2 Q3 Q4 Q5 Q6 Q7 Q8

SETF P0 P1 P2 P3 P4 P5 P6 P7 P8
SETF Q0 Q1 Q2 /Q3 Q4 Q5 Q6 Q7 Q8
SETF P0 P1 P2 /P3 P4 P5 P6 P7 P8
SETF Q0 Q1 Q2 Q3 /Q4 Q5 Q6 Q7 Q8
SETF P0 P1 P2 P3 P4 /P5 P6 P7 P8
SETF Q0 Q1 Q2 Q3 Q4 Q5 Q6 Q7 Q8
SETF P0 P1 P2 P3 P4 P5 P6 P7 P8
SETF Q0 Q1 Q2 Q3 Q4 Q5 Q6 Q7 Q8


;--------------------------------------------------------------------
```

```
;PALASM Design Description

;---------------------------------- Declaration Segment ------------
TITLE    Z latch



CHIP  ZLATCH   MACH130

;---------------------------------- PIN Declarations ---------------
PIN 8, 34, 51, 75, 9, 33, 52, 66, 10, 24, 45, 81, 4, 38, 48, 78 ZNMDT[0..15] REG
PIN 6, 36, 50, 76, 3, 39, 47, 79, 5, 37, 49, 77, 7, 35, 46, 80 ZNMDT[16..31] REG
PIN 13, 25, 55, 67, 14, 31, 54, 73 ZCURR[0..7] REGISTERED ; OUTPUT
PIN 83, 82, 71, 69, 72, 70, 68, 56 PFIFO[0..7] ; INPUT
PIN 41 PFIFOS ; INPUT
PIN 65 SDPCK ; INPUT
PIN 23 MQGRABT ; INPUT
PIN 20 /MQRESET ; INPUT
PIN 12 FRA0 REGISTERED ; OUTPUT
PIN 62 /ZCNTOE ; INPUT

; Latch PFIFO[0..7] onto 4 bytes of ZNMDT when PFIFOS is high.
; /ZCNTOE enables ZNMDT outputs
; MQRESET and MQGRABT both reset everything
;
; FRA0 has a simple synchronous set/reset function. Set if MQGRABT. Reset
; when frame count goes to 1 (ZNMDT lsb changes).
; (FRA0 is used to force unconditional write of first frame when
; GRAB GRABVOL)
;

STRING RESET '(MQRESET + MQGRABT)'

;---------------------------------- Boolean Equation Segment ------
EQUATIONS

FRA0.CLKF = SDPCK
FRA0.RSTF = GND
FRA0.SETF = GND
FRA0.TRST = VCC


ZCURR[0..7].CLKF = SDPCK
ZCURR[0..7].RSTF = GND
ZCURR[0..7].SETF = GND
ZCURR[0..7].TRST = VCC

ZCURR[0].T =    /RESET * PFIFOS * /PFIFO[0] *  ZCURR[0]
              + /RESET * PFIFOS *  PFIFO[0] * /ZCURR[0]
              +  RESET * ZCURR[0]
ZCURR[1].T =    /RESET * PFIFOS * /PFIFO[1] *  ZCURR[1]
              + /RESET * PFIFOS *  PFIFO[1] * /ZCURR[1]
              +  RESET * ZCURR[1]
ZCURR[2].T =    /RESET * PFIFOS * /PFIFO[2] *  ZCURR[2]
              + /RESET * PFIFOS *  PFIFO[2] * /ZCURR[2]
              +  RESET * ZCURR[2]
ZCURR[3].T =    /RESET * PFIFOS * /PFIFO[3] *  ZCURR[3]
```

```
              + /RESET * PFIFOS *  PFIFO[3] * /ZCURR[3]
              +  RESET * ZCURR[3]
ZCURR[4].T =   /RESET * PFIFOS * /PFIFO[4] *  ZCURR[4]
              + /RESET * PFIFOS *  PFIFO[4] * /ZCURR[4]
              +  RESET * ZCURR[4]
ZCURR[5].T =   /RESET * PFIFOS * /PFIFO[5] *  ZCURR[5]
              + /RESET * PFIFOS *  PFIFO[5] * /ZCURR[5]
              +  RESET * ZCURR[5]
ZCURR[6].T =   /RESET * PFIFOS * /PFIFO[6] *  ZCURR[6]
              + /RESET * PFIFOS *  PFIFO[6] * /ZCURR[6]
              +  RESET * ZCURR[6]
ZCURR[7].T =   /RESET * PFIFOS * /PFIFO[7] *  ZCURR[7]
              + /RESET * PFIFOS *  PFIFO[7] * /ZCURR[7]
              +  RESET * ZCURR[7]


ZNMDT[0..31].CLKF = SDPCK
ZNMDT[0..31].RSTF = GND
ZNMDT[0..31].SETF = GND
ZNMDT[0..31].TRST = ZCNTOE

ZNMDT[0].T =   /RESET * PFIFOS * /PFIFO[0] *  ZNMDT[0]
              + /RESET * PFIFOS *  PFIFO[0] * /ZNMDT[0]
              +  RESET * ZNMDT[0]
ZNMDT[1].T =   /RESET * PFIFOS * /PFIFO[1] *  ZNMDT[1]
              + /RESET * PFIFOS *  PFIFO[1] * /ZNMDT[1]
              +  RESET * ZNMDT[1]
ZNMDT[2].T =   /RESET * PFIFOS * /PFIFO[2] *  ZNMDT[2]
              + /RESET * PFIFOS *  PFIFO[2] * /ZNMDT[2]
              +  RESET * ZNMDT[2]
ZNMDT[3].T =   /RESET * PFIFOS * /PFIFO[3] *  ZNMDT[3]
              + /RESET * PFIFOS *  PFIFO[3] * /ZNMDT[3]
              +  RESET * ZNMDT[3]
ZNMDT[4].T =   /RESET * PFIFOS * /PFIFO[4] *  ZNMDT[4]
              + /RESET * PFIFOS *  PFIFO[4] * /ZNMDT[4]
              +  RESET * ZNMDT[4]
ZNMDT[5].T =   /RESET * PFIFOS * /PFIFO[5] *  ZNMDT[5]
              + /RESET * PFIFOS *  PFIFO[5] * /ZNMDT[5]
              +  RESET * ZNMDT[5]
ZNMDT[6].T =   /RESET * PFIFOS * /PFIFO[6] *  ZNMDT[6]
              + /RESET * PFIFOS *  PFIFO[6] * /ZNMDT[6]
              +  RESET * ZNMDT[6]
ZNMDT[7].T =   /RESET * PFIFOS * /PFIFO[7] *  ZNMDT[7]
              + /RESET * PFIFOS *  PFIFO[7] * /ZNMDT[7]
              +  RESET * ZNMDT[7]
ZNMDT[8].T =   /RESET * PFIFOS * /PFIFO[0] *  ZNMDT[8]
              + /RESET * PFIFOS *  PFIFO[0] * /ZNMDT[8]
              +  RESET * ZNMDT[8]
ZNMDT[9].T =   /RESET * PFIFOS * /PFIFO[1] *  ZNMDT[9]
              + /RESET * PFIFOS *  PFIFO[1] * /ZNMDT[9]
              +  RESET * ZNMDT[9]
ZNMDT[10].T =   /RESET * PFIFOS * /PFIFO[2] *  ZNMDT[10]
              + /RESET * PFIFOS *  PFIFO[2] * /ZNMDT[10]
              +  RESET * ZNMDT[10]
ZNMDT[11].T =   /RESET * PFIFOS * /PFIFO[3] *  ZNMDT[11]
              + /RESET * PFIFOS *  PFIFO[3] * /ZNMDT[11]
              +  RESET * ZNMDT[11]
ZNMDT[12].T =   /RESET * PFIFOS * /PFIFO[4] *  ZNMDT[12]
```

```
              + /RESET * PFIFOS *  PFIFO[4] * /ZNMDT[12]
              +  RESET * ZNMDT[12]
ZNMDT[13].T =   /RESET * PFIFOS * /PFIFO[5] *  ZNMDT[13]
              + /RESET * PFIFOS *  PFIFO[5] * /ZNMDT[13]
              +  RESET * ZNMDT[13]
ZNMDT[14].T =   /RESET * PFIFOS * /PFIFO[6] *  ZNMDT[14]
              + /RESET * PFIFOS *  PFIFO[6] * /ZNMDT[14]
              +  RESET * ZNMDT[14]
ZNMDT[15].T =   /RESET * PFIFOS * /PFIFO[7] *  ZNMDT[15]
              + /RESET * PFIFOS *  PFIFO[7] * /ZNMDT[15]
              +  RESET * ZNMDT[15]
ZNMDT[16].T =   /RESET * PFIFOS * /PFIFO[0] *  ZNMDT[16]
              + /RESET * PFIFOS *  PFIFO[0] * /ZNMDT[16]
              +  RESET * ZNMDT[16]
ZNMDT[17].T =   /RESET * PFIFOS * /PFIFO[1] *  ZNMDT[17]
              + /RESET * PFIFOS *  PFIFO[1] * /ZNMDT[17]
              +  RESET * ZNMDT[17]
ZNMDT[18].T =   /RESET * PFIFOS * /PFIFO[2] *  ZNMDT[18]
              + /RESET * PFIFOS *  PFIFO[2] * /ZNMDT[18]
              +  RESET * ZNMDT[18]
ZNMDT[19].T =   /RESET * PFIFOS * /PFIFO[3] *  ZNMDT[19]
              + /RESET * PFIFOS *  PFIFO[3] * /ZNMDT[19]
              +  RESET * ZNMDT[19]
ZNMDT[20].T =   /RESET * PFIFOS * /PFIFO[4] *  ZNMDT[20]
              + /RESET * PFIFOS *  PFIFO[4] * /ZNMDT[20]
              +  RESET * ZNMDT[20]
ZNMDT[21].T =   /RESET * PFIFOS * /PFIFO[5] *  ZNMDT[21]
              + /RESET * PFIFOS *  PFIFO[5] * /ZNMDT[21]
              +  RESET * ZNMDT[21]
ZNMDT[22].T =   /RESET * PFIFOS * /PFIFO[6] *  ZNMDT[22]
              + /RESET * PFIFOS *  PFIFO[6] * /ZNMDT[22]
              +  RESET * ZNMDT[22]
ZNMDT[23].T =   /RESET * PFIFOS * /PFIFO[7] *  ZNMDT[23]
              + /RESET * PFIFOS *  PFIFO[7] * /ZNMDT[23]
              +  RESET * ZNMDT[23]
ZNMDT[24].T =   /RESET * PFIFOS * /PFIFO[0] *  ZNMDT[24]
              + /RESET * PFIFOS *  PFIFO[0] * /ZNMDT[24]
              +  RESET * ZNMDT[24]
ZNMDT[25].T =   /RESET * PFIFOS * /PFIFO[1] *  ZNMDT[25]
              + /RESET * PFIFOS *  PFIFO[1] * /ZNMDT[25]
              +  RESET * ZNMDT[25]
ZNMDT[26].T =   /RESET * PFIFOS * /PFIFO[2] *  ZNMDT[26]
              + /RESET * PFIFOS *  PFIFO[2] * /ZNMDT[26]
              +  RESET * ZNMDT[26]
ZNMDT[27].T =   /RESET * PFIFOS * /PFIFO[3] *  ZNMDT[27]
              + /RESET * PFIFOS *  PFIFO[3] * /ZNMDT[27]
              +  RESET * ZNMDT[27]
ZNMDT[28].T =   /RESET * PFIFOS * /PFIFO[4] *  ZNMDT[28]
              + /RESET * PFIFOS *  PFIFO[4] * /ZNMDT[28]
              +  RESET * ZNMDT[28]
ZNMDT[29].T =   /RESET * PFIFOS * /PFIFO[5] *  ZNMDT[29]
              + /RESET * PFIFOS *  PFIFO[5] * /ZNMDT[29]
              +  RESET * ZNMDT[29]
ZNMDT[30].T =   /RESET * PFIFOS * /PFIFO[6] *  ZNMDT[30]
              + /RESET * PFIFOS *  PFIFO[6] * /ZNMDT[30]
              +  RESET * ZNMDT[30]
ZNMDT[31].T =   /RESET * PFIFOS * /PFIFO[7] *  ZNMDT[31]
              + /RESET * PFIFOS *  PFIFO[7] * /ZNMDT[31]
              +  RESET * ZNMDT[31]
```

```
FRA0.T  = /FRA0 *  RESET
        +  FRA0 * /RESET * ZNMDT[0]

SIMULATION
TRACE_ON    SDPCK MQRESET MQGRABT PFIFOS FRA0 ZCNTOE
            PFIFO[3] PFIFO[4] PFIFO[5] PFIFO[6]
            ZNMDT[3] ZNMDT[12] ZNMDT[21] ZNMDT[30]


PRELOAD /FRA0 /ZNMDT[0..31]
SETF /SDPCK MQRESET /MQGRABT /PFIFOS /PFIFO[3] /PFIFO[4] /PFIFO[5] /PFIFO[6]
SETF ZCNTOE
CLOCKF SDPCK
CLOCKF SDPCK
SETF /MQRESET /MQGRABT /PFIFOS /PFIFO[3] /PFIFO[4] /PFIFO[5] /PFIFO[6]
CLOCKF SDPCK
CLOCKF SDPCK
SETF /MQRESET /MQGRABT /PFIFOS  PFIFO[3] /PFIFO[4] /PFIFO[5] /PFIFO[6]
CLOCKF SDPCK
CLOCKF SDPCK
SETF /MQRESET /MQGRABT  PFIFOS  PFIFO[3] /PFIFO[4] /PFIFO[5] /PFIFO[6]
CLOCKF SDPCK
CLOCKF SDPCK
SETF /MQRESET /MQGRABT /PFIFOS  PFIFO[3] /PFIFO[4] /PFIFO[5] /PFIFO[6]
CLOCKF SDPCK
CLOCKF SDPCK
SETF /MQRESET  MQGRABT /PFIFOS  PFIFO[3] /PFIFO[4] /PFIFO[5] /PFIFO[6]
CLOCKF SDPCK
CLOCKF SDPCK
SETF /MQRESET  MQGRABT  PFIFOS  PFIFO[3] /PFIFO[4] /PFIFO[5] /PFIFO[6]
CLOCKF SDPCK
CLOCKF SDPCK
SETF /MQRESET /MQGRABT  PFIFOS  PFIFO[3] /PFIFO[4] /PFIFO[5] /PFIFO[6]
CLOCKF SDPCK
CLOCKF SDPCK
SETF /MQRESET /MQGRABT /PFIFOS  PFIFO[3] /PFIFO[4] /PFIFO[5] /PFIFO[6]
CLOCKF SDPCK
CLOCKF SDPCK
SETF /MQRESET /MQGRABT  PFIFOS  PFIFO[3] /PFIFO[4]  PFIFO[5] /PFIFO[6]
CLOCKF SDPCK
CLOCKF SDPCK
SETF /MQRESET /MQGRABT /PFIFOS  PFIFO[3] /PFIFO[4] /PFIFO[5] /PFIFO[6]

SETF /MQRESET /MQGRABT /PFIFOS  PFIFO[3] /PFIFO[4] /PFIFO[5] /PFIFO[6]
SETF /MQRESET /MQGRABT /PFIFOS  PFIFO[3] /PFIFO[4] /PFIFO[5] /PFIFO[6]
SETF /MQRESET /MQGRABT /PFIFOS  PFIFO[3] /PFIFO[4] /PFIFO[5] /PFIFO[6]
SETF /MQRESET /MQGRABT /PFIFOS  PFIFO[3] /PFIFO[4] /PFIFO[5] /PFIFO[6]
SETF /MQRESET /MQGRABT /PFIFOS  PFIFO[3] /PFIFO[4] /PFIFO[5] /PFIFO[6]


TRACE_OFF   SDPCK MQRESET MQGRABT PFIFOS FRA0 ZCNTOE
            PFIFO[3] PFIFO[4] PFIFO[5] PFIFO[6]
            ZNMDT[3] ZNMDT[12] ZNMDT[21] ZNMDT[30]
```

```
;PALASM Design Description

;---------------------------------- Declaration Segment ------------
TITLE    PROM Address Counter


CHIP  _PROMCTRL  PAL22V10

;---------------------------------- PIN Declarations ---------------
PIN  14,23,15,22,16,21,17,20,18,19    PAD[0..9]     REGISTERED ; OUTPUT
PIN  11,10,9,8    CYC[3..0]                                    ; INPUT
PIN  1            SDPCK                                        ; INPUT
PIN  3            PRESET                                       ; INPUT
PIN  2            DNLDZ                                        ; INPUT

; CY7C245 is 2k x 8 PROM, ie 11 address bits. A 22V10 has 10 outputs.
; We must use a 22V10 because we need the -7 7.5 ns delay version.
; Hence we set the msb to 0 and use only half the PROM.
; Address lines A6 through A9 can be preset, ie the data is stored
; starting at 64 word boundaries. Some cycles require more than
; 64 words (the DTM, DLx and EOD cycles), these are allocated
; extra 64-word blocks and overrun intermediate boundaries.


;        3 2 1 0 D             9876 5     0      required no. of cycles
;NULC - 0 0 0 0 X  Preset to 00000 000000          0
;LINC - 0 0 0 1 X  Preset to 00001 000000          9
;SYNC - 0 0 1 0 X  Preset to 00010 000000          3
;REFC - 0 0 1 1 X  Preset to 00011 000000          7
;OFRC - 0 1 0 0 X  Preset to 00100 000000          ?

;DTMC - 0 1 0 1 X  Preset to 00101 000000        146
;reserved                     00110 000000
;reserved                     00111 000000
;reserved                     01000 000000
;EODC - 0 1 1 1 X  Preset to 01001 000000        128
;reserved                     01010 000000
;DLIC - 1 0 0 0 0  Preset to 01011 000000         82
;reserved                     01100 000000
;DLZC - 1 0 0 0 1  Preset to 01101 000000         82
;reserved                     01110 000000
;CLNC - 1 0 1 0 X  Preset to 01111 000000          3

STRING NULC '(/CYC[3] * /CYC[2] * /CYC[1] * /CYC[0])'
STRING LINC '(/CYC[3] * /CYC[2] * /CYC[1] *  CYC[0])'
STRING SYNC '(/CYC[3] * /CYC[2] *  CYC[1] * /CYC[0])'
STRING REFC '(/CYC[3] * /CYC[2] *  CYC[1] *  CYC[0])'
STRING OFRC '(/CYC[3] *  CYC[2] * /CYC[1] * /CYC[0])'
STRING DTMC '(/CYC[3] *  CYC[2] * /CYC[1] *  CYC[0])'
STRING DLIC '( CYC[3] * /CYC[2] * /CYC[1] * /CYC[0] * /DNLDZ)'
STRING DLZC '( CYC[3] * /CYC[2] * /CYC[1] * /CYC[0] *  DNLDZ)'
STRING EODC '(/CYC[3] *  CYC[2] *  CYC[1] *  CYC[0])'
STRING CLNC '( CYC[3] * /CYC[2] *  CYC[1] * /CYC[0])'

;---------------------------------- Boolean Equation Segment ------
EQUATIONS
```

```
/PAD[0] =   PAD[0] * /PRESET
          + PRESET
/PAD[1] =   PAD[0] * PAD[1] * /PRESET
          + /PAD[1] * /PAD[0] * /PRESET
          + PRESET
/PAD[2] = PAD[0] * PAD[1] * PAD[2] * /PRESET
          + /PAD[2] * /PAD[1] * /PRESET
          + /PAD[2] * /PAD[0] * /PRESET
          + PRESET
/PAD[3] = PAD[0] * PAD[1] * PAD[2] * PAD[3] * /PRESET
          + /PAD[3] * /PAD[2] * /PRESET
          + /PAD[3] * /PAD[1] * /PRESET
          + /PAD[3] * /PAD[0] * /PRESET
          + PRESET
/PAD[4] = PAD[0] * PAD[1] * PAD[2] * PAD[3] * PAD[4] * /PRESET
          + /PAD[4] * /PAD[3] * /PRESET
          + /PAD[4] * /PAD[2] * /PRESET
          + /PAD[4] * /PAD[1] * /PRESET
          + /PAD[4] * /PAD[0] * /PRESET
          + PRESET
/PAD[5]   = PAD[0] * PAD[1] * PAD[2] * PAD[3] * PAD[4] * PAD[5] * /PRESET
          + /PAD[5] * /PAD[4] * /PRESET
          + /PAD[5] * /PAD[3] * /PRESET
          + /PAD[5] * /PAD[2] * /PRESET
          + /PAD[5] * /PAD[1] * /PRESET
          + /PAD[5] * /PAD[0] * /PRESET
          + PRESET
/PAD[6]   = PAD[0] * PAD[1] * PAD[2] * PAD[3] * PAD[4] * PAD[5] * PAD[6] * /PRES
          + /PAD[6] * /PAD[5] * /PRESET
          + /PAD[6] * /PAD[4] * /PRESET
          + /PAD[6] * /PAD[3] * /PRESET
          + /PAD[6] * /PAD[2] * /PRESET
          + /PAD[6] * /PAD[1] * /PRESET
          + /PAD[6] * /PAD[0] * /PRESET
          + PRESET * NULC
          + PRESET * SYNC
          + PRESET * OFRC
/PAD[7]   = PAD[0] * PAD[1] * PAD[2] * PAD[3] * PAD[4] * PAD[5] * PAD[6] *
                          PAD[7] * /PRESET
          + /PAD[7] * /PAD[6] * /PRESET
          + /PAD[7] * /PAD[5] * /PRESET
          + /PAD[7] * /PAD[4] * /PRESET
          + /PAD[7] * /PAD[3] * /PRESET
          + /PAD[7] * /PAD[2] * /PRESET
          + /PAD[7] * /PAD[1] * /PRESET
          + /PAD[7] * /PAD[0] * /PRESET
          + PRESET * NULC
          + PRESET * LINC
          + PRESET * OFRC
          + PRESET * DTMC
          + PRESET * EODC
          + PRESET * DLZC
/PAD[8]   = PAD[0] * PAD[1] * PAD[2] * PAD[3] * PAD[4] * PAD[5] * PAD[6] *
                          PAD[7] * PAD[8] * /PRESET
          + /PAD[8] * /PAD[7] * /PRESET
          + /PAD[8] * /PAD[6] * /PRESET
          + /PAD[8] * /PAD[5] * /PRESET
          + /PAD[8] * /PAD[4] * /PRESET
          + /PAD[8] * /PAD[3] * /PRESET
```

```
         + /PAD[8] * /PAD[2] * /PRESET
         + /PAD[8] * /PAD[1] * /PRESET
         + /PAD[8] * /PAD[0] * /PRESET
         + PRESET * NULC
         + PRESET * LINC
         + PRESET * SYNC
         + PRESET * REFC
         + PRESET * EODC
         + PRESET * DLIC
/PAD[9]  = PAD[0] * PAD[1] * PAD[2] * PAD[3] * PAD[4] * PAD[5] * PAD[6] *
                   PAD[7] * PAD[8] * PAD[9] * /PRESET
         + /PAD[9] * /PAD[8] * /PRESET
         + /PAD[9] * /PAD[7] * /PRESET
         + /PAD[9] * /PAD[6] * /PRESET
         + /PAD[9] * /PAD[5] * /PRESET
         + /PAD[9] * /PAD[4] * /PRESET
         + /PAD[9] * /PAD[3] * /PRESET
         + /PAD[9] * /PAD[2] * /PRESET
         + /PAD[9] * /PAD[1] * /PRESET
         + /PAD[9] * /PAD[0] * /PRESET
         + PRESET * NULC
         + PRESET * LINC
         + PRESET * SYNC
         + PRESET * OFRC
         + PRESET * REFC
         + PRESET * DTMC

;------------------------------------ Simulation Segment ------------
SIMULATION
TRACE_ON  SDPCK CYC[2..0] PRESET DNLDZ PAD[9..0]
SETF /SDPCK /CYC[2] /CYC[1] /CYC[0] /PRESET /DNLDZ
CLOCKF SDPCK
CLOCKF SDPCK
CLOCKF SDPCK
SETF /CYC[2] /CYC[1] CYC[0] PRESET /DNLDZ
CLOCKF SDPCK
CLOCKF SDPCK
SETF /CYC[2] /CYC[1] CYC[0] /PRESET /DNLDZ
CLOCKF SDPCK
CLOCKF SDPCK
CLOCKF SDPCK
CLOCKF SDPCK
CLOCKF SDPCK
CLOCKF SDPCK
CLOCKF SDPCK


TRACE_OFF SDPCK CYC[2..0] PRESET DNLDZ PAD[9..0]

;-------------------------------------------------------------------
```

```
;PALASM Design Description

;---------------------------------- Declaration Segment -----------
TITLE    External bus control



CHIP  EXTMACH  MACH120

;---------------------------------- PIN Declarations ---------------
PIN 50 BUSCK COMBINATORIAL ; INPUT
PIN 2 /EXRST COMBINATORIAL ; INPUT
PIN 16 /EXAS COMBINATORIAL ; INPUT
PIN 24 /EXWR COMBINATORIAL ; INPUT
PIN 37, 51, 38, 23, 40, 41, 43, 44, 45, 46, 54, 20, 47, 48, 28, 15 BQAD[31..16]
PIN 49, 17, 26, 25 BQAD[11..8] COMBINATORIAL ; INPUT
PIN 6 /PWRUPRST COMBINATORIAL ; INPUT
PIN 58 /BEXAS REGISTERED ;
PIN 36 /ENAD008 REGISTERED ; OUTPUT
PIN 14 /ENAD009 REGISTERED ; OUTPUT
PIN 33 /ENAD00A REGISTERED ; OUTPUT
PIN 32 /ENAD00B REGISTERED ; OUTPUT
PIN 3 /ENAD00C REGISTERED ; OUTPUT
PIN 4 /ENAD00D REGISTERED ; OUTPUT
PIN 5 /ENAD00E REGISTERED ; OUTPUT
PIN 31 /ENAD00F REGISTERED ; OUTPUT
PIN 30 /ENAD400 REGISTERED ; OUTPUT
PIN 67 /RESET REGISTERED ; OUTPUT
NODE 48, 49, 27 RST[0..2] REGISTERED ; OUTPUT

PIN 22 GBINTCL ; INPUT
PIN 21 CYCTOG ; INPUT
PIN 29 /GRAB ; INPUT
PIN 7 /GRABING ; INPUT
PIN 66 GRABTOG ; OUTPUT
PIN 65 DNLDTOG ; OUTPUT
PIN 63 GRBINT REGISTERED ; OUTPUT
PIN 59 DNLDEN REGISTERED ; OUTPUT
PIN 64 ST0 REGISTERED ; OUTPUT
PIN 60 ST1 REGISTERED ; OUTPUT

PIN 39 AD00A REGISTERED ;

PIN 9 OFIF3HF ; INPUT
PIN 10 OFIF3PA ; INPUT
PIN 11 OFIF3EF ; INPUT

PIN 57 OFIFOUT REGISTERED ; OUTPUT

STRING SLOT0 '/BQAD[31]*/BQAD[30]*/BQAD[29]*BQAD[28]*BQAD[27]*BQAD[26]*
              BQAD[25]*BQAD[24]*/BQAD[23]*BQAD[22]*/BQAD[21]*/BQAD[20]*
              /BQAD[19]'

STRING REGISTERS '/BQAD[18]*/BQAD[17]*/BQAD[16]'

;---------------------------------- Boolean Equation Segment ------
```

```
EQUATIONS

OFIFOUT.RSTF = GND
OFIFOUT.SETF = GND
OFIFOUT.CLKF = BUSCK

RST[0..2].SETF = GND
RST[0..2].RSTF = GND
RST[0..2].CLKF = BUSCK

RESET.SETF = GND
RESET.RSTF = GND
RESET.CLKF = BUSCK

; The OFIF3 flags, EF, HF and PA decode six OFIFO states as follows:
;
; EF  PA  HF    State                              Number of words
; 0   0   1     Empty                              0
; 1   0   1     Almost empty                       1  - 64
; 1   1   1     Less than or equal to half full    65 - 256
; 1   1   0     Greater than half full             257 - 447
; 1   0   0     Almost full                        448 - 511
; 0   0   0     Full                               512
; 0   1   X     Invalid (resetting)                 -

; The SDPIB logic needs to know that there are at least 64 words in the
; FIFO. It uses negative logic.
; Hence we decode for states EMPTY and ALMOST EMPTY (high)
; We also decode for the invalid states as they occur during reset.
; All other states (low)


OFIFOUT = /OFIF3PA *  OFIF3HF
        + /OFIF3EF *  OFIF3PA
        + DNLDTOG
        + GRABTOG

BEXAS.RSTF      = GND
ENAD008.RSTF    = GND
ENAD009.RSTF    = GND
AD00A.RSTF      = GND
ENAD00B.RSTF    = GND
ENAD00C.RSTF    = GND
ENAD00D.RSTF    = GND
ENAD00E.RSTF    = GND
ENAD00F.RSTF    = GND
ENAD400.RSTF    = GND

ENAD00A.SETF = GND
ENAD00A.RSTF = GND
ENAD00A.CLKF = BUSCK

BEXAS.SETF      = GND
ENAD008.SETF    = GND
ENAD009.SETF    = GND
AD00A.SETF    = GND
ENAD00B.SETF    = GND
ENAD00C.SETF    = GND
ENAD00D.SETF    = GND
```

```
ENAD00E.SETF    = GND
ENAD00F.SETF    = GND
ENAD400.SETF    = GND

BEXAS.CLKF      = BUSCK
ENAD008.CLKF = BUSCK
ENAD009.CLKF  = BUSCK
AD00A.CLKF    = BUSCK
ENAD00B.CLKF     = BUSCK
ENAD00C.CLKF     = BUSCK
ENAD00D.CLKF     = BUSCK
ENAD00E.CLKF     = BUSCK
ENAD00F.CLKF    = BUSCK
ENAD400.CLKF    = BUSCK

BEXAS      = /RESET * EXAS
ENAD008.T = BEXAS*SLOT0*REGISTERS*BQAD[11]*/BQAD[10]*/BQAD[9]*/BQAD[8]
            * /ENAD008
            + EXAS * ENAD008
ENAD009.T  = BEXAS*SLOT0*REGISTERS*BQAD[11]*/BQAD[10]*/BQAD[9]*BQAD[8]
            * /ENAD009
            + EXAS * ENAD009
AD00A.T  = BEXAS*SLOT0*REGISTERS*BQAD[11]*/BQAD[10]*BQAD[9]*/BQAD[8]
            * /AD00A
            + EXAS * AD00A
ENAD00B.T    = BEXAS*SLOT0*REGISTERS*BQAD[11]*/BQAD[10]*BQAD[9]*BQAD[8]
              * /ENAD00B
            + EXAS * ENAD00B
ENAD00C.T    = BEXAS*SLOT0*REGISTERS*BQAD[11]*BQAD[10]*/BQAD[9]*/BQAD[8]
             * /ENAD00C
            + EXAS * ENAD00C
ENAD00D.T    = BEXAS*SLOT0*REGISTERS*BQAD[11]*BQAD[10]*/BQAD[9]*BQAD[8]
             * /ENAD00D
            + EXAS * ENAD00D
ENAD00E.T    = BEXAS*SLOT0*REGISTERS*BQAD[11]*BQAD[10]*BQAD[9]*/BQAD[8]
            * /ENAD00E
            + EXAS * ENAD00E
ENAD00F.T   = BEXAS*SLOT0*REGISTERS*BQAD[11]*BQAD[10]*BQAD[9]*BQAD[8]
            * /ENAD00F
            + EXAS * ENAD00F
ENAD400.T   = BEXAS*SLOT0*BQAD[18] * /ENAD400
            + EXAS * ENAD400

ENAD00A = AD00A ; DELAY IFIFO WRITE ONE CLOCK CYCLE

RST[0] = PWRUPRST + EXRST
RST[1] = RST[0]
RST[2] = RST[1]

RESET     = RST[0] + RST[1] + RST[2]

; Generate GRABTOG and DNLDTOG from GRAB and CYCTOG

GRABTOG =  GRAB * CYCTOG
DNLDTOG = /GRAB * CYCTOG

; Grab DNLDEN when a write to control register address comes in
; (DNLDEN is echoed from the SDP IB board, it's one bit from the
; top 16 bits on that board we need here)
```

```
GRBINT.CLKF = BUSCK
GRBINT.SETF = GND
GRBINT.RSTF = GND

ST0.CLKF = BUSCK
ST0.SETF = GND
ST0.RSTF = GND

ST1.CLKF = BUSCK
ST1.SETF = GND
ST1.RSTF = GND

DNLDEN.CLKF = BUSCK
DNLDEN.SETF = GND
DNLDEN.RSTF = GND

DNLDEN = BQAD[16] * EXWR * ENAD00B
       + DNLDEN * /EXWR
       + DNLDEN * /ENAD00B
;
;
; Use a state machine to manage the interrupt generation and clearing
; We want to arm ready for an interrupt when the toggle is high.
; The interrupt is generated when the toggle is low and GRABING is low.
; The interrupt is reset to wait for another toggle when GBINTCL is set.
;

STATE

MOORE_MACHINE
CLKF = BUSCK
; State transition equations

S_RESET          := C_NOT_RESET -> S_WAITING
                 +-> S_RESET
S_WAITING        := C_ARM -> S_ARMED
                 +  C_RESET -> S_RESET
                 +-> S_WAITING
S_ARMED          := C_DONE -> S_INTERRUPTING
                 +  C_RESET -> S_RESET
                 +-> S_ARMED
S_INTERRUPTING   := C_RESET -> S_RESET
                 + C_CLEAR -> S_WAITING
                 +-> S_INTERRUPTING


; State assignment equations

S_RESET          =        /ST1 * /ST0
S_WAITING        =        /ST1 *  ST0
S_ARMED          =         ST1 * /ST0
S_INTERRUPTING   =         ST1 *  ST0

; State output equations

S_RESET.OUTF               =        /GRBINT
S_WAITING.OUTF             =        /GRBINT
S_ARMED.OUTF               =        /GRBINT
S_INTERRUPTING.OUTF        =         GRBINT
```

```
CONDITIONS

C_RESET         =       PWRUPRST + EXRST
C_NOT_RESET     =       /PWRUPRST * /EXRST
C_ARM           =       /PWRUPRST * /EXRST * GRAB * CYCTOG
C_DONE          =       /PWRUPRST * /EXRST * /GRABING  * /CYCTOG
C_CLEAR         =       /PWRUPRST * /EXRST *  GBINTCL

;----------------------------------- Simulation Segment ------------
SIMULATION

TRACE_ON BUSCK ENAD008 EXAS BEXAS

SETF /BUSCK /EXRST /EXAS /EXWR /PWRUPRST
SETF /BQAD[31] /BQAD[30] /BQAD[29]  BQAD[28]  BQAD[27]  BQAD[26]
SETF  BQAD[25]  BQAD[24] /BQAD[23]  BQAD[22] /BQAD[21] /BQAD[20]
SETF /BQAD[19] /BQAD[18] /BQAD[17] /BQAD[16]  BQAD[11] /BQAD[10]
SETF /BQAD[9] /BQAD[8]

CLOCKF BUSCK
CLOCKF BUSCK
SETF EXAS
CLOCKF BUSCK
SETF /EXAS
CLOCKF BUSCK
CLOCKF BUSCK
CLOCKF BUSCK
SETF EXAS
CLOCKF BUSCK
SETF /EXAS
CLOCKF BUSCK
CLOCKF BUSCK
TRACE_OFF BUSCK ENAD008 EXAS BEXAS

;-------------------------------------------------------------------
```

```
;PALASM Design Description

;---------------------------------- Declaration Segment ------------
TITLE    Input data pre-selection



CHIP  IFIFO  MACH210

;---------------------------------- PIN Declarations ---------------
PIN 35 SCNPXCK ; INPUT
PIN 13 FWDENAIN ; INPUT
PIN 11 REVENAIN ; INPUT
PIN 33 /VSYNCIN ; INPUT
PIN 32 SQGRABT ; INPUT
PIN 10 /SQRESET ; INPUT
PIN 38 HIBMATCH REGISTERED ; OUTPUT
PIN 42 LOBMATCH REGISTERED ; OUTPUT
PIN 27,28,29,30,31,37,36 SQNL[0..6] ; INPUT
PIN 2,3,4,5,6,7,8,9 RAW[0..7] REGISTERED ; OUTPUT
PIN 14, 15, 16, 17, 18, 19, 20, 21, 41 QL[8..0] REGISTERED ; OUTPUT
PIN 43 LASTLINE REGISTERED ; OUTPUT
PIN 25 /ATODOE REGISTERED ; OUTPUT
NODE 38 RAWOE REGISTERED ; OUTPUT
NODE 5, 3, 15 VS[1..3] REGISTERED ; OUTPUT
NODE 7, 9, 11 FE[1..3] REGISTERED ; OUTPUT
NODE 17, 13, 55 RE[1..3] REGISTERED ; OUTPUT
NODE 37, 48 QS[0..1] REGISTERED ; OUTPUT
PIN 40 /IFIFMR REGISTERED ; OUTPUT
PIN 24 /IFIFWE REGISTERED ; OUTPUT



;
; This device handles pre-selection of valid lines from the A to D
; converter into the input buffer FIFO, IFIFO.
; The FIFO is used to hold off the 30 MHz maximum input data rate.
; The FIFO output can be processed at any rate greater than the line
; average data rate of 16 MHz.
; IFIFO is cleared (reset) either by SQGRABT or SQRESET.
; Data is written into IFIFO when the line is valid, and either
; FWDENA or REVENA is asserted. These enable lines are asserted for
; exactly 512 pixels.
; IFIFO is a clocked FIFO, and writes occur when IFIFWE is asserted
; and SCNPXCK clocks.
;
; There are two counters implemented in this device and a state machine.
;
; One counter counts lines within a frame (the QL bits). When the
; line count matches the value in the SQNumLines register (the SQNL bits)
; no further lines in this frame will be selected.
;
; There is also a frame counter, output onto the 8-bit RAW data bus
; for two counts only every frame. At all other times, the RAW bus has
; the A to D pixel data.
;
```

```
; The state machine manages the RAW bus and the FIFO write enable.
;
; The delay between the analog data and its digital control signals,
; VSYNC, FWDENA and REVENA is also adjusted here. Coarse adjustments
; to within 4 pixels are made externally, fine adjustment is
; handled here by clocking three versions of these signals, each delayed
; by an extra clock, and selecting the required signal from them.
;
;
STRING  VSYNC   'VS[3]'         ; or, eg, VSYNCIN
STRING  FWDENA  'FE[3]'
STRING  REVENA  'RE[3]'
STRING  SYNC2   '( IFIFWE * /ATODOE *  RAWOE * /QS[0] * /QS[1])'


GROUP   DELAYED_SIGS    FE[1..3] RE[1..3] VS[1..3]

;---------------------------------- Boolean Equation Segment ------
EQUATIONS

LOBMATCH.CLKF = SCNPXCK
LOBMATCH.RSTF = GND
LOBMATCH.SETF = GND
HIBMATCH.CLKF = SCNPXCK
HIBMATCH.RSTF = GND
HIBMATCH.SETF = GND

IFIFWE.CLKF = SCNPXCK
IFIFWE.RSTF = GND
IFIFWE.SETF = GND

IFIFMR.CLKF = SCNPXCK
IFIFMR.RSTF = GND
IFIFMR.SETF = GND

IFIFMR = SQRESET + SQGRABT

ATODOE.CLKF = SCNPXCK
ATODOE.RSTF = GND
ATODOE.SETF = GND

RAWOE.CLKF = SCNPXCK
RAWOE.RSTF = GND
RAWOE.SETF = GND

QS[0..1].CLKF = SCNPXCK
QS[0..1].RSTF = GND
QS[0..1].SETF = GND

LASTLINE.CLKF = SCNPXCK
LASTLINE.RSTF = GND
LASTLINE.SETF = GND

LASTLINE = LOBMATCH * HIBMATCH * QL[1] * QL[0]

HIBMATCH =      (QL[8] :*: SQNL[6])
              * (QL[7] :*: SQNL[5])
              * (QL[6] :*: SQNL[4])
LOBMATCH =      (QL[5] :*: SQNL[3])
              * (QL[4] :*: SQNL[2])
```

```
               * (QL[3] :*: SQNL[1])
               * (QL[2] :*: SQNL[0])

DELAYED_SIGS.CLKF = SCNPXCK
DELAYED_SIGS.RSTF = GND
DELAYED_SIGS.SETF = GND

VS[1] = VSYNCIN
VS[2] = VS[1]
VS[3] = VS[2]
FE[1] = FWDENAIN
FE[2] = FE[1]
FE[3] = FE[2]
RE[1] = REVENAIN
RE[2] = RE[1]
RE[3] = RE[2]

; The line counter. It clocks on FWDENA. It is reset by SQRESET,
; SQGRABT or VSYNC (ie every frame). LASTLINE is decoded from the
; line counter and the SQNL bits, and used as a condition in
; the state machine.

QL[0..8].CLKF = FWDENAIN
QL[0..8].RSTF = GND
QL[0..8].SETF = GND

QL[0].T = /SQRESET   * /SQGRABT * /VSYNCIN
        +  SQRESET   * /QL[0]
        +  SQGRABT * /QL[0]
        +  VSYNCIN * /QL[0]
QL[1].T = /SQRESET * /SQGRABT * /VSYNCIN * QL[0]
        +  SQRESET   * /QL[1]
        +  SQGRABT * /QL[1]
        +  VSYNCIN * /QL[1]
QL[2].T = /SQRESET * /SQGRABT * /VSYNCIN * QL[0] * QL[1]
        +  SQRESET   * /QL[2]
        +  SQGRABT * /QL[2]
        +  VSYNCIN * /QL[2]
QL[3].T = /SQRESET * /SQGRABT * /VSYNCIN * QL[0] * QL[1] * QL[2]
        +  SQRESET   * /QL[3]
        +  SQGRABT * /QL[3]
        +  VSYNCIN * /QL[3]
QL[4].T = /SQRESET * /SQGRABT * /VSYNCIN * QL[0] * QL[1] * QL[2] * QL[3]
        +  SQRESET   * /QL[4]
        +  SQGRABT * /QL[4]
        +  VSYNCIN * /QL[4]
QL[5].T = /SQRESET * /SQGRABT * /VSYNCIN * QL[0] * QL[1] * QL[2] * QL[3]
          * QL[4]
        +  SQRESET   * /QL[5]
        +  SQGRABT * /QL[5]
        +  VSYNCIN * /QL[5]
QL[6].T = /SQRESET * /SQGRABT * /VSYNCIN * QL[0] * QL[1] * QL[2] * QL[3]
          * QL[4] * QL[5]
        +  SQRESET   * /QL[6]
        +  SQGRABT * /QL[6]
        +  VSYNCIN * /QL[6]
QL[7].T = /SQRESET * /SQGRABT * /VSYNCIN * QL[0] * QL[1] * QL[2] * QL[3]
          * QL[4] * QL[5] * QL[6]
        +  SQRESET   * /QL[7]
        +  SQGRABT * /QL[7]
```

```
        +  VSYNCIN * /QL[7]
QL[8].T = /SQRESET * /SQGRABT * /VSYNCIN * QL[0] * QL[1] * QL[2] * QL[3]
         * QL[4] * QL[5] * QL[6] * QL[7]
        +  SQRESET   * /QL[8]
        +  SQGRABT * /QL[8]
        +  VSYNCIN * /QL[8]

; The frame counter. This toggles once per frame. It is enabled by
; state S_SYNC2
; It is reset by SQRESET or SQGRABT, otherwise it just free runs round
; and round for ever.
; The outputs are enabled onto the RAW bus every frame.

RAW[7..0].CLKF = SCNPXCK
RAW[7..0].RSTF = GND
RAW[7..0].SETF = GND
RAW[7..0].TRST = RAWOE

RAW[0].T = /IFIFMR * SYNC2
         +  IFIFMR * RAW[0]
RAW[1].T = /IFIFMR * SYNC2 * RAW[0]
         +  IFIFMR * RAW[1]
RAW[2].T = /IFIFMR * SYNC2 * RAW[0] * RAW[1]
         +  IFIFMR * RAW[2]
RAW[3].T = /IFIFMR * SYNC2 * RAW[0] * RAW[1] * RAW[2]
         +  IFIFMR * RAW[3]
RAW[4].T = /IFIFMR * SYNC2 * RAW[0] * RAW[1] * RAW[2] * RAW[3]
         +  IFIFMR * RAW[4]
RAW[5].T = /IFIFMR * SYNC2 * RAW[0] * RAW[1] * RAW[2] * RAW[3] * RAW[4]
         +  IFIFMR * RAW[5]
RAW[6].T = /IFIFMR * SYNC2 * RAW[0] * RAW[1] * RAW[2] * RAW[3] * RAW[4]
            * RAW[5]
         +  IFIFMR * RAW[6]
RAW[7].T = /IFIFMR * SYNC2 * RAW[0] * RAW[1] * RAW[2] * RAW[3] * RAW[4]
            * RAW[5] * RAW[6]
         +  IFIFMR * RAW[7]


;------------------- State Machine Segment ---------------------------------
;
;
;
STATE
MOORE_MACHINE
START_UP := POWER_UP -> S_WAIT_FRA
CLKF= SCNPXCK

;------------------- State Transition Equations ----------------------------

S_WAIT_FRA      := C_SYNC -> S_SYNC1
             +->    S_WAIT_FRA
S_SYNC1         :=       VCC -> S_SYNC2
S_SYNC2         :=       VCC -> S_ARMED
S_ARMED         := C_RESET -> S_WAIT_FRA
                +  C_FIRST_LINE -> S_NACQUIRE
                +-> S_ARMED
S_NACQUIRE      := C_RESET -> S_WAIT_FRA
                +  C_GO_FACQ -> S_FACQUIRE
                +  C_GO_RACQ -> S_RACQUIRE
```

```
                 +-> S_NACQUIRE
S_FACQUIRE       := C_RESET -> S_WAIT_FRA
                 +  C_GO_NACQF -> S_NACQUIRE
                 +-> S_FACQUIRE
S_RACQUIRE       := C_END_FRA -> S_WAIT_FRA
                 +  C_GO_NACQR -> S_NACQUIRE
                 +-> S_RACQUIRE
;------------------- State Assignments -------------------------------------

S_WAIT_FRA = /IFIFWE * /ATODOE * /RAWOE * /QS[0] * /QS[1]
S_SYNC1    =  IFIFWE * /ATODOE *  RAWOE * /QS[0] *  QS[1]
S_SYNC2    =  IFIFWE * /ATODOE *  RAWOE * /QS[0] * /QS[1]
S_ARMED    = /IFIFWE * /ATODOE * /RAWOE * /QS[0] *  QS[1]
S_NACQUIRE = /IFIFWE * /ATODOE * /RAWOE *  QS[0] * /QS[1]
S_FACQUIRE =  IFIFWE *  ATODOE * /RAWOE * /QS[0] * /QS[1]
S_RACQUIRE =  IFIFWE *  ATODOE * /RAWOE * /QS[0] *  QS[1]
;------------------- State Condition Equations ----------------------------

CONDITIONS

C_RESET          =  SQRESET +  SQGRABT
C_SYNC           = /SQRESET * /SQGRABT * VSYNC
C_FIRST_LINE     = /SQRESET * /SQGRABT * /VSYNC * /REVENA
C_GO_FACQ        = /SQRESET * /SQGRABT * /VSYNC *  FWDENA
C_GO_RACQ        = /SQRESET * /SQGRABT * /VSYNC * /FWDENA * REVENA
C_GO_NACQF       = /SQRESET * /SQGRABT * /VSYNC * /FWDENA * /REVENA
C_GO_NACQR       = /SQRESET * /SQGRABT * /VSYNC * /FWDENA * /REVENA * /LASTLINE
C_END_FRA        =  SQRESET + SQGRABT
                 +  /SQRESET * /SQGRABT * /REVENA * LASTLINE

;-------------------------------------- Simulation Segment ------------
SIMULATION
;----------------------------------------------------------------------
```

```
;PALASM Design Description
;---------------------------------- Declaration Segment ------------
TITLE    Generate Memory Write Enable pulses



CHIP  WRTECTRL  MACH110
;---------------------------------- PIN Declarations ---------------
PIN 32 /WP ; INPUT
PIN 24 WALWAYS ; INPUT
PIN 13 FREEZE ; INPUT
PIN 33 PGTI0IN ; INPUT
PIN 25 PGTI1IN ; INPUT
PIN 26 PGTI2IN ; INPUT
PIN 39 PGTI3IN ; INPUT
PIN 35 SDPCK ; INPUT
PIN 5 /IZNWE0 REGISTERED ; OUTPUT
PIN 7 /IZNWE1 REGISTERED ; OUTPUT
PIN 8 /IZNWE2 REGISTERED ; OUTPUT
PIN 9 /IZNWE3 REGISTERED ; OUTPUT

PIN 6, 4, 3, 2, 17, 16, 15, 14, 43 REFCNT[8..0] REGISTERED ; OUTPUT
PIN 11 /MQRESET ; INPUT
PIN 10 REFCLR ; INPUT

PIN 18 PGTI0 REGISTERED ; LATCHES TO STORE COMPARATOR RESULT
PIN 19 PGTI1 REGISTERED
PIN 20 PGTI2 REGISTERED
PIN 27 PGTI3 REGISTERED

PIN 31 COLADCK ; INPUT
;---------------------------------- Boolean Equation Segment ------

STRING REF_HOLD         '(/MQRESET * REFCNT[8] * /REFCLR)'
STRING REF_COUNT        '(/MQRESET * /REFCNT[8] * /REFCLR)'
STRING REF_CLEAR        '(MQRESET + REFCLR)'


EQUATIONS

IZNWE0.RSTF = GND
IZNWE0.SETF = GND
IZNWE0.CLKF = SDPCK
IZNWE1.RSTF = GND
IZNWE1.SETF = GND
IZNWE1.CLKF = SDPCK
IZNWE2.RSTF = GND
IZNWE2.SETF = GND
IZNWE2.CLKF = SDPCK
IZNWE3.RSTF = GND
IZNWE3.SETF = GND
IZNWE3.CLKF = SDPCK

PGTI0.CLKF = SDPCK
```

```
PGTI0.RSTF = GND
PGTI0.SETF = GND
PGTI1.CLKF = SDPCK
PGTI1.RSTF = GND
PGTI1.SETF = GND
PGTI2.CLKF = SDPCK
PGTI2.RSTF = GND
PGTI2.SETF = GND
PGTI3.CLKF = SDPCK
PGTI3.RSTF = GND
PGTI3.SETF = GND

PGTI0.T = COLADCK *  PGTI0IN * /PGTI0
        + COLADCK * /PGTI0IN *  PGTI0
PGTI1.T = COLADCK *  PGTI1IN * /PGTI1
        + COLADCK * /PGTI1IN *  PGTI1
PGTI2.T = COLADCK *  PGTI2IN * /PGTI2
        + COLADCK * /PGTI2IN *  PGTI2
PGTI3.T = COLADCK *  PGTI3IN * /PGTI3
        + COLADCK * /PGTI3IN *  PGTI3

IZNWE0 =  WP * PGTI0 * /FREEZE
        + WP * WALWAYS * /FREEZE
IZNWE1 =  WP * PGTI1 * /FREEZE
        + WP * WALWAYS * /FREEZE
IZNWE2 =  WP * PGTI2 * /FREEZE
        + WP * WALWAYS * /FREEZE
IZNWE3 =  WP * PGTI3 * /FREEZE
        + WP * WALWAYS * /FREEZE


REFCNT[8..0].CLKF = SDPCK
REFCNT[8..0].RSTF = GND
REFCNT[8..0].SETF = GND

; Refresh counter counts until MSB goes high, then holds until reset by
; REFCLR.
; HOLD condition is /MQRESET * REFCNT[8] * /REFCLR
; COUNT condition is /MQRESET * /REFCNT[8] * /REFCLR
; CLEAR condition is MQRESET + REFCLR


REFCNT[0].T =    REF_COUNT
               + REF_CLEAR * REFCNT[0]
REFCNT[1].T =    REF_COUNT * REFCNT[0]
               + REF_CLEAR * REFCNT[1]
REFCNT[2].T =    REF_COUNT * REFCNT[0] * REFCNT[1]
               + REF_CLEAR * REFCNT[2]
REFCNT[3].T =    REF_COUNT * REFCNT[0] * REFCNT[1] * REFCNT[2]
               + REF_CLEAR * REFCNT[3]
REFCNT[4].T =    REF_COUNT * REFCNT[0] * REFCNT[1] * REFCNT[2] * REFCNT[3]
               + REF_CLEAR * REFCNT[4]
REFCNT[5].T =    REF_COUNT * REFCNT[0] * REFCNT[1] * REFCNT[2] * REFCNT[3]
                 * REFCNT[4]
               + REF_CLEAR * REFCNT[5]
REFCNT[6].T =    REF_COUNT * REFCNT[0] * REFCNT[1] * REFCNT[2] * REFCNT[3]
                 * REFCNT[4] * REFCNT[5]
               + REF_CLEAR * REFCNT[6]

REFCNT[7].T =    REF_COUNT * REFCNT[0] * REFCNT[1] * REFCNT[2] * REFCNT[3]
```

```
               * REFCNT[4] * REFCNT[5] * REFCNT[6]
             + REF_CLEAR * REFCNT[7]

REFCNT[8].T =  REF_COUNT * REFCNT[0] * REFCNT[1] * REFCNT[2] * REFCNT[3]
               * REFCNT[4] * REFCNT[5] * REFCNT[6] * REFCNT[7]
             + REF_CLEAR * REFCNT[8]


;------------------------------------ Simulation Segment ------------
SIMULATION

;-------------------------------------------------------------------
```

```
; PALASM Design Description

;---------------------------------- Declaration Segment ------------
TITLE    Parallel FIFO, Data Reordering and Parallelization

CHIP  PFIFO  MACH220

; This device is clocked at 20 MHz, 50ns period.
; t setup is          11 ns
; t clock to out is   10 ns
; t comb out is       15 ns

; It is possible to have a combinatorial delay plus setup (26 ns) as
; long as the input signal is at most 24 ns after the clock.
; The synchronous resets are done this way. They are combined into
; GLOBAL and GLOBALSYNC, which are then used as synchronous resets
; which will take effect on the next clock.

;---------------------------------- PIN Declarations ---------------

NODE 17 GLOBAL ; MASTER DEVICE RESET
NODE 15 GLOBALSYNC ; COUNTER RESET
PIN 50 SDPCK2 ; INTERNAL CLOCK
PIN 23 /IFIFSYNC ; IFIFSYNC WORD

PIN 15 IFIFF2 ; DECODE STATE OF FIFO - WHEN HIGH, AT LEAST 17 WORDS
NODE 19 DATAVALID REG ; DELAYED VERSION OF IFIFF2
PIN 33 /IFIFREN ; ENABLE INPUT FIFO READ
PIN 54 /MQRESET ; MASTER MEMORY QUARTER RESET
PIN 16 MQGRABT ; ACQUIRE
NODE 37, 36, 30, 28, 39, 43, 41 RA[8..2] REG ; PIX CNT + FRAM ADDR
PIN 32 RA[0] REG ; PIX CNT MSB = DIR
PIN 31 RA[1] REG ; PIX CNT MSB = DIR
PIN 21 FA[9] REG ; PIX CNT MSB = DIR
PIN 41, 40, 39, 38, 37, 44, 45, 47, 48 FA[8..0] REG ; PIX CNT + RRAM ADDR

PIN 49 CTGELOPIX ; FROM PIXEL COMPARATOR
PIN 17 CTLEHIPIX ; FROM PIXEL COMPARATOR
NODE 21 NOT1STLINE REG ; OUTPUT
PIN 14 SYNCREQ REG ; OUTPUT
NODE 96 HOLD REG ; OUTPUT
PIN 9, 10, 11, 12, 13, 7, 6, 5, 4 FAO[8..0] REG
PIN 55, 60, 59, 58, 56, 63, 65, 66, 67 RAO[8..0] REG
PIN 2 /PFIF0WEN REG ; OUTPUT
PIN 3 /PFIF1WEN REG ; OUTPUT
PIN 36 /PFIF2WEN REG ; OUTPUT
PIN 46 /PFIF3WEN REG ; OUTPUT
PIN 51 FWDSEL ; INPUT
PIN 20 REVSEL ; INPUT

PIN 57 SYNCCT0 REG ; OUTPUT
PIN 64 SYNCCT1 REG ; OUTPUT
PIN 43 SYNCCT2 REG ; OUTPUT
```

```
NODE 51 FA9LKAHD REG ;

;GROUP          MACH_SEG_A      FAO[3..0]
;GROUP          MACH_SEG_B      FAO[8..4]
;GROUP          MACH_SEG_C      FA[9..5]
;GROUP          MACH_SEG_D      FA[4..0]
;GROUP          MACH_SEG_E      RA[8..4]
;GROUP          MACH_SEG_F      RA[3..0]
;GROUP          MACH_SEG_G      RAO[8..4]
;GROUP          MACH_SEG_H      RAO[3..0]

; General Design Notes
;
; This MACH and the PFIFCTRL MACH work together to unpack 9-bit data
; from the input FIFO, IFIFO, and pack it into the 36-bit parallel FIFO,
; PFIFO.
;
; IFIFO data format is like this:
;
; <S1><S2><F1><F2><F3..F510><F511><F512><R512><R511..R2><R1><F1><F2...
;    \_ sync words every frame
;
; All 512 forward and 512 reverse pixels are written to IFIFO. Pixels
; are written only in valid lines.
;
; PFIFO data format is like this, pixel cuts at L and H:
; This case shows both forward and reverse data selected, however
; either may be selected alone.
;
; <S1><S2><FL  ><FL+4><FL+8...FH-7><FH-3><RL  ><RL+4..RH-7><RH-3><FL  >..
; <S1><S2><FL+1><FL+5><FL+9...FH-6><FH-2><RL+1><RL+5..RH-6><RH-2><FL+1>..
; <S1><S2><FL+2><FL+6><FL+10..FH-5><FH-1><RL+2><RL+6..RH-5><RH-1><FL+2>..
; <S1><S2><FL+3><FL+7><FL+11..FH-4><FH  ><RL+3><RL+7..RH-4><RH  ><FL+3>..
;
; The ninth bit in all FIFOs flags the sync word.
;
; The data reversal is handled by storing each line in SRAM before
; writing it to PFIFO. Reverse lines are addressed differently from
; forward lines. This gives a one line delay between data out from
; IFIFO and data into PFIFO.
;
; Data selection within the pixel window is handled by enabling PFIFO
; writes only when the pixel count is greater than the low pixel
; and less than the high pixel. SRAM IO is not affected by data
; selection parameters.
;
; All FIFOs are cleared and controllers reset by either a MQRESET
; or MQGRABT toggle.
;
; PFIFO overrun is not checked. PFIFO is designed to overrun under
; some conditions, but otherwise it is guaranteed by design not to
; overflow.
;
; Note some of the problems.
;     First line in cycle problem - no reverse data.
; The logic works by reading out the reverse SRAM at the same time
; it is writing the forward SRAM. The very first line in a cycle, however,
; there is no valid data in the reverse RAM as the forward RAM is written.
; This case has to be detected and compensated.
; Note there would be a similar case at the end of a cycle, but we
```

```
; assume that unwanted data will 'flush through' the good data.
;
;     First line in frame - getting sync words in the right place
; The one-line pipeline means that sync words must also be written
; to PFIFO after a one-line delay. This requires storing the sync
; word value for one line and inserting it when the forward line
; terminates.
;
;     One-cycle pipeline delay of data - getting address and
;     data to SRAM in synch with each other.
; There is a one-cycle delay in the data path. This is compensated
; by a one-cycle delay in the address path, FAO and RAO outputs
; are delayed versions of FA and RA.
;
;   -------------  see PFIFCTRL.PDS for further notes  -------------
;
;----------------------------------- Boolean Equation Segment ------

STRING SYNCING   '(IFIFSYNC + SYNCCT0 + SYNCCT2)'

STRING COUNTING '(DATAVALID * /GLOBALSYNC * /SYNCING)'
STRING COUNTUP   '(DATAVALID * /GLOBALSYNC * /SYNCING * /FA[9] * /HOLD)'
STRING COUNTDN   '(DATAVALID * /GLOBALSYNC * /SYNCING *  FA[9] * /HOLD)'

STRING WRONEPFIF '(DATAVALID * CTGELOPIX * CTLEHIPIX * /IFIFSYNC * NOT1STLINE)

EQUATIONS

GLOBAL              =  MQRESET + MQGRABT
GLOBALSYNC          =  MQRESET + MQGRABT + IFIFSYNC

DATAVALID.SETF      = GND
DATAVALID.RSTF      = GND
DATAVALID.CLKF      = SDPCK2

; DATAVALID indicates the validity of data currently on the FIFO outputs
; (ie it was clocked out when IFIFREN was true). Because DATAVALID is
; registered and IFIFREN is not, DATAVALID is one clock cycle behind
; IFIFREN.

DATAVALID           =  IFIFF2 * /SYNCCT0 * /SYNCCT1   ; REGISTERED
                       * /(FA[0] * FA[1] * FA[2] * FA[3] * FA[4] * FA[5] *
                    FA[6] * FA[7] * FA[8] * SYNCREQ)

IFIFREN             =  IFIFF2 * /SYNCCT0 * /SYNCCT1   ; NOT REGISTERED
                       * /(FA[0] * FA[1] * FA[2] * FA[3] * FA[4] * FA[5] *
                    FA[6] * FA[7] * FA[8] * SYNCREQ)

PFIF0WEN.SETF       = GND
PFIF0WEN.RSTF       = GND
PFIF0WEN.CLKF       = SDPCK2
PFIF1WEN.SETF       = GND
PFIF1WEN.RSTF       = GND
PFIF1WEN.CLKF       = SDPCK2
PFIF2WEN.SETF       = GND
PFIF2WEN.RSTF       = GND
PFIF2WEN.CLKF       = SDPCK2
PFIF3WEN.SETF       = GND
PFIF3WEN.RSTF       = GND
PFIF3WEN.CLKF       = SDPCK2
```

```
PFIF0WEN =   /GLOBAL * WRONEPFIF * /FA[1] * /FA[0] *  FA[9]    * FWDSEL
           + /GLOBAL * WRONEPFIF * /FA[1] * /FA[0] * /FA[9]    * REVSEL
           + /GLOBAL * SYNCCT0
PFIF1WEN =   /GLOBAL * WRONEPFIF * /FA[1] *  FA[0] *  FA[9]    * FWDSEL
           + /GLOBAL * WRONEPFIF * /FA[1] *  FA[0] * /FA[9]    * REVSEL
           + /GLOBAL * SYNCCT0
PFIF2WEN =   /GLOBAL * WRONEPFIF *  FA[1] * /FA[0] *  FA[9]    * FWDSEL
           + /GLOBAL * WRONEPFIF *  FA[1] * /FA[0] * /FA[9]    * REVSEL
           + /GLOBAL * SYNCCT0
PFIF3WEN =   /GLOBAL * WRONEPFIF *  FA[1] *  FA[0] *  FA[9]    * FWDSEL
           + /GLOBAL * WRONEPFIF *  FA[1] *  FA[0] * /FA[9]    * REVSEL
           + /GLOBAL * SYNCCT0


NOT1STLINE.SETF      = GND
NOT1STLINE.RSTF      = GND
NOT1STLINE.CLKF      = SDPCK2

NOT1STLINE.T  = /GLOBAL * DATAVALID * FA[0] * FA[1] * FA[2] * FA[3] * FA[4]
                 * FA[5] * FA[6] * FA[7] * FA[8] * /NOT1STLINE
               + GLOBAL * NOT1STLINE


; SYNCREQ is SET when a sync byte is detected
;            CLEARED at the end of the first line or by a reset

SYNCREQ.T    =    DATAVALID * IFIFSYNC * /GLOBAL * /SYNCREQ        ; SET
             +    /GLOBAL *
                  FA[0] * FA[1] * FA[2] * FA[3] * FA[4] * FA[5] *  ; CLEAR
                  FA[6] * FA[7] * FA[8] * SYNCREQ
             +    GLOBAL * SYNCREQ                                 ; RESET

SYNCCT0.T    =    SYNCREQ * /GLOBAL *                              ; SET
                  FA[0] * FA[1] * FA[2] * FA[3] * FA[4] * FA[5] *
                  FA[6] * FA[7] * FA[8] * /SYNCCT0
             +    SYNCCT1 * SYNCCT0 * /GLOBAL                      ; CLEAR
             +    GLOBAL * SYNCCT0                                 ; RESET

SYNCCT1.T    =    SYNCCT0 * /GLOBAL * /SYNCCT1                     ; SET
             +    /SYNCCT0 * /GLOBAL * SYNCCT1                     ; CLEAR
             +    GLOBAL * SYNCCT1                                 ; RESET

SYNCCT2.T    =    SYNCCT1 * /GLOBAL * /SYNCCT2                     ; SET
             +    /SYNCCT1 * /GLOBAL * SYNCCT2                     ; CLEAR
             +    GLOBAL * SYNCCT2                                 ; RESET


SYNCREQ.SETF      = GND
SYNCREQ.RSTF      = GND
SYNCREQ.CLKF      = SDPCK2

SYNCCT0.SETF      = GND
SYNCCT0.RSTF      = GND
SYNCCT0.CLKF      = SDPCK2

SYNCCT1.SETF      = GND
SYNCCT1.RSTF      = GND
SYNCCT1.CLKF      = SDPCK2
```

```
SYNCCT2.SETF        = GND
SYNCCT2.RSTF        = GND
SYNCCT2.CLKF        = SDPCK2


; The only time we disable RAM reads and writes is when writing the
; sync words to the PFIFO (to avoid bus contention). Otherwise we can
; always write, because data will simply be overwritten, and always
; read, because nothing else is writing to the bus.

;
; There are two pixel counters. One addresses the forward RAM and the
; other the reverse RAM. While FA[9] is FALSE, both count up. While
; FA[9] is TRUE, the forward RAM address counts up and the reverse
; RAM address counts down. The reverse RAM address is also an input
; to the pixel comparator.
;

HOLD.T = /GLOBALSYNC * FA[8] * FA[7] * FA[6] * FA[5] * FA[4] * FA[3] * FA[2]
         * FA[1] * /FA[0] * COUNTING
         + HOLD * COUNTING

FA9LKAHD.T = COUNTING * /FA[0] * FA[1] * FA[2] * FA[3] * FA[4] * FA[5] * FA[6] *
          FA[7] * FA[8]
        + GLOBALSYNC *  FA9LKAHD

FA[9..0].RSTF = GND
FA[9..0].SETF = GND
FA[9..0].CLKF = SDPCK2

FA9LKAHD.RSTF = GND
FA9LKAHD.SETF = GND
FA9LKAHD.CLKF = SDPCK2

RA[8..0].RSTF = GND
RA[8..0].SETF = GND
RA[8..0].CLKF = SDPCK2

FAO[8..0].RSTF = GND
FAO[8..0].SETF = GND
FAO[8..0].CLKF = SDPCK2

RAO[8..0].RSTF = GND
RAO[8..0].SETF = GND
RAO[8..0].CLKF = SDPCK2

FAO[8] = FA[8]
FAO[7] = FA[7]
FAO[6] = FA[6]
FAO[5] = FA[5]
FAO[4] = FA[4]
FAO[3] = FA[3]
FAO[2] = FA[2]
FAO[1] = FA[1]
FAO[0] = FA[0]

RAO[8] = RA[8]
RAO[7] = RA[7]
RAO[6] = RA[6]
```

```
RAO[5] = RA[5]
RAO[4] = RA[4]
RAO[3] = RA[3]
RAO[2] = RA[2]
RAO[1] = RA[1]
RAO[0] = RA[0]

HOLD.RSTF = GND
HOLD.SETF = GND
HOLD.CLKF = SDPCK2

FA[0].T = COUNTING
        + GLOBALSYNC * FA[0]
FA[1].T = COUNTING * FA[0]
        + GLOBALSYNC * FA[1]
FA[2].T = COUNTING * FA[0] * FA[1]
        + GLOBALSYNC * FA[2]
FA[3].T = COUNTING * FA[0] * FA[1] * FA[2]
        + GLOBALSYNC * FA[3]
FA[4].T = COUNTING * FA[0] * FA[1] * FA[2] * FA[3]
        + GLOBALSYNC * FA[4]
FA[5].T = COUNTING * FA[0] * FA[1] * FA[2] * FA[3] * FA[4]
        + GLOBALSYNC * FA[5]
FA[6].T = COUNTING * FA[0] * FA[1] * FA[2] * FA[3] * FA[4] * FA[5]
        + GLOBALSYNC * FA[6]
FA[7].T = COUNTING * FA[0] * FA[1] * FA[2] * FA[3] * FA[4] * FA[5] * FA[6]
        + GLOBALSYNC * FA[7]
FA[8].T = COUNTING * FA[0] * FA[1] * FA[2] * FA[3] * FA[4] * FA[5] * FA[6] *
          FA[7]
        + GLOBALSYNC * FA[8]
FA[9].T = COUNTING * FA[0] * FA[1] * FA[2] * FA[3] * FA[4] * FA[5] * FA[6] *
          FA[7] * FA[8]
        + GLOBALSYNC *  FA[9]


RA[0].T = COUNTING * /HOLD
        + GLOBALSYNC *  RA[0]
RA[1].T = COUNTUP * RA[0]
          + COUNTDN * /RA[0]
        + GLOBALSYNC *  RA[1]
RA[2].T = COUNTUP * RA[0] * RA[1]
          + COUNTDN * /RA[1] * /RA[0]
        + GLOBALSYNC *  RA[2]
RA[3].T = COUNTUP * RA[0] * RA[1] * RA[2]
          + COUNTDN * /RA[0] * /RA[1] * /RA[2]
        + GLOBALSYNC *  RA[3]

RA[4].T = COUNTUP * RA[0] * RA[1] * RA[2] * RA[3]
          + COUNTDN * /RA[0] * /RA[1] * /RA[2] * /RA[3]
        + GLOBALSYNC *  RA[4]
RA[5].T = COUNTUP * RA[0] * RA[1] * RA[2] * RA[3] * RA[4]
          + COUNTDN * /RA[0] * /RA[1] * /RA[2] * /RA[3] * /RA[4]
        + GLOBALSYNC *  RA[5]
RA[6].T = COUNTUP * RA[0] * RA[1] * RA[2] * RA[3] * RA[4] * RA[5]
          + COUNTDN * /RA[0] * /RA[1] * /RA[2] * /RA[3] * /RA[4] * /RA[5]
        + GLOBALSYNC *  RA[6]
RA[7].T = COUNTUP * RA[0] * RA[1] * RA[2] * RA[3] * RA[4] * RA[5]
            * RA[6]
          + COUNTDN * /RA[0] * /RA[1] * /RA[2] * /RA[3] * /RA[4] * /RA[5]
```

```
          * /RA[6]
        + GLOBALSYNC *  RA[7]
RA[8].T = COUNTUP * RA[0] * RA[1] * RA[2] * RA[3] * RA[4] * RA[5]
          * RA[6] * RA[7]
        + COUNTDN * /RA[0] * /RA[1] * /RA[2] * /RA[3] * /RA[4] * /RA[5]
          * /RA[6] * /RA[7]
        + GLOBALSYNC *  RA[8]

;----------------------------------------------------------------------
```

```
;PALASM Design Description
;---------------------------------- Declaration Segment ------------
TITLE    PFIFO Write Control



CHIP  PFIFCTRL  MACH110
;---------------------------------- PIN Declarations ---------------
; General control
PIN 35 SDPCK2
PIN 28 /MQRESET
PIN 29 MQGRABT
PIN 43 /PFIFMR COMBINATORIAL ; OUTPUT

;--------------------
; Latch and 3-S control the sync word (goes to PFIFI bus)
PIN 33 /IFIFSYNC
PIN 36, 37, 38, 39, 40, 42, 13, 32 IFIF[0..7]
PIN 2, 3, 4, 5, 6, 7, 8, 9 PFIFI[0..7] REGISTERED ; OUTPUT
PIN 31 SYNCCT0 COMBINATORIAL ; INPUT
PIN 10 SYNCCT1 COMBINATORIAL ; INPUT
PIN 41 SYNCCT2 COMBINATORIAL ; INPUT
;--------------------

;--------------------
; SRAM write enables

PIN 30 FA9 COMBINATORIAL ; INPUT
PIN 25 /FOERWE REG; FWD RAM OE, REV RAM WE
PIN 26 /FWEROE REG; REV RAM OE, FWD RAM WE
;--------------------

;--------------------
; Latch and gate input data (goes to SRAMI bus)

PIN 11 IGTTHR COMBINATORIAL ; INPUT
PIN 14, 15, 16, 17, 18, 19, 24, 27 SRAMI[0..7] REGISTERED ; OUTPUT
;--------------------

; Design notes. See also PFIFO.PDS.
;
; This MACH has various functions.
; 1. Latch the sync word so it can be output after a one-line delay
; IFIFSYNC flags the sync word.
;
; 2. Generate the enable signals for the SRAM devices.
; The forward RAM is write enabled while the reverse RAM is output
; enabled, and vice versa. The only gating required is to output tri-state
; when the sync byte is output to the bus, that is when any of the
; sync count bits is asserted.
; Otherwise there is no problem driving the bus even though the parallel
; FIFO is not accepting data, and no problem writing to the RAMs
; multiple times at one address.

; 3. Latch and gate the data signals for the SRAM input bus.
```

```
; This is to implement a one-cycle delay while the address and
; control signals are computed. The data is also thresholded,
; and will be zero if the IGTTHR is not true. No 3-S required.
;
; 4. Output the sync word data when required onto the PFIFO input bus.
; The PFIFO data is either FRAM output, RRAM output or sync data.
; The signal SYNCCT1 controls the latch tristate.
;
; Note that the input data, IFIF is latched and output to both
; PFIFI and SRAMI.
; PFIFI - latched when IFIFSYNC. Output when SYNCCT1
; SRAMI - latched every SDPCK2 cycle. Output all the time (no other
; outputs on the SRAMI bus)
;
;

;---------------------------------- Boolean Equation Segment ------

EQUATIONS

PFIFMR = MQRESET + MQGRABT

FWEROE = /FA9 * /SYNCCT0 * /SYNCCT1 * /SYNCCT2
FOERWE =  FA9 * /SYNCCT0 * /SYNCCT1 * /SYNCCT2

SRAMI[0]    =  IFIF[0] * IGTTHR
SRAMI[1]    =  IFIF[1] * IGTTHR
SRAMI[2]    =  IFIF[2] * IGTTHR
SRAMI[3]    =  IFIF[3] * IGTTHR
SRAMI[4]    =  IFIF[4] * IGTTHR
SRAMI[5]    =  IFIF[5] * IGTTHR
SRAMI[6]    =  IFIF[6] * IGTTHR
SRAMI[7]    =  IFIF[7] * IGTTHR

SRAMI[0..7].CLKF = SDPCK2
SRAMI[0..7].RSTF = GND
SRAMI[0..7].SETF = GND

FOERWE.CLKF = SDPCK2
FOERWE.RSTF = GND
FOERWE.SETF = GND

FWEROE.CLKF = SDPCK2
FWEROE.RSTF = GND
FWEROE.SETF = GND


PFIFI[0..7].TRST = SYNCCT1
PFIFI[0..7].CLKF = SDPCK2
PFIFI[0..7].RSTF = GND
PFIFI[0..7].SETF = GND

PFIFI[0].T = /PFIFMR * IFIFSYNC *  PFIFI[0] * /IFIF[0]
           + /PFIFMR * IFIFSYNC * /PFIFI[0] *  IFIF[0]
           +  PFIFMR * PFIFI[0]
PFIFI[1].T = /PFIFMR * IFIFSYNC *  PFIFI[1] * /IFIF[1]
           + /PFIFMR * IFIFSYNC * /PFIFI[1] *  IFIF[1]
           +  PFIFMR * PFIFI[1]
PFIFI[2].T = /PFIFMR * IFIFSYNC *  PFIFI[2] * /IFIF[2]
           + /PFIFMR * IFIFSYNC * /PFIFI[2] *  IFIF[2]
```

```
             +  PFIFMR * PFIFI[2]
PFIFI[3].T = /PFIFMR * IFIFSYNC *  PFIFI[3] * /IFIF[3]
             + /PFIFMR * IFIFSYNC * /PFIFI[3] *  IFIF[3]
             +  PFIFMR * PFIFI[3]
PFIFI[4].T = /PFIFMR * IFIFSYNC *  PFIFI[4] * /IFIF[4]
             + /PFIFMR * IFIFSYNC * /PFIFI[4] *  IFIF[4]
             +  PFIFMR * PFIFI[4]
PFIFI[5].T = /PFIFMR * IFIFSYNC *  PFIFI[5] * /IFIF[5]
             + /PFIFMR * IFIFSYNC * /PFIFI[5] *  IFIF[5]
             +  PFIFMR * PFIFI[5]
PFIFI[6].T = /PFIFMR * IFIFSYNC *  PFIFI[6] * /IFIF[6]
             + /PFIFMR * IFIFSYNC * /PFIFI[6] *  IFIF[6]
             +  PFIFMR * PFIFI[6]
PFIFI[7].T = /PFIFMR * IFIFSYNC *  PFIFI[7] * /IFIF[7]
             + /PFIFMR * IFIFSYNC * /PFIFI[7] *  IFIF[7]
             +  PFIFMR * PFIFI[7]
;---------------------------------- Simulation Segment ------------
SIMULATION

TRACE_ON SDPCK2 IFIFSYNC FA9 IGTTHR SYNCCT0 SYNCCT1 SYNCCT2
         IFIF[0..1] PFIFI[0..1] SRAMI[0..1]
         FOERWE FWEROE
PRELOAD /PFIFI[0..7]
SETF /SDPCK2 /MQRESET
     /IFIFSYNC /IGTTHR FA9
     /IFIF[0..7] /SYNCCT0 /SYNCCT1 /SYNCCT2

CLOCKF SDPCK2
SETF SYNCCT0
CLOCKF SDPCK2
SETF /FA9
CLOCKF SDPCK2
SETF   SYNCCT1
CLOCKF SDPCK2
SETF FA9
CLOCKF SDPCK2
SETF /SYNCCT0 /SYNCCT1
CLOCKF SDPCK2
SETF IFIF[0]
CLOCKF SDPCK2
SETF IFIFSYNC
CLOCKF SDPCK2
CLOCKF SDPCK2
CLOCKF SDPCK2
SETF /IFIF[0] IFIF[1]
CLOCKF SDPCK2
CLOCKF SDPCK2
CLOCKF SDPCK2
SETF /IFIFSYNC
SETF IFIF[0] /IFIF[1]
CLOCKF SDPCK2
CLOCKF SDPCK2
TRACE_OFF SDPCK2 IFIFSYNC FA9 IGTTHR  SYNCCT0 SYNCCT1 SYNCCT2
          IFIF[0..1] PFIFI[0..1] SRAMI[0..1]
          FWEROE FOERWE
;-----------------------------------------------------------------
```

```
;PALASM Design Description
;---------------------------------- Declaration Segment ------------
TITLE    Main memory cycle controller in normal mode

CHIP  _MEMCTRL  MACH220
;---------------------------------- PIN Declarations ---------------
PIN 50 SDPCK ;

PIN 9 PFIF3F2 ; INPUT
PIN 25 PFIF0F2 ; INPUT
PIN 26 REFREQ ; INPUT
PIN 6 LINREQ ; INPUT

PIN 64 /LASTFRA ; INPUT
PIN 29 FRAME0 ; INPUT
PIN 30 CYCEND ; INPUT
PIN 16 /COLCMP ; INPUT
PIN 49 /ROWCMP ; INPUT
PIN 17 /MQRESET ; INPUT
PIN 15 RCMUX ; INPUT

PIN 65 GRABTOG ; INPUT
PIN 28 GRABVOL ; INPUT
PIN 67 /GRABING REGISTERED ; OUTPUT

PIN 51 DNLDTOG ; INPUT
PIN 41 /DNLDING REGISTERED ; OUTPUT

PIN 63 COLADCK ; INPUT
NODE 51 COLGATE REGISTERED
NODE 63, 89 COLDEL[0..1] REGISTERED

NODE 53 COLEND REGISTERED
NODE 87 ROWEND REGISTERED

PIN 7 /OFIF0HF ; INPUT
PIN 60 PRESET REGISTERED ; OUTPUT
PIN 55, 57, 58, 59 CYC[0..3] REGISTERED ; 3 OUTPUTS
PIN 23, 24, 21, 22, 33, 32, 31 CAD[0..6] REGISTERED ; 7 OUTPUTS
PIN 2, 3, 4, 5, 14, 13, 12, 11, 10 RAD[0..8] REGISTERED ; 9 OUTPUTS
PIN 36, 37, 38, 39, 48, 47, 46, 45, 44 IZNAD[0..8] REGISTERED ; 9 OUTPUTS
PIN 66 WALWAYS REGISTERED ; OUTPUT
NODE 91 CNTRST
NODE 90 SYNREQ REGISTERED ; OUTPUT
PIN 43 EODREQ REGISTERED ; OUTPUT
NODE 96 OFRREQ REGISTERED ; OUTPUT
PIN 62 /MQMADEN ; INPUT
PIN 54 ZEROMAD ; INPUT
                                                          ; BITS
GROUP          MACH_SEG_A                RAD[0..3]
GROUP          MACH_SEG_B                RAD[4..8]
```

```
GROUP           MACH_SEG_C          CAD[0..3]
GROUP           MACH_SEG_D          CAD[4..6]
GROUP           MACH_SEG_E          IZNAD[0..3]
GROUP           MACH_SEG_F          IZNAD[4..8]
GROUP           MACH_SEG_G          CYC[0..3] PRESET

;---------------------------------- Design Description ------------
;
; MEMCTRL is the main memory cycle arbiter. It works with the
; WRTECTRL and PROMCTRL PALs to control VRAM I/O, PFIFO output,
; OFIFO input and associated logic.
;
; The interaction between this MACH, PROMCTRL, WRTECTRL and the
; PROM outputs is quite complex in detail, here is an overview.
;
; Cycle priority is determined within this device, which
; sets the PROMCTRL inputs such that PROMCTRL loads a PROM start
; address for the appropriate cycle. PROMCTRL then counts up
; from the start address until reset from this device. The reset
; occurs either because one of the PROM outputs (CYCEND)
; signals completion, or because an end-of-line condition is
; detected by this device.
;
; Meanwhile, the WRTECTRL PAL is controlling the VRAM write lines
; to determine whether or not to write data based on the PROM outputs,
; the WALWAYS flag from here, and the FREEZE flag.


STRING  ROWGATE   '(CYC[3] * /CYC[2] *  CYC[1] *  CYC[0] * /PRESET)'
STRING  PFIFREQ   '(PFIF0F2 * PFIF3F2)'
STRING  ENDVOL    '(COLGATE * COLEND * ROWEND * LASTFRA * GRABVOL)'
STRING  ENDDNLD   '(COLGATE * COLEND * ROWEND)'
;--------------------------------- Boolean Equation Segment ------
EQUATIONS


; **************** THE COUNTERS ************************
; Both counters are reset by GRABTOG or DNLDTOG or MQRESET
; Use an asynchronous reset term CNTRST to combine these, timing is not
; critical and we save PT resources.
; Counters are muxed to the VRAM address lines (IZNAD) by RCMUX from the PROM.
;
; Because of mux, address will appear at RAM one cycle
; later than RCMUX change. Address set-up times must be carefully
; calculated.
;
; IZNAD can be doing one of four things:
; RAD from here (default)
; CAD from here
; Zero from here (TAP address in line transfer cycle)
; Video Quarter line number from video quarter, IZNAD outputs here are hi-Z
;
; Control lines to achieve this are RCMUX, ZEROMAD, VQIRADEN
;
; COLADCK comes from the PROM. COLEND and ROWEND are from the comparators.
; COLEND and ROWEND timing is > 1 SDPCK cycle, hence they must be gated
; with other, better defined signals.
; -> COLEND is gated with COLGATE
```

```
; -> ROWEND is gated with ROWGATE

CNTRST = GRABTOG + DNLDTOG + MQRESET


; **************** THE COLUMN COUNTER ******************
;
; Counter is SYNCHRONOUS
; Count ENABLED by COLADCK (from PROM)
; Count RESET by COLEND (gated by COLGATE) or GRABTOG or DNLDTOG or MQRESET
;
; Counter timing. Counter is only clocked during state machine states
; S_DTM_HNDLR and S_DL_HNDLR, ie when writing data to memory or downloading
; data out of memory. It is not incremented during refresh or line request
; handling.
; Timing is like this:
;
; SDPCK       |    |    |    |    |    |    |    |
; COLADCK     ___/----\_________________________________(min 1 SDPCK after /CAS)
; CAD[..]     11111111XX22222222222XX000000000000000000000000000
; COLCMP      ________XXXXXXXXXX----XXXXXXXXXX_______________
; COLGATE     __________________/----\________________________
; COLEND      ______________________/-------------------------
; state       S_DTM_HNDLR          XX 1 XX 2 XX 3 XX S_WAITING
;             S_DL_HNDLR           XX 1 XX 2 XX 3 XX
; RAD[..]     1111111111111111111111XX222222222222XX0000000000000000
; ROWCMP      ______________________XXXXXXXXXXXX---XXXXXXXXXXX_______
; ROWGATE     _______________________________/----\_______________
; ROWEND      ____________________________________/---------------
; CYC[..]     1111111111111111111111XX2222
; PROM ADDR   1111111111111111111111111111XX22222
; PROM DATA   11111111111111111111111111111111XX22
;
;                                  ^____ conditions here cause count reset
;                                        and end the cycle early (if no
; COLADCK                                COLEND cycle terminated by /CYCEND
; is  from PROM                          after 16 counts).
; COLEND is comparator                   Row Address clock also enabled here.
; output.
; COLGATE is COLADCK delayed 3 cycles
;
; The ROWGATE condition is in fact S_CLNUP3 and RAD two LSBs set,
; so it doesn't need a separate pin or node.
;
;
;

COLEND.RSTF = MQRESET
COLEND.SETF = GND
COLEND.CLKF = SDPCK

; Duration of COLEND is from COLGATE to COLGATE, ie one CAD cycle

COLEND.T = COLGATE *  COLCMP * /COLEND
         + COLGATE * /COLCMP *  COLEND

ROWEND.RSTF = MQRESET
ROWEND.SETF = GND
ROWEND.CLKF = SDPCK
```

```
ROWEND.T = ROWGATE *    ROWCMP * RAD[0] * RAD[1]  * /ROWEND
         + ROWGATE * /(ROWCMP * RAD[0] * RAD[1]) *  ROWEND


COLDEL[0..1].RSTF = MQRESET
COLDEL[0..1].SETF = GND
COLDEL[0..1].CLKF = SDPCK

COLGATE.RSTF = MQRESET
COLGATE.SETF = GND
COLGATE.CLKF = SDPCK

COLDEL[0] = COLADCK
COLDEL[1] = COLDEL[0]
COLGATE = COLDEL[1]

CAD[0..6].CLKF = SDPCK
CAD[0..6].RSTF = CNTRST
CAD[0..6].SETF = GND


CAD[0].T =    COLADCK
          + CAD[0]   * COLEND * COLGATE
CAD[1].T =    COLADCK * CAD[0]
          + CAD[1]   * COLEND * COLGATE
CAD[2].T =    COLADCK * CAD[0] * CAD[1]
          + CAD[2]   * COLEND * COLGATE
CAD[3].T =    COLADCK * CAD[0] * CAD[1] * CAD[2]
          + CAD[3]   * COLEND * COLGATE
CAD[4].T =    COLADCK * CAD[0] * CAD[1] * CAD[2] * CAD[3]
          + CAD[4]   * COLEND * COLGATE
CAD[5].T =    COLADCK * CAD[0] * CAD[1] * CAD[2] * CAD[3] * CAD[4]
          + CAD[5]   * COLEND * COLGATE
CAD[6].T =    COLADCK * CAD[0] * CAD[1] * CAD[2] * CAD[3] * CAD[4] * CAD[5]
          + CAD[6]   * COLEND * COLGATE


; **************** THE ROW COUNTER *******************
;
; Counter is SYNCHRONOUS
; Count ENABLED by COLEND
; Count RESET by ROWEND or GRABTOG or DNLDTOG or MQRESET
;

RAD[0..8].CLKF = SDPCK
RAD[0..8].RSTF = CNTRST
RAD[0..8].SETF = GND


RAD[0].T =    COLEND * COLGATE * /SYNREQ
          + RAD[0]   * SYNREQ
RAD[1].T =    COLEND * COLGATE * RAD[0] * /SYNREQ
          + RAD[1]   * SYNREQ
RAD[2].T =    COLEND * COLGATE * RAD[0] * RAD[1] * /SYNREQ
          + RAD[2]   * SYNREQ
RAD[3].T =    COLEND * COLGATE * RAD[0] * RAD[1] * RAD[2] * /SYNREQ
          + RAD[3]   * SYNREQ
RAD[4].T =    COLEND * COLGATE * RAD[0] * RAD[1] * RAD[2] * RAD[3] * /SYNREQ
          + RAD[4]   * SYNREQ
RAD[5].T =    COLEND * COLGATE * RAD[0] * RAD[1] * RAD[2] * RAD[3] * RAD[4]
```

```
              * /SYNREQ
            + RAD[5]  * SYNREQ
RAD[6].T =    COLEND * COLGATE * RAD[0] * RAD[1] * RAD[2] * RAD[3] * RAD[4]
              * RAD[5] * /SYNREQ
            + RAD[6]  * SYNREQ
RAD[7].T =    COLEND * COLGATE * RAD[0] * RAD[1] * RAD[2] * RAD[3] * RAD[4]
              * RAD[5] * RAD[6] * /SYNREQ
            + RAD[7]  * SYNREQ
RAD[8].T =    COLEND * COLGATE * RAD[0] * RAD[1] * RAD[2] * RAD[3] * RAD[4]
              * RAD[5] * RAD[6] * RAD[7] * /SYNREQ
            + RAD[8]  * SYNREQ

IZNAD[0..8].RSTF = MQRESET
IZNAD[0..8].SETF = GND
IZNAD[0..8].CLKF = SDPCK

IZNAD[0..8].TRST = MQMADEN

IZNAD[0] = /ZEROMAD * /RCMUX * RAD[0]
         + /ZEROMAD *  RCMUX * CAD[0]
IZNAD[1] = /ZEROMAD * /RCMUX * RAD[1]
         + /ZEROMAD *  RCMUX * CAD[1]
IZNAD[2] = /ZEROMAD * /RCMUX * RAD[2]
         + /ZEROMAD *  RCMUX * CAD[2]
IZNAD[3] = /ZEROMAD * /RCMUX * RAD[3]
         + /ZEROMAD *  RCMUX * CAD[3]
IZNAD[4] = /ZEROMAD * /RCMUX * RAD[4]
         + /ZEROMAD *  RCMUX * CAD[4]
IZNAD[5] = /ZEROMAD * /RCMUX * RAD[5]
         + /ZEROMAD *  RCMUX * CAD[5]
IZNAD[6] = /ZEROMAD * /RCMUX * RAD[6]
         + /ZEROMAD *  RCMUX * CAD[6]

IZNAD[7] = /ZEROMAD * /RCMUX * RAD[7]
IZNAD[8] = /ZEROMAD * /RCMUX * RAD[8]


; **************** OTHER EQUATIONS *******************

GRABING.RSTF = MQRESET
GRABING.SETF = GND
GRABING.CLKF = SDPCK

DNLDING.RSTF = MQRESET
DNLDING.SETF = GND
DNLDING.CLKF = SDPCK

SYNREQ.RSTF = MQRESET
SYNREQ.SETF = GND
SYNREQ.CLKF = SDPCK

EODREQ.RSTF = MQRESET
EODREQ.SETF = GND
EODREQ.CLKF = SDPCK

OFRREQ.RSTF = MQRESET
OFRREQ.SETF = GND
OFRREQ.CLKF = SDPCK

WALWAYS.RSTF = MQRESET
```

```
WALWAYS.SETF = GND
WALWAYS.CLKF = SDPCK

GRABING.T = /GRABING *  GRABTOG
          +  GRABING * /GRABTOG * ENDVOL
          + GRABING * DNLDTOG

DNLDING.T = /DNLDING *  DNLDTOG
          +  DNLDING * /DNLDTOG * ENDDNLD
          + DNLDING * GRABTOG

; SYNREQ - next word is a sync word if frame has just completed, or
;          this is the start of a grab cycle
;          Enable SYNREQ to toggle high at grab cycle start,
;          or frame end.
;          Enable SYNREQ to toggle low when state machine starts
;          to handle a SYN cycle, ie in state S_SYN_*
;

SYNREQ.T =  /SYNREQ * GRABTOG
          + /SYNREQ * /GRABTOG * GRABING * ROWEND * COLEND * COLGATE
          +  SYNREQ * /CYC[3] * /CYC[2] *  CYC[1] * /CYC[0]

; EODREQ - set high when a DNLD or GRAB/download cycle completes.
;          State machine will clock out extra bytes
;          to flush data through (until OFIFOHF stops it).
;          Enable EODREQ to toggle high at cycle end (GRAB/vol or DNLD)
;          Enable EODREQ to toggle low when next cycle toggle is detected
;

EODREQ.T = /EODREQ * /GRABTOG * GRABING * ENDVOL
         + /EODREQ * /DNLDTOG * DNLDING * ENDDNLD
         +  EODREQ * GRABTOG
         +  EODREQ * DNLDTOG

OFRREQ.T = /OFRREQ *  GRABTOG
         + /OFRREQ *  DNLDTOG
         +  OFRREQ * /GRABTOG * /DNLDTOG *
           /CYC[3] *  CYC[2] * /CYC[1] * /CYC[0]

WALWAYS = FRAME0
        + /GRABTOG * GRABING * /GRABVOL

CYC[3..0].CLKF = SDPCK
CYC[3..0].RSTF = MQRESET
CYC[3..0].SETF = GND

PRESET.RSTF = MQRESET
PRESET.SETF = GND
PRESET.CLKF = SDPCK
                                          State Machine Segment ---------
;-----------------------------------
;
; The State Machine runs 8 different cycles. These are, in order of
; priority:
;
; LIN - VRAM internal transfer of a line for the video quarter
; SYN - Read two sync bytes out of PFIFO
; REF - Refresh the VRAM
; OFR - Output FIFO Reset (and re-program)
; DTM - Read pixel (non-sync) data out of PFIFO
; DL  - Download data to OFIFO (I or Z determined in PROMCTRL PAL)
```

```
; EOD - (End of DNLD) write 128 garbage bytes to OFIFO to flush
;       through good data
; CLN - 3 cleanup cycles after a DL or DTM. Handled differently
;       from the others.
;
; There is also a NUL cycle when nothing is happening, in RESET or
; WAITING states.
;
;
; The cycle implementation is handled by setting inpts to the PROMCTRL
; PAL to preset a start address, then holding in the hadler state
; until an end-of-cycle condition is detected. There may be cycle
; cleanup required when the cycle completes.
; The PROMCTRL PAL detects the PRESET signal to setup the PROM start
; address, PRESET is valid only one clock cycle. When PRESET is
; deasserted, the PROMCTRL PAL counts the address upwards from the
; preset start address.
;
; LIN cycle
; Signalled by:     LINREQ input
; Accepted when:    Not reset.
; Terminated by:    /CYCEND or RESET
; Cleanup:          None

; SYN cycle
; Signalled by:     Sync data in PFIFO (PFIFREQ * SYNREQ)
; Accepted when:    No LINREQ outstanding. GRABing.
; Terminated by:    /CYCEND or RESET.
; Cleanup:          None

; REF cycle
; Signalled by:     REFREQ input
; Accepted when:    Not reset, no LINREQ or SYNREQ outstanding
; Terminated by:    /CYCEND or RESET
; Cleanup:          None

; OFR cycle
; Signalled by:     OFRREQ input
; Accepted when:    Not reset, no LINREQ or SYNREQ outstanding
; Terminated by:    /CYCEND or RESET
; Cleanup:          None

; DTM cycle
; Signalled by:     Pixel data in PFIFO (PFIFREQ * /SYNREQ)
; Accepted when:    Not reset. No LINREQ or REFREQ or OFRREQ.
;                   GRAB is currently in effect.
; Terminated by:    Either CYCEND from PROM after 16 words, or end of cut line
;                   when COLEND comparator becomes true. COLEND is gated
;                   to ensure cycle is terminated when current word
;                   handling is complete.
; Cleanup:          Yes. 3 cycles of cleanup to check whether this was
;                   last row in frame, or last row and last frame if
;                   downloading. If last row, setup for a SYN cycle.
;                   If last row in last frame when downloading, terminate
;                   GRAB and setup for an EOD cycle
;

; DL cycle
; Signalled by:     Room in OFIFO for data
; Accepted when:    Not reset. No LINREQ or REFREQ or OFRREQ. DNLD is in
;                   effect.
;
```

```
C_DL_GO        = /MQRESET * /LINREQ * /REFREQ * /OFIFOHF
                 * /DNLDTOG * DNLDING * /GRABTOG * /GRABING * /OFRREQ


C_CYC_STOP     = /MQRESET * CYCEND
C_EARLY_STOP   = /MQRESET * CYCEND
               + /MQRESET * COLEND * COLGATE
C_RESET        = MQRESET

;----------------------------------- Simulation Segment ------------
SIMULATION

;-------------------------------------------------------------------
```

```
;PALASM Design Description
;---------------------------------- Declaration Segment ------------
TITLE    Graphics memory, video init and I/Z diagnostic control
PATTERN  A
REVISION 01/323A
AUTHOR   A.A.Moorhouse
COMPANY  RIGG ASSOCIATES
DATE     04/05/93

CHIP  GRPHCTRL  MACH220
;---------------------------------- PIN Declarations ---------------
PIN 16 /RESET ;
PIN 50 BUSCK ;
PIN 51 /EXWR ;
PIN 49 /EXRD ;
PIN 17 /EXAS ;
PIN 59 /ENAD400 ;
PIN 46 /ENAD00F ;
PIN 65 BLINREQ
PIN 20 MEMDIAG ;
PIN 30 DIAGZ ;
PIN 15, 29, 41, 45, 63, 62, 57, 28, 44, 39, 58, 54, 6, 43, 5, 64 ADDRIN[2..17] ;
PIN 23 /IZDRAS REGISTERED ; OUTPUT
PIN 2 /IZDCAS REGISTERED ; OUTPUT
PIN 26 RCMUX REGISTERED ; OUTPUT
PIN 25 ZGAD REGISTERED ; OUTPUT
PIN 22 /GADOE REGISTERED ; OUTPUT
PIN 32 /VOGRADEN REGISTERED ; OUTPUT
PIN 12 /IDWE REGISTERED ; OUTPUT
PIN 9 /ZDWE REGISTERED ; OUTPUT
PIN 37 /GWE REGISTERED ; OUTPUT
PIN 13 /IDOE REGISTERED ; OUTPUT
PIN 10 /ZDOE REGISTERED ; OUTPUT
PIN 4 /GOE REGISTERED ; OUTPUT
PIN 24 /BTCE REGISTERED ; OUTPUT
PIN 47 /BTWR REGISTERED ; OUTPUT
PIN 3 HOFF REGISTERED ; OUTPUT
PIN 55, 67, 21, 14, 33, 36, 48, 56, 66 GAD[0..8] REGISTERED ; OUTPUT
PIN 11, 31 ADDROUT[3..2] REGISTERED ; OUTPUT
NODE 17, 43, 61, 68, 75, 91, 44, 53, 66, 77, 87, 41, 60, 67 ADDROUT[4..17] REGIS
NODE 78 QS1 REGISTERED
NODE 92 QS0 REGISTERED
NODE 39 PEND400 REGISTERED
NODE 56 PEND00F REGISTERED
NODE 72, 80, 97, 73, 84, 31, 33, 35 REFCNT[0..7] REGISTERED
NODE 90 REFREQ REGISTERED
PIN 38 /BLINCLR REGISTERED
NODE 8 ESB REGISTERED

STRING BUSIO0   '(GADOE * /HOFF * /IZDRAS * /IZDCAS * /RCMUX * /ZGAD *  ESB)'
STRING BUSIO1   '(GADOE * /HOFF *  IZDRAS * /IZDCAS *  RCMUX * /ZGAD *  ESB)'
STRING BUSIO2   '(GADOE * /HOFF *  IZDRAS * /IZDCAS *  RCMUX * /ZGAD * /ESB)'
STRING BUSIO3   '(GADOE * /HOFF *  IZDRAS *  IZDCAS *  RCMUX * /ZGAD *  ESB)'
STRING BUSIO4   '(GADOE * /HOFF *  IZDRAS *  IZDCAS *  RCMUX * /ZGAD * /ESB)'
STRING REF0     '(/IZDRAS *  IZDCAS)'
STRING LIN01    '( HOFF * /IZDRAS * /IZDCAS )'
STRING LIN2     '( /GADOE * HOFF *  IZDRAS * /IZDCAS * /RCMUX * /ZGAD * ESB)'
```

```
;------------------------------------- Boolean Equation Segment ------
EQUATIONS

; Three successive clock cycles will clock the address strobe, the valid
; address, and one of the enable lines if the address is for us (ENAD400
; or ENAD00F). If neither enable line is asserted, it's not for us and
; we ignore this address cycle, it doesn't matter that we latched the
; address. If one of the lines is asserted, we set the pending flag
; for the enabled memory. The pending flag will be handled when any current
; refresh or line transfers have completed, or immediately if none
; are currently active. The pending flag will be cleared when handled.
;
; We implement this by counting to three in the QS1, QS0 bits whenever
; EXAS is detected. We decode count 0 as no action, count 1 as latch
; the address and count 2 as latch the pending flag.
; Also, we use count 1 and count 2 in the state machine to indicate
; imminent address cycle, don't start a refresh or line transfer yet.

QS0.CLKF = BUSCK
QS0.RSTF = RESET
QS0.SETF = GND

QS1.CLKF = BUSCK
QS1.RSTF = RESET
QS1.SETF = GND

QS0      = EXAS
QS1      = QS0

ADDROUT[2..17].CLKF = BUSCK
ADDROUT[2..17].RSTF = RESET
ADDROUT[2..17].SETF = GND


ADDROUT[2].T =   ADDRIN[2] * QS0 * /ADDROUT[2]
             + /ADDRIN[2] * QS0 *  ADDROUT[2]
ADDROUT[3].T =   ADDRIN[3] * QS0 * /ADDROUT[3]
             + /ADDRIN[3] * QS0 *  ADDROUT[3]
ADDROUT[4].T =   ADDRIN[4] * QS0 * /ADDROUT[4]
             + /ADDRIN[4] * QS0 *  ADDROUT[4]
ADDROUT[5].T =   ADDRIN[5] * QS0 * /ADDROUT[5]
             + /ADDRIN[5] * QS0 *  ADDROUT[5]
ADDROUT[6].T =   ADDRIN[6] * QS0 * /ADDROUT[6]
             + /ADDRIN[6] * QS0 *  ADDROUT[6]
ADDROUT[7].T =   ADDRIN[7] * QS0 * /ADDROUT[7]
             + /ADDRIN[7] * QS0 *  ADDROUT[7]
ADDROUT[8].T =   ADDRIN[8] * QS0 * /ADDROUT[8]
             + /ADDRIN[8] * QS0 *  ADDROUT[8]
ADDROUT[9].T =   ADDRIN[9] * QS0 * /ADDROUT[9]
             + /ADDRIN[9] * QS0 *  ADDROUT[9]
ADDROUT[10].T =   ADDRIN[10] * QS0 * /ADDROUT[10]
              + /ADDRIN[10] * QS0 *  ADDROUT[10]
ADDROUT[11].T =   ADDRIN[11] * QS0 * /ADDROUT[11]
              + /ADDRIN[11] * QS0 *  ADDROUT[11]
ADDROUT[12].T =   ADDRIN[12] * QS0 * /ADDROUT[12]
              + /ADDRIN[12] * QS0 *  ADDROUT[12]
ADDROUT[13].T =   ADDRIN[13] * QS0 * /ADDROUT[13]
              + /ADDRIN[13] * QS0 *  ADDROUT[13]
ADDROUT[14].T =   ADDRIN[14] * QS0 * /ADDROUT[14]
```

```
             + /ADDRIN[14] * QS0 *  ADDROUT[14]
ADDROUT[15].T =  ADDRIN[15] * QS0 * /ADDROUT[15]
             + /ADDRIN[15] * QS0 *  ADDROUT[15]
ADDROUT[16].T =  ADDRIN[16] * QS0 * /ADDROUT[16]
             + /ADDRIN[16] * QS0 *  ADDROUT[16]
ADDROUT[17].T =  ADDRIN[17] * QS0 * /ADDROUT[17]
             + /ADDRIN[17] * QS0 *  ADDROUT[17]

GAD[0..8].CLKF = BUSCK
GAD[0..8].RSTF = RESET
GAD[0..8].SETF = GND
GAD[0..8].TRST = GADOE

GAD[0]   =  RCMUX * ADDROUT[2] * /ZGAD
         + /RCMUX * ADDROUT[9] * /ZGAD
GAD[1]   =  RCMUX * ADDROUT[3] * /ZGAD
         + /RCMUX * ADDROUT[10] * /ZGAD
GAD[2]   =  RCMUX * ADDROUT[4] * /ZGAD
         + /RCMUX * ADDROUT[11] * /ZGAD
GAD[3]   =  RCMUX * ADDROUT[5] * /ZGAD
         + /RCMUX * ADDROUT[12] * /ZGAD
GAD[4]   =  RCMUX * ADDROUT[6] * /ZGAD
         + /RCMUX * ADDROUT[13] * /ZGAD
GAD[5]   =  RCMUX * ADDROUT[7] * /ZGAD
         + /RCMUX * ADDROUT[14] * /ZGAD
GAD[6]   =  RCMUX * ADDROUT[8] * /ZGAD
         + /RCMUX * ADDROUT[15] * /ZGAD
GAD[7]   = /RCMUX * ADDROUT[16] * /ZGAD
GAD[8]   = /RCMUX * ADDROUT[17] * /ZGAD

PEND400.CLKF = BUSCK
PEND400.RSTF = RESET
PEND400.SETF = GND

PEND00F.CLKF = BUSCK
PEND00F.RSTF = RESET
PEND00F.SETF = GND


PEND400.T     =  QS1 * ENAD400 * /PEND400
              +  PEND400 * BUSIO4

PEND00F.T     =  QS1 * ENAD00F * /PEND00F
              +  PEND00F * BUSIO4

IDWE.CLKF = BUSCK
IDWE.RSTF = RESET
IDWE.SETF = GND

ZDWE.CLKF = BUSCK
ZDWE.RSTF = RESET
ZDWE.SETF = GND

IDOE.CLKF = BUSCK
IDOE.RSTF = RESET
IDOE.SETF = GND

ZDOE.CLKF = BUSCK
```

```
ZDOE.RSTF = RESET
ZDOE.SETF = GND

GOE.CLKF = BUSCK
GOE.RSTF = RESET
GOE.SETF = GND

GWE.CLKF = BUSCK
GWE.RSTF = RESET
GWE.SETF = GND

IDWE    =       BUSIO1 * PEND400 * EXWR *  MEMDIAG * /DIAGZ
              + BUSIO2 * PEND400 * EXWR *  MEMDIAG * /DIAGZ
ZDWE    =       BUSIO1 * PEND400 * EXWR *  MEMDIAG *  DIAGZ
              + BUSIO2 * PEND400 * EXWR *  MEMDIAG *  DIAGZ
GWE     =       BUSIO1 * PEND400 * EXWR * /MEMDIAG
              + BUSIO2 * PEND400 * EXWR * /MEMDIAG

IDOE    =       BUSIO1 * PEND400 * EXRD *  MEMDIAG * /DIAGZ
              + BUSIO2 * PEND400 * EXRD *  MEMDIAG * /DIAGZ
              + BUSIO3 * PEND400 * EXRD *  MEMDIAG * /DIAGZ
              + LIN01
              + LIN2
ZDOE    =       BUSIO1 * PEND400 * EXRD *  MEMDIAG *  DIAGZ
              + BUSIO2 * PEND400 * EXRD *  MEMDIAG *  DIAGZ
              + BUSIO3 * PEND400 * EXRD *  MEMDIAG *  DIAGZ
              + LIN01
              + LIN2
GOE     =       BUSIO1 * PEND400 * EXRD * /MEMDIAG
              + BUSIO2 * PEND400 * EXRD * /MEMDIAG
              + BUSIO3 * PEND400 * EXRD * /MEMDIAG
              + LIN01
              + LIN2

BTCE.CLKF = BUSCK
BTCE.SETF = GND
BTCE.RSTF = RESET

BTWR.CLKF = BUSCK
BTWR.SETF = GND
BTWR.RSTF = RESET

BTCE    =       BUSIO1 * PENDOOF
            +   BUSIO2 * PENDOOF
            +   BUSIO3 * PENDOOF
BTWR    =       BUSIO0 * PENDOOF * EXWR
            +   BUSIO1 * PENDOOF * EXWR
REFCNT[0..7].CLKF = BUSCK
REFCNT[0..7].RSTF = RESET
REFCNT[0..7].SETF = GND

; Refresh counter

REFCNT[0].T = /REFREQ
REFCNT[1].T = /REFREQ * REFCNT[0]
REFCNT[2].T = /REFREQ * REFCNT[0] * REFCNT[1]
REFCNT[3].T = /REFREQ * REFCNT[0] * REFCNT[1] * REFCNT[2]
REFCNT[4].T = /REFREQ * REFCNT[0] * REFCNT[1] * REFCNT[2]
            * REFCNT[3]
```

```
REFCNT[5].T = /REFREQ * REFCNT[0] * REFCNT[1] * REFCNT[2]
            * REFCNT[3] * REFCNT[4]
REFCNT[6].T = /REFREQ * REFCNT[0] * REFCNT[1] * REFCNT[2]
            * REFCNT[3] * REFCNT[4] * REFCNT[5]
REFCNT[7].T = /REFREQ * REFCNT[0] * REFCNT[1] * REFCNT[2]
            * REFCNT[3] * REFCNT[4] * REFCNT[5] * REFCNT[6]

REFREQ.CLKF = BUSCK
REFREQ.SETF = GND
REFREQ.RSTF = RESET


REFREQ.T = /REFREQ * REFCNT[0] * REFCNT[1] * REFCNT[2] * REFCNT[3]
         * REFCNT[4] * REFCNT[5] * REFCNT[6] * REFCNT[7]
         + REF0 * REFREQ

BLINCLR.CLKF = BUSCK
BLINCLR.RSTF = RESET
BLINCLR.SETF = GND

BLINCLR = LIN01
HOFF.RSTF = RESET
HOFF.SETF = GND

RCMUX.RSTF = RESET
RCMUX.SETF = GND

IZDRAS.RSTF = RESET
IZDRAS.SETF = GND

IZDCAS.RSTF = RESET
IZDCAS.SETF = GND

ZGAD.RSTF = RESET
ZGAD.SETF = GND

GADOE.RSTF = RESET
GADOE.SETF = GND

VQGRADEN.RSTF = RESET
VQGRADEN.SETF = GND

ESB.SETF = GND
ESB.RSTF = RESET


STATE
MOORE_MACHINE
CLKF = BUSCK
DEFAULT_BRANCH S_READY
START_UP := POWER_UP -> S_READY

; State assignments
;              64        32          16         8          4          2         1

S_READY    = /GADOE * /HOFF * /IZDRAS * /IZDCAS * /RCMUX * /ZGAD * /ESB ;  0
S_BUSIO0   =  GADOE * /HOFF * /IZDRAS * /IZDCAS * /RCMUX * /ZGAD *  ESB ; 65
S_BUSIO1   =  GADOE * /HOFF *  IZDRAS * /IZDCAS *  RCMUX * /ZGAD *  ESB ; 85
S_BUSIO2   =  GADOE * /HOFF *  IZDRAS * /IZDCAS *  RCMUX * /ZGAD * /ESB ; 84
```

```
S_BUSIO3   =  GADOE * /HOFF *  IZDRAS *  IZDCAS *  RCMUX * /ZGAD *  ESB ; 93
S_BUSIO4   =  GADOE * /HOFF *  IZDRAS *  IZDCAS *  RCMUX * /ZGAD * /ESB ; 92

; RCMUX, ZGAD are don't care during refresh cycle. Change them
; around in order to differentiate states, if necessary.

S_REF0     = /GADOE *  HOFF * /IZDRAS *  IZDCAS * /RCMUX * /ZGAD *  ESB ; 41
S_REF1     = /GADOE *  HOFF *  IZDRAS *  IZDCAS * /RCMUX * /ZGAD *  ESB ; 57
S_REF2     = /GADOE *  HOFF *  IZDRAS * /IZDCAS *  RCMUX * /ZGAD *  ESB ; 53
S_REF3     = /GADOE * /HOFF *  IZDRAS * /IZDCAS * /RCMUX * /ZGAD *  ESB ; 17

S_LIN0     = /GADOE *  HOFF * /IZDRAS * /IZDCAS * /RCMUX * /ZGAD * /ESB ; 32
S_LIN1     = /GADOE *  HOFF * /IZDRAS * /IZDCAS * /RCMUX * /ZGAD *  ESB ; 33
S_LIN2     = /GADOE *  HOFF *  IZDRAS * /IZDCAS * /RCMUX * /ZGAD *  ESB ; 49
S_LIN3     = /GADOE *  HOFF *  IZDRAS * /IZDCAS * /RCMUX *  ZGAD * /ESB ; 50
S_LIN4     =  GADOE *  HOFF *  IZDRAS * /IZDCAS * /RCMUX *  ZGAD *  ESB ; 115
S_LIN5     =  GADOE * /HOFF *  IZDRAS *  IZDCAS * /RCMUX *  ZGAD *  ESB ; 91

; Assign unused states too.

S01     =  /GADOE * /HOFF * /IZDRAS * /IZDCAS * /RCMUX * /ZGAD *  ESB ; 01
S02     =  /GADOE * /HOFF * /IZDRAS * /IZDCAS * /RCMUX *  ZGAD * /ESB ; 02
S03     =  /GADOE * /HOFF * /IZDRAS * /IZDCAS * /RCMUX *  ZGAD *  ESB ; 03
S04     =  /GADOE * /HOFF * /IZDRAS * /IZDCAS *  RCMUX * /ZGAD * /ESB ; 04
S05     =  /GADOE * /HOFF * /IZDRAS * /IZDCAS *  RCMUX * /ZGAD *  ESB ; 05
S06     =  /GADOE * /HOFF * /IZDRAS * /IZDCAS *  RCMUX *  ZGAD * /ESB ; 06
S07     =  /GADOE * /HOFF * /IZDRAS * /IZDCAS *  RCMUX *  ZGAD *  ESB ; 07
S08     =  /GADOE * /HOFF * /IZDRAS *  IZDCAS * /RCMUX * /ZGAD * /ESB ; 08
S09     =  /GADOE * /HOFF * /IZDRAS *  IZDCAS * /RCMUX * /ZGAD *  ESB ; 09
S10     =  /GADOE * /HOFF * /IZDRAS *  IZDCAS * /RCMUX *  ZGAD * /ESB ; 10
S11     =  /GADOE * /HOFF * /IZDRAS *  IZDCAS * /RCMUX *  ZGAD *  ESB ; 11
S12     =  /GADOE * /HOFF * /IZDRAS *  IZDCAS *  RCMUX * /ZGAD * /ESB ; 12
S13     =  /GADOE * /HOFF * /IZDRAS *  IZDCAS *  RCMUX * /ZGAD *  ESB ; 13
S14     =  /GADOE * /HOFF * /IZDRAS *  IZDCAS *  RCMUX *  ZGAD * /ESB ; 14
S15     =  /GADOE * /HOFF * /IZDRAS *  IZDCAS *  RCMUX *  ZGAD *  ESB ; 15
S16     =  /GADOE * /HOFF *  IZDRAS * /IZDCAS * /RCMUX * /ZGAD * /ESB ; 16
S18     =  /GADOE * /HOFF *  IZDRAS * /IZDCAS * /RCMUX *  ZGAD * /ESB ; 18
S19     =  /GADOE * /HOFF *  IZDRAS * /IZDCAS * /RCMUX *  ZGAD *  ESB ; 19
S20     =  /GADOE * /HOFF *  IZDRAS * /IZDCAS *  RCMUX * /ZGAD * /ESB ; 20
S21     =  /GADOE * /HOFF *  IZDRAS * /IZDCAS *  RCMUX * /ZGAD *  ESB ; 21
S22     =  /GADOE * /HOFF *  IZDRAS * /IZDCAS *  RCMUX *  ZGAD * /ESB ; 22
S23     =  /GADOE * /HOFF *  IZDRAS * /IZDCAS *  RCMUX *  ZGAD *  ESB ; 23
S24     =  /GADOE * /HOFF *  IZDRAS *  IZDCAS * /RCMUX * /ZGAD * /ESB ; 24
S25     =  /GADOE * /HOFF *  IZDRAS *  IZDCAS * /RCMUX * /ZGAD *  ESB ; 25
S26     =  /GADOE * /HOFF *  IZDRAS *  IZDCAS * /RCMUX *  ZGAD * /ESB ; 26
S27     =  /GADOE * /HOFF *  IZDRAS *  IZDCAS * /RCMUX *  ZGAD *  ESB ; 27
S28     =  /GADOE * /HOFF *  IZDRAS *  IZDCAS *  RCMUX * /ZGAD * /ESB ; 28
S29     =  /GADOE * /HOFF *  IZDRAS *  IZDCAS *  RCMUX * /ZGAD *  ESB ; 29
S30     =  /GADOE * /HOFF *  IZDRAS *  IZDCAS *  RCMUX *  ZGAD * /ESB ; 30
S31     =  /GADOE * /HOFF *  IZDRAS *  IZDCAS *  RCMUX *  ZGAD *  ESB ; 31
S34     =  /GADOE *  HOFF * /IZDRAS * /IZDCAS * /RCMUX *  ZGAD * /ESB ; 34
S35     =  /GADOE *  HOFF * /IZDRAS * /IZDCAS * /RCMUX *  ZGAD *  ESB ; 35
S36     =  /GADOE *  HOFF * /IZDRAS * /IZDCAS *  RCMUX * /ZGAD * /ESB ; 36
S37     =  /GADOE *  HOFF * /IZDRAS * /IZDCAS *  RCMUX * /ZGAD *  ESB ; 37
S38     =  /GADOE *  HOFF * /IZDRAS * /IZDCAS *  RCMUX *  ZGAD * /ESB ; 38
S39     =  /GADOE *  HOFF * /IZDRAS * /IZDCAS *  RCMUX *  ZGAD *  ESB ; 39
S40     =  /GADOE *  HOFF * /IZDRAS *  IZDCAS * /RCMUX * /ZGAD * /ESB ; 40
S42     =  /GADOE *  HOFF * /IZDRAS *  IZDCAS * /RCMUX *  ZGAD * /ESB ; 42
S43     =  /GADOE *  HOFF * /IZDRAS *  IZDCAS * /RCMUX *  ZGAD *  ESB ; 43
S44     =  /GADOE *  HOFF * /IZDRAS *  IZDCAS *  RCMUX * /ZGAD * /ESB ; 44
```

```
S45  = /GADOE *  HOFF * /IZDRAS *  IZDCAS *  RCMUX * /ZGAD *  ESB ; 45
S46  = /GADOE *  HOFF * /IZDRAS *  IZDCAS *  RCMUX *  ZGAD * /ESB ; 46
S47  = /GADOE *  HOFF * /IZDRAS *  IZDCAS *  RCMUX *  ZGAD *  ESB ; 47
S48  = /GADOE *  HOFF *  IZDRAS * /IZDCAS * /RCMUX * /ZGAD * /ESB ; 48
S51  = /GADOE *  HOFF *  IZDRAS * /IZDCAS * /RCMUX *  ZGAD *  ESB ; 51
S52  = /GADOE *  HOFF *  IZDRAS * /IZDCAS *  RCMUX * /ZGAD * /ESB ; 52
S54  = /GADOE *  HOFF *  IZDRAS * /IZDCAS *  RCMUX *  ZGAD * /ESB ; 54
S55  = /GADOE *  HOFF *  IZDRAS * /IZDCAS *  RCMUX *  ZGAD *  ESB ; 55
S56  = /GADOE *  HOFF *  IZDRAS *  IZDCAS * /RCMUX * /ZGAD * /ESB ; 56
S58  = /GADOE *  HOFF *  IZDRAS *  IZDCAS * /RCMUX *  ZGAD * /ESB ; 58
S59  = /GADOE *  HOFF *  IZDRAS *  IZDCAS * /RCMUX *  ZGAD *  ESB ; 59
S60  = /GADOE *  HOFF *  IZDRAS *  IZDCAS *  RCMUX * /ZGAD * /ESB ; 60
S61  = /GADOE *  HOFF *  IZDRAS *  IZDCAS *  RCMUX * /ZGAD *  ESB ; 61
S62  = /GADOE *  HOFF *  IZDRAS *  IZDCAS *  RCMUX *  ZGAD * /ESB ; 62
S63  = /GADOE *  HOFF *  IZDRAS *  IZDCAS *  RCMUX *  ZGAD *  ESB ; 63

S64  =  GADOE * /HOFF * /IZDRAS * /IZDCAS * /RCMUX * /ZGAD * /ESB ; 64
S66  =  GADOE * /HOFF * /IZDRAS * /IZDCAS * /RCMUX *  ZGAD * /ESB ; 02
S67  =  GADOE * /HOFF * /IZDRAS * /IZDCAS * /RCMUX *  ZGAD *  ESB ; 03
S68  =  GADOE * /HOFF * /IZDRAS * /IZDCAS *  RCMUX * /ZGAD * /ESB ; 04
S69  =  GADOE * /HOFF * /IZDRAS * /IZDCAS *  RCMUX * /ZGAD *  ESB ; 05
S70  =  GADOE * /HOFF * /IZDRAS * /IZDCAS *  RCMUX *  ZGAD * /ESB ; 06
S71  =  GADOE * /HOFF * /IZDRAS * /IZDCAS *  RCMUX *  ZGAD *  ESB ; 07
S72  =  GADOE * /HOFF * /IZDRAS *  IZDCAS * /RCMUX * /ZGAD * /ESB ; 08
S73  =  GADOE * /HOFF * /IZDRAS *  IZDCAS * /RCMUX * /ZGAD *  ESB ; 09
S74  =  GADOE * /HOFF * /IZDRAS *  IZDCAS * /RCMUX *  ZGAD * /ESB ; 10
S75  =  GADOE * /HOFF * /IZDRAS *  IZDCAS * /RCMUX *  ZGAD *  ESB ; 11
S76  =  GADOE * /HOFF * /IZDRAS *  IZDCAS *  RCMUX * /ZGAD * /ESB ; 12
S77  =  GADOE * /HOFF * /IZDRAS *  IZDCAS *  RCMUX * /ZGAD *  ESB ; 13
S78  =  GADOE * /HOFF * /IZDRAS *  IZDCAS *  RCMUX *  ZGAD * /ESB ; 14
S79  =  GADOE * /HOFF * /IZDRAS *  IZDCAS *  RCMUX *  ZGAD *  ESB ; 15
S80  =  GADOE * /HOFF *  IZDRAS * /IZDCAS * /RCMUX * /ZGAD * /ESB ; 16
S81  =  GADOE * /HOFF *  IZDRAS * /IZDCAS * /RCMUX * /ZGAD *  ESB ; 17
S82  =  GADOE * /HOFF *  IZDRAS * /IZDCAS * /RCMUX *  ZGAD * /ESB ; 18
S83  =  GADOE * /HOFF *  IZDRAS * /IZDCAS * /RCMUX *  ZGAD *  ESB ; 19
S86  =  GADOE * /HOFF *  IZDRAS * /IZDCAS *  RCMUX *  ZGAD * /ESB ; 22
S87  =  GADOE * /HOFF *  IZDRAS * /IZDCAS *  RCMUX *  ZGAD *  ESB ; 23
S88  =  GADOE * /HOFF *  IZDRAS *  IZDCAS * /RCMUX * /ZGAD * /ESB ; 24
S89  =  GADOE * /HOFF *  IZDRAS *  IZDCAS * /RCMUX * /ZGAD *  ESB ; 25
S90  =  GADOE * /HOFF *  IZDRAS *  IZDCAS * /RCMUX *  ZGAD * /ESB ; 26
S94  =  GADOE * /HOFF *  IZDRAS *  IZDCAS *  RCMUX *  ZGAD * /ESB ; 30
S95  =  GADOE * /HOFF *  IZDRAS *  IZDCAS *  RCMUX *  ZGAD *  ESB ; 31
S96  =  GADOE *  HOFF * /IZDRAS * /IZDCAS * /RCMUX * /ZGAD * /ESB ; 32
S97  =  GADOE *  HOFF * /IZDRAS * /IZDCAS * /RCMUX * /ZGAD *  ESB ; 33
S98  =  GADOE *  HOFF * /IZDRAS * /IZDCAS * /RCMUX *  ZGAD * /ESB ; 34
S99  =  GADOE *  HOFF * /IZDRAS * /IZDCAS * /RCMUX *  ZGAD *  ESB ; 35
S100 =  GADOE *  HOFF * /IZDRAS * /IZDCAS *  RCMUX * /ZGAD * /ESB ; 36
S101 =  GADOE *  HOFF * /IZDRAS * /IZDCAS *  RCMUX * /ZGAD *  ESB ; 37
S102 =  GADOE *  HOFF * /IZDRAS * /IZDCAS *  RCMUX *  ZGAD * /ESB ; 38
S103 =  GADOE *  HOFF * /IZDRAS * /IZDCAS *  RCMUX *  ZGAD *  ESB ; 39
S104 =  GADOE *  HOFF * /IZDRAS *  IZDCAS * /RCMUX * /ZGAD * /ESB ; 40
S105 =  GADOE *  HOFF * /IZDRAS *  IZDCAS * /RCMUX * /ZGAD *  ESB ; 41
S106 =  GADOE *  HOFF * /IZDRAS *  IZDCAS * /RCMUX *  ZGAD * /ESB ; 42
S107 =  GADOE *  HOFF * /IZDRAS *  IZDCAS * /RCMUX *  ZGAD *  ESB ; 43
S108 =  GADOE *  HOFF * /IZDRAS *  IZDCAS *  RCMUX * /ZGAD * /ESB ; 44
S109 =  GADOE *  HOFF * /IZDRAS *  IZDCAS *  RCMUX * /ZGAD *  ESB ; 45
S110 =  GADOE *  HOFF * /IZDRAS *  IZDCAS *  RCMUX *  ZGAD * /ESB ; 46
S111 =  GADOE *  HOFF * /IZDRAS *  IZDCAS *  RCMUX *  ZGAD *  ESB ; 47
S112 =  GADOE *  HOFF *  IZDRAS * /IZDCAS * /RCMUX * /ZGAD * /ESB ; 48
S113 =  GADOE *  HOFF *  IZDRAS * /IZDCAS * /RCMUX * /ZGAD *  ESB ; 49
```

```
S114    =   GADOE *  HOFF *  IZDRAS * /IZDCAS * /RCMUX *  ZGAD * /ESB ; 50
S116    =   GADOE *  HOFF *  IZDRAS * /IZDCAS *  RCMUX * /ZGAD * /ESB ; 52
S117    =   GADOE *  HOFF *  IZDRAS * /IZDCAS *  RCMUX * /ZGAD *  ESB ; 53
S118    =   GADOE *  HOFF *  IZDRAS * /IZDCAS *  RCMUX *  ZGAD * /ESB ; 54
S119    =   GADOE *  HOFF *  IZDRAS * /IZDCAS *  RCMUX *  ZGAD *  ESB ; 55
S120    =   GADOE *  HOFF *  IZDRAS *  IZDCAS * /RCMUX * /ZGAD * /ESB ; 56
S121    =   GADOE *  HOFF *  IZDRAS *  IZDCAS * /RCMUX * /ZGAD *  ESB ; 57
S122    =   GADOE *  HOFF *  IZDRAS *  IZDCAS * /RCMUX *  ZGAD * /ESB ; 58
S123    =   GADOE *  HOFF *  IZDRAS *  IZDCAS * /RCMUX *  ZGAD *  ESB ; 59
S124    =   GADOE *  HOFF *  IZDRAS *  IZDCAS *  RCMUX * /ZGAD * /ESB ; 60
S125    =   GADOE *  HOFF *  IZDRAS *  IZDCAS *  RCMUX * /ZGAD *  ESB ; 61
S126    =   GADOE *  HOFF *  IZDRAS *  IZDCAS *  RCMUX *  ZGAD * /ESB ; 62
S127    =   GADOE *  HOFF *  IZDRAS *  IZDCAS *  RCMUX *  ZGAD *  ESB ; 63

;  State output equations

S_READY.OUTF   = /VQGRADEN
S_BUSIO0.OUTF  = /VQGRADEN
S_BUSIO1.OUTF  = /VQGRADEN
S_BUSIO2.OUTF  = /VQGRADEN
S_BUSIO3.OUTF  = /VQGRADEN
S_BUSIO4.OUTF  = /VQGRADEN
S_REF0.OUTF    = /VQGRADEN
S_REF1.OUTF    = /VQGRADEN
S_REF2.OUTF    = /VQGRADEN
S_REF3.OUTF    = /VQGRADEN
S_LIN0.OUTF    =  VQGRADEN
S_LIN1.OUTF    =  VQGRADEN
S_LIN2.OUTF    = /VQGRADEN
S_LIN3.OUTF    = /VQGRADEN
S_LIN4.OUTF    = /VQGRADEN
S_LIN5.OUTF    = /VQGRADEN

S01.OUTF       = /VQGRADEN
S02.OUTF       = /VQGRADEN
S03.OUTF       = /VQGRADEN
S04.OUTF       = /VQGRADEN
S05.OUTF       = /VQGRADEN
S06.OUTF       = /VQGRADEN
S07.OUTF       = /VQGRADEN
S08.OUTF       = /VQGRADEN
S09.OUTF       = /VQGRADEN
S10.OUTF       = /VQGRADEN
S11.OUTF       = /VQGRADEN
S12.OUTF       = /VQGRADEN
S13.OUTF       = /VQGRADEN
S14.OUTF       = /VQGRADEN
S15.OUTF       = /VQGRADEN
S16.OUTF       = /VQGRADEN
S18.OUTF       = /VQGRADEN
S19.OUTF       = /VQGRADEN
S21.OUTF       = /VQGRADEN
S22.OUTF       = /VQGRADEN
S23.OUTF       = /VQGRADEN
S24.OUTF       = /VQGRADEN
S25.OUTF       = /VQGRADEN
S26.OUTF       = /VQGRADEN
S27.OUTF       = /VQGRADEN
S28.OUTF       = /VQGRADEN
S29.OUTF       = /VQGRADEN
```

```
S30.OUTF      = /VQGRADEN
S31.OUTF      = /VQGRADEN
S34.OUTF      = /VQGRADEN
S35.OUTF      = /VQGRADEN
S36.OUTF      = /VQGRADEN
S37.OUTF      = /VQGRADEN
S38.OUTF      = /VQGRADEN
S39.OUTF      = /VQGRADEN
S40.OUTF      = /VQGRADEN
S42.OUTF      = /VQGRADEN
S43.OUTF      = /VQGRADEN
S44.OUTF      = /VQGRADEN
S45.OUTF      = /VQGRADEN
S46.OUTF      = /VQGRADEN
S47.OUTF      = /VQGRADEN
S48.OUTF      = /VQGRADEN
S51.OUTF      = /VQGRADEN
S52.OUTF      = /VQGRADEN
S54.OUTF      = /VQGRADEN
S55.OUTF      = /VQGRADEN
S56.OUTF      = /VQGRADEN
S58.OUTF      = /VQGRADEN
S59.OUTF      = /VQGRADEN
S60.OUTF      = /VQGRADEN
S61.OUTF      = /VQGRADEN
S62.OUTF      = /VQGRADEN
S63.OUTF      = /VQGRADEN
S64.OUTF      = /VQGRADEN
S66.OUTF      = /VQGRADEN
S67.OUTF      = /VQGRADEN
S68.OUTF      = /VQGRADEN
S69.OUTF      = /VQGRADEN
S70.OUTF      = /VQGRADEN
S71.OUTF      = /VQGRADEN
S72.OUTF      = /VQGRADEN
S73.OUTF      = /VQGRADEN
S74.OUTF      = /VQGRADEN
S75.OUTF      = /VQGRADEN
S76.OUTF      = /VQGRADEN
S77.OUTF      = /VQGRADEN
S78.OUTF      = /VQGRADEN
S79.OUTF      = /VQGRADEN
S80.OUTF      = /VQGRADEN
S81.OUTF      = /VQGRADEN
S82.OUTF      = /VQGRADEN
S83.OUTF      = /VQGRADEN
S86.OUTF      = /VQGRADEN
S87.OUTF      = /VQGRADEN
S88.OUTF      = /VQGRADEN
S89.OUTF      = /VQGRADEN
S90.OUTF      = /VQGRADEN
S94.OUTF      = /VQGRADEN
S95.OUTF      = /VQGRADEN
S96.OUTF      = /VQGRADEN
S97.OUTF      = /VQGRADEN
S98.OUTF      = /VQGRADEN
S99.OUTF      = /VQGRADEN
S100.OUTF     = /VQGRADEN
S101.OUTF     = /VQGRADEN
S102.OUTF     = /VQGRADEN
```

```
S103.OUTF        = /VQGRADEN
S104.OUTF        = /VQGRADEN
S105.OUTF        = /VQGRADEN
S106.OUTF        = /VQGRADEN
S107.OUTF        = /VQGRADEN
S108.OUTF        = /VQGRADEN
S109.OUTF        = /VQGRADEN
S110.OUTF        = /VQGRADEN
S111.OUTF        = /VQGRADEN
S112.OUTF        = /VQGRADEN
S113.OUTF        = /VQGRADEN
S114.OUTF        = /VQGRADEN
S116.OUTF        = /VQGRADEN
S117.OUTF        = /VQGRADEN
S118.OUTF        = /VQGRADEN
S119.OUTF        = /VQGRADEN
S120.OUTF        = /VQGRADEN
S121.OUTF        = /VQGRADEN
S122.OUTF        = /VQGRADEN
S123.OUTF        = /VQGRADEN
S124.OUTF        = /VQGRADEN
S125.OUTF        = /VQGRADEN
S126.OUTF        = /VQGRADEN
S127.OUTF        = /VQGRADEN


S_READY          :=      C_BUSIO -> S_BUSIO0
                 +       C_REF   -> S_REF0
                 +       C_LIN   -> S_LIN0
                 +->     S_READY
S_BUSIO0         :=      VCC -> S_BUSIO1
S_BUSIO1         :=      VCC -> S_BUSIO2
S_BUSIO2         :=      VCC -> S_BUSIO3
S_BUSIO3         :=      C_RDDLY -> S_BUSIO3
                 +->     S_BUSIO4
S_BUSIO4         :=      VCC -> S_READY
S_REF0           :=      VCC -> S_REF1
S_REF1           :=      VCC -> S_REF2
S_REF2           :=      VCC -> S_REF3
S_REF3           :=      VCC -> S_READY
S_LIN0           :=      VCC -> S_LIN1
S_LIN1           :=      VCC -> S_LIN2
S_LIN2           :=      VCC -> S_LIN3
S_LIN3           :=      VCC -> S_LIN4
S_LIN4           :=      VCC -> S_LIN5
S_LIN5           :=      VCC -> S_READY


S01 :=  VCC -> S_READY
S02 :=  VCC -> S_READY
S03 :=  VCC -> S_READY
S04 :=  VCC -> S_READY
S05 :=  VCC -> S_READY
S06 :=  VCC -> S_READY
S07 :=  VCC -> S_READY
S08 :=  VCC -> S_READY
S09 :=  VCC -> S_READY
```

```
S10 :=  VCC -> S_READY
S11 :=  VCC -> S_READY
S12 :=  VCC -> S_READY
S13 :=  VCC -> S_READY
S14 :=  VCC -> S_READY
S15 :=  VCC -> S_READY
S16 :=  VCC -> S_READY
S18 :=  VCC -> S_READY
S19 :=  VCC -> S_READY
S20 :=  VCC -> S_READY
S21 :=  VCC -> S_READY
S22 :=  VCC -> S_READY
S23 :=  VCC -> S_READY
S24 :=  VCC -> S_READY
S25 :=  VCC -> S_READY
S26 :=  VCC -> S_READY
S27 :=  VCC -> S_READY
S28 :=  VCC -> S_READY
S29 :=  VCC -> S_READY
S30 :=  VCC -> S_READY
S31 :=  VCC -> S_READY
S34 :=  VCC -> S_READY
S35 :=  VCC -> S_READY
S36 :=  VCC -> S_READY
S37 :=  VCC -> S_READY
S38 :=  VCC -> S_READY
S39 :=  VCC -> S_READY
S40 :=  VCC -> S_READY
S42 :=  VCC -> S_READY
S43 :=  VCC -> S_READY
S44 :=  VCC -> S_READY
S45 :=  VCC -> S_READY
S46 :=  VCC -> S_READY
S47 :=  VCC -> S_READY
S48 :=  VCC -> S_READY
S51 :=  VCC -> S_READY
S52 :=  VCC -> S_READY
S54 :=  VCC -> S_READY
S55 :=  VCC -> S_READY
S56 :=  VCC -> S_READY
S58 :=  VCC -> S_READY
S59 :=  VCC -> S_READY
S60 :=  VCC -> S_READY
S61 :=  VCC -> S_READY
S62 :=  VCC -> S_READY
S63 :=  VCC -> S_READY
S64 :=  VCC -> S_READY
S66 :=  VCC -> S_READY
S67 :=  VCC -> S_READY
S68 :=  VCC -> S_READY
S69 :=  VCC -> S_READY
S70 :=  VCC -> S_READY
S71 :=  VCC -> S_READY
S72 :=  VCC -> S_READY
S73 :=  VCC -> S_READY
S74 :=  VCC -> S_READY
S75 :=  VCC -> S_READY
S76 :=  VCC -> S_READY
S77 :=  VCC -> S_READY
S78 :=  VCC -> S_READY
```

```
S79 :=  VCC -> S_READY
S80 :=  VCC -> S_READY
S81 :=  VCC -> S_READY
S82 :=  VCC -> S_READY
S83 :=  VCC -> S_READY
S86 :=  VCC -> S_READY
S87 :=  VCC -> S_READY
S88 :=  VCC -> S_READY
S89 :=  VCC -> S_READY
S90 :=  VCC -> S_READY
S94 :=  VCC -> S_READY
S95 :=  VCC -> S_READY
S96 :=  VCC -> S_READY
S97 :=  VCC -> S_READY
S98 :=  VCC -> S_READY
S99 :=  VCC -> S_READY
S100 :=  VCC -> S_READY
S101 :=  VCC -> S_READY
S102 :=  VCC -> S_READY
S103 :=  VCC -> S_READY
S104 :=  VCC -> S_READY
S105 :=  VCC -> S_READY
S106 :=  VCC -> S_READY
S107 :=  VCC -> S_READY
S108 :=  VCC -> S_READY
S109 :=  VCC -> S_READY
S110 :=  VCC -> S_READY
S111 :=  VCC -> S_READY
S112 :=  VCC -> S_READY
S113 :=  VCC -> S_READY
S114 :=  VCC -> S_READY
S116 :=  VCC -> S_READY
S117 :=  VCC -> S_READY
S118 :=  VCC -> S_READY
S119 :=  VCC -> S_READY
S120 :=  VCC -> S_READY
S121 :=  VCC -> S_READY
S122 :=  VCC -> S_READY
S123 :=  VCC -> S_READY
S124 :=  VCC -> S_READY
S125 :=  VCC -> S_READY
S126 :=  VCC -> S_READY
S127 :=  VCC -> S_READY

CONDITIONS

C_BUSIO =  PEND400
        +  PEND00F * (EXWR + EXRD)
C_REF   = /PEND400 * /PEND00F * /EXAS * /QS0 * /QS1 * /BLINREQ * REFREQ
C_LIN   = /PEND400 * /PEND00F * /EXAS * /QS0 * /QS1 *  BLINREQ

C_RDDLY =  EXRD

;---------------------------------- Simulation Segment ------------
SIMULATION

;------------------------------------------------------------------
```

```
; Terminated by:   Either CYCEND from PROM after 16 words, or end of cut line
;                  when COLEND comparator becomes true. COLEND is gated
;                  to ensure cycle is terminated when current word
;                  handling is complete.
; Cleanup:         Yes. 3 cycles of cleanup to check whether this was
;                  last row in frame.
;

; EOD cycle
; Signalled by:    Completion of either GRAB/GRABVOL/download or DNLD cycle
; Accepted when:   Not reset.
; Terminated by:   CYCEND from PROM.
; Cleanup:         None.

STATE
;------------- State Setup and Defaults ----------------------------
MOORE_MACHINE
START_UP := POWER_UP -> S_RESET
CLKF = SDPCK

DEFAULT_BRANCH S_WAITING

;------------- State Transition Equations --------------------------

S_RESET     := C_NOT_RESET   -> S_WAITING
            +-> S_RESET
S_WAITING   := C_LIN_GO -> S_LIN_PRESET
             +  C_REF_GO -> S_REF_PRESET
             +  C_OFR_GO -> S_OFR_PRESET
             +  C_DTM_GO -> S_DTM_PRESET
             +  C_DL_GO  -> S_DL_PRESET
             +  C_SYN_GO -> S_SYN_PRESET
             +  C_EOD_GO -> S_EOD_PRESET
            +-> S_WAITING
S_SYN_PRESET := VCC -> S_SYN_HNDLR
S_LIN_PRESET := VCC -> S_LIN_HNDLR
S_REF_PRESET := VCC -> S_REF_HNDLR
S_OFR_PRESET := VCC -> S_OFR_HNDLR
S_DTM_PRESET := VCC -> S_DTM_HNDLR
S_DL_PRESET  := VCC -> S_DL_HNDLR
S_EOD_PRESET := VCC -> S_EOD_HNDLR

S_SYN_HNDLR  := C_CYC_STOP -> S_WAITING
             +  C_RESET -> S_RESET
             +-> S_SYN_HNDLR
S_LIN_HNDLR  := C_CYC_STOP -> S_WAITING
             + C_RESET -> S_RESET
             +-> S_LIN_HNDLR
S_REF_HNDLR  := C_CYC_STOP -> S_WAITING
             + C_RESET -> S_RESET
             +-> S_REF_HNDLR
S_OFR_HNDLR  := C_CYC_STOP -> S_WAITING
             + C_RESET -> S_RESET
             +-> S_OFR_HNDLR
S_EOD_HNDLR  := C_CYC_STOP -> S_WAITING
             + C_RESET -> S_RESET
             +-> S_EOD_HNDLR

S_DTM_HNDLR  := C_EARLY_STOP -> S_CLN_PRESET
             +  C_RESET -> S_RESET
```

```
             +-> S_DTM_HNDLR

S_DL_HNDLR   := C_EARLY_STOP -> S_CLN_PRESET
              + C_RESET -> S_RESET
             +-> S_DL_HNDLR

S_CLN_PRESET := VCC -> S_CLNUP2

S_CLNUP2     := VCC -> S_CLNUP3

S_CLNUP3     := VCC -> S_WAITING

;------------- State Assignment Equations --------------------------
;
; STATE WEIGHT     16          8          4          2          1
; PROM ADDRESS    400h        200h       100h       080h                  HEX
;
S_RESET        = /CYC[3] * /CYC[2] * /CYC[1] * /CYC[0] * /PRESET  ;  0
S_WAITING      = /CYC[3] * /CYC[2] * /CYC[1] * /CYC[0] *  PRESET  ;  1   000

S_LIN_PRESET   = /CYC[3] * /CYC[2] * /CYC[1] *  CYC[0] *  PRESET  ;  3,  080
S_SYN_PRESET   = /CYC[3] * /CYC[2] *  CYC[1] * /CYC[0] *  PRESET  ;  5,  100
S_REF_PRESET   = /CYC[3] * /CYC[2] *  CYC[1] *  CYC[0] *  PRESET  ;  7,  180
S_OFR_PRESET   = /CYC[3] *  CYC[2] * /CYC[1] * /CYC[0] *  PRESET  ;  9,  200
S_DTM_PRESET   = /CYC[3] *  CYC[2] * /CYC[1] *  CYC[0] *  PRESET  ; 11,  280
; not used       /CYC[3] *  CYC[2] *  CYC[1] * /CYC[0] *  PRESET  ; 13,  300
S_EOD_PRESET   = /CYC[3] *  CYC[2] *  CYC[1] *  CYC[0] *  PRESET  ; 15,  380
S_DL_PRESET    =  CYC[3] * /CYC[2] * /CYC[1] * /CYC[0] *  PRESET  ; 17,  400
; reserved     =  CYC[3] * /CYC[2] * /CYC[1] *  CYC[0] *  PRESET  ; 19,  480
S_CLN_PRESET   =  CYC[3] * /CYC[2] *  CYC[1] * /CYC[0] *  PRESET  ; 21,  500

S_LIN_HNDLR    = /CYC[3] * /CYC[2] * /CYC[1] *  CYC[0] * /PRESET  ;  2
S_SYN_HNDLR    = /CYC[3] * /CYC[2] *  CYC[1] * /CYC[0] * /PRESET  ;  4
S_REF_HNDLR    = /CYC[3] * /CYC[2] *  CYC[1] *  CYC[0] * /PRESET  ;  6
S_OFR_HNDLR    = /CYC[3] *  CYC[2] * /CYC[1] * /CYC[0] * /PRESET  ;  8
S_DTM_HNDLR    = /CYC[3] *  CYC[2] * /CYC[1] *  CYC[0] * /PRESET  ; 10
; not used       /CYC[3] *  CYC[2] *  CYC[1] * /CYC[0] * /PRESET  ; 12
S_EOD_HNDLR    = /CYC[3] *  CYC[2] *  CYC[1] *  CYC[0] * /PRESET  ; 14
S_DL_HNDLR     =  CYC[3] * /CYC[2] * /CYC[1] * /CYC[0] * /PRESET  ; 16

S_CLNUP2       =  CYC[3] * /CYC[2] *  CYC[1] * /CYC[0] * /PRESET  ; 20
S_CLNUP3       =  CYC[3] * /CYC[2] *  CYC[1] *  CYC[0] * /PRESET  ; 22

;------------- State Condition Equations ---------------------------

CONDITIONS
C_NOT_RESET    = /MQRESET
C_LIN_GO       = /MQRESET *  LINREQ

C_REF_GO       = /MQRESET * /LINREQ *  REFREQ
C_SYN_GO       = /MQRESET * /LINREQ * /REFREQ *  SYNREQ * PFIFREQ
                 * /GRABTOG * GRABING * /OFRREQ
C_OFR_GO       = /MQRESET * /LINREQ * /REFREQ *  OFRREQ
C_DTM_GO       = /MQRESET * /LINREQ * /SYNREQ * /REFREQ * /EODREQ * PFIFREQ
                 * /GRABTOG * GRABING * /DNLDTOG * /DNLDING * /OFRREQ

C_EOD_GO       = /MQRESET * /LINREQ * /REFREQ * EODREQ * /OFIFOHF
                 * /GRABING * /DNLDING * /OFRREQ
```

```
;PALASM Design Description
;---------------------------------- Declaration Segment ------------
TITLE    ADBCBIS.PDS
PATTERN  ADDRESS & BYTE COUNT MACH FOR GIO32-BIS BUS ONLY


CHIP  ADBCMACH  MACH230
;---------------------------------- PIN Declarations ---------------
PIN 65 ADDCLK                              COMBINATORIAL ; INPUT
PIN 62 BCCLK                               COMBINATORIAL ; INPUT
PIN 50 /RESET                              COMBINATORIAL ; INPUT
PIN 51 BIS                                 COMBINATORIAL ; INPUT
PIN 83 /BGNT                               COMBINATORIAL ; INPUT
PIN 41 LDADD                               COMBINATORIAL ; INPUT
PIN 23 OUTADD                              COMBINATORIAL ; INPUT
PIN 75 INCADD                              COMBINATORIAL ; INPUT
PIN 78 LDBC                                COMBINATORIAL ; INPUT
PIN 20 OUTBC                               COMBINATORIAL ; INPUT
PIN 10 DECBC                               COMBINATORIAL ; INPUT
PIN 77 /RSTFIFO                            COMBINATORIAL ; INPUT
NODE 80 RSTBYCNT                           COMBINATORIAL ;
PIN 70 BLOCK0                              COMBINATORIAL ; OUTPUT
PIN 73 COUNT2                              REGISTERED    ; OUTPUT
PIN 13 WORD0                               COMBINATORIAL ; OUTPUT
NODE 36 BAD[31]                            REGISTERED ;
PIN 25 BADIO[31]     PAIR BADIO[31]        REGISTERED ; IO
NODE 34 BAD[30]                            REGISTERED ;
PIN 24 BADIO[30]     PAIR BADIO[30]        REGISTERED ; IO
NODE 42 BAD[29]                            REGISTERED ;
PIN 28 BADIO[29]     PAIR BADIO[29]        REGISTERED ; IO
NODE 48 BAD[28]                            REGISTERED ;
PIN 31 BADIO[28]     PAIR BADIO[28]        REGISTERED ; IO
NODE 40 BAD[27]                            REGISTERED ;
PIN 27 BADIO[27]     PAIR BADIO[27]        REGISTERED ; IO
NODE 46 BAD[26]                            REGISTERED ;
PIN 30 BADIO[26]     PAIR BADIO[26]        REGISTERED ; IO
NODE 38 BAD[25]                            REGISTERED ;
PIN 26 BADIO[25]     PAIR BADIO[25]        REGISTERED ; IO
NODE 44 BAD[24]                            REGISTERED ;
PIN 29 BADIO[24]     PAIR BADIO[24]        REGISTERED ; IO
NODE 64 BAD[23]                            REGISTERED ;
PIN 33 BADIO[23]     PAIR BADIO[23]        REGISTERED ; IO
NODE 60 BAD[22]                            REGISTERED ;
PIN 35 BADIO[22]     PAIR BADIO[22]        REGISTERED ; IO
NODE 52 BAD[21]                            REGISTERED ;
PIN 39 BADIO[21]     PAIR BADIO[21]        REGISTERED ; IO
NODE 50 BAD[20]                            REGISTERED ;
PIN 40 BADIO[20]     PAIR BADIO[20]        REGISTERED ; IO
NODE 58 BAD[19]                            REGISTERED ;
PIN 36 BADIO[19]     PAIR BADIO[19]        REGISTERED ; IO
NODE 62 BAD[18]                            REGISTERED ;
PIN 34 BADIO[18]     PAIR BADIO[18]        REGISTERED ; IO
NODE 56 BAD[17]                            REGISTERED ;
PIN 37 BADIO[17]     PAIR BADIO[17]        REGISTERED ; IO
NODE 54 BAD[16]      PAIR BADIO[16]        REGISTERED ;
```

```
PIN 38 BADIO[16]                                        REGISTERED ; IO
NODE 74 BAD[15]             PAIR BADIO[15]              REGISTERED ;
PIN 49 BADIO[15]                                        REGISTERED ; IO
NODE 70 BAD[14]             PAIR BADIO[14]              REGISTERED ;
PIN 47 BADIO[14]                                        REGISTERED ; IO
NODE 72 BAD[13]             PAIR BADIO[13]              REGISTERED ;
PIN 48 BADIO[13]                                        REGISTERED ; IO
NODE 68 BAD[12]             PAIR BADIO[12]              REGISTERED ;
PIN 46 BADIO[12]                                        REGISTERED ; IO
NODE 8 BAD[11]              PAIR BADIO[11]              REGISTERED ;
PIN 6 BADIO[11]                                         REGISTERED ; IO
NODE 4 BAD[10]              PAIR BADIO[10]              REGISTERED ;
PIN 4 BADIO[10]                                         REGISTERED ; IO
NODE 2 BAD[9]               PAIR BADIO[9]               REGISTERED ;
PIN 3 BADIO[9]                                          REGISTERED ; IO
NODE 14 BAD[8]              PAIR BADIO[8]               REGISTERED ;
PIN 9 BADIO[8]                                          REGISTERED ; IO
NODE 12 BAD[7]              PAIR BADIO[7]               REGISTERED ;
PIN 8 BADIO[7]                                          REGISTERED ; IO
NODE 10 BAD[6]              PAIR BADIO[6]               REGISTERED ;
PIN 7 BADIO[6]                                          REGISTERED ; IO
NODE 6 BAD[5]               PAIR BADIO[5]               REGISTERED ;
PIN 5 BADIO[5]                                          REGISTERED ; IO
NODE 120 BAD[4]             PAIR BADIO[4]               REGISTERED ;
PIN 79 BADIO[4]                                         REGISTERED ; IO
NODE 126 BAD[3]             PAIR BADIO[3]               REGISTERED ;
PIN 76 BADIO[3]                                         REGISTERED ; IO
NODE 118 BAD[2]             PAIR BADIO[2]               REGISTERED ;
PIN 80 BADIO[2]                                         REGISTERED ; IO
NODE 116 BAD[1]             PAIR BADIO[1]               REGISTERED ;
PIN 81 BADIO[1]                                         REGISTERED ; IO
NODE 114 BAD[0]             PAIR BADIO[0]               REGISTERED ;
PIN 82 BADIO[0]                                         REGISTERED ; IO
NODE 26 BYCNT[12]           PAIR BYCNTIO[12]            REGISTERED ;
PIN 15 BYCNTIO[12]                                      REGISTERED ; IO
NODE 22 BYCNT[11]           PAIR BYCNTIO[11]            REGISTERED ;
PIN 17 BYCNTIO[11]                                      REGISTERED ; IO
NODE 18 BYCNT[10]           PAIR BYCNTIO[10]            REGISTERED ;
PIN 19 BYCNTIO[10]                                      REGISTERED ; IO
NODE 28 BYCNT[9]            PAIR BYCNTIO[9]             REGISTERED ;
PIN 14 BYCNTIO[9]                                       REGISTERED ; IO
NODE 32 BYCNT[8]            PAIR BYCNTIO[8]             REGISTERED ;
PIN 12 BYCNTIO[8]                                       REGISTERED ; IO
NODE 104 BYCNT[7]           PAIR BYCNTIO[7]             REGISTERED ;
PIN 69 BYCNTIO[7]                                       REGISTERED ; IO
NODE 110 BYCNT[6]           PAIR BYCNTIO[6]             REGISTERED ;
PIN 72 BYCNTIO[6]                                       REGISTERED ; IO
NODE 102 BYCNT[5]           PAIR BYCNTIO[5]             REGISTERED ;
PIN 68 BYCNTIO[5]                                       REGISTERED ; IO
NODE 108 BYCNT[4]           PAIR BYCNTIO[4]             REGISTERED ;
PIN 71 BYCNTIO[4]                                       REGISTERED ; IO
NODE 100 BYCNT[3]           PAIR BYCNTIO[3]             REGISTERED ;
PIN 67 BYCNTIO[3]                                       REGISTERED ; IO
NODE 98 BYCNT[2]            PAIR BYCNTIO[2]             REGISTERED ;
PIN 66 BYCNTIO[2]                                       REGISTERED ; IO
NODE 24 BYCNT[1]            PAIR BYCNTIO[1]             REGISTERED ;
PIN 16 BYCNTIO[1]                                       REGISTERED ; IO
NODE 20 BYCNT[0]            PAIR BYCNTIO[0]             REGISTERED ;
PIN 18 BYCNTIO[0]                                       REGISTERED ; IO
PIN 59 MASTERBC[31]                                     COMBINATORIAL ; OUTPUT
```

```
PIN 60 MASTERBC[30]                                   COMBINATORIAL ; OUTPUT
PIN 61 MASTERBC[12]                                   COMBINATORIAL ; OUTPUT
PIN 54 MASTERBC[11]                                   COMBINATORIAL ; OUTPUT
PIN 55 MASTERBC[10]                                   COMBINATORIAL ; OUTPUT
PIN 56 MASTERBC[9]                                    COMBINATORIAL ; OUTPUT
PIN 57 MASTERBC[8]                                    COMBINATORIAL ; OUTPUT
PIN 58 MASTERBC[1]                                    COMBINATORIAL ; OUTPUT
PIN 45 MASTERBC[0]                                    COMBINATORIAL ; OUTPUT

STRING ADD15   '(BAD[7]*BAD[6]*BAD[5]*BAD[4]*BAD[3]*BAD[2])'
STRING BYTE0   '(/BYCNT[7]*/BYCNT[6]*/BYCNT[5]*/BYCNT[4]*/BYCNT[3]*/BYCNT[2])'

GROUP MACH_SEG_A BADIO[11] BADIO[10] BADIO[9] BADIO[8] BADIO[7] BADIO[6]
                 BADIO[5]
GROUP MACH_SEG_B BYCNTIO[12] BYCNTIO[11] BYCNTIO[10] BYCNTIO[9] BYCNTIO[8]
                 BYCNTIO[1] BYCNTIO[0] WORD0
GROUP MACH_SEG_C BADIO[31] BADIO[30] BADIO[29] BADIO[28]
                 BADIO[27] BADIO[26] BADIO[25] BADIO[24]
GROUP MACH_SEG_D BADIO[23] BADIO[22] BADIO[21] BADIO[20]
                 BADIO[19] BADIO[18] BADIO[17] BADIO[16]
GROUP MACH_SEG_E BADIO[15] BADIO[14] BADIO[13] BADIO[12] MASTERBC[0]
GROUP MACH_SEG_F MASTERBC[31] MASTERBC[30] MASTERBC[12] MASTERBC[11]
                 MASTERBC[10] MASTERBC[9]  MASTERBC[8]  MASTERBC[1]
GROUP MACH_SEG_G BYCNTIO[7] BYCNTIO[6] BYCNTIO[5] BYCNTIO[4] BYCNTIO[3]
                 BYCNTIO[2] BLOCK0     COUNT2
GROUP MACH_SEG_H BADIO[4] BADIO[3] BADIO[2] BADIO[1] BADIO[0]
;---------------------------------- Boolean Equation Segment ------
EQUATIONS
BAD[31..0].RSTF      = RESET
BAD[31..0].SETF      = GND
BADIO[31..0].RSTF    = RESET
BADIO[31..0].SETF    = GND
BYCNT[12..0].RSTF    = RSTBYCNT
BYCNT[12..0].SETF    = GND
BYCNTIO[12..0].RSTF= RSTBYCNT
BYCNTIO[12..0].SETF= GND
COUNT2.RSTF          = RSTBYCNT
COUNT2.SETF          = GND

BAD[31..0].CLKF      =ADDCLK
BADIO[31..0].CLKF    =ADDCLK
BYCNT[12..0].CLKF    =BCCLK
BYCNTIO[12..0].CLKF=BCCLK
COUNT2.CLKF          =BCCLK

BADIO[31..0].TRST   =OUTADD
BYCNTIO[12..8].TRST=OUTBC*/BGNT
BYCNTIO[7..2].TRST =OUTBC
BYCNTIO[1..0].TRST =OUTBC*/BGNT
MASTERBC[31..30].TRST=OUTBC*BGNT
MASTERBC[12..8].TRST =OUTBC*BGNT
MASTERBC[1..0].TRST  =OUTBC*BGNT

RSTBYCNT = RESET + RSTFIFO

MASTERBC[31..30] = GND
MASTERBC[12..9] = GND
MASTERBC[8]       = BLOCK0
MASTERBC[1..0]    = GND
```

```
BAD[31..12]    = BADIO[31..12]*LDADD + BAD[31..12]*/LDADD
BAD[1..0]      = GND
BYCNT[1..0]    = GND

BAD[2].T  = INCADD
              +LDADD*BAD[2]*/BADIO[2]+LDADD*/BAD[2]*BADIO[2]
BAD[3].T  = INCADD*BAD[2]
              +LDADD*BAD[3]*/BADIO[3]+LDADD*/BAD[3]*BADIO[3]
BAD[4].T  = INCADD*BAD[3]*BAD[2]
              +LDADD*BAD[4]*/BADIO[4]+LDADD*/BAD[4]*BADIO[4]
BAD[5].T  = INCADD*BAD[4]*BAD[3]*BAD[2]
              +LDADD*BAD[5]*/BADIO[5]+LDADD*/BAD[5]*BADIO[5]
BAD[6].T  = INCADD*BAD[5]*BAD[4]*BAD[3]*BAD[2]
              +LDADD*BAD[6]*/BADIO[6]+LDADD*/BAD[6]*BADIO[6]
BAD[7].T  = INCADD*BAD[6]*BAD[5]*BAD[4]*BAD[3]*BAD[2]
              +LDADD*BAD[7]*/BADIO[7]+LDADD*/BAD[7]*BADIO[7]
BAD[8].T  = INCADD*ADD15
              +LDADD*BAD[8]*/BADIO[8]+LDADD*/BAD[8]*BADIO[8]
BAD[9].T  = INCADD*ADD15*BAD[8]
              +LDADD*BAD[9]*/BADIO[9]+LDADD*/BAD[9]*BADIO[9]
BAD[10].T = INCADD*ADD15*BAD[9]*BAD[8]
              +LDADD*BAD[10]*/BADIO[10]+LDADD*/BAD[10]*BADIO[10]
BAD[11].T = INCADD*ADD15*BAD[10]*BAD[9]*BAD[8]
              +LDADD*BAD[11]*/BADIO[11]+LDADD*/BAD[11]*BADIO[11]

BYCNT[2].T  = DECBC
                +LDBC*BYCNT[2]*/BYCNTIO[2]+LDBC*/BYCNT[2]*BYCNTIO[2]
BYCNT[3].T  = DECBC*/BYCNT[2]
                +LDBC*BYCNT[3]*/BYCNTIO[3]+LDBC*/BYCNT[3]*BYCNTIO[3]
BYCNT[4].T  = DECBC*/BYCNT[3]*/BYCNT[2]
                +LDBC*BYCNT[4]*/BYCNTIO[4]+LDBC*/BYCNT[4]*BYCNTIO[4]
BYCNT[5].T  = DECBC*/BYCNT[4]*/BYCNT[3]*/BYCNT[2]
                +LDBC*BYCNT[5]*/BYCNTIO[5]+LDBC*/BYCNT[5]*BYCNTIO[5]
BYCNT[6].T  = DECBC*/BYCNT[5]*/BYCNT[4]*/BYCNT[3]*/BYCNT[2]
                +LDBC*BYCNT[6]*/BYCNTIO[6]+LDBC*/BYCNT[6]*BYCNTIO[6]
BYCNT[7].T  = DECBC*/BYCNT[6]*/BYCNT[5]*/BYCNT[4]*/BYCNT[3]*/BYCNT[2]
                +LDBC*BYCNT[7]*/BYCNTIO[7]+LDBC*/BYCNT[7]*BYCNTIO[7]
BYCNT[8].T  = DECBC*BYTE0
                +LDBC*BYCNT[8]*/BYCNTIO[8]+LDBC*/BYCNT[8]*BYCNTIO[8]
BYCNT[9].T  = DECBC*BYTE0*/BYCNT[8]
                +LDBC*BYCNT[9]*/BYCNTIO[9]+LDBC*/BYCNT[9]*BYCNTIO[9]
BYCNT[10].T = DECBC*BYTE0*/BYCNT[9]*/BYCNT[8]
                +LDBC*BYCNT[10]*/BYCNTIO[10]+LDBC*/BYCNT[10]*BYCNTIO[10]
BYCNT[11].T = DECBC*BYTE0*/BYCNT[10]*/BYCNT[9]*/BYCNT[8]
                +LDBC*BYCNT[11]*/BYCNTIO[11]+LDBC*/BYCNT[11]*BYCNTIO[11]
BYCNT[12].T = DECBC*BYTE0*/BYCNT[11]*/BYCNT[10]*/BYCNT[9]*/BYCNT[8]
                +LDBC*BYCNT[12]*/BYCNTIO[12]+LDBC*/BYCNT[12]*BYCNTIO[12]

BLOCK0 = /BYCNT[7]*/BYCNT[6]*/BYCNT[5]*/BYCNT[4]*/BYCNT[3]*
           /BYCNT[2]
COUNT2 = /BYCNT[7]*/BYCNT[6]*/BYCNT[5]*/BYCNT[4]*BYCNT[3]* BYCNT[2]
WORD0  = /BYCNT[12]*/BYCNT[11]*/BYCNT[10]*/BYCNT[9]*/BYCNT[8]*/BYCNT[7]*
         /BYCNT[6]*/BYCNT[5]*/BYCNT[4]*/BYCNT[3]*/BYCNT[2]
;---------------------------------- Simulation Segment ------------
SIMULATION
TRACE_ON BCCLK BLOCK0 COUNT2 WORD0 BYCNT[3] BYCNT[2] LDBC DECBC~BIS

;Reset all registers
```

```
SETF RESET
CLOCKF BCCLK
;Load a byte count of 3, non BIS mode
SETF /RESET LDBC /BYCNTIO[12..4] BYCNTIO[3] BYCNTIO[2] /BYCNTIO[1..0] /BIS
CLOCKF BCCLK
;check for no decrementing
SETF /LDBC
CLOCKF BCCLK
;Decrement byte count 3 times to 0
SETF DECBC
CLOCKF BCCLK
CLOCKF BCCLK
CLOCKF BCCLK

;Load a byte count of 2, BIS mode
SETF LDBC /DECBC /BYCNTIO[12..4] BYCNTIO[3] /BYCNTIO[2..0] BIS
CLOCKF BCCLK
;Check for no decrementing
SETF /LDBC
CLOCKF BCCLK
;Decrement byte count 3 times to -1
SETF DECBC
CLOCKF BCCLK
CLOCKF BCCLK
CLOCKF BCCLK

TRACE_OFF

TRACE_ON BCCLK MASTERBC[8] BYCNTIO[8] BYCNTIO[3] BYCNTIO[2] OUTBC /BGNT
         BYCNT[3] BYCNT[2] LDBC DECBC

;Reset all registers
SETF RESET
CLOCKF BCCLK
;Load a byte count of 3, non BIS mode
SETF /RESET LDBC /DECBC /BYCNTIO[12..4] BYCNTIO[3..2] /BYCNTIO[1..0] /BIS
CLOCKF BCCLK
;Output bytecount register
SETF /LDBC OUTBC /BGNT
CLOCKF BCCLK
;Decrement bytecount register to 1
SETF DECBC
CLOCKF BCCLK
CLOCKF BCCLK
;Output in BGNT mode
SETF /DECBC BGNT
CLOCKF BCCLK
;Decrement bytecount register to 0
SETF DECBC
CLOCKF BCCLK
;Check output in /BGNT mode
CLOCKF BCCLK

TRACE_OFF
;------------------------------------------------------------------------
```

```
;PALASM Design Description

;---------------------------------- Declaration Segment ------------
TITLE    ADDECODR.PDS
PATTERN  BUS INTERFACE ADDRESS DECODER MACH FOR BOTH GIO32 AND BIS BUSSES


CHIP  ADDECODR  MACH130

;---------------------------------- PIN Declarations ---------------
PIN  65        CLK                                COMBINATORIAL ; INPUT
PIN  62        BASCLK                             COMBINATORIAL ; INPUT
PIN  83        /RESET                             COMBINATORIAL ; INPUT
PIN  80        BIS                                COMBINATORIAL ; INPUT
NODE ?         CONTROL[31]    PAIR BAD[31]        REGISTERED ; OUTPUT
PIN  39        BAD[31]                            REGISTERED ; INPUT
NODE ?         CONTROL[30]    PAIR BAD[30]        REGISTERED ; OUTPUT
PIN  35        BAD[30]                            REGISTERED ; INPUT
NODE ?         CONTROL[29]    PAIR BAD[29]        REGISTERED ; OUTPUT
PIN  30        BAD[29]                            REGISTERED ; INPUT
NODE ?         CONTROL[28]    PAIR BAD[28]        REGISTERED ; OUTPUT
PIN  31        BAD[28]                            REGISTERED ; INPUT
NODE ?         CONTROL[27]    PAIR BAD[27]        REGISTERED ; OUTPUT
PIN  37        BAD[27]                            REGISTERED ; INPUT
NODE ?         CONTROL[26]    PAIR BAD[26]        REGISTERED ; OUTPUT
PIN  24        BAD[26]                            REGISTERED ; INPUT
NODE ?         CONTROL[25]    PAIR BAD[25]        REGISTERED ; OUTPUT
PIN  33        BAD[25]                            REGISTERED ; INPUT
NODE ?         CONTROL[24]    PAIR BAD[24]        REGISTERED ; OUTPUT
PIN  38        BAD[24]                            REGISTERED ; INPUT
NODE ?         CONTROL[23]    PAIR BAD[23]        REGISTERED ; OUTPUT
PIN  34        BAD[23]                            REGISTERED ; INPUT
NODE ?         CONTROL[22]    PAIR BAD[22]        REGISTERED ; OUTPUT
PIN  26        BAD[22]                            REGISTERED ; INPUT
NODE ?         CONTROL[21]    PAIR BAD[21]        REGISTERED ; OUTPUT
PIN  40        BAD[21]                            REGISTERED ; INPUT
NODE ?         CONTROL[20]    PAIR BAD[20]        REGISTERED ; OUTPUT
PIN  54        BAD[20]                            REGISTERED ; INPUT
NODE ?         CONTROL[19]    PAIR BAD[19]        REGISTERED ; OUTPUT
PIN  55        BAD[19]                            REGISTERED ; INPUT
NODE ?         CONTROL[18]    PAIR BAD[18]        REGISTERED ; OUTPUT
PIN  58        BAD[18]                            REGISTERED ; INPUT
NODE ?         CONTROL[17]    PAIR BAD[17]        REGISTERED ; OUTPUT
PIN  57        BAD[17]                            REGISTERED ; INPUT
NODE ?         CONTROL[16]    PAIR BAD[16]        REGISTERED ; OUTPUT
PIN  56        BAD[16]                            REGISTERED ; INPUT
NODE ?         PRODID[15]     PAIR BAD[15]        COMBINATORIAL ; INPUT
PIN  51        BAD[15]                            COMBINATORIAL ; INPUT
NODE ?         PRODID[14]     PAIR BAD[14]        COMBINATORIAL ; INPUT
PIN  46        BAD[14]                            COMBINATORIAL ; INPUT
NODE ?         PRODID[13]     PAIR BAD[13]        COMBINATORIAL ; INPUT
PIN  45        BAD[13]                            COMBINATORIAL ; INPUT
NODE ?         PRODID[12]     PAIR BAD[12]        COMBINATORIAL ; INPUT
PIN  47        BAD[12]                            COMBINATORIAL ; INPUT
NODE ?         PRODID[11]     PAIR BAD[11]        COMBINATORIAL ; INPUT
PIN  52        BAD[11]                            COMBINATORIAL ; INPUT
NODE ?         PRODID[10]     PAIR BAD[10]        COMBINATORIAL ; INPUT
```

```
PIN  50      BAD[10]                        COMBINATORIAL ; INPUT
NODE ?       PRODID[9]     PAIR BAD[9]      COMBINATORIAL ; INPUT
PIN  49      BAD[9]                         COMBINATORIAL ; INPUT
NODE ?       PRODID[8]     PAIR BAD[8]      COMBINATORIAL ; INPUT
PIN  48      BAD[8]                         COMBINATORIAL ; INPUT
NODE ?       PRODID[7]     PAIR BAD[7]      COMBINATORIAL ; INPUT
PIN  76      BAD[7]                         COMBINATORIAL ; INPUT
NODE ?       PRODID[6]     PAIR BAD[6]      COMBINATORIAL ; INPUT
PIN  77      BAD[6]                         COMBINATORIAL ; INPUT
NODE ?       PRODID[5]     PAIR BAD[5]      COMBINATORIAL ; INPUT
PIN  78      BAD[5]                         COMBINATORIAL ; INPUT
NODE ?       PRODID[4]     PAIR BAD[4]      COMBINATORIAL ; INPUT
PIN  79      BAD[4]                         COMBINATORIAL ; INPUT
NODE ?       PRODID[3]     PAIR BAD[3]      COMBINATORIAL ; INPUT
PIN  81      BAD[3]                         COMBINATORIAL ; INPUT
NODE ?       PRODID[2]     PAIR BAD[2]      COMBINATORIAL ; INPUT
PIN  73      BAD[2]                         COMBINATORIAL ; INPUT
NODE ?       PRODID[1]     PAIR BAD[1]      COMBINATORIAL ; INPUT
PIN  75      BAD[1]                         COMBINATORIAL ; INPUT
NODE ?       PRODID[0]     PAIR BAD[0]      COMBINATORIAL ; INPUT
PIN  82      BAD[0]                         COMBINATORIAL ; INPUT
PIN  36      /AS                            COMBINATORIAL ; INPUT
PIN  67      /BAS                           REGISTERED ; OUTPUT
PIN  20      LATCHCONT                      COMBINATORIAL ; INPUT
PIN  69      ENCONTROL                      COMBINATORIAL ; INPUT
PIN  29      ENSTATUS                       COMBINATORIAL ; INPUT
PIN  27      ENPRODID                       COMBINATORIAL ; INPUT
PIN  72      ENLOWORD                       COMBINATORIAL ; INPUT
PIN  10      ENSLVDLY                       REGISTERED ; OUTPUT
PIN  8       AINTRD                         REGISTERED ; OUTPUT
PIN  14      AINTWR                         REGISTERED ; OUTPUT
PIN  9       APRODID                        REGISTERED ; OUTPUT
PIN  5       AFIFORST                       REGISTERED ; OUTPUT
PIN  4       AFIFODAT                       REGISTERED ; OUTPUT
PIN  3       ANXTMEM                        REGISTERED ; OUTPUT
PIN  6       ABYCNT                         REGISTERED ; OUTPUT
PIN  12      AEXTRST                        REGISTERED ; OUTPUT
PIN  13      ACONT                          REGISTERED ; OUTPUT
PIN  16      ASTATUS                        REGISTERED ; OUTPUT
PIN  7       AEXTFAST                       REGISTERED ;OUTPUT
PIN  15      AEXTSLOW                       REGISTERED ; OUTPUT
PIN  71      EXINT1                         COMBINATORIAL ; INPUT
PIN  23      EXINT2                         COMBINATORIAL ; INPUT
NODE ?       INT1INT                        REGISTERED ;
PIN  59      /INT1                          REGISTERED ; OUTPUT
PIN  70      WORD0                          COMBINATORIAL ; INPUT
PIN  66      /EFABCFIFO                     COMBINATORIAL ; INPUT
PIN  18      /HFABCFIFO                     COMBINATORIAL ; INPUT
PIN  68      EXPWRGOOD                      COMBINATORIAL ; INPUT
PIN  60      /BREQ                          REGISTERED ; OUTPUT
PIN  17      /EX128                         COMBINATORIAL ; INPUT
NODE ?       /EX128PIPE                     REGISTERED ;
PIN  41      READ                           COMBINATORIAL ; INPUT
NODE ?       BREAD                          REGISTERED ;
PIN  28      DONE                           COMBINATORIAL ; INPUT

STRING SLOT0 '/BAD[31]*/BAD[30]*/BAD[29]*BAD[28]*BAD[27]*BAD[26]*BAD[25]*
              BAD[24]*/BAD[23]*BAD[22]*/BAD[21]*/BAD[20]*/BAD[19]'

GROUP MACH_SEG_A ANXTMEM  AFIFODAT AFIFORST ABYCNT
```

```
                  AEXTFAST AINTRD    APRODID  ASTATUS
                  AEXTRST  ACONT     AINTWR   AEXTSLOW
                  ENSLVDLY

GROUP MACH_SEG_B BAD[31] BAD[30] BAD[29] BAD[28]
                 BAD[27] BAD[26] BAD[25] BAD[24]
                 BAD[23] BAD[22] BAD[21]

GROUP MACH_SEG_C BAD[20] BAD[19] BAD[18] BAD[17]
                 BAD[16] BAD[15] BAD[14]  BAD[13]
                 BAD[12]  BAD[11]  BAD[10]  BAD[9]
                 BAD[8]  INT1     BREQ


GROUP MACH_SEG_D BAD[7] BAD[6] BAD[5] BAD[4]
                 BAD[3] BAD[2] BAD[1] BAD[0]
                 EX128PIPE     BAS    BREAD

;
; Design Notes
; BASCLK is (CLK + /BAS), generated in a 74F32 discrete OR gate
;
; CLK     _|‾‾|__|‾‾|__|‾‾|__|‾‾|__|‾‾|__|‾‾|__|‾‾|__|‾‾|__|‾‾
;
; /AS     ‾‾|_____|‾‾‾‾‾‾‾‾‾‾‾‾‾‾‾‾‾‾‾‾‾‾‾‾‾‾‾‾‾‾‾‾‾‾‾‾‾‾‾
;
; /BAS    ‾‾‾‾‾‾‾‾|_____|‾‾‾‾‾‾‾‾‾‾‾‾‾‾‾‾‾‾‾‾‾‾‾‾‾‾‾‾‾‾‾‾‾‾‾
;
; BASCLK  ‾‾‾‾‾‾‾‾‾‾‾|__|‾‾‾‾‾‾‾‾‾‾‾‾‾‾‾‾‾‾‾‾‾‾‾‾‾‾‾‾‾‾‾‾‾‾‾
;
;
; BASCLK clocks the address enables, ASTATUS, AEXTSLOW etc, when
; their address is strobed by AS.
;
;
;
;------------------------------------ Boolean Equation Segment ------
EQUATIONS
CONTROL[31..16].RSTF = RESET
CONTROL[31..16].SETF = GND
BAD[31..16].RSTF     = RESET
BAD[31..16].SETF     = GND
BAS.RSTF             = RESET
BAS.SETF             = GND
ENSLVDLY.RSTF        = RESET
ENSLVDLY.SETF        = GND
AINTRD.RSTF          = RESET
AINTRD.SETF          = GND
AINTWR.RSTF          = RESET
AINTWR.SETF          = GND
APRODID.RSTF         = RESET
APRODID.SETF         = GND
AFIFORST.RSTF        = RESET
AFIFORST.SETF        = GND
AFIFODAT.RSTF        = RESET
AFIFODAT.SETF        = GND
ANXTMEM.RSTF         = RESET
ANXTMEM.SETF         = GND
ABYCNT.RSTF          = RESET
ABYCNT.SETF          = GND
```

```
AEXTRST.RSTF          = RESET
AEXTRST.SETF          = GND
ACONT.RSTF            = RESET
ACONT.SETF            = GND
ASTATUS.RSTF          = RESET
ASTATUS.SETF          = GND
AEXTFAST.RSTF         = RESET
AEXTFAST.SETF         = GND
AEXTSLOW.RSTF         = RESET
AEXTSLOW.SETF         = GND
INT1INT.RSTF          = RESET
INT1INT.SETF          = GND
INT1.RSTF             = RESET
INT1.SETF             = GND
BREQ.RSTF             = RESET
BREQ.SETF             = GND
EX128PIPE.RSTF        = RESET
EX128PIPE.SETF        = GND
BREAD.RSTF            = RESET
BREAD.SETF            = GND

CONTROL[31..16].CLKF  = CLK
BAS.CLKF              = CLK
ENSLVDLY.CLKF         = CLK
AINTRD.CLKF           = BASCLK
AINTWR.CLKF           = BASCLK
APRODID.CLKF          = BASCLK
AFIFORST.CLKF         = BASCLK
AFIFODAT.CLKF         = BASCLK
ANXTMEM.CLKF          = BASCLK
ABYCNT.CLKF           = BASCLK
AEXTRST.CLKF          = BASCLK
ACONT.CLKF            = BASCLK
ASTATUS.CLKF          = BASCLK
AEXTFAST.CLKF         = BASCLK
AEXTSLOW.CLKF         = BASCLK
INT1INT.CLKF          = CLK
INT1.CLKF             = CLK
BREQ.CLKF             = CLK
EX128PIPE.CLKF        = CLK
BREAD.CLKF            = CLK

BAD[31..16].TRST      = ENCONTROL
BAD[15..0].TRST       = ENLOWORD
INT1.TRST             = INT1INT

BAD[15]  = ENPRODID*GND + ENSTATUS*GND
BAD[14]  = ENPRODID*GND + ENSTATUS*GND
BAD[13]  = ENPRODID*GND + ENSTATUS*GND
BAD[12]  = ENPRODID*GND + ENSTATUS*GND
BAD[11]  = ENPRODID*GND + ENSTATUS*GND
BAD[10]  = ENPRODID*GND + ENSTATUS*GND
BAD[9]   = ENPRODID*GND + ENSTATUS*GND
BAD[8]   = ENPRODID*GND + ENSTATUS*GND
BAD[7]   = ENPRODID*VCC + ENSTATUS*GND
BAD[6]   = ENPRODID*VCC + ENSTATUS*GND
BAD[5]   = ENPRODID*VCC + ENSTATUS*GND
BAD[4]   = ENPRODID*VCC + ENSTATUS*GND
BAD[3]   = ENPRODID*VCC + ENSTATUS*HFABCFIFO
BAD[2]   = ENPRODID*GND + ENSTATUS*CONTROL[16]*EFABCFIFO*WORD0
```

```
BAD[1]   = ENPRODID*GND + ENSTATUS*EXPWRGOOD
BAD[0]   = ENPRODID*VCC + ENSTATUS*(CONTROL[17]*CONTROL[16]*EFABCFIFO*WORD0 +
                                    CONTROL[18]*EXINT1 +
                                    CONTROL[19]*EXINT2 +
                                    CONTROL[20]*/EXPWRGOOD +
                                    CONTROL[21]*/HFABCFIFO)
BAS   = AS
BREAD = READ
CONTROL[31..16] = BAD[31..16]*LATCHCONT + CONTROL[31..16]*/LATCHCONT


EX128PIPE = EX128
BREQ = CONTROL[16]*EX128PIPE*(/EFABCFIFO+/WORD0)*/DONE + BREQ*/DONE

INT1INT = CONTROL[17]*CONTROL[16]*EFABCFIFO*WORD0 +
          CONTROL[18]*EXINT1 +
          CONTROL[19]*EXINT2 +
          CONTROL[20]*/EXPWRGOOD +
          CONTROL[21]*/HFABCFIFO
INT1     = INT1INT

BAD[31] = {CONTROL[31]}
BAD[30] = {CONTROL[30]}
BAD[29] = {CONTROL[29]}
BAD[28] = {CONTROL[28]}
BAD[27] = {CONTROL[27]}
BAD[26] = {CONTROL[26]}
BAD[25] = {CONTROL[25]}
BAD[24] = {CONTROL[24]}
BAD[23] = {CONTROL[23]}
BAD[22] = {CONTROL[22]}
BAD[21] = {CONTROL[21]}
BAD[20] = {CONTROL[20]}
BAD[19] = {CONTROL[19]}
BAD[18] = {CONTROL[18]}
BAD[17] = {CONTROL[17]}
BAD[16] = {CONTROL[16]}

ENSLVDLY = BAS*SLOT0 + ENSLVDLY*( /AS*/BIS + /BAS*BIS)

AINTRD   = BAS*SLOT0*BREAD*/BAD[18]*/BAD[17]*/BAD[16]*
                    (/BAD[11]*         /BAD[9]*/BAD[8] +
                     /BAD[11]*/BAD[10]* BAD[9])

AINTWR   = BAS*SLOT0*/BREAD*/BAD[18]*/BAD[17]*/BAD[16]*
                    (/BAD[11]*         /BAD[9]* BAD[8] +
                     /BAD[11]*/BAD[10]* BAD[9]*/BAD[8])

APRODID  = BAS*SLOT0*/BAD[18]*/BAD[17]*/BAD[16]*/BAD[11]*/BAD[10]*/BAD[9]*
                     /BAD[8]
AFIFORST = BAS*SLOT0*/BAD[18]*/BAD[17]*/BAD[16]*/BAD[11]*/BAD[10]*/BAD[9]*
                     BAD[8]
AFIFODAT = BAS*SLOT0*/BAD[18]*/BAD[17]*/BAD[16]*/BAD[11]*/BAD[10]*BAD[9]*
                     /BAD[8]
ANXTMEM  = BAS*SLOT0*/BAD[18]*/BAD[17]*/BAD[16]*/BAD[11]*/BAD[10]*BAD[9]*
                     BAD[8]
ABYCNT   = BAS*SLOT0*/BAD[18]*/BAD[17]*/BAD[16]*/BAD[11]*BAD[10]*/BAD[9]*
                     /BAD[8]
AEXTRST  = BAS*SLOT0*/BAD[18]*/BAD[17]*/BAD[16]*/BAD[11]*BAD[10]*/BAD[9]*
                     BAD[8]
```

```
ACONT     = BAS*SLOT0*/BAD[18]*/BAD[17]*/BAD[16]*BAD[11]*/BAD[10]*/BAD[9]*
                 /BAD[8]
ASTATUS   = BAS*SLOT0*/BAD[18]*/BAD[17]*/BAD[16]*BAD[11]*/BAD[10]*/BAD[9]*
                 BAD[8]
AEXTFAST = BAS*SLOT0*/BAD[18]*/BAD[17]*/BAD[16]*BAD[11]*(/BAD[10]*BAD[9]+
                    BAD[10]*/BAD[9]+BAD[10]*BAD[9]*/BAD[8])
AEXTSLOW = BAS*SLOT0*(BAD[18] + /BAD[18]*/BAD[17]*/BAD[16]*BAD[11]*BAD[10]*
                  BAD[9]*BAD[8])
;--------------------------------- Simulation Segment ------------
SIMULATION

;-----------------------------------------------------------------
```

```
;PALASM Design Description

;---------------------------------- Declaration Segment ------------
TITLE    BISSTATE.PDS
PATTERN  BUS INTERFACE STATE CONTROL MACH FOR THE GIO32-BIS BUS ONLY


CHIP  BISSTATE  MACH435

;---------------------------------- PIN Declarations ---------------
PIN   65        CLK                            COMBINATORIAL ; INPUT
PIN   49        /RESET                         COMBINATORIAL ; INPUT
PIN   9         /BGNT                          COMBINATORIAL ; INPUT
PIN   38        /BBGNT                         REGISTERED ;
PIN   48        HOLDOFF                        COMBINATORIAL ; INPUT
PIN   62        COUNT2                         COMBINATORIAL ; INPUT
NODE  ?         BLOCKDONE                      REGISTERED ;
PIN   78        WORD0                          COMBINATORIAL ; INPUT
PIN   66        /GBA                           REGISTERED ; OUTPUT
PIN   79        /EXRST                         COMBINATORIAL ; OUTPUT
PIN   47        /DIRBA                         REGISTERED ; OUTPUT
PIN   14        /EXRD                          REGISTERED ; OUTPUT
PIN   5         /EXWR                          REGISTERED ; OUTPUT
PIN   51        NOTEXOEH                       REGISTERED ; OUTPUT
PIN   45        NOTEXOEL                       REGISTERED ; OUTPUT
PIN   25        /OFIFOOE                       REGISTERED ; OUTPUT
PIN   26        /OFIFOENR                      COMBINATORIAL ; OUTPUT
PIN   18        /RDFIFO                        REGISTERED ; OUTPUT
PIN   80        /WRFIFO                        REGISTERED ; OUTPUT
PIN   3         /RSTFIFO                       REGISTERED ; OUTPUT
PIN   55        LDADD                          REGISTERED ; OUTPUT
PIN   68        OUTADD                         REGISTERED ; OUTPUT
PIN   60        INCADD                         REGISTERED ; OUTPUT
PIN   57        LDBC                           REGISTERED ; OUTPUT
PIN   67        OUTBC                          REGISTERED ; OUTPUT
PIN   59        DECBC                          REGISTERED ; OUTPUT
NODE  82        /MAS          PAIR AS          REGISTERED ;
PIN   61        /AS                            REGISTERED ; INPUT
PIN   37        /BAS                           REGISTERED ;
NODE  96        NOTMREAD      PAIR READ        REGISTERED ;
PIN   54        READ                           REGISTERED ; INPUT
PIN   39        BREAD                          REGISTERED ;
NODE  50        NOTMDLY       PAIR MASDLY      REGISTERED ;
PIN   40        MASDLY                         REGISTERED ; INPUT
NODE  114       NOTSDLY       PAIR SLVDLY      REGISTERED ;
PIN   82        SLVDLY                         REGISTERED ; INPUT
NODE  3         WST[2]                         REGISTERED ;
NODE  7         WST[1]                         REGISTERED ;
NODE  5         WST[0]                         REGISTERED ;
PIN   19        RST[2]                         REGISTERED ;
PIN   16        RST[1]                         REGISTERED ;
PIN   17        RST[0]                         REGISTERED ;
PIN   30        MST[3]                         REGISTERED ;
PIN   29        MST[2]                         REGISTERED ;
PIN   28        MST[1]                         REGISTERED ;
PIN   24        MST[0]                         REGISTERED ;
PIN   77        ENSLVDLY                       COMBINATORIAL ; INPUT
```

```
PIN  81         LATCHCONT                               REGISTERED ; OUTPUT
PIN  13         ENCONTROL                               REGISTERED ; OUTPUT
PIN  12         ENSTATUS                                REGISTERED ; OUTPUT
PIN  73         ENPRODID                                REGISTERED ; OUTPUT
PIN  70         ENLOWORD                                REGISTERED ; OUTPUT
PIN  56         /ENADDCLK                               REGISTERED ; OUTPUT
PIN  58         /ENBCCLK                                REGISTERED ; OUTPUT
PIN  50         AINTRD                                  COMBINATORIAL ; INPUT
PIN  6          AINTWR                                  COMBINATORIAL ; INPUT
PIN  7          APRODID                                 COMBINATORIAL ; INPUT
PIN  75         AFIFORST                                COMBINATORIAL ; INPUT
PIN  52         AFIFODAT                                COMBINATORIAL ; INPUT
PIN  8          ANXTMEM                                 COMBINATORIAL ; INPUT
PIN  76         ABYCNT                                  COMBINATORIAL ; INPUT
PIN  36         AEXTRST                                 COMBINATORIAL ; INPUT
PIN  23         ACONT                                   COMBINATORIAL ; INPUT
PIN  46         ASTATUS                                 COMBINATORIAL ; INPUT
PIN  83         AEXTFAST                                COMBINATORIAL ; INPUT
PIN  20         AEXTSLOW                                COMBINATORIAL ; INPUT
PIN  4          WROPER                                  REGISTERED ;
PIN  15         RDOPER                                  REGISTERED ;
PIN  27         DONE                                    REGISTERED ; OUTPUT
NODE 51         BMASDLY                                 REGISTERED ;
NODE 115        BSLVDLY                                 REGISTERED ;
NODE 68         RDDONE                                  REGISTERED ;

GROUP MACH_SEG_A WROPER WST[2] WST[1] WST[0]
                 EXWR   RSTFIFO

GROUP MACH_SEG_B RDOPER RST[2] RST[1] RST[0]
                 ENSTATUS ENCONTROL EXRD RDFIFO

GROUP MACH_SEG_C MST[3] MST[2] MST[1] MST[0]
                 DONE   OFIFOENR OFIFOOE

GROUP MACH_SEG_D BREAD  BBGNT
                 MASDLY BAS    BMASDLY

GROUP MACH_SEG_E NOTEXOEH NOTEXOEL DIRBA
                 RDDONE

GROUP MACH_SEG_F ENBCCLK DECBC LDBC ENADDCLK
                 INCADD  LDADD READ AS

GROUP MACH_SEG_G ENPRODID ENLOWORD
                 GBA    OUTBC    OUTADD

GROUP MACH_SEG_H LATCHCONT EXRST SLVDLY
                 WRFIFO    BSLVDLY
;----------------------------------- Boolean Equation Segment ------
EQUATIONS
BBGNT.RSTF          = RESET
BBGNT.SETF          = GND
GBA.RSTF            = RESET
GBA.SETF            = GND
EXRD.RSTF           = RESET
EXRD.SETF           = GND
EXWR.RSTF           = RESET
EXWR.SETF           = GND
DIRBA.RSTF          = RESET
```

```
DIRBA.SETF          = GND
NOTEXOEH.RSTF       = RESET
NOTEXOEH.SETF       = GND
NOTEXOEL.RSTF       = RESET
NOTEXOEL.SETF       = GND
OFIFOOE.RSTF        = RESET
OFIFOOE.SETF        = GND
RDFIFO.RSTF         = RESET
RDFIFO.SETF         = GND
WRFIFO.RSTF         = RESET
WRFIFO.SETF         = GND
RSTFIFO.RSTF        = RESET
RSTFIFO.SETF        = GND
LDADD.RSTF          = RESET
LDADD.SETF          = GND
OUTADD.RSTF         = RESET
OUTADD.SETF         = GND
INCADD.RSTF         = RESET
INCADD.SETF         = GND
LDBC.RSTF           = RESET
LDBC.SETF           = GND
OUTBC.RSTF          = RESET
OUTBC.SETF          = GND
DECBC.RSTF          = RESET
DECBC.SETF          = GND
AS.RSTF             = RESET
AS.SETF             = GND
MAS.RSTF            = RESET
MAS.SETF            = GND
BAS.RSTF            = RESET
BAS.SETF            = GND
READ.RSTF           = RESET
READ.SETF           = GND
NOTMREAD.RSTF       = RESET
NOTMREAD.SETF       = GND
BREAD.RSTF          = RESET
BREAD.SETF          = GND
NOTMDLY.RSTF        = RESET
NOTMDLY.SETF        = GND
MASDLY.RSTF         = RESET
MASDLY.SETF         = GND
NOTSDLY.RSTF        = RESET
NOTSDLY.SETF        = GND
SLVDLY.RSTF         = RESET
SLVDLY.SETF         = GND
WST[2..0].RSTF      = RESET
WST[2..0].SETF      = GND
RST[2].RSTF         = RESET
RST[2].SETF         = GND
RST[1].RSTF         = RESET
RST[1].SETF         = GND
RST[0].RSTF         = RESET
RST[0].SETF         = GND
MST[3..0].RSTF      = RESET
MST[3..0].SETF      = GND
LATCHCONT.RSTF      = RESET
LATCHCONT.SETF      = GND
ENCONTROL.RSTF      = RESET
ENCONTROL.SETF      = GND
ENSTATUS.RSTF       = RESET
```

```
ENSTATUS.SETF        = GND
ENPRODID.RSTF        = RESET
ENPRODID.SETF        = GND
ENLOWORD.RSTF        = RESET
ENLOWORD.SETF        = GND
ENADDCLK.RSTF        = RESET
ENADDCLK.SETF        = GND
ENBCCLK.RSTF         = RESET
ENBCCLK.SETF         = GND
WROPER.RSTF          = RESET
WROPER.SETF          = GND
RDOPER.RSTF          = RESET
RDOPER.SETF          = GND
DONE.RSTF            = RESET
DONE.SETF            = GND
BMASDLY.RSTF         = RESET
BMASDLY.SETF         = GND
BSLVDLY.RSTF         = RESET
BSLVDLY.SETF         = GND
RDDONE.RSTF          = RESET
RDDONE.SETF          = GND
BLOCKDONE.RSTF       = RESET
BLOCKDONE.SETF       = GND

BBGNT.CLKF           = CLK
GBA.CLKF             = CLK
DIRBA.CLKF           = CLK
EXRD.CLKF            = CLK
EXWR.CLKF            = CLK
NOTEXOEH.CLKF        = CLK
NOTEXOEL.CLKF        = CLK
OFIFOOE.CLKF         = CLK
RDFIFO.CLKF          = CLK
WRFIFO.CLKF          = CLK
RSTFIFO.CLKF         = CLK
LDADD.CLKF           = CLK
OUTADD.CLKF          = CLK
INCADD.CLKF          = CLK
LDBC.CLKF            = CLK
OUTBC.CLKF           = CLK
DECBC.CLKF           = CLK
MAS.CLKF             = CLK
BAS.CLKF             = CLK
NOTMREAD.CLKF        = CLK
BREAD.CLKF           = CLK
NOTMDLY.CLKF         = CLK
NOTSDLY.CLKF         = CLK
WST[2..0].CLKF       = CLK
RST[2..0].CLKF       = CLK
MST[3..0].CLKF       = CLK
LATCHCONT.CLKF       = CLK
ENCONTROL.CLKF       = CLK
ENSTATUS.CLKF        = CLK
ENPRODID.CLKF        = CLK
ENLOWORD.CLKF        = CLK
ENADDCLK.CLKF        = CLK
ENBCCLK.CLKF         = CLK
WROPER.CLKF          = CLK
RDOPER.CLKF          = CLK
DONE.CLKF            = CLK
```

```
BMASDLY.CLKF        = CLK
BSLVDLY.CLKF        = CLK
RDDONE.CLKF         = CLK
BLOCKDONE.CLKF      = CLK

AS.TRST             = BGNT*BBGNT*/DONE
READ.TRST           = BGNT*BBGNT*/DONE
MASDLY.TRST         = BGNT*BBGNT*/DONE
SLVDLY.TRST         = ENSLVDLY*/RDDONE

BAS     = AS
BREAD   = READ
BBGNT   = BGNT*/DONE


MAS       = MST[3]*/MST[2]*MST[1]*/MST[0]
AS        = {MAS}
NOTMREAD  = MST[3]*/MST[2]*MST[1]*/MST[0] +
            NOTMREAD*/(MST[3]*MST[2]*MST[1]*/MST[0]*/SLVDLY*BLOCKDONE)
/READ     = {NOTMREAD}
NOTMDLY   = MST[3]*MST[2]*/MST[1]*MST[0] + NOTMDLY*/BLOCKDONE
/MASDLY   = {NOTMDLY}

WROPER    = (BAS*/BREAD + WROPER*/READ)*/BGNT
RDOPER    = (BAS* BREAD + RDOPER*/READ)*/BGNT

WST[0]    = WROPER*(WST[2]+WST[1])*/WST[0] +
            WROPER*AEXTSLOW*/WST[2]*/WST[1]*/WST[0]*/MASDLY*/HOLDOFF

WST[1]    = WROPER*(WST[1]*/WST[0] + /WST[1]*WST[0])

WST[2]    = WROPER*(AINTWR+ACONT+AEXTFAST)*
                    /MASDLY*/WST[1]*/WST[0] +
            WROPER*AEXTSLOW*/WST[2]*WST[1]*WST[0] +
            WROPER*WST[2]*(/WST[1]+/WST[0])

RST[0]    = RDOPER*(RST[2]*/RST[1]*/RST[0]+RST[2]*/RST[1]*RST[0]*/BMASDLY) +
            RDOPER*AEXTSLOW*
            (/RST[2]*/RST[1] */RST[0]*/HOLDOFF + /RST[2]*RST[1]*/RST[0])

RST[1]    = RDOPER*(RST[1]*/RST[0] + /RST[1]*RST[0])

RST[2]    = RDOPER*(AINTRD+ACONT+ASTATUS+AEXTFAST)*(/RST[1]+/RST[0]) +
            RDOPER*AEXTSLOW*/RST[2]*RST[1]*RST[0] +
            RDOPER*RST[2]*(/RST[1]+/RST[0])


NOTSDLY   =WROPER*/WST[2]* WST[1]* WST[0] +
            WROPER*(AINTWR+ACONT+AEXTFAST)*
                   /WST[2]*/WST[1]*/WST[0] +
            WROPER* WST[2]*/WST[1] +
            RDOPER*RST[2]*/RST[1]*RST[0] +
            RDOPER*NOTSDLY*BMASDLY
/SLVDLY    = {NOTSDLY}

RSTFIFO   = AFIFORST*WROPER* WST[2]*/WST[1]*/WST[0]*/MASDLY
WRFIFO    = AFIFODAT*WROPER* WST[2]*/WST[1]*/WST[0]*/MASDLY + RESET
EXRST     = AEXTRST *WROPER* WST[2]*/WST[1]*/WST[0]*/MASDLY
LATCHCONT= ACONT    *WROPER* WST[2]*/WST[1]*/WST[0]*/MASDLY
```

```
EXWR      = (ACONT+AEXTFAST)*WROPER* WST[2]*/WST[1]*/WST[0]*/MASDLY +
            AEXTSLOW*WROPER*(/MASDLY*/WST[2]*/WST[1]*/WST[0]+EXWR*BSLVDLY)
EXRD      = RDOPER*/AINTRD*RST[2]*/RST[1]*/RST[0] + EXRD*(SLVDLY+BMASDLY) +
            RDOPER*AEXTSLOW*/RST[2]*/RST[1]*/RST[0]*/HOLDOFF

LDADD     = /MST[3]*MST[2]*/MST[1]*/MST[0]
OUTADD    = RDOPER*ANXTMEM*RST[2]*/RST[1]*/RST[0] +
                 ANXTMEM*OUTADD*(SLVDLY+BMASDLY) +
            MST[3]*/MST[2]*/MST[1]*MST[0]
INCADD    = (MST[3]*MST[2]*/MST[1]* MST[0]+MST[3]*MST[2]*MST[1]*/MST[0])*
                 /SLVDLY*/BLOCKDONE
ENADDCLK  = /MST[3]*MST[2]*/MST[1]*/MST[0] +
            (MST[3]*MST[2]*/MST[1]* MST[0]+MST[3]*MST[2]*MST[1]*/MST[0])*
                 /SLVDLY*/BLOCKDONE
LDBC      = /MST[3]*MST[2]*MST[1]*MST[0]
OUTBC     = RDOPER*ABYCNT*RST[2]*/RST[1]*/RST[0] +
                 ABYCNT*OUTBC*(SLVDLY+BMASDLY) +
            MST[3]*/MST[2]*MST[1]*/MST[0]
DECBC     = (MST[3]*MST[2]*/MST[1]* MST[0]+MST[3]*MST[2]*MST[1]*/MST[0])*
                 /SLVDLY*/BLOCKDONE
ENBCCLK   = /MST[3]*MST[2]*MST[1]*MST[0] +
            (MST[3]*MST[2]*/MST[1]* MST[0]+MST[3]*MST[2]*MST[1]*/MST[0])*
                 /SLVDLY*/BLOCKDONE
GBA       = RDOPER*(AINTRD+ACONT+ASTATUS+AEXTFAST+AEXTSLOW)*
                 /RST[2]*/RST[1]*/RST[0] +RDOPER*GBA*(SLVDLY+BMASDLY) +
            BGNT*BBGNT
DIRBA     = RDOPER*(ACONT+ASTATUS+AEXTFAST)*RST[2]*/RST[1]*/RST[0] +
            RDOPER*DIRBA*(SLVDLY+BMASDLY) +
            RDOPER*AEXTSLOW*/RST[2]*/RST[1]*RST[0] +
            MST[3]*MST[2]*/MST[1]*/MST[0] +
              DIRBA*BGNT*/(MST[3]*MST[2]*MST[1]*/MST[0]*/BSLVDLY*BLOCKDONE)
NOTEXOEH  = ACONT*RST[2]*/RST[1]*/RST[0] + NOTEXOEH*(SLVDLY+MASDLY)
NOTEXOEL  = ASTATUS*RST[2]*/RST[1]*/RST[0] + NOTEXOEL*(SLVDLY+BMASDLY)
ENLOWORD  = (APRODID+ASTATUS)*RDOPER*RST[2]*/RST[1]*/RST[0] +
              ENLOWORD*(SLVDLY+BMASDLY)
ENPRODID  = APRODID* RDOPER*RST[2]*/RST[1]*/RST[0]+ENPRODID*(SLVDLY+BMASDLY)
RDFIFO    = AFIFODAT*RDOPER*RST[2]*/RST[1]*/RST[0] +
            RDOPER*RDFIFO*(SLVDLY+BMASDLY) +
            /MST[3]*MST[1]*MST[0] + /MST[3]*MST[2]*/MST[0]

OFIFOOE   = MST[3]*/MST[2]*MST[1]*MST[0] +
              OFIFOOE*BGNT*/(MST[3]*MST[2]*MST[1]*/MST[0]*/BSLVDLY*BLOCKDONE)
OFIFOENR  = MST[3]*MST[2]*/MST[1] +
            MST[3]*MST[2]* MST[1]*/MST[0]*/(BLOCKDONE + COUNT2*/BSLVDLY)

ENCONTROL= ACONT   *RDOPER*RST[2]*/RST[1]*/RST[0]+ENCONTROL*(SLVDLY+BMASDLY)
ENSTATUS = ASTATUS *RDOPER*RST[2]*/RST[1]*/RST[0]+ENSTATUS*(SLVDLY+BMASDLY)

DONE      = MST[3]*MST[2]*MST[1]*MST[0] + DONE*BGNT

MST[0].T = BGNT*BBGNT*/DONE*/(MST[3]*MST[2]*/MST[1]*/MST[0]*SLVDLY)*
                /( MST[3]* MST[2]* MST[1]*/MST[0]*/BSLVDLY*/BLOCKDONE)
MST[1].T = BGNT*BBGNT*/DONE*MST[0] +
           BGNT*BBGNT*/DONE*/MST[3]*/MST[2]*/MST[1]*/MST[0]*WORD0
MST[2].T = BGNT*BBGNT*/DONE*MST[1]*MST[0]
MST[3].T = BGNT*BBGNT*/DONE*MST[2]*MST[1]*MST[0] +
           BGNT*BBGNT*/DONE*/MST[3]*/MST[2]*/MST[1]*/MST[0]*/WORD0

BSLVDLY  = SLVDLY
BMASDLY  = MASDLY
```

```
RDDONE    = RST[2]*RST[1]*RST[0] + RDDONE*/BAS
BLOCKDONE = COUNT2*/BSLVDLY
;------------------------------------ Simulation Segment ------------
SIMULATION

;-------------------------------------------------------------------
```

HIPROM.ASC

B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
F75756F6B6B4B4B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B3B3B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B5B4B6B6B6B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B6B6B2949C94B4A4A4A4A4B2949C94B4A4A4A4A4B2949C94B4A4A4A4A4B2949C
94B4A4A4A4A4B2949C94B4A4A4A4A4B2949C94B4A4A4A4A4B2949C94B4A4A4A4
A4B2949C94B4A4A4A4A4B2949C94B4A4A4A4A4B2949C94B4A4A4A4A4B2949C94
B4A4A4A4A4B2949C94B4A4A4A4A4B2949C94B4A4A4A4A4B2949C94B4A4A4A4A4
B2949C94B4A4A4A4A4B2949C94B4A4A4A4A4B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B696969494949496969694949494969696949494949696969494949496969694
9494949696969494949496969694949494969696949494949696969494949496
9696949494949696969494949496969694949494969696949494949696969494
949496969694949494969696949494949696B7B7B7B7B7B7B7B7B7B7B7B7B7B7
B6B6B6B4B4B4B4B6B6B6B4B4B4B4B6B6B6B4B4B4B4B6B6B6B4B4B4B4B6B6B6B4
B4B4B4B6B6B6B4B4B4B4B6B6B6B4B4B4B4B6B6B6B4B4B4B4B6B6B6B4B4B4B4B6
B6B6B4B4B4B4B6B6B6B4B4B4B4B6B6B6B4B4B4B4B6B6B6B4B4B4B4B6B6B6B4B4
B4B4B6B6B6B4B4B4B4B6B6B6B4B4B4B4B6B6B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7

B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
B7B7B7B7B7B7B7B7B7B7B7B7B7B7B7B7B7B7B7B7B7B7B7B7B7B7B7B7B7B7B7B7
0000

LOPROM.ASC 0505050505050505050505050505050505050505050505050505050505050505
0505050505050505050505050505050505050505050505050505050505050505
0504040505050D05050505050505050505050505050505050505050505050505
0505050505050505050505050505050505050505050505050505050505050505
0D05050505050505050505050505050505050505050505050505050505050505
0505050505050505050505050505050505050505050505050505050505050505
050505050D0505050505050505050505050505050505050505050505050505050505
0505050505050505050505050505050505050505050505050505050505050505
0901010505050505050505050505050505050505050505050505050505050505
0505050505050505050505050505070505050505050505050705050505050505
0505050505070505050505050505070505050505050705050505050507050505
0705050505050505050705050505050505050505050507050505050505050507
0505050507050505050505050505070505050505050505050505050705050505
0505050505050505070505050505050505070505050505050505050505050505
0505050705050505050505050505070505050D05050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
05050505050505050505050505050505050505050505050505050505050D0505
0505050505050505050505050505050505050505050505070505050505050507
0505050705050505050505050505070505050505050505050705050505050505070505050505
0505050505070505050505050505070505050505050505070505050505050505070505
0505070505050505050505070505050505050505070505050505050505050505050505
0505050505070505050505050507050505050D05050505050505050604040404040406
0504040604040404040404040406040404040404040406040404040404040406040404040404
0404040404040604040404040404040604040404040404060404040404040406 04
0404060404040404040404060404040404040406040404050505050505050505050505
040404040406040404040404040604040C04040505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505
0505050505050505050505050505050505050505050505050505050505050505

05050505050505050505050505050505050505050505050505050505050505050505050505050505
05050505050505050505050505050505050505050505050505050505050505050505050505050505
05050505050505050505050505050505050505050505050505050505050505050505050505050505
05050505050505050505050505050505050505050505050505050505050505050505050505050505
00

IMPROM.ASC

```
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
0F4F4F5F5F5F5F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
6F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4E4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
CFCFCFCFCFCFCFCDC5CCCDCFCFCFCFCFCDC5CCCDCFCFCFCFCFCDC5CCCDCFCFCF
CFCFCDC5CCCDCFCFCFCFCFCDC5CCCDCFCFCFCFCFCDC5CCCDCFCFCFCFCFCDC5CC
CDCFCFCFCFCFCDC5CCCDCFCFCFCFCFCDC5CCCDCFCFCFCFCFCDC5CCCDCFCFCFCF
CFCDC5CCCDCFCFCFCFCFCDC5CCCDCFCFCFCFCFCDC5CCCDCFCFCFCFCFCDC5CCCD
CFCFCFCFCFCFCDC5CCCDCFCFCFCFCFCDC5CCCD4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4E4E4E4E4E4E4E4E4E4E4E4E4E4E4E4E4E4E4E4E4E4E4E4E4E4E4E4E4E4E
4E4E4E4E4E4E4E4E4E4E4E4E4E4E4E4E4E4E4E4E4E4E4E4E4E4E4E4E4E4E
4E4E4E4E4E4E4E4E4E4E4E4E4E4E4E4E4E4E4E4E4E4E4E4E4E4E4E4E4E4E
4E4E4E4E4E4E4E4E4E4E4E4E4E4E4E4E4E4E4E4E4E4E4E4E4E4E4E4E4E4E
CFCFCFCFCECFCFCFCFCFCFCECFCFCFCFCFCFCECFCFCFCFCFCFCECFCFCFCFCFCF
CECFCFCFCFCFCFCECFCFCFCFCFCFCECFCFCFCFCFCFCECFCFCFCFCFCFCECFCFCF
CFCFCFCECFCFCFCFCFCFCECFCFCFCFCFCFCECFCFCFCFCFCFCECFCFCFCFCFCFCE
CFCFCFCFCFCFCECFCFCFCFCFCFCECFCFCFCF4F4F4F4F4F4F4F4F4F4F4F4F
CFCFCFCFCECFCFCFCFCFCFCECFCFCFCFCFCFCECFCFCFCFCFCFCECFCFCFCFCFCF
CECFCFCFCFCFCFCECFCFCFCFCFCFCECFCFCFCFCFCFCECFCFCFCFCFCFCECFCFCF
CFCFCFCECFCFCFCFCFCFCECFCFCFCFCFCFCECFCFCFCFCFCFCECFCFCFCFCFCFCE
CFCFCFCFCFCFCECFCFCFCFCFCFCECFCFCFCF4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F
```

4F4F4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F4F4F
4F4F4F4F4F4F4F4F4F4F4F4F4F4F4F4F4F4F4F4F4F4F4F4F4F4F4F4F4F4F4F4F
00

What is claimed is:

1. A method for generating an imaging signal representative of a three dimensional surface of a target comprising the steps of measuring a fixed number of first intensity values, wherein each of said first intensity values corresponds to one of a plurality of positions on the surface of said target, each of said first intensity values being measured at a first height of said target, storing each of said first intensity values at one of a plurality of addresses within a first memory, each of said plurality of addresses within said first memory corresponding to one of said plurality of positions on the surface of said target, measuring a fixed number of second intensity values, wherein each of said second intensity values corresponds to one of said plurality of positions on the surface of said target, each of said second intensity values being measured at a second height of said target, comparing said second intensity values with said first intensity values, such that said second intensity values and said first intensity values which were measured at the same positions on the surface of the target are compared, overwriting said first intensity values in said first memory with said second intensity values when said second intensity values are greater than said first intensity values.

2. The method of claim 1, further comprising the steps of:

storing said first height at each of a plurality of addresses within a second memory, each of said plurality of addresses within said second memory corresponding to one of said plurality of addresses within said first memory; and when said first intensity values in said first memory are overwritten with said second intensity values, overwriting said first height with said second height in said addresses within said second memory which correspond to the addresses within said first memory at which said first intensity values are overwritten with said second intensity values.

3. The method of claim 2, further comprising the step of downloading said intensity values stored in said first memory and said heights stored in said second memory to a host work station.

4. The method of claim 3, wherein said step of downloading includes direct memory accessing of a memory within said host work station.

5. A circuit for generating a surface image of a three-dimensional target, the circuit comprising:

a scanner circuit which repeatedly scans a light beam over the target in a predetermined two dimensional pattern;

a detector circuit coupled to the scanner circuit, wherein the detector circuit measures intensity values of the light beam reflected from the target at a plurality of positions in the two dimensional pattern;

an actuator coupled to the target, wherein the actuator moves the target to successive target heights along a direction substantially perpendicular to the two dimensional pattern each time the scanner circuit completes a scan along the two dimensional pattern;

a first memory coupled to the detector circuit, wherein the first memory has a plurality of addresses which correspond to the positions in the two dimensional pattern at which the intensity values are measured, and wherein the first memory stores the intensity values measured at a first target height;

a second memory having a plurality of addresses that correspond to the addresses of the first memory, wherein each of the addresses of the second memory stores the first target height; and a comparator circuit coupled to the detector circuit, the first memory and the second memory, wherein the comparator circuit compares the intensity values measured at the first target height with intensity values measured at corresponding positions on the two dimensional pattern at a second target height, and where the intensity values measured at the second target height exceed the intensity values measured at the first target height, overwrites the first intensity values with the second intensity values at a corresponding address of the first memory and overwrites the first target height with the second target height at a corresponding address of the second memory.

6. The circuit of claim 5, further comprising:

a host work station which generates a video image having a blank area;

a video monitor; and a video signal summing circuit coupled to the first memory, the host work station and the video monitor, wherein the video signal summing circuit combines the intensity values stored in the first memory with the video image of the host work station for display on the video monitor, wherein the intensity values stored in the first memory are displayed in the blank area of the video image.

7. The circuit of claim 5, wherein the two dimensional pattern is formed by alternating forward and backwards linear movements along the target, the circuit further comprising a line reversal circuit which reverses the order of the pixel intensity values measured during the backwards linear movements.

* * * * *